(12) United States Patent
Starr et al.

(10) Patent No.: US 7,768,739 B2
(45) Date of Patent: Aug. 3, 2010

(54) ELECTRICAL CONTACTS CONNECTING STORAGE MAGAZINE TO DOCKING STATION IN A DATA STORAGE LIBRARY HAVING NON MALE/FEMALE-TYPE PIN-ENGAGING-PAD COOPERATION

(75) Inventors: Matthew Thomas Starr, Lafyette, CO (US); Christian Cameron Curtis, Thornton, CO (US); Ray Dean Heineman, Gig Harbor, WA (US)

(73) Assignee: Spectra Logic Corporation

( * ) Notice: Subject to any disclaimer, the term of this patent is extended or adjusted under 35 U.S.C. 154(b) by 268 days.

(21) Appl. No.: 11/608,533

(22) Filed: Dec. 8, 2006

(65) Prior Publication Data
US 2007/0103810 A1    May 10, 2007

Related U.S. Application Data

(63) Continuation of application No. 10/605,222, filed on Sep. 16, 2003, now Pat. No. 7,400,469.

(51) Int. Cl.
*G11B 15/68* (2006.01)
*G11B 21/08* (2006.01)
*G11B 7/085* (2006.01)

(52) U.S. Cl. ............ 360/92.1; 369/30.39; 369/30.42; 369/30.83

(58) Field of Classification Search ............ 360/92.1, 360/99.08; 369/30.83, 30.42, 30.39; 439/66; 710/104, 303
See application file for complete search history.

(56) References Cited

U.S. PATENT DOCUMENTS

| | | | |
|---|---|---|---|
| 4,386,382 A | 5/1983 | Cutler et al. | |
| 5,157,564 A | 10/1992 | Theobald et al. | |
| 5,235,474 A | 8/1993 | Searle | |
| 5,442,500 A | * 8/1995 | Hidano et al. | ............ 360/92.1 |
| 5,521,586 A | 5/1996 | Takeshita | |
| 5,526,217 A | 6/1996 | Gormley et al. | |
| 5,684,654 A | 11/1997 | Searle et al. | |
| 5,738,537 A | 4/1998 | Setoguchi et al. | |

(Continued)

FOREIGN PATENT DOCUMENTS

WO    WO2005/010661 A2    2/2005

(Continued)

OTHER PUBLICATIONS

U.S. Appl. No. 11/126,025, Rector et al.

(Continued)

*Primary Examiner*—A. J. Heinz

(57) ABSTRACT

Described herein is a mobile data storage magazine for interacting with a docking station. The magazine can include a magazine frame containing a plurality of operatively interconnected disk drives, a first contact element associated with the magazine frame capable of conducting electrical power to at least one of the plurality of disk drives when engaged with a second contact element associated with the docking station wherein the first and second contact elements are adapted to cooperate in a non male/female relationship. The magazine can further comprise a first communication element capable of conducting data between at least one of the plurality of disk drives and the docking station when the first communication element is operatively linked to a second communication element associated with the docking station.

20 Claims, 187 Drawing Sheets

U.S. PATENT DOCUMENTS

| | | | |
|---|---|---|---|
| 5,768,047 A | 6/1998 | Ulrich et al. | |
| 5,818,723 A | 10/1998 | Dimitri | |
| 5,867,344 A | 2/1999 | Ellis et al. | |
| 5,995,320 A | 11/1999 | Ostwald | |
| 6,034,928 A | 3/2000 | Inoue | |
| 6,215,611 B1 | 4/2001 | Gibbons | |
| 6,266,574 B1 | 7/2001 | Searle et al. | |
| 6,324,608 B1 * | 11/2001 | Papa et al. | 710/104 |
| 6,344,946 B1 * | 2/2002 | Papst | 360/99.08 |
| 6,375,344 B1 * | 4/2002 | Hanson et al. | 710/303 |
| 6,411,462 B1 | 6/2002 | Ostwald et al. | |
| 6,454,572 B1 * | 9/2002 | Konetski et al. | 439/66 |
| 6,512,962 B2 | 1/2003 | Dimitri et al. | |
| 6,600,703 B1 * | 7/2003 | Emberty et al. | 369/30.83 |
| 6,639,751 B2 | 10/2003 | Brace et al. | |
| 6,650,961 B2 | 11/2003 | Deckers | |
| 6,704,832 B1 | 3/2004 | Ng | |
| 6,782,448 B2 | 8/2004 | Goodman et al. | |
| 6,796,813 B1 | 9/2004 | L'Hermet | |
| 6,845,422 B2 | 1/2005 | Shimada et al. | |
| 6,859,854 B2 | 2/2005 | Kwong | |
| 6,880,033 B1 | 4/2005 | Mahmoud et al. | |
| 6,957,291 B2 | 10/2005 | Moon et al. | |
| 2003/0040836 A1 | 2/2003 | Deckers | |
| 2003/0076618 A1 | 4/2003 | Brace et al. | |
| 2004/0105187 A1 | 6/2004 | Woodruff et al. | |
| 2004/0181388 A1 | 9/2004 | Yip et al. | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Armagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0047258 A1 | 3/2005 | Starr et al. | |
| 2005/0063089 A1 | 3/2005 | Starr et al. | |
| 2005/0065637 A1 | 3/2005 | Lantry et al. | |
| 2005/0195517 A1 | 9/2005 | Brace et al. | |
| 2005/0195518 A1 | 9/2005 | Starr et al. | |
| 2005/0195519 A1 | 9/2005 | Kumpon et al. | |
| 2005/0195520 A1 | 9/2005 | Starr et al. | |
| 2005/0219964 A1 | 10/2005 | Pollard et al. | |
| 2005/0246484 A1 | 11/2005 | Lantry et al. | |
| 2005/0267627 A1 | 12/2005 | Lantry et al. | |
| 2006/0064953 A1 | 3/2006 | Wong | |
| 2006/0070059 A1 | 3/2006 | Starr et al. | |
| 2006/0095657 A1 | 5/2006 | Rector et al. | |
| 2006/0112138 A1 | 5/2006 | Fenske et al. | |
| 2006/0126209 A1 | 6/2006 | Starr et al. | |
| 2006/0134997 A1 | 6/2006 | Curtis et al. | |
| 2006/0161936 A1 | 7/2006 | Permut et al. | |
| 2006/0164928 A1 | 7/2006 | Starr et al. | |
| 2006/0215300 A1 | 9/2006 | Starr et al. | |

FOREIGN PATENT DOCUMENTS

| | | |
|---|---|---|
| WO | PCT/US05/45168 | 12/2005 |
| WO | PCT/US05/46447 | 12/2005 |

OTHER PUBLICATIONS

U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.

* cited by examiner

ELECTRICAL CONTACTS CONNECTING STORAGE MAGAZINE TO DOCKING STATION IN A DATA STORAGE LIBRARY HAVING NON MALE/FEMALE-TYPE PIN-ENGAGING-PAD COOPERATION

CROSS-REFERENCE TO RELATED APPLICATIONS

This application is a continuation of U.S. Ser. No. 10/605,222, filed Sep. 16, 2003 and now U.S. Pat. No. 7,400,469 which is incorporated herein by reference.

FIELD OF THE INVENTION

The present invention is directed to a data cartridge library that is useful in storing data on a recording medium located in a cartridge and/or retrieving data from such a recording medium.

BACKGROUND OF THE INVENTION

Presently, data cartridge libraries are primarily used to archive data, i.e., store data that is not immediately needed by the host computer, and provide archived data to the host computer when the data is needed. To elaborate, the typical data cartridge library receives data from a host computer and causes the data to be stored or recorded on the recording medium located in one or more data cartridges. When the host computer requires some of the data that was previously stored in a data cartridge, a request for the data is sent from the host computer to the library. In response, the library identifies the data cartridge(s) in which the desired data is located, retrieves the data from the recording medium within the cartridge(s), and transmits the retrieved data to the host computer system.

Presently, most data cartridge libraries are comprised of: (a) a plurality of storage slots for holding data cartridges with the slots being in fixed locations during operation of the library; (b) one or more drives that are each capable of writing data onto the recording medium located in a data cartridge and/or reading data from the recording medium located in a data cartridge; (c) a cartridge picker device that is capable of moving individual data cartridges between the slots and the drives; and (d) an interface for receiving data from and transmitting data to a host computer. Such libraries are considered to be "cartridge based" data cartridge libraries (hereinafter referred to as cartridge-based libraries) because, during operation of the library, the movement of cartridges to and from the fixed storage slots is accomplished solely by a cartridge picker device that transports individual cartridges. Generally, the operation of a "cartridge-based" library involves using the cartridge picker device: (a) to move a cartridge from a fixed storage slot to a drive so that data can be either written on to or read from the recording medium in a cartridge; and (b) to move a cartridge from a drive to a storage slot.

One approach to implementing storage slots in a "cartridge-based" library is to create a wall with a number of fixed slots. This approach has a distinct drawback when adding cartridges to the library and removing cartridges from the library. Namely, the fixed slots require the cartridges to be loaded into the slots one at a time and removed from the slots one at a time. This drawback is particularly acute in situations in which a library has a large number of slots and a large number of cartridges either needed to be inserted into or removed from the slots. An example of such as situation is when the library is being initially populated with cartridges.

In such situations, an operator typically powers down the library and inserts the cartridges into the slots by hand. Another approach to the implementation of storage slots in a "cartridge-based" library involves the use of a data cartridge magazine that an operator can mount or demount from a wall in the library. Typically, the magazine is a box-like structure that has an open side through which cartridges can be inserted into and removed from the magazine, a partitioning structure that defines a number of slots for holding data cartridges, and a mounting structure that allows the magazine to be mounted and demounted from a wall in the library. A significant advantage of the magazine approach is that an operator, by manipulating magazines rather than individual cartridges, is able to more quickly insert a large number of cartridges into a library and more quickly remove a large number of cartridges from a library. However, regardless of whether cartridges are being inserted into or removed from the library, the operator is still typically required to powerdown the library or otherwise disable the cartridge picker device to avoid being injured by the device during the mounting or de-mounting of a magazine.

In many instances, only one data cartridge needs to be either inserted into or extracted from a "cartridge-based" library. In these instances, the powering down of the library or disabling of the cartridge picker device so that an operator can insert or extract the cartridge is undesirable. To address this situation, many "cartridge-based" libraries employ an entry/exit port that allows an operator to insert a single data cartridge into the library and extract a single data cartridge from the library without being exposed to the cartridge picker device. Because the operator is not exposed to the cartridge picker device, the library does not need to be powered down or the cartridge picker device disabled during the insertion or removal operation. Generally, the entry/exit port is comprised of a slot for holding a data cartridge and a device that places the slot in one of two states. In the first state, the slot of the entry port is exposed to the environment exterior to the library such that an operator can access the slot. When the slot is in the first state, the exit/entry port substantially prevents an operator from accessing the interior of the library by way of the slot and, as a consequence, prevents the operator from being exposed to injury by the cartridge picker device. In the second state, the slot of the entry/exit port is exposed to the interior of the library such that the cartridge picker device is able to access the slot. When the slot is in the second state, the entry/exit port prevents an operator from accessing the interior of the library via the slot. For the insertion of a data cartridge into the library, the slot is placed in the first state and the operator inserts a data cartridge into the slot. The slot is then placed in the second state to make the cartridge available to the cartridge picker device for placement elsewhere in the library. For the extraction of a data cartridge, the slot is placed in the second state and the cartridge picker device places a cartridge in the slot. The slot is then placed in the first state to make the cartridge available to an operator for removal.

Entry/exit ports that provide the ability to insert multiple data cartridges en masse into a library and extract multiple data cartridges en masse from a library are also known. Such exit/entry ports are typically employed in libraries that have a relatively high number of slots and are used in a manner in which the insertion and/or extraction of several cartridges at a time is desirable but the powering down or disabling of the cartridge picker device to allow a manual insertion/extraction of the cartridges is undesirable. For these types of libraries, the operator is effectively limited to inserting and extracting data cartridges via the entry/exit port. To provide the operator with the ability to insert or extract several cartridges at a time, the entry/exit port has multiple slots that form a fixed part of the port. Alternatively, an entry/exit port is provided that allows a magazine with multiple slots to be inserted into the port by the operator. With respect to this type of entry/exit port, insertion of multiple cartridges into the library is accomplished by placing the port in a first state so that an operator can either: (a) populate a magazine that is already present in the port with multiple cartridges, or (b) place a magazine and accompanying cartridges into the port. The port is then placed in a second state so that the cartridge picker device can individually move each of the cartridges in the magazine to other locations within the library. To extract multiple cartridges, the port is placed in the second state and the cartridge picker device individually moves cartridges from various locations in the library to the magazine. After all of the cartridges that are to be extracted have been placed in the magazine, the port is placed in the first state. Once in the first state, an operator can either individually remove cartridges from the magazine or remove the magazine from the port.

In many applications, the user of a cartridge-based library has a current need for a library with a particular data cartridge storage capacity and/or a particular number of drives but anticipates that there will be a future need for a library with a greater data cartridge capacity and/or greater number of drives. To address this situation, cartridge-based libraries have been developed that allow the user to initially acquire a library that satisfies the current needs and when future needs exceed the data cartridge and/or drive capacity of the library, allow the user to expand the library. Certain cartridge-based libraries that have this expansion capability expand the library with a unit or units that expand the library horizontally. Other cartridge-based libraries expand the library in a vertical fashion. In either case, such cartridge based libraries are in many cases able to pass cartridges between the original library and the expansion units by expanding the cartridge picker system.

In certain cartridge-based libraries, the use of expansion units that provide greater data cartridge storage capacity and/or a greater number of drives and an expandable cartridge picker system is not practicable. For instance, the use of expansion units and an expandable cartridge picker system is typically not practicable for libraries that employ a cartridge picker system that traverses a circular path, which are sometimes referred to as "silo" libraries. Nonetheless, in many situations, there is a need to transfer cartridges between libraries for which the expansion approach is impracticable and to do so automatically, rather than transfer a cartridge out of one library by its entry/exit port and then have an operator transfer the cartridge to the entry/exit port of the other library. Consequently, cartridge pass-through ports have been developed that allow one library to automatically transfer a cartridge to another library, i.e., without operator assistance.

SUMMARY OF THE INVENTION

The present invention is directed to a "magazine-based" data cartridge library that is capable of moving data cartridge magazines within the library, as well as moving individual cartridges within the library. A magazine-based data cartridge library (hereinafter referred to as a magazine-based library) is comprised of: (a) one or more shelves that are each capable of holding one or more data cartridge magazines and allowing the one or more data cartridge magazines to be moved to and from the shelf system by a robotic device; (b) one or more drives that are each capable of reading data from and/or writing data to a recording medium located in a data cartridge; (c) a magazine transport device for moving a magazine within the library, including the movement of a magazine to and from the shelf system; (d) a cartridge transport for moving data cartridges between a magazine that is moveable within the library and one or more drives that are located in the library; and (e) an interface for receiving data from and transmitting data to a host computer. In contrast, a cartridge-based library does not have the shelves or the magazine transport of a magazine-based library. Further, it should be appreciated that a cartridge-based library does not have the cartridge transport of a magazine-based library. To elaborate, the cartridge picker in a cartridge-based library moves cartridges to and from slots that are at fixed locations during operation of the library. In contrast, the cartridge transport of a magazine-based library moves cartridges to and from the slots of a magazine that is capable of being moved by the magazine transport device during operation of the library.

A magazine-based library has a number of advantages relative to a cartridge-based library. For instance, in one embodiment of a magazine-based library that has multiple drives, cartridges can be "bulk" loaded into the drives. In a bulk load operation, an embodiment of a magazine transport device extracts a magazine from a shelf and moves the extracted magazine to a location adjacent to the drives, which are typically situated in a row or column. Once the magazine is positioned adjacent the drives, an embodiment of a cartridge transport moves a cartridge into one of the drives and then another cartridge into another one of the drives. The cartridge transport continues loading cartridges in this manner until the desired number of cartridges have been loaded. In most cases, the total distance moved by the magazine transport and the cartridge transport in performing a bulk loading of the cartridges will be significantly less than the distance that a cartridge picker in a cartridge-based library would move in traversing back and forth between the fixed storage slots and the drives in loading the same number of cartridges into individual drives. As a consequence, with other factors being equal, this embodiment of a magazine-based library is able to load the drives faster than a cartridge-based library and in many cases, considerably faster.

One embodiment of the magazine-based library has a layout in which the space allocated to the magazine transport (i.e., the space within which the magazine transport must be able to move within the library to position magazines at all desired locations within the library) has at least one dimension that is related to a dimension of the magazine employed in the library. To elaborate, when a magazine is situated on a shelf in a magazine-based library, the front and rear surfaces of the magazine define a magazine plane with a depth that is equal to the distance between the front and rear surfaces of the magazine. The space within which the magazine transport operates is also a plane that will be referred to as a transport plane. The transport plane is parallel to the magazine plane and, like the magazine plane, has a depth. When the magazine transport removes a magazine from a shelf, the magazine transport displaces the magazine from the magazine plane into the transport plane. In one embodiment of the magazine-based library, the depth of the transport plane is greater than the depth of the magazine plane but less than twice the depth of the magazine plane. Typically, the closer the depth of the transport plane is to the depth of the magazine plane, the more likely the overall volume of space occupied by the transport plane approaches an optimal volume at which the volume of the transport plane is the minimum needed to transport magazines within the library. Consequently, a transport plane or space with a depth that approaches the depth of the magazine plane can contribute to achieving a high data density footprint for the library. The data density footprint is the amount of data that a library is capable of storing when the maximum number of data cartridges that the library is capable of accommodating are housed within the library divided by the area of the floor space or footprint occupied by the library. The depth of the transport plane is preferably less than about 150% of the depth of the magazine plane and more preferably less than about 130% of the depth of the magazine plane. In a further embodiment, the distance between the front and rear surfaces of the magazine used in the library or the depth of the magazine plane is roughly equal to the depth of the drives used in the library, i.e., within about +/−20% of the depth of the drives. By employing magazines with a length or depth that is related to the length or depth of the drive(s) employed in the library, the ability to layout the components of the library in a manner that efficiently uses the space within the library is increased.

Another embodiment of the magazine-based library is particularly able to move magazines that are relatively heavy when fully populated with cartridges. To elaborate, this embodiment of the library comprises a magazine picker for displacing a magazine towards and away from a shelf and an elevator for moving the magazine picker within the library (an elevator that moves in only one dimension or in multiple dimensions is possible). To manage fully populated magazines that are relatively heavy, the magazine picker is comprised of a support surface on which all or a portion of a magazine can rest and a device that is capable of moving a magazine between a shelf and the support. In one embodiment, the support surface comprises a guide structure that serves to orient the magazine during the transfer of the magazine to or from a shelf and to maintain the orientation of a magazine during movement of the support within the library by the elevator. In another embodiment, the device for moving a magazine between the support and a shelf comprises: (a) an engagement device for establishing a connection with a magazine that is sufficiently positive to allow the magazine to be moved; and (b) a displacement device for moving the engagement device so that when the engagement device has engaged a magazine, the magazine can be moved between a shelf and the support. In one embodiment, the engagement device comprises a member with a surface that is used to "hook" a magazine, an actuator for providing the force to move the member into and out of engagement with a magazine, and a linkage that constrains the member to rotate about an axis. In operation, the engagement device "hooks" a magazine by using the actuator to rotate the member so that the "hooking" surface is in position to engage a magazine. To "unhook" the magazine, the actuator is used to rotate the member so the surface is no longer in position to "hook" the magazine.

A further embodiment of the invention provides a method for moving a magazine relative to a shelf in a magazine-based library. The method involves displacing the magazine relative to the shelf in discrete steps that each displace the magazine further towards or away from a shelf. For convenience, the method is initially described with respect to the moving of a magazine away from a shelf. The method comprises providing a device for engaging a magazine and using the device to engage the magazine. Once the magazine has been engaged, the device is displaced to move the engaged magazine a first distance away from a shelf. After the magazine has been displaced the first distance, the device is disengaged from the magazine and moved back towards the shelf. At this point, the device re-engages the magazine and is then displaced away from the shelf to move the re-engaged magazine further away from the shelf. In the case of moving a magazine towards a shelf, the method comprises the steps of providing a device for engaging a magazine and using the device to engage the magazine. Once the magazine has been engaged, the device is displaced to move the engaged magazine a first distance towards a shelf. After the magazine has been displaced the first distance, the device is disengaged from the magazine and moved away from the shelf. At this point, the device re-engages the magazine and is then displaced towards the shelf to move the re-engaged magazine further towards the shelf. The method is capable of being implemented with an engagement device that "hooks" a magazine. The method is also capable of being implemented with an engagement device that is an adaptation of the types of devices that are presently used in cartridge-based libraries to grasp cartridges between two members. Typically, the two members in such devices grasp a data cartridge by either (a) moving one member towards the other member; or (b) moving each member towards the other member. The movement of a member is typically accomplished by either rotating the member about an axis or linearly translating the member. In any event, such devices are adaptable to grasping magazines and the method is capable of being practiced with devices that are so adapted and any other devices that are capable of engaging a magazine so that the magazine can be displaced.

A further embodiment of the invention provides a method for moving a magazine relative to a shelf in a magazine-based library. The method is initially described with respect to the moving of a magazine away from a shelf. The method comprises the steps of providing a support structure for holding a data cartridge magazine and providing a device for engaging a magazine. The method further comprises positioning the support structure adjacent to the magazine; causing the device to engage the magazine; and displacing the device and, as a consequence, the engaged magazine away from the shelf such that at least a portion of the magazine is held by the support structure. The method is capable of being implemented with a device that engages a magazine by "hooking" the magazine. The method is also capable of being implemented with various types of devices for engaging a magazine that, in operation, grasp a magazine between two members, rather than "hook" a magazine. The method is also practicable with any other device that is capable of engaging a magazine so that the magazine can be displaced.

Yet a further embodiment of the invention is directed to a method for moving magazines between different shelves in a magazine-based library. The method comprises the steps of providing a device for engaging a magazine and providing a support structure for holding a magazine. The method further comprises positioning the support structure adjacent to a magazine located on a first shelf; causing the device to engage the shelved magazine; and moving the device away from the first shelf to an extent that the engaged magazine is held by the support structure and is no longer held by the first shelf. Further comprising the method is the step of moving the device towards a second shelf to an extent that the magazine is supported by the second shelf and no longer associated with the support structure. In one embodiment, the first and second shelves are situated opposite to one another and separated by a space. In this embodiment, the support structure is used to bridge the space for the transfer of the magazine from the first shelf to the second shelf. The method is capable of being implemented with a device that "hooks" a magazine. The method is also capable of being implemented with the types of devices that operate to grasp a magazine between two members, rather than "hook" a magazine. The method is also practicable with any other device that is capable of engaging a magazine so that the magazine can be displaced.

A further embodiment of a magazine-based library comprises a cartridge transport for moving cartridges to and from a magazine when the cartridges are oriented within the magazine and the library such that the faces of the cartridges with the greatest surface area lie in a substantially vertical plane. At least with respect to certain cartridge form factors and particular or desired library dimensions, it has been discovered that the orientation of cartridges in this manner contributes to a high data density footprint. Data density footprint is the amount of data that a library is capable of storing when the maximum number of data cartridges that the library is capable of accommodating are housed within the library divided by the floor space occupied by the library. A high data density footprint is important in applications where the floor space that can be dedicated to data storage is limited and the amount of data that needs to be stored is relatively large. One notable example of such an application is a data center that provides off-site "backup" or "mirroring" of the data stored on the computer systems of the data center's clients. Such data centers typically want to maximize the amount of data that can be stored over a given floor space. In one embodiment, the cartridge transport comprises a grasper for grasping a data cartridge and a displacement or actuating device for moving the grasper such that when the grasper is extracting/inserting a cartridge from/into a magazine, the cartridge is linearly displaced such that the cartridge moves within a substantially vertical plane. In one embodiment, the displacement, in addition to being in vertical plane, has a vertical component. In another embodiment, the displacement has a horizontal or lateral component. In a further embodiment, an additional actuating device operates to rotate the grasper about a horizontal axis during the transport of a grasped cartridge from a magazine to a drive. The rotation, in one embodiment, is about a horizontal axis that allows a grasped data cartridge to be inserted into a drive with a horizontally oriented slot for receiving a cartridge. In another embodiment, the rotation is about a horizontal axis that allows a grasped data cartridge to be inserted into a drive with a vertically oriented slot for receiving a data cartridge. The additional actuating device also operates to rotate the grasper about a horizontal axis during the transport of a grasped cartridge from a drive to a magazine.

Yet another embodiment of a magazine-based library comprises a magazine transport that is capable of moving a magazine, that when located in the library orients a cartridge such that the face of the cartridge with the greatest surface area lies in a vertical plane, to a site at which two or more of the slots of the magazine are accessible by a cartridge transport. The cartridge transport comprises a grasper for grasping cartridges and a grasper transport that is capable of horizontally displacing the grasper such that the grasper can be positioned adjacent to the two slots of a magazine that has been positioned at the noted site by the magazine transport. In one embodiment, the magazine transport comprises a support for holding a magazine, a magazine engagement device for moving a magazine between the support and a shelf, and an elevator for moving the support and magazine engagement device within the library. The grasper and the grasper transport are operatively attached to the elevator and positioned so that the grasper transport is able to move the grasper to a location adjacent to one of two or more of the slots of a magazine that is held by the support so that the grasper can insert/extract a cartridge into/from the magazine. In another embodiment, the grasper and grasper transport are not associated with the elevator but rather are fixedly positioned adjacent to a drive. In this embodiment, the magazine transport positions a magazine adjacent to the grasper and grasper transport. The grasper transport horizontally moves the grasper to a location adjacent to one of two or more of the slots of the magazine for insertion or extraction of a cartridge. In a further embodiment, the cartridge transport comprises an additional actuating device or structure that is used to linearly displace a cartridge relative to the magazine during extraction of a cartridge from the magazine and insertion of a cartridge into the magazine. In yet a further embodiment, an additional actuating mechanism is employed to rotate the grasper about a horizontal axis to facilitate the transport of a cartridge between the drive and a magazine.

Another embodiment of a magazine-based library comprises a magazine transport for moving a magazine within the library, a cartridge transport for moving a cartridge between a magazine and a drive, and an elevator that is part of both the magazine transport and the cartridge transport. In one embodiment, the elevator comprises a carriage to which both a magazine picker and a grasper are attached, and a surface for holding a magazine. Such a magazine-based library is capable of a "bulk load" operation in which: (a) the magazine picker moves a magazine from a shelf onto the support; (b) the elevator moves the support and associated magazine to a location adjacent the drives; and (c) the grasper is then used to repeatedly move a cartridge from the magazine into one of the drives until the desired number of cartridges have been loaded. In one embodiment, the cartridge transport comprises a grasper for grasping the cartridges and a grasper transport for moving the grasper such that the grasper can be positioned adjacent to at least two of the slots of a magazine when the magazine is associated with the support. In a particular embodiment, the grasper transport is capable of positioning the grasper adjacent to each slot of a magazine that is appropriately positioned on the support.

Yet a further embodiment of a magazine-based library comprises a device for reading a label that is associated with a magazine, as well as labels that are associated with any cartridges held by the magazine. In "cartridge-based" libraries there is a need to be able to identify cartridges within the library because a particular cartridge will not necessarily be permanently associated with a particular storage slot. The cartridge picker in such libraries can move the cartridge from one storage slot to another storage slot, to an entry/exit port, or to another library via a pass-through port. Consequently, to be able to determine which a cartridge is in a particular location within a library, the cartridges need to be susceptible to identification. Presently, identification of cartridges is accomplished by associating a bar-code label with each cartridge in the library and positioning the bar-code label such that a barcode reader is readily able to read the bar-code associated with the cartridge. However, there is no need in "cartridge-based" libraries that employ magazines to create cartridge storage slots to be able to identify a magazine within the library because such libraries do not manipulate or move magazines within the library during operation. Consequently, the magazines that are used in cartridge-based libraries do not bear labels that identify the magazine and that can be read by any kind of label reader located within the library. However, in a magazine-based library, because the location of a magazine is not fixed and can be changed using a magazine transporter, there is a need to be able to identify each magazine. In one embodiment, the device for reading the magazine label and cartridge labels comprises a label reader (e.g., a bar code reader) and an actuating device for moving the label reader between a first orientation at which the reader is capable of reading a magazine label and a second orientation at which the reader is able to read cartridge labels. In one embodiment, the label reader is associated with the element of the cartridge transport that grasps data cartridges. In another embodiment, the device is comprised of two label readers, one label reader for reading a magazine label and a second reader for reading cartridge labels. In one embodiment that employs two label readers, the first reader is associated with the element of the cartridge transport that grasps data cartridges, and the second reader is associated with a magazine picker that moves magazines to and from shelves in the library.

Another embodiment of a magazine-based library comprises a cartridge transport that is capable of accommodating cartridges of different dimensions. The particular dimensions associated with a data cartridge are commonly referred to as a form factor. For tape data cartridges, common form factors include DLT (digital linear tape), LTO (linear tape open), and SAIT (super advanced intelligent tape). The present invention provides a magazine-based library with a cartridge transport that is able to grasp cartridges that conform to two different form factors. To elaborate, the cartridge transport comprises a housing that serves to constrain a cartridge in at least one dimension. The housing is capable of adapting to cartridges that have different measurements in one dimension, such as the height dimension. In one embodiment, the housing comprises a first planar surface and a second planar surface that is substantially parallel to and separated from the first planar surface. Further, the first planar member is able to move relative to the second planar member so that the distance between the two members can be adjusted to accommodate the differences in the distances between two substantially parallel surfaces associated with two cartridges that each conform to a different form factor. In one embodiment, the planar members are able to accommodate LTO and DLT tape cartridges, which have different heights (height being the distance between the two substantially parallel faces of the cartridge that have the greatest surface area).

Another embodiment of a magazine-based library comprises an entry/exit port for conveying a magazine between: (a) a space that is interior to the library and accessible by a magazine transport device that can place a magazine in the port or remove a magazine from the port; and (b) an exterior environment where an operator can place a magazine in the port or remove a magazine from the port. It should be appreciated that such an entry/exit port is markedly different than the entry/export ports in "cartridge-based" libraries that utilize a magazine to move cartridges into and out of a library. In a cartridge-based library that employs an entry/exit port, the cartridge picker cannot move the magazine, the cartridge picker can only move individual cartridges between the magazine associated with the port and other locations in the library. In contrast, the entry/exit port of a "magazine-based" library allows a magazine picker to move magazines into and out of the port.

In one embodiment, the entry/exit port comprises a tray for supporting a magazine and selectively holding the magazine in a substantially fixed position relative to the tray during the movement of a magazine between the exterior environment and the space that is interior to the cabinet. The ability to selectively hold the magazine in a fixed position is particularly important during the transport of a magazine between the exterior environment and the interior space that is accessible by the magazine picker. To elaborate, momentum is imparted to the magazine during transport of the magazine between the exterior environment and the interior space. If the magazine was not fixed in place during the transport, the momentum could possibly carry the magazine into the interior of the library in a manner that could adversely affect the operation of the library. In one embodiment, the tray comprises a fixed wall and a spring-loaded, opposing wall that are capable of clamping a magazine in place during transport. When the tray is positioned so that the magazine picker can access the tray, the spring-loaded, opposing wall is retracted to unclamp any magazine being supported by the tray so that the magazine picker can remove the magazine from the tray.

A further embodiment of the entry/exit port comprises a door system that prevents an operator from accessing the interior of the library via the entry/exit port. In one embodiment, the entry/exit port comprises an exterior door and an interior door that operate such that during the time that the exterior door is opening to allow an operator to access the port, the interior door is closing to prevent the operator from accessing the interior of the library via the port and from possibly being injured by moving elements within the library. Conversely, during the time that the exterior door is closing, the interior door is opening to allow the magazine picker to access the port. In one embodiment, a linkage between the interior and exterior doors is employed to achieve the coordinated operation.

A further embodiment employs a tray for supporting a magazine that moves between a position that is exterior to the library so that an operator can access the tray and a position that is interior to the library so that a magazine picker can access the tray. In this embodiment, a linkage is employed that coordinates the opening and closing of the doors with the movement of the tray. To elaborate, the linkage operates such that during the time that the tray is moving from the position that is exterior to the library to the position that is interior to the library, the exterior door moves from the open position towards the closed position and the interior door moves from the closed position towards the open position. Conversely, during the time that the tray is moving from the position that is interior to the library to the position that is exterior to the library, the exterior door moves from the closed position towards the open position and the interior door moves from the open position towards the closed position. In one embodiment, the interior and exterior doors are substantially planar and are operated in a "draw-bridge" fashion such that each of the doors rotate about an axis that is substantially parallel to the face of the door. Other door structures are feasible, including a door structure that rotates about a different axis to move between open and closed positions, a door structure that is linearly translated between open and closed positions, and a multi-element door. In a further embodiment, a single actuator is used to achieve the movement of the tray and the interior and exterior doors. Yet another embodiment of the entry/exit port employs a carousel with a body that holds a magazine and that rotates about an axis. The body serves to prevent an operator from accessing the interior of the library. Consequently, the carousel approach avoids the use of doors. However, the implementation of a carousel entry/exit port is likely to reduce the space available for magazines and/or drives in the library.

Also provided is a magazine that is suitable for use in a magazine-based library in which magazines are moved within the library. The magazine is comprised of: (a) a frame that defines a space for accommodating a plurality of data cartridges; (b) a partitioning structure for dividing the space into a plurality of slots with each slot being capable of accommodating a data cartridge and supporting the cartridge such that when the magazine is associated with the magazine-based library, the face of the cartridge with the greatest surface area lies in a vertical plane; and (c) an engagement structure that allows the magazine to be engaged by a magazine picker for movement within the library. In one embodiment, the engagement structure comprises a hole for use in magazine-based libraries that employ a magazine picker that utilizes a member to "hook" magazines. Another embodiment employs an engagement structure that is adapted for use with a magazine picker that utilizes two members to grasp a magazine. In one embodiment, the engagement structure comprises a pair of holes. In another embodiment, the engagement structure comprises a pair of protrusions that extend beyond a surface or surfaces of the frame. Yet a further embodiment comprises a pair of indentations in a surface or surfaces of the frame. Yet a further embodiment of the magazine comprises a flag structure for use in determining when a magazine picker has engaged the magazine. In one embodiment, the flag structure comprises an element that blocks an optical signal when the magazine picker has engaged the magazine.

Another embodiment of the magazine comprises a "label" structure for use in identifying the magazine within the library so that, for example, the location of the magazine in the library can be tracked. There is no need in a "cartridge-based" library that employs magazines to create fixed storage slots to identify the magazines during the operation of the library because the library does not manipulate or move magazines within the library during operation. As previously noted, magazines in cartridge-based libraries primarily serve to make it easier for an operator to hand load/unload a large number of cartridges into/from the library. In contrast, in a magazine-based library, magazines are manipulated during operation of the library and, as a consequence, there is a need to be able to identify a magazine within a library. In one embodiment, the label structure comprises an indentation in a surface of the magazine that is capable of accommodating an adhesive label, such as an adhesive bar-code label. Another embodiment comprises a receptacle that is associated with the magazine and that is capable of receiving a label or other identifier, such as a radio frequency identification RFID tag. In yet another embodiment, an identifier, such as an RFID tag, is embedded within the magazine. Identifiers with fixed or programmable identification information are also feasible.

Another embodiment of the magazine comprises a structure for inhibiting, when the magazine is on a shelf within a magazine-based library, movement of the magazine other than movement attributable to the magazine picker. In one embodiment, the structure comprises a detent that cooperates with a notch associated with a shelf to hold the magazine in a desired location on a shelf. The engagement between the notch and the detent serves to resist forces that might displace the magazine. The resistance provided by this engagement is not, however, great enough so that it cannot be overcome by a magazine picker. A further embodiment of the structure comprises one portion of an active latching mechanism, the other portion of the latching mechanism being associated with the shelf. In one active latch embodiment, the structure associated with the magazine comprises a receptacle that is designed to engage an active element associated with the shelf. In another active latch embodiment, the structure associated with the magazine comprises an active element that is adapted to engage a receptacle associated with a shelf. One such active element comprises a cantilevered detent. In operation, the cantilever provides a spring force that must be overcome to disengage the detent from the receptacle and, as a consequence, resists forces that might displace the magazine from a preferred location.

A further embodiment of a magazine-based library comprises a drive bay for holding a drive in an operative position within the library and facilitating relatively speedy insertions and extractions of the drive. Most drives have a front face with a slot for receiving a data cartridge and rear face with one or more plugs for receiving power, control signals, and data signals. In many cartridge-based libraries, when such a drive is operatively situated in a library, the front face of the drive is accessible to the cartridge picker. The drive is also typically situated near a removable panel or door of the library housing so that an operator can readily access the drive. Further, the drive is typically attached to a frame to prevent the drive from moving during operation of the library. To remove or replace such a drive, the operator has to remove the panel or open the door to obtain access to the drive, disconnect the drive from all of the electrical connectors that are providing power, control signals, and data signals to the drive, and then unfasten the drive from the frame. In many situations, the library is powered down during such an operation. The magazine-based library with a drive bay substantially reduces the work and, hence, the time required for such operations. To elaborate, in one embodiment, the drive bay comprises a housing with two open sides, where one of the open sides is exposed to the cartridge transport and the other open side is exposed to an environment that is accessible to an operator so that the operator can insert or extract a drive from the housing. Further comprising the drive bay is a sled that is capable of holding a drive. The sled comprises an electrical connector with one or more drive plugs that mate with the plug(s) on the rear face of the drive, one or more sled plugs, and one or more electrical conductors extending between the drive plug(s) and the sled plug(s). The sled plug(s) is/are oriented so as to face towards the first open side of the housing, i.e., towards the cartridge transport. The drive bay further comprises housing plug(s) that face the second opening or the area accessible to the operator. The housing plug(s) is/are positioned in the housing so that when an operator inserts the sled into the housing with the proper orientation (i.e., such that if the sled held a drive, the front face of the drive would be accessible to the cartridge transport), the sled plug(s) engage the housing plug(s). As a consequence, the insertion of a drive into the library is accomplished by pushing a sled with the drive into the housing such that the sled plug(s) and the housing plug(s) engage one another. Conversely, removal of a drive from the library is accomplished by extracting the sled and drive form the housing, which causes the sled plug(s) and housing plug(s) to disengage from one another. Consequently, the drive bay eliminates the need for an operator to spend time disconnecting/connecting cables from plug(s) associated with the rear face of the drive during the extraction/insertion of a drive. Further, since the drive is attached to the sled and not a fixed frame within the library, the drive bay eliminates the need to spend time detaching/attaching a drive from/to such a frame. In one embodiment, the drive bay housing is comprised of multiple sub-bays with each sub-bay capable of accommodating a sled and having a housing plug for establishing an electrical connection with a sled residing in the sub-bay.

In yet another embodiment, a magazine-based library comprises an operator alterable space within the housing, i.e., a space whose function in the library is subject to a choice by an operator. The alterable space is capable of accommodating at least two different types of library modules. Among the possible types of modules are shelving modules and drive modules. The alterable space is defined by a first open side that is accessible to the cartridge transport and/or magazine picker and a second side that is accessible to an operator. Associated with the alterable space is a mounting structure that allows a module to be readily mounted within the library or demounted from the library. Among the possible modules is a drive bay module that, in addition to the features of a drive bay described above, also has a drive bay mounting structure that cooperates with the library mounting structure to facilitate securing the module within the library and removing the module from the library. Another module is a magazine bay module that provides one or more shelves, each for holding at least one magazine. The magazine bay module has a magazine bay mounting structure that cooperates with the library mounting structure to facilitate securing the magazine bay within the library and removing the module from the library.

A further embodiment of a magazine-based library comprises a power system that is used to provide power to the drive(s) within the library and that allows the space within the library to be utilized more efficiently. In many cases, the power system allows more data cartridges to be housed within a library relative to a library that employs a typical power system. This advantage is particularly discernable in libraries that employ multiple drives. To elaborate, most data cartridge libraries include one or more power supplies for providing power to the drive or drives within the library. In libraries that employ multiple drives, power is typically conveyed from the power supply or supplies via multiple cables, each with a circular cross-section and each with a conductor surrounded by an insulating cover. Typically, these cables are bundled together. This bundle of cables typically has a cross-section that is roughly circular. The cross-sectional shape of the bundle makes it awkward to "fit" the bundle with other elements of the library to efficiently utilize the space within the library. The embodiment of the magazine-based library comprises a power supply and a conductor structure for distributing power produced by the power supply to the drive(s) in the library that is flat, i.e., has two external and flat surfaces that are separated from one another and substantially parallel to one another. For the distribution of power to a given number of drives, the distance between the flat external surfaces is less than the diameter of a bundle of circular conductors. This reduced dimension typically allows the space within the library to be more efficiently used and, in many cases, allows a greater number of data cartridges to be stored within the library. Further, the flat shape of the conductor lends itself to being integrated with the other components of the library, many of which are box-shaped, so that the space within the library can be more efficiently used relative to libraries that employ power conductors with circular cross-sections and bundles of such conductors.

Further, the insulating covers associated with the conductors in a bundle of cables may provide more insulation than is needed to electrically insulate the conductors from one another. Consequently, the insulating covers occupy more space over a diameter of the cross-section of the bundle than is needed. In one embodiment, the conductor is comprised of a plurality of laminated electrical conductors that are separated from one another by insulating material. In a transit between the two external flat surfaces, the amount of space dedicated to insulating material is less than that for a comparable bundle of cables. Consequently, relative to a bundle of cables, the conductor structure provides additional space for other uses.

Yet another embodiment of the invention is directed to a method that allows a user to upwardly scale or expand the size of a magazine-based library in a modular manner. The method comprises the step of providing a magazine-based library with a cabinet surface that is alterable to form a passageway through the cabinet so that the library can be joined to an add-on module and magazines can be transferred between the library and the add-on module. The magazine-based library further comprises an elevator structure that is used to horizontally displace a magazine picker that is capable of moving magazines to and from the shelves in the library. The method further comprises the step of providing an add-on module with a side surface that is either alterable to form a passageway or already has a passageway. The add-on cabinet can take a number of forms. For example, the add-on module may be able to accommodate a shelf, multiple shelves, a drive, multiple drives, combinations of the foregoing elements, or be a self-sufficient magazine-based library. In one embodiment, the method further comprises replacing whatever portion(s) of the elevator structure in the library serves to limit the horizontal range over which the magazine picker can be moved within the library with a longer structure that extends through the passageways of the library and the add-on. In another embodiment, the method comprises the further step of providing an add-on to the existing elevator structure such that an elevator is modularly expanded and the resulting expanded elevator is capable of transporting the magazine picker through the passageways of the library and the add-on. In yet a further embodiment, the add-on has its own magazine transport device and the two magazine transport devices (one associated with the library and the other associated with the add-on) are capable of directly passing a magazine from one to the other. In yet another embodiment, the add-on comprises a separate magazine transport device from that of the library. However, the two magazine transports are incapable of directly passing a magazine from one to another. Consequently, the method comprises the further step of providing a third magazine transport device that serves as an intermediary transport device between the transport device associated with the library and the transport device associated with the add-on.

The present invention is also directed to a magazine-based library that is capable of moving magazine data storage elements, as well as data cartridge magazines. A magazine data storage element comprises a plurality of disk drives, a frame that supports the plurality of hard disk drives, electrical and/or optical connection circuitry that establishes signal and power paths between the hard disk drives and a magazine-drive connector, and a transport structure for engagement by a magazine transport device associated with the library.

To transfer data between a magazine data storage element and another computer device, a magazine data storage element drive is employed. The magazine data storage element drive comprises a frame for supporting a magazine data storage element and electrical and/or optical connection circuitry for use in establishing an electrical and/or optical connection between a magazine data storage element and another computer device. The electrical and/or optical connection circuitry is comprised of a drive-magazine connector that is adapted to engage the magazine-drive connector of a magazine data storage element, a drive-device connector for establishing electrical and/or optical connections with another computer device, and conductors extending between the drive-magazine connector and the drive-device connector.

The magazine-based library that is capable of moving magazine data storage elements and data cartridge magazines is comprised of: (a) one or more shelves that are each capable of holding one or more magazines, where a magazine can be either a magazine data storage element or data cartridge magazine, and allowing the one or more magazines to be moved to and from the shelf system by a robotic device; (b) at least one magazine data storage element drive that is capable of reading data from and/or writing data to a magazine data storage element; (c) at least one data cartridge drive that is capable of reading data from and/or writing data to a recording medium located in a data cartridge; (d) a magazine transport device for moving a magazine within the library, including the movement of a magazine data storage element between a shelf and a magazine data storage element drive; (e) a cartridge transport for moving data cartridges between a data cartridge magazine that is moveable within the library and the data cartridge drive; and (f) an interface for receiving data from and transmitting data to a host computer.

In one embodiment, the magazine-based library is adapted to operate on magazine data storage elements and data cartridge magazines that have common or standardized transport and dimensional features that facilitate the movement and storage of the magazines within the library. This standardization reduces the complexity of the library. For example, by having common transport features, the same elements of the magazine transport device that are used to engage a magazine data storage element are also used to engage a data cartridge magazine, thereby avoiding the need for a magazine transport device with one structure for engaging a magazine data storage element and another structure for engaging a data cartridge magazine.

The present invention is also directed to a magazine-based library that is capable of moving magazine data storage elements. The magazine-based library is comprised of: (a) one or more shelves that are each capable of holding one or more magazine data storage elements, and allowing the one or more magazine data storage elements to be moved to and from the shelf system by a robotic device; (b) at least one magazine data storage element drive that is capable of reading data from and/or writing data to a magazine data storage element; (c) a magazine transport device for moving a magazine data storage element within the library, including the movement of a magazine data storage element between a shelf and a magazine data storage element drive; and (d) an interface for receiving data from and transmitting data to a host computer.

The present invention is further directed to a magazine data storage element comprised of a plurality of disk drives, a frame that supports the plurality of hard disk drives, electrical and/or optical connection circuitry that establishes signal and power paths between the hard disk drives and a magazine-drive connector, and a transport structure for engagement by a magazine transport device associated with a magazine-based library. In one embodiment, each of the hard disk drives comprises a serial signal interface (e.g., a serial ATA interface). In yet a further embodiment, the hard disk drives each have the same external dimensions. Another embodiment employs disk drives that each have the same disk size (e.g., 2½"). Yet another embodiment employs an electrical and/or optical connection circuitry that comprises multiplexing circuitry that allows the path or "pin" count of the magazine-drive connector to be less than the cumulative path or "pin" count associated with the interfaces of the hard disk drives.

The present invention also provides a drive for a magazine data storage element that is comprised of: (a) a frame for supporting a magazine data storage element; and (b) an electrical and/or optical interconnect structure for transmitting power to a magazine data storage element and conveying signals to and from the magazine data storage element. The electrical and/or optical interconnect structure is comprised of a drive-magazine connector for establishing electrical and/or optical connections with the magazine-drive connector of a magazine data storage element, a drive-device connector for establishing electrical and/or optical connections with another device (such as a library or a host computer), and suitable electrical and/or optical conductors extending between the drive-magazine connector and the drive-device connector.

In one embodiment of the drive, the drive-magazine connector is comprised of a plurality of spring-loaded pins, with each pin located so to contact a conductive pad associated with the magazine-drive connector. The use of spring-loaded pins reduces occurrences of pin breakage that could render the drive inoperative relative to a drive plug that employs static pins. Reducing the occurrences of pin breakage is considered important in applications in which the drive is likely to experience frequent loading and unloading of magazine data storage elements, such as in a magazine-based library.

Another embodiment of the drive comprises a six-sided box-like housing that conforms to certain standardized dimensions of another type of drive. In one embodiment, the housing conforms to the standardized dimensions of an LTO tape drive, which has a height of approximately 3¼" to 3⅜" and a width of approximately 5¾" to 5⅘". Conformance to standardized dimensions of other drives is also feasible. By employing a housing that conforms to the standardized dimensions of another type of drive, the drive is more likely to be incorporated into the design of various computer devices, such as data storage libraries, or replace other types of the drives in such devices. It should, however, be appreciated that the drive is also capable of stand-alone operation, i.e., the drive does not needed to be incorporated into another computer device but can be directly connected to a host computer.

DETAILED DESCRIPTION

The present invention is directed to a magazine-based data cartridge library that is capable of moving data cartridge magazines within the library, as well as moving individual cartridges within the library.

Figure 1:
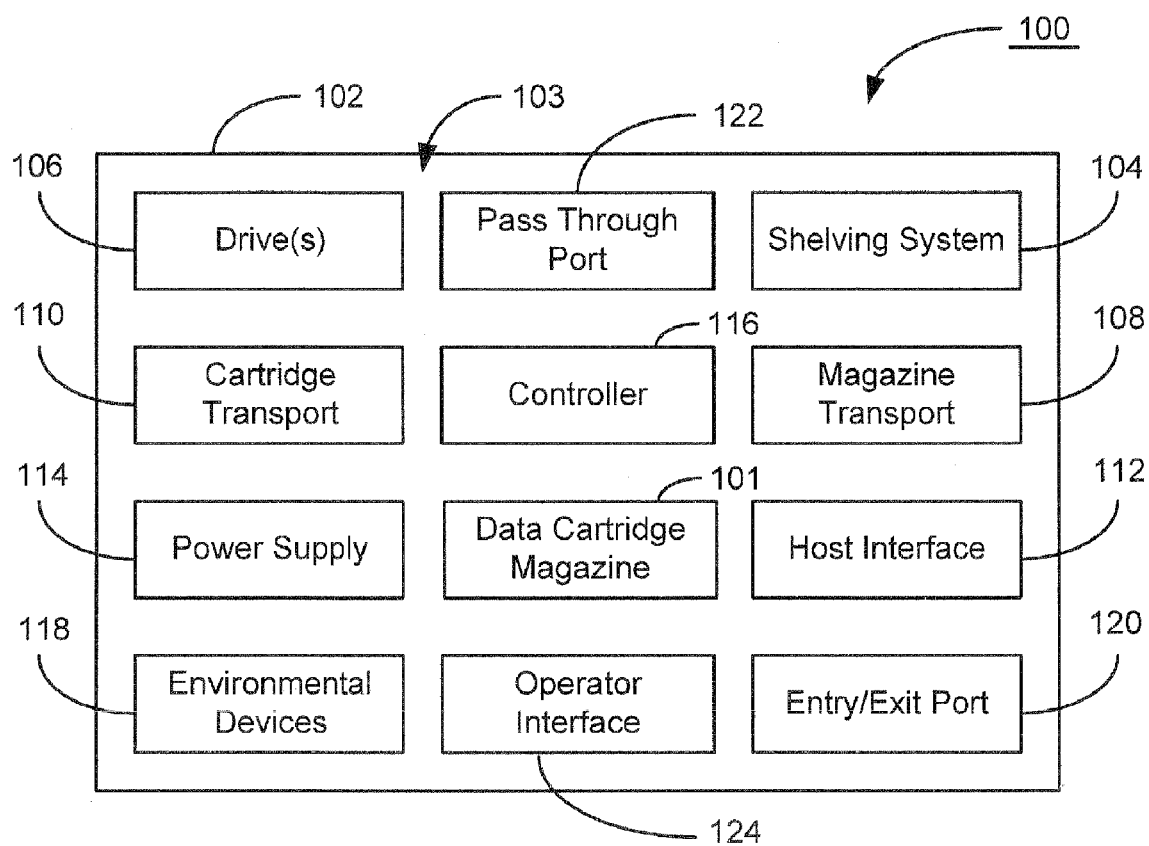
FIG. 1 is a block diagram of a magazine-based data cartridge library that illustrates necessary and optional features of the library.
Figure 2A:
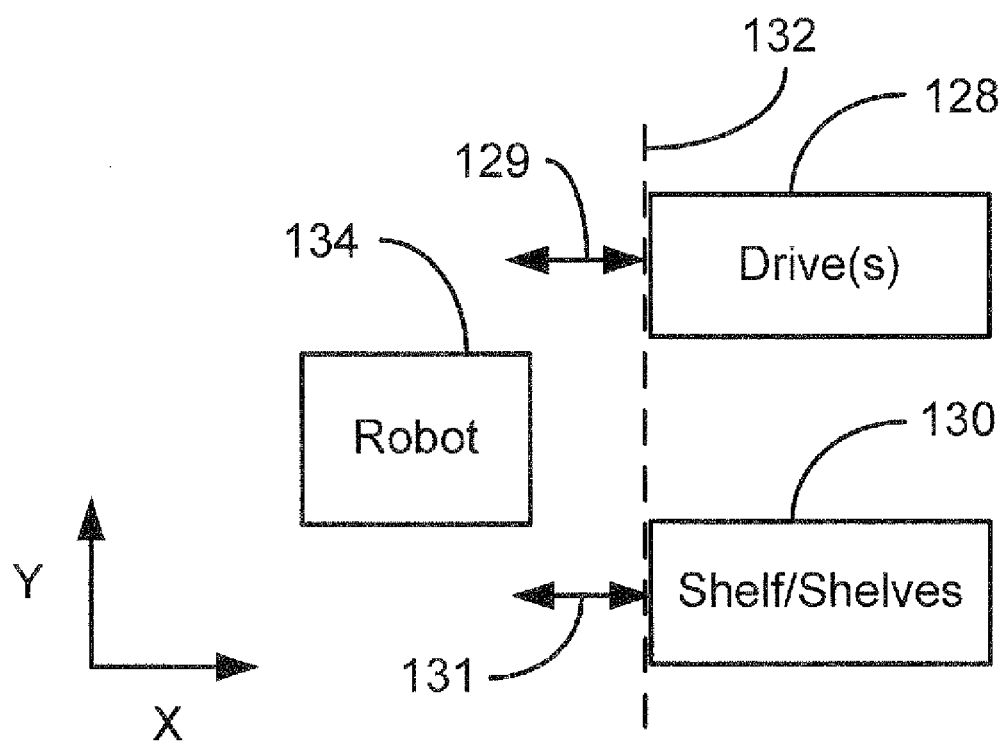
FIGS. 2A-2E are plan views of five rectilinear layouts for a magazine-based data cartridge library.
Figure 2B:
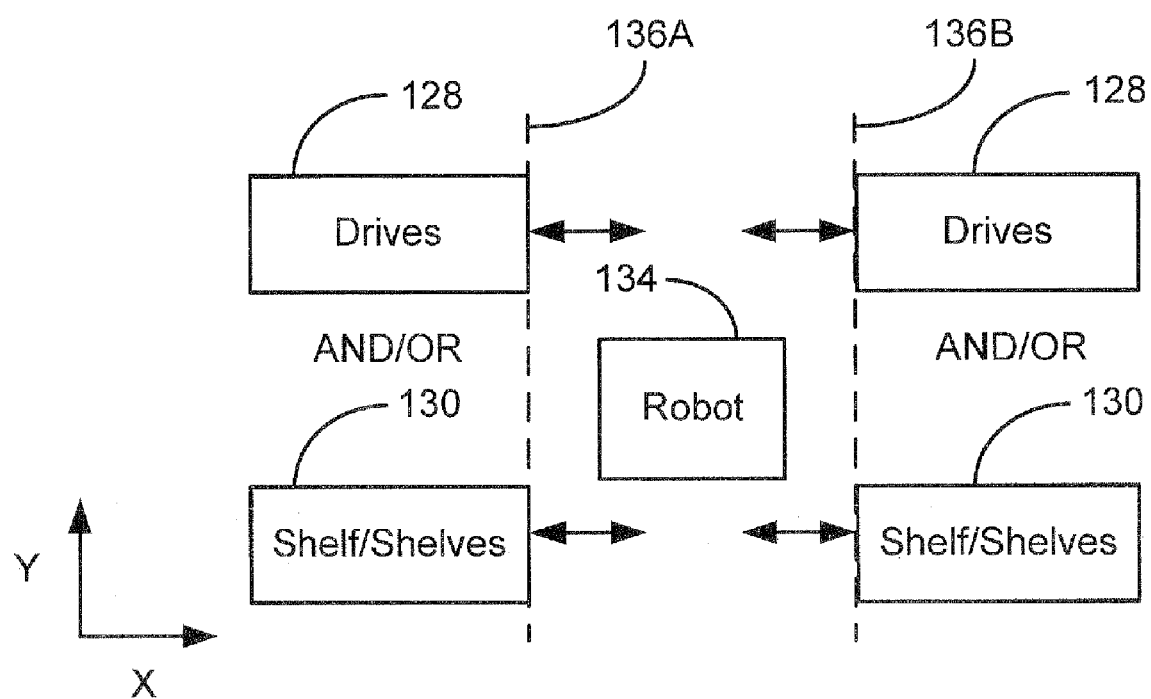
Figure 2C:
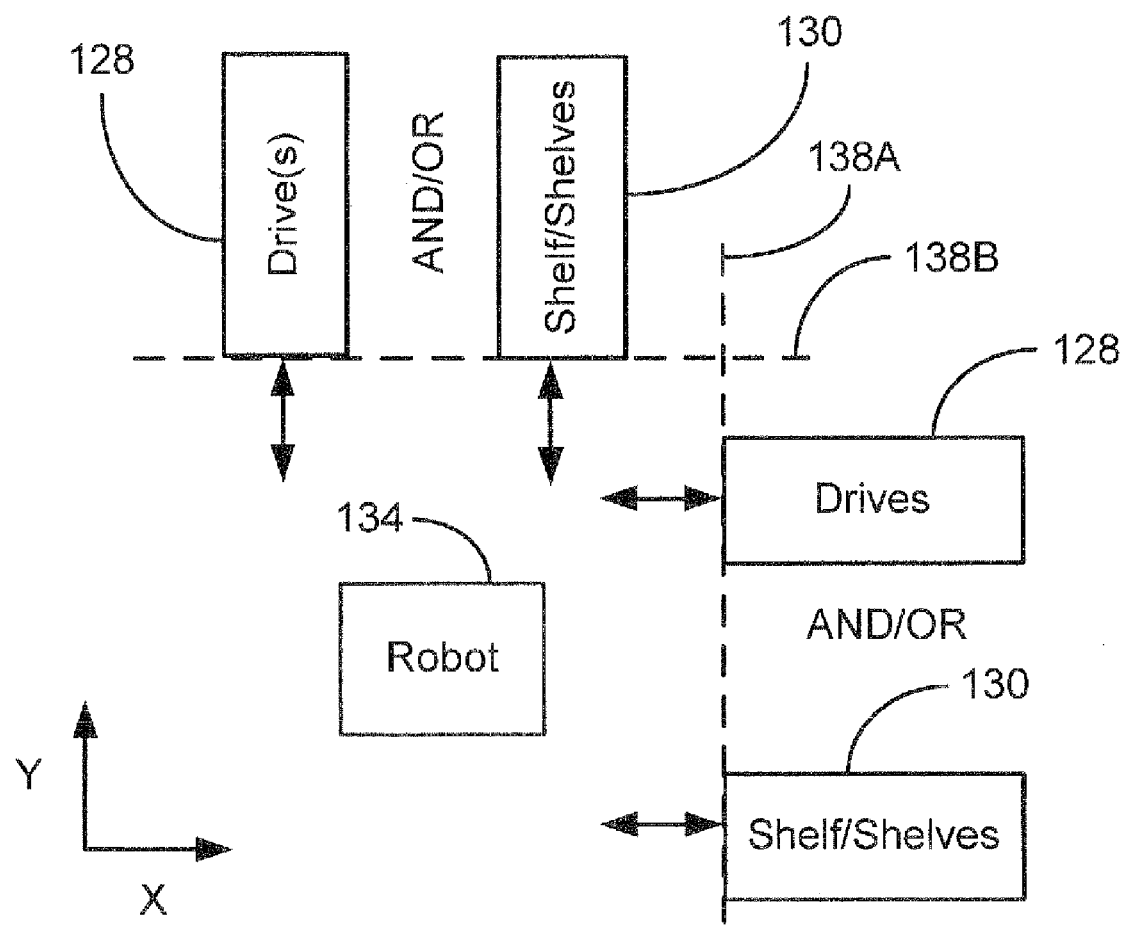
Figure 2D:
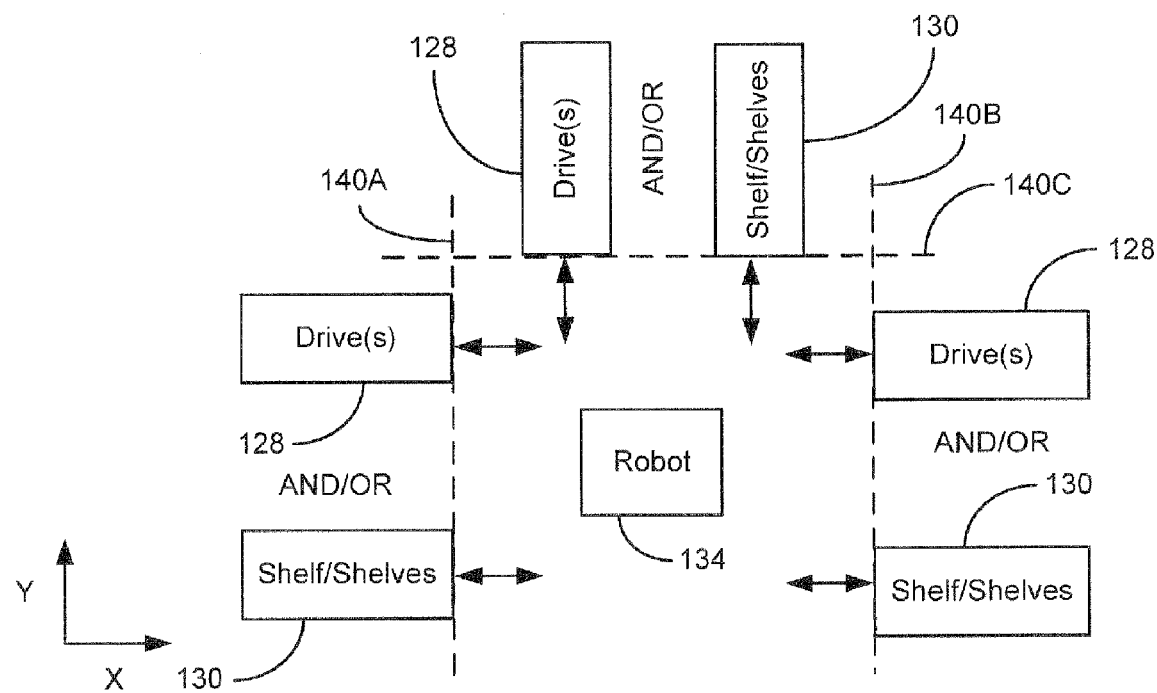
Figure 2E:
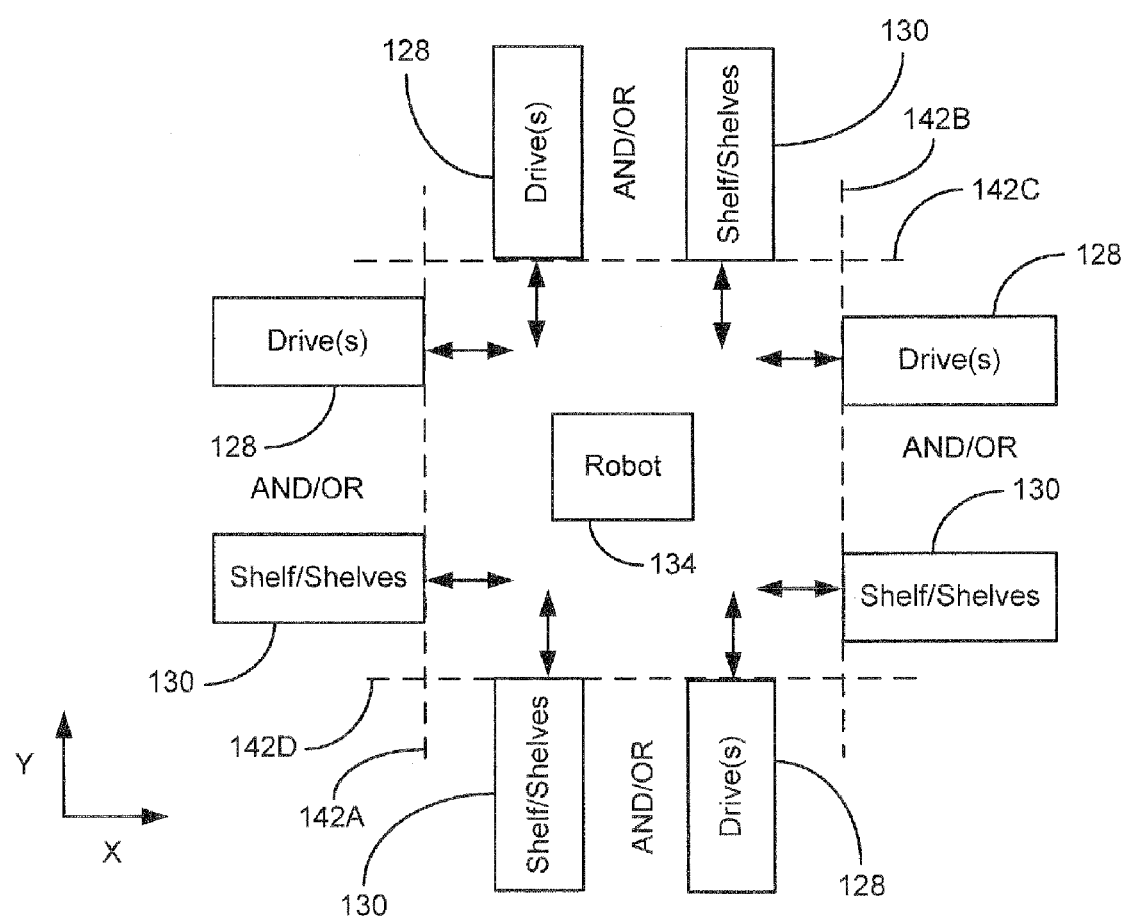

With reference to FIG. 1, the present invention is directed to a magazine-based data cartridge library 100 comprised of: (a) a frame 102 for supporting the other elements of the library; (b) a shelving system 104 for supporting at least two data cartridge magazines 101 wherein a data cartridge magazine 101 is adapted to hold a plurality of data cartridges (not shown); (c) one or more drives 106 that are each capable of writing and/or reading data to/from a recording medium in a data cartridge; (d) a magazine transport 108 for moving a magazine 101 within the library 100; (e) a cartridge transport 110 for moving a data cartridge between a magazine 101 and a drive 106; and (f) an interface 112 for communicating with a host computer (not shown) that uses the library 101 to store data.

As noted, the frame 102 provides a support for the other elements of the library 100. In addition, the frame 102 may comprise one or more exterior surfaces that form a cabinet for enclosing most of the components of the library 100. [The frame may further define an interior space 102]. Typically, the cabinet establishes an environment whose temperature can be controlled for the benefit of the elements of the library 100 housed within the cabinet. The cabinet also commonly serves as a barrier to contaminants that could adversely affect the operation of the elements housed within the library 100. Additionally, the cabinet is also useful in preventing an operator from accessing the space within the cabinet during operation of the library 100 and potentially being injured by the moving elements within the library 100.

There are a number of devices that do not necessarily need to be part of the magazine-based-data cartridge library 100 (i.e., not supported by the frame 102) but are nonetheless needed for the library 100 to function and, as a consequence, typically are part of the library 100. Among these devices are a power supply system 114 (which may be comprised of multiple power supplies) and a controller 116 for managing the operations of the library 100. Environmental devices 118, such as fans, fins, heat pipes, etc., are additionally incorporated into the library 100 to manage excess heat build-up beyond what the library 100 is able to passively dissipate.

Some embodiments of the present invention can include additional features for enhancing library 100 functionality, such as an entry/exit port 120, a pass-through port 122 and an operator interface 124, to name three examples. An entry/exit port 120 can facilitate movement of a magazine in and out of the library 100, a pass-through port 122 can facilitate movement of a magazine between two libraries (such as when adjacent and working together to share at least one magazine), and an operator interface 124 can facilitate operator command interaction with the library 100.

There are several possible layouts for the magazine-based cartridge library 100, consistent with embodiments of the present invention. Many of these layouts can be characterized or typed as rectilinear or circular/cylindrical. In a rectilinear type, magazine-based data cartridge library 100, at least the drive or drives 106 and the shelf or shelves of the shelf system 104 are laid out along: (a) a straight line or plane; or (b) along multiple straight lines or planes that are parallel and/or perpendicular to one another as will be further elaborated in the disclosure of FIGS. 2A-2E. More specifically, in a rectilinear type library, the face of a drive 106, comprising a receptacle for receiving a data cartridge (not shown), is oriented such that the direction that the data cartridge is displaced when the cartridge is either inserted or extracted from the receptacle by the cartridge transport 110 is substantially perpendicular to a straight line or plane. Similarly, a shelf of the shelf system 104 in the rectilinear type library is oriented such that the direction that a magazine 101 is displaced when the magazine 101 is either associated with a shelf of the shelf system 104 or removed from a shelf of the shelf system 104 by the magazine transport 108, is substantially perpendicular to a straight line or plane. Typically, most of the other elements of the library 100 are also laid out in the same manner.

FIGS. 2A-2E are plan views of five different rectilinear type layouts for the magazine-based data cartridge library 100. In the layout illustrated in FIG. 2A, a drive 128 (or drives) and/or a shelf 130 (or shelves) are oriented along a straight line/plane 132. A robot 134 is provided that cumulatively represents the magazine transport 108 and the cartridge transport 110. In this embodiment, the robot 134 is capable of accessing the drive(s) 128 for purposes of inserting or extracting data cartridges (not shown) as indicated by the two-way arrow 129. The robot 134 is further capable of accessing the shelf/shelves 130 to displace a magazine 101, such as to remove for example, as indicated by the two-way arrow 131. With respect to the rectilinear type layouts shown in FIGS. 2B-2E, the drive 128 and shelf 130 elements retain the same reference numbers as those elements bear in FIG. 2A. Additionally, the two-way arrows, such as arrow 131, indicate an access locations to drive 128 and shelf 130 elements. In the embodiment illustrated in FIG. 2B, at least one drive 128 and/or at least one shelf 130 is/are laid out along line/plane 136A, and at least one drive 128 and/or at least one shelf 130 is/are laid out along line/plane 136B, which is parallel to line/plane 136A. In the embodiment illustrated in FIG. 2C, at least one drive 128 and/or at least one shelf 130 is/are laid out along line/plane 138A, and at least one drive 128 and/or at least one shelf 130 is/are laid out along line/plane 138B, which is perpendicular to line/plane 138A. With respect to the embodiment of FIG. 2D, at least one drive 128 and/or at least one shelf 130 is/are laid out along each of lines/planes 140A, 140B and 140C, with lines/planes 140A and 140B being parallel to each other and perpendicular to line/plane 140C. In the embodiment illustrated in FIG. 2E, at least one drive 128 and/or at least one shelf 130 is/are laid out along each of lines/planes 142A-142D, with lines/planes 142A, 142B being parallel to one-another, and with lines/planes 142C, 142D being parallel to one another and perpendicular to the parallel lines/planes 142A, 142B. It should be appreciated that each of the embodiments comprises at least one drive 128. Further, each embodiment comprises at least one shelf 130 that is capable of supporting two or more magazines 101, from FIG. 1, or multiple shelves 130 that cumulatively support two or more magazines 101. It should also be appreciated that the illustrated location of a drive 128 or shelf 130 along a line/plane is merely illustrative and that the actual location of a drive 128 or shelf 130 can be anywhere along a line/plane. It should also be appreciated that, while the robot 134 cumulatively represents the magazine transport 108 and cartridge transport 110, the magazine transport 108 and the cartridge transport 110 may share one or more elements or be entirely separate from one another. It should be further appreciated that there may be other rectilinear layouts for the magazine-based data cartridge library capable of cooperating with a magazine transport 108.

Referring back to the elements of FIG. 1, in a circular/cylindrical type, magazine-based data cartridge library 100, the drive or drives 106 and shelf or shelves of the shelf system 104 are laid out along radial lines that have a common center and/or along one circular arc or multiple, concentric circular arcs. More specifically, in a circular type library, the face of a drive 106 comprises a receptacle for receiving a data cartridge (not shown) is oriented such that the direction that the data cartridge is displaced when the cartridge is either inserted or extracted from the receptacle is either: (a) substantially along a radial line/plane, (b) substantially along a line/plane that is parallel to a radial line/plane, or (c) along a line that is tangent to a circular arc as will be further elaborated in the disclosure of FIGS. 3A-3G. Similarly, a shelf of the shelf system 104 in a circular type library is oriented such that the direction that a magazine 101 is displaced when the magazine 101 is either associated with a shelf or removed from a shelf of the shelf system 104 by the magazine transport 108 is either: (a) substantially along a radial line/plane, (b) substantially along a line/plane that is parallel to a radial line/plane, or (b) along a line that is tangent to a circular arc.

Figure 3A:
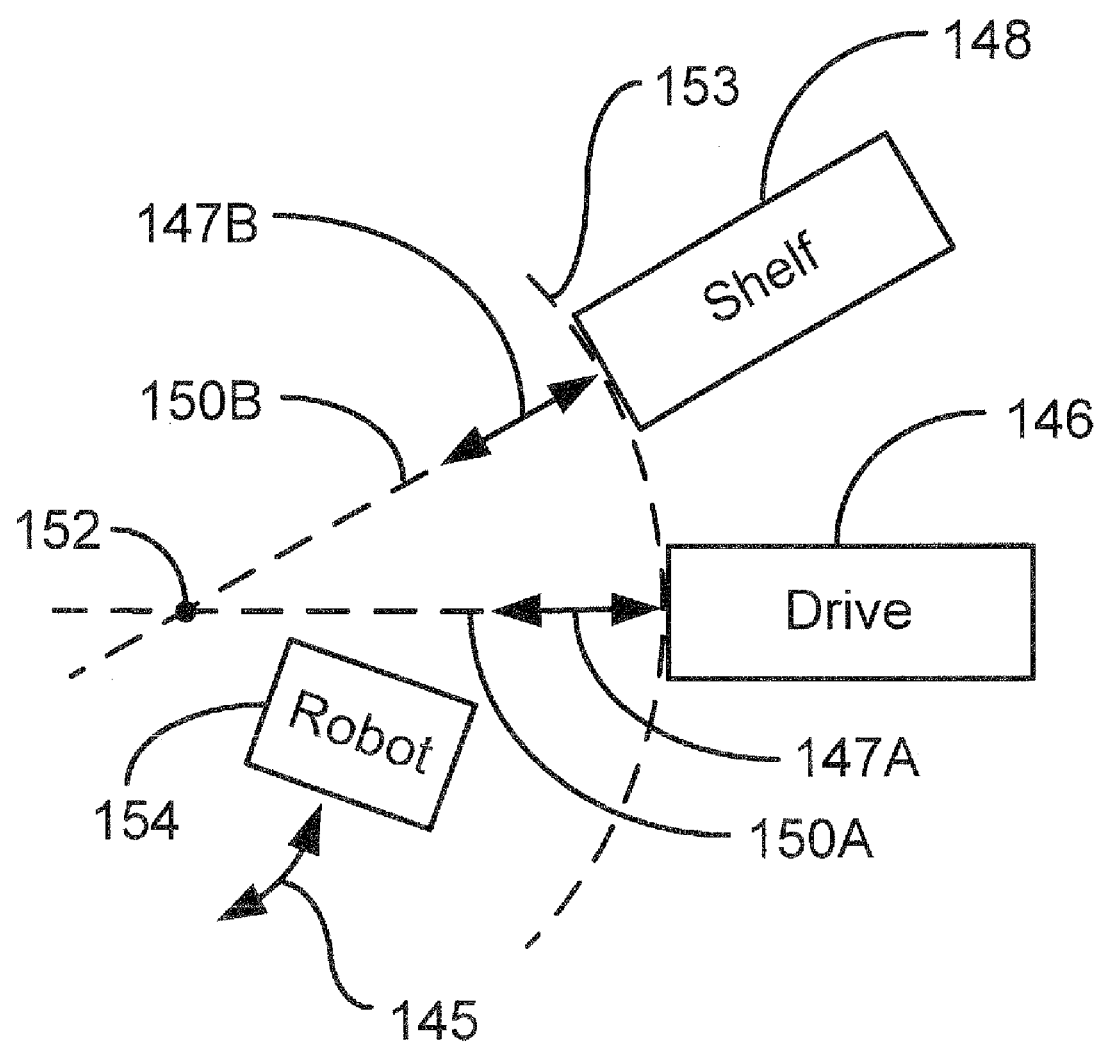
FIGS. 3A-3G are plan views of seven cylindrical layouts for a magazine-based data cartridge library.
Figure 3B:
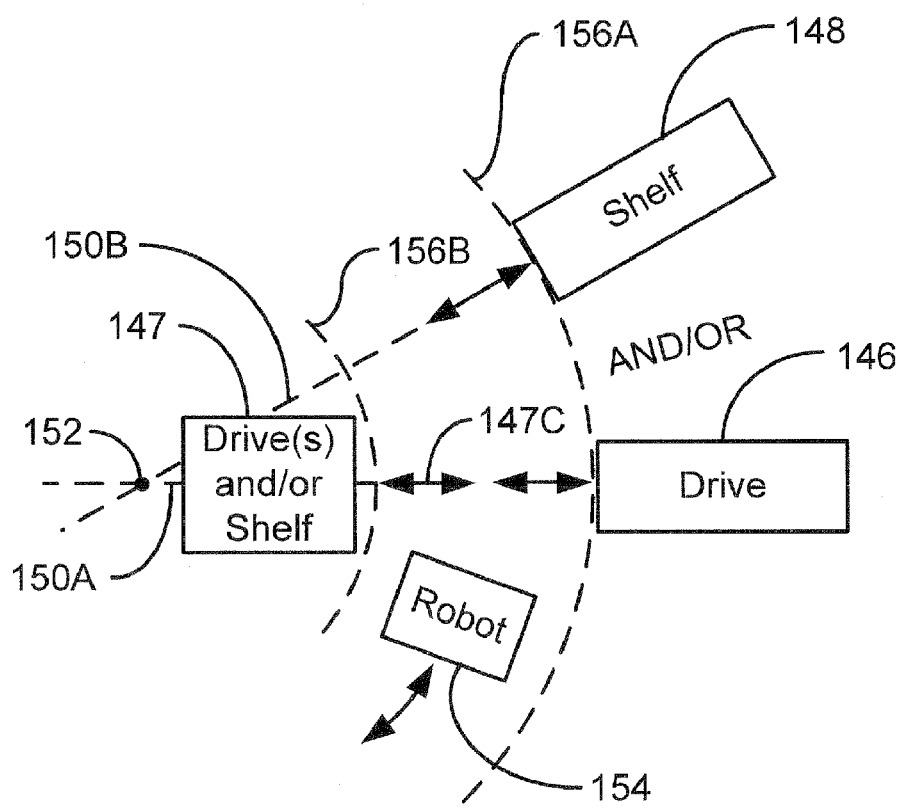
Figure 3C:
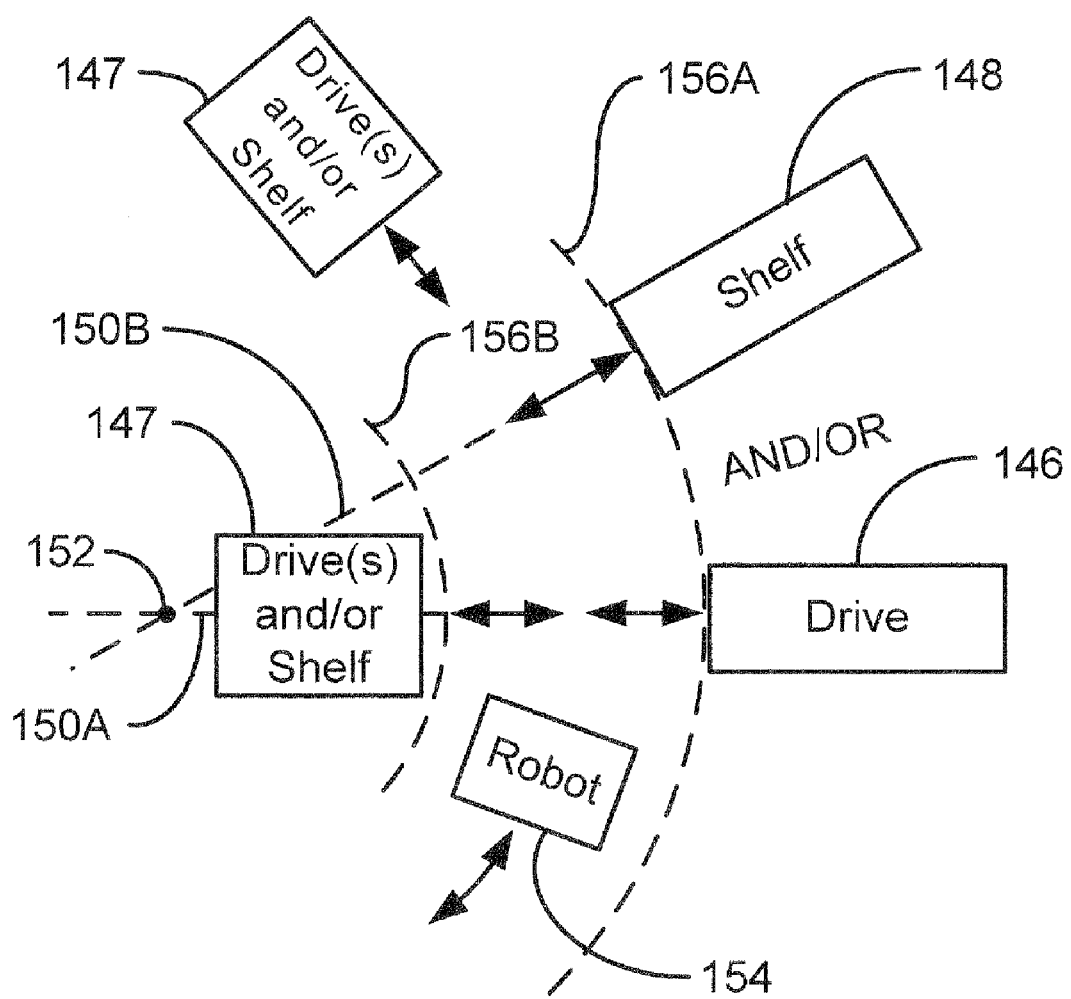
Figure 3D:
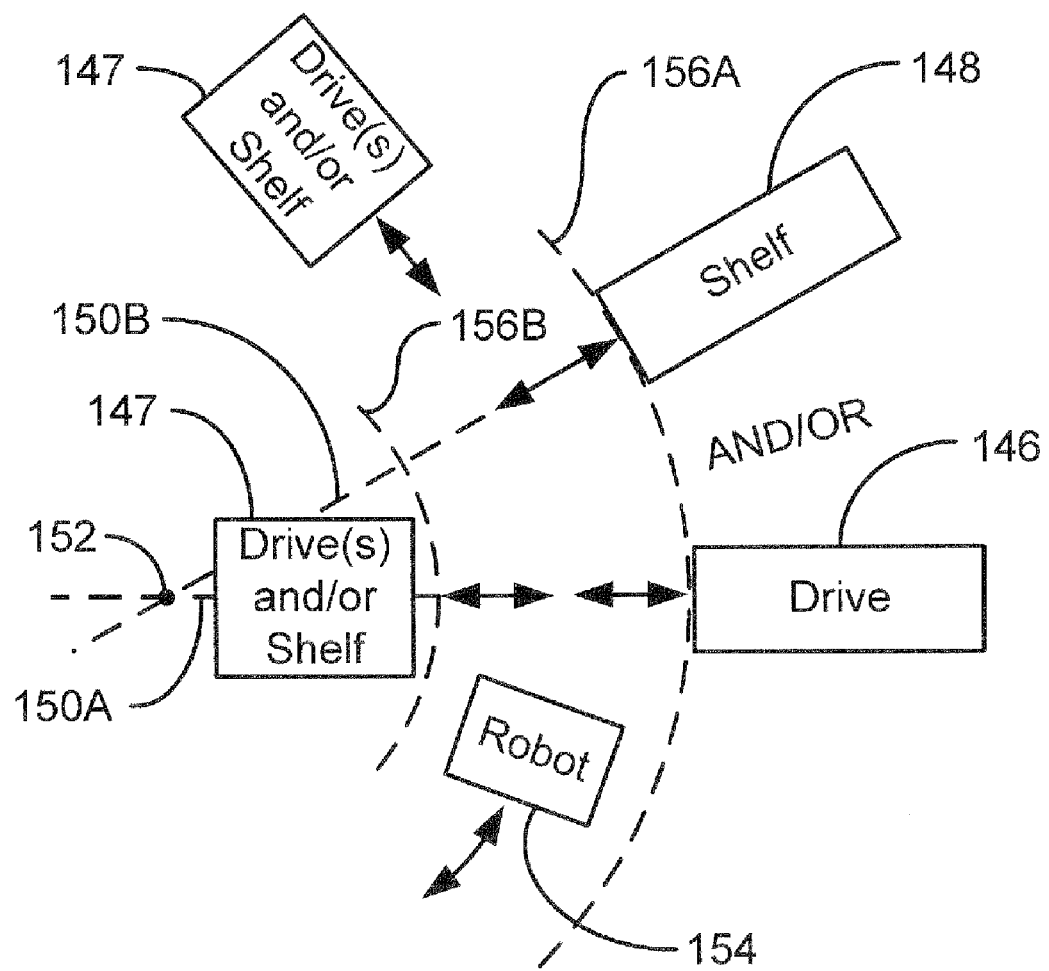
Figure 3E:
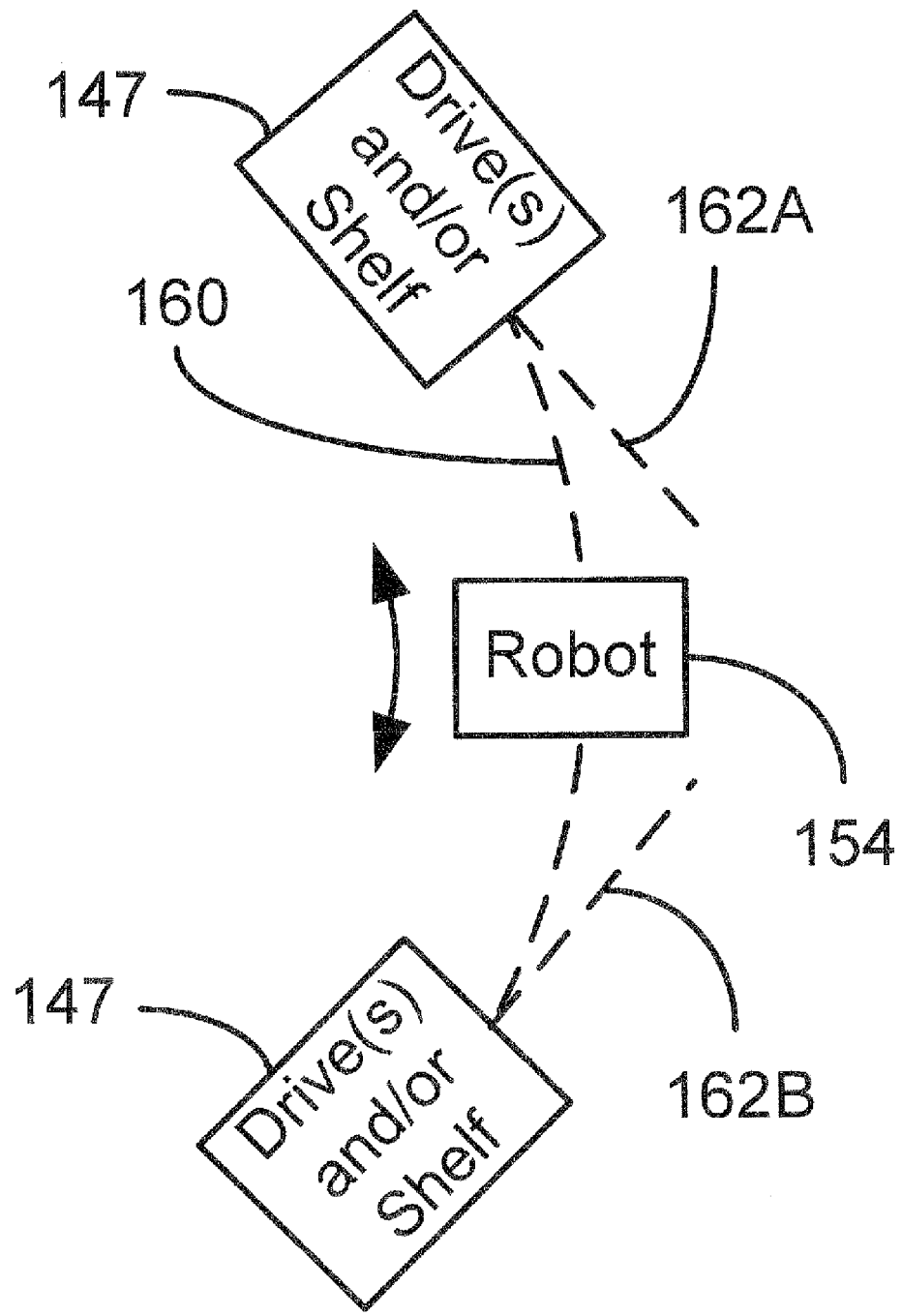
Figure 3F:
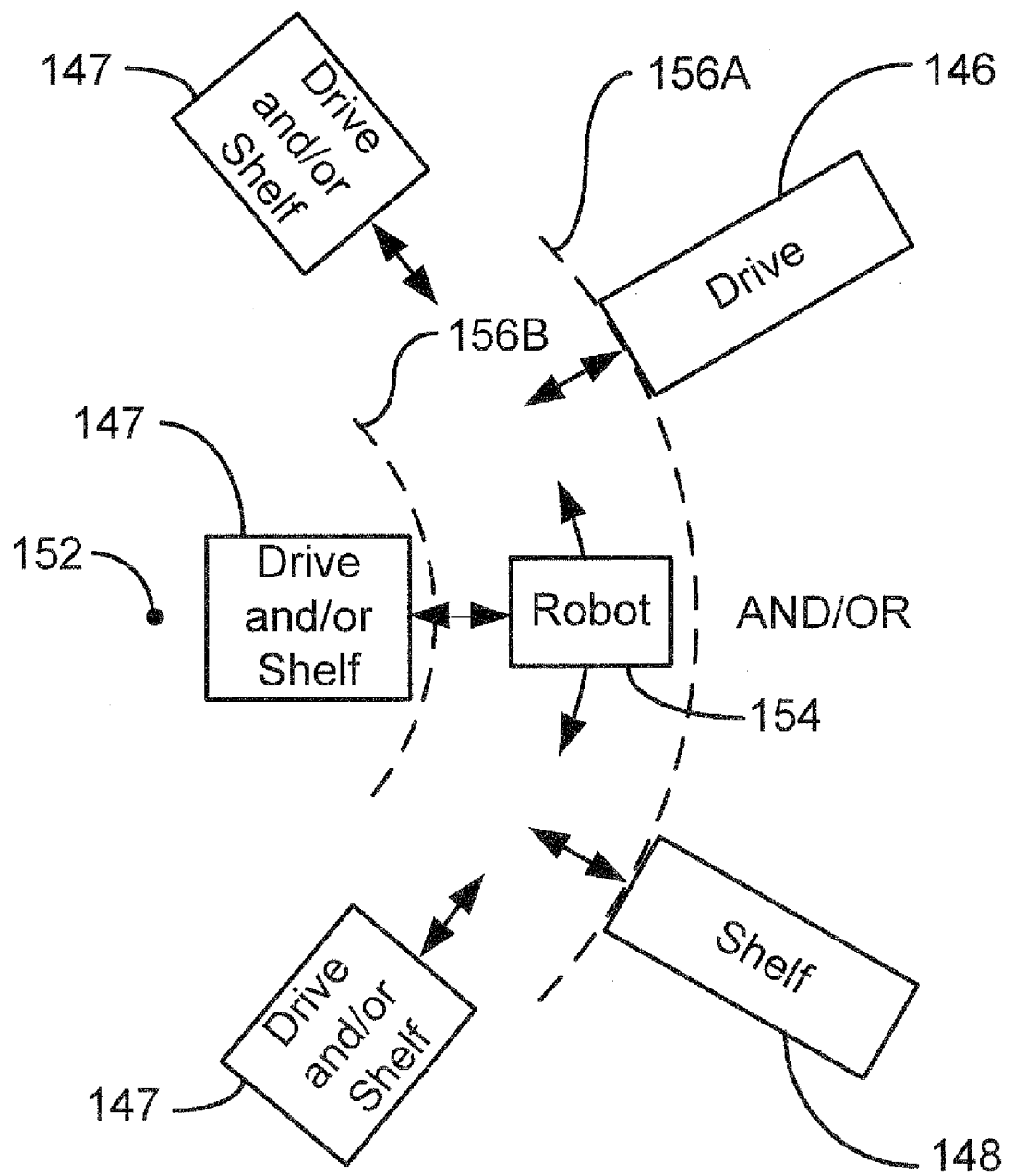
Figure 3G:
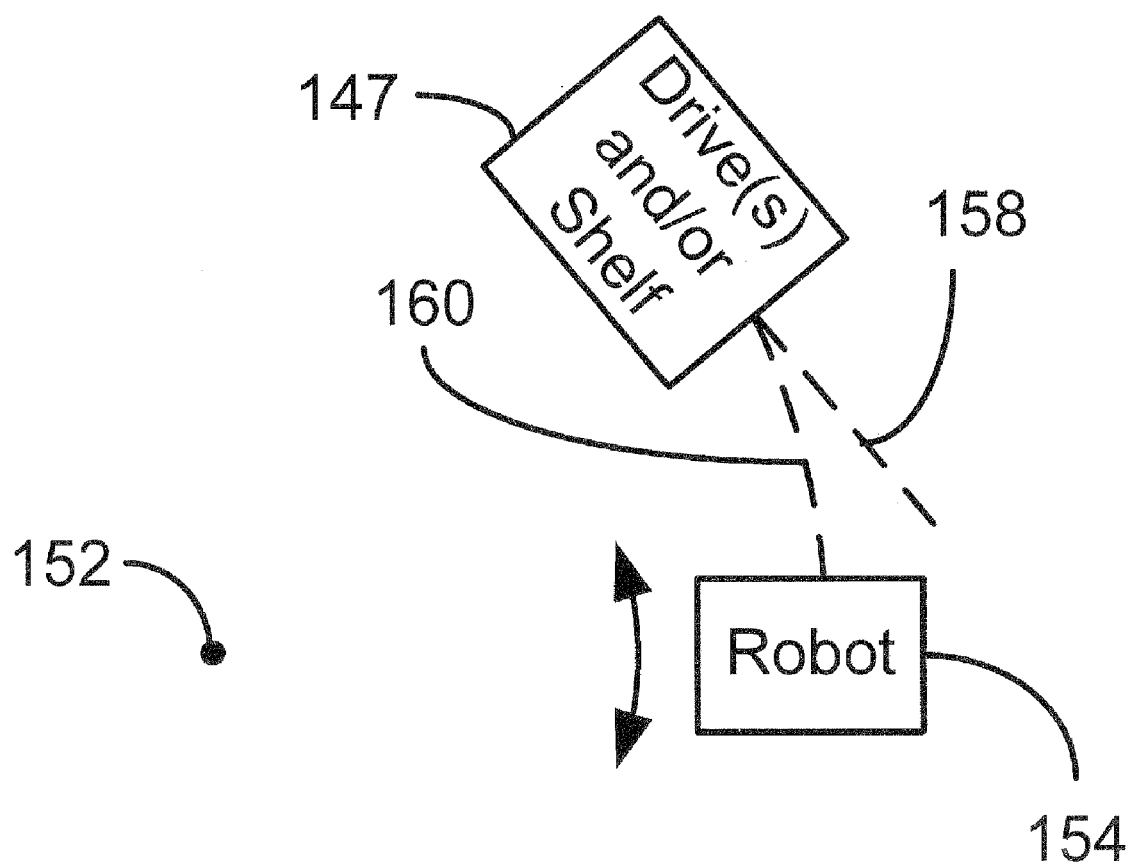

FIGS. 3A-3G are plan views of seven different circular/cylindrical type layouts for the magazine-based data cartridge library 100. In the layout illustrated in FIG. 3A, a drive 146 (or drives) and/or shelf 148 (or shelves) are respectively oriented along radial lines 150A, 150B that have a common center 152 and along a circular/cylindrical arc 153. A robot 154 is provided that cumulatively represents the magazine transport 108 and the cartridge transport 110 of FIG. 1. The robot 154 is capable of accessing the shelf 148 disposed along the circular/cylindrical arc 153 for transferring one or more data cartridge magazines 101 to and from the shelf 140 as indicated by the two-way arrow 147B. The robot 154 is also capable of accessing the drive 146 also disposed along the circular/cylindrical arc 153 for transferring one or more data cartridges (not shown) to and from the drive 146 as indicated by the two-way arrow 147A. As illustrated in this embodiment, the robot 154 is adapted to accessing the drive 146 and shelf 148 by moving along an arc following the circular/cylindrical arc 153 for as shown by the two-way arrow 145. With respect to the circular/cylindrical type layouts shown in FIGS. 3B-3G, the term drive 146 refers to one or multiple drives and the term shelf 148 refers to one or more shelves. Additionally, reference numbers for elements common to the various embodiments have been retained as a matter of convenience. In the embodiment illustrated in FIG. 3B, at least one drive 146 and/or at least one shelf 148 is/are laid out along a radial line(s) 150A and 150B respectively and along a first circular/cylindrical arc 156A, and at least one drive and/or at least one shelf collectively shown by a drive(s) and/or shelf block 147 is/are laid out along a radial line(s), herein radial line 150A, and along a second circular/cylindrical arc 156B that is concentric to the circular arc 156A. The robot 154 moves in a space that is located between the two concentric arcs 156A, 156B. It should be appreciated that the embodiments illustrated in FIGS. 3A and 3B are each capable of being implemented such that the shelf or shelves 148 and drive or drives 146 are laid out along a circular/cylindrical arc 156A that defines a complete or substantially complete circle or cylinder. In the embodiment illustrated in FIG. 3C, at least one drive 146 and/or at least one shelf 148 is/are laid out along radial lines 150A and 150B respectively and along a circular/cylindrical arc 156A, and at least one drive and/or shelf 147 is/are laid out along a tangent line 158 to a circular/cylindrical arc 160 that typically represents the path traveled by an element of the robot 154. The robot 154 is capable of accessing the drive(s) and/or shelf 147 as indicated by the two-way arrow 147D. The embodiment illustrated in FIG. 3D is a combination of the characteristics or features noted with respect to the embodiments shown in FIGS. 3B and 3C. In the embodiment illustrated in FIG. 3E, at least one drive and/or shelf 147 is/are laid out along a tangent line 162A to the circular/cylindrical arc 160, and at least one drive and/or shelf 147 is laid out along a tangent line 162B to the circular/cylindrical arc 160. The embodiment illustrated in FIG. 3F is a combination of the characteristics or features noted with respect to the embodiment shown in FIGS. 3B and 3E. In the embodiment illustrated in FIG. 3G, at least one drive and/or shelf 147 is/are laid out along the tangent line 158 of the circular/cylindrical arc 160. In yet a further embodiment (not shown), at least one drive and/or shelf 147 are located along each of two or more circular arcs, such as the two concentric arcs 156A, 156B, with a common center 152 wherein an element of the robot 154 is cable of moving between the arcs. It should be appreciated that each of the embodiments comprises at least one drive 146. Further, each embodiment comprises at least one shelf 148 capable of supporting two or more magazines 101 or multiple shelves 148 that cumulatively support two or more magazines 101. It should also be appreciated that the illustrated location of a drive 146 or shelf 148 along a circular/cylindrical arc, such as arc 156A, is merely illustrative and that the actual location of a drive 146 or shelf 148 can be anywhere along the circular/cylindrical arc. It should also be appreciated that, while the robot 154 cumulatively represents the magazine transport 108 and cartridge transport 110, the magazine transport 108 and the cartridge transport 110 may share one or more elements or be entirely separate from one another. It should be further appreciated that there may be other circular layouts for the magazine-based data cartridge library 100 with features capable of cooperating with a magazine transport 108.

Figure 4A:
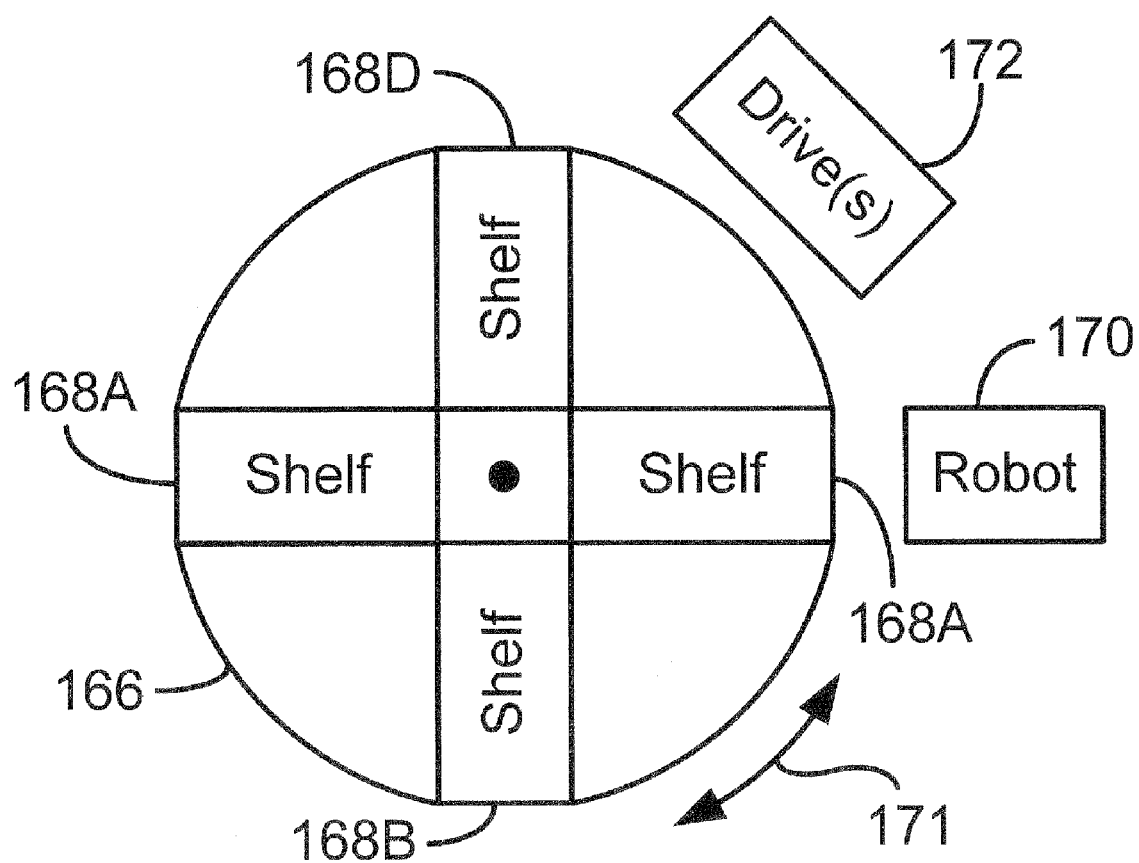
FIGS. 4A and 4B are plan view of two moving shelf layouts for a magazine-based library.
Figure 4B:
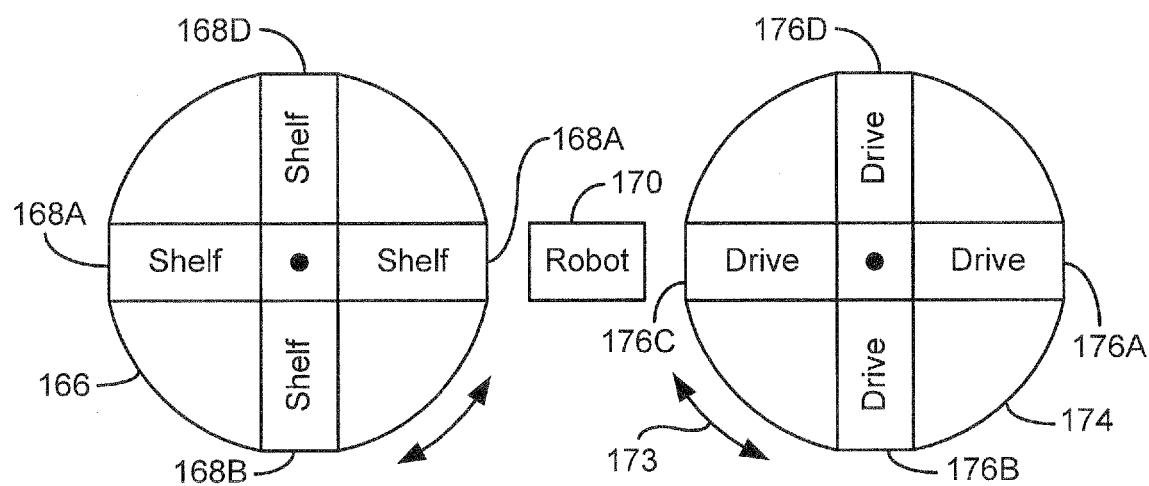

Yet another possible layout for the magazine-based data cartridge library 100 of FIG. 1 is a movable-shelf type in which at least two shelves of the shelf system 104 are moveable to facilitate the positioning of the shelves 104 relative to the magazine transport 108. FIG. 4A is a plan view of one embodiment of a movable-shelf layout for the magazine-based data cartridge library 100. The embodiment comprises a rotating shelf structure 166 with shelves 168A-D, a robot 170 that cumulatively represents the magazine transport 108 and cartridge transport 110, and one or more stationary drives 172. In operation, the shelf structure 166 is rotated, as indicated by the two-way arrow 171, to place one of the shelves 168A-D in the same plane as the robot 170 so that the robot 170 can perform a magazine 101 or cartridge (not shown) transfer operation. In an alternative embodiment, one or more drives are also associated with the rotating shelf structure 166. FIG. 4B is a plan view of another embodiment of a movable-shelf layout for the magazine-based library 100 that includes movable drives 176A-D. Elements common to this embodiment and the embodiment in FIG. 4A have been given the same reference numbers. The embodiment shown in FIG. 4B comprises the further element of a rotating drive structure 174 that is capable of holding multiple drives 176A-D. As illustrated herein, a drive, such as 176C, can be rotated, as shown by the two-way arrow 173, into a position capable of cooperating with the robot 170 to transfer a data cartridge (not shown) between the drive 176C and the robot 170. In other embodiments, one or more drives are associated with the rotating shelf structure 166 and/or one or more shelves 168A-D are associated with the rotating drive structure 174. Although not illustrated, another possible layout for the magazine-based data cartridge library 100 is movable-drive type that is comprised of a stationary shelf system, such as the shelf/shelves 130 of FIG. 2A, and movable drives, such as the rotating drive structure 174 of FIG. 4B, for example. It should be appreciated that each of the embodiments of FIGS. 4A and 4B comprise at least one drive, such as drive 172 of FIG. 4A. Further, each embodiment of FIGS. 4A and 4B comprise at least one shelf, such as the shelf 168A, capable of supporting two or more magazines 101 or multiple shelves, such as 168A-D, that cumulatively support two or more magazines 101. Moreover, while the illustrate embodiments contemplate that the rotating elements rotate about a vertical axis, rotation about a horizontal axis is also feasible. It should also be appreciated that, while the robot 170 cumulatively represents the magazine transport 108 and cartridge transport 110, the magazine transport 108 and the cartridge transport 110 may share one or more elements or be entirely separate from one another. It should be further appreciated that there may be other movable-shelf layouts for the magazine-based data cartridge library 100 of cooperating with a magazine transport 108.

The magazine-based data cartridge library 100 is also capable of being implemented in a layout that is a combination of two or more of the rectilinear type, circular type, movable-shelf type, and movable-drive type layouts.

Figure 5A:
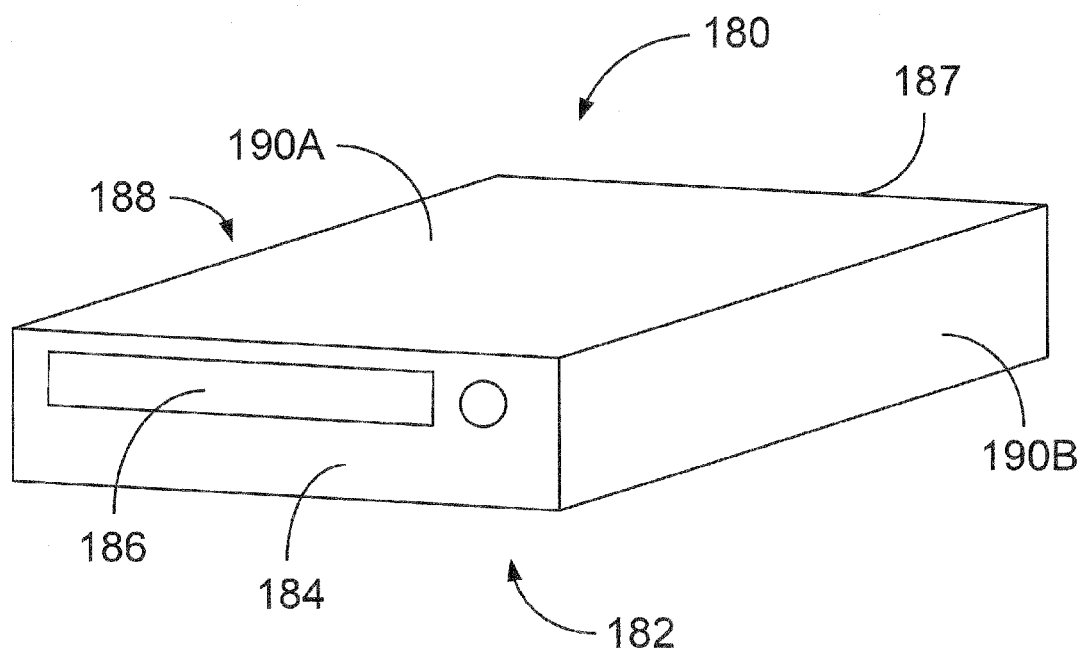
FIGS. 5A-5C are a perspective view of a drive, a front view of the drive in a vertical orientation, and a front view of the drive in a horizontal orientation.
Figure 5B:
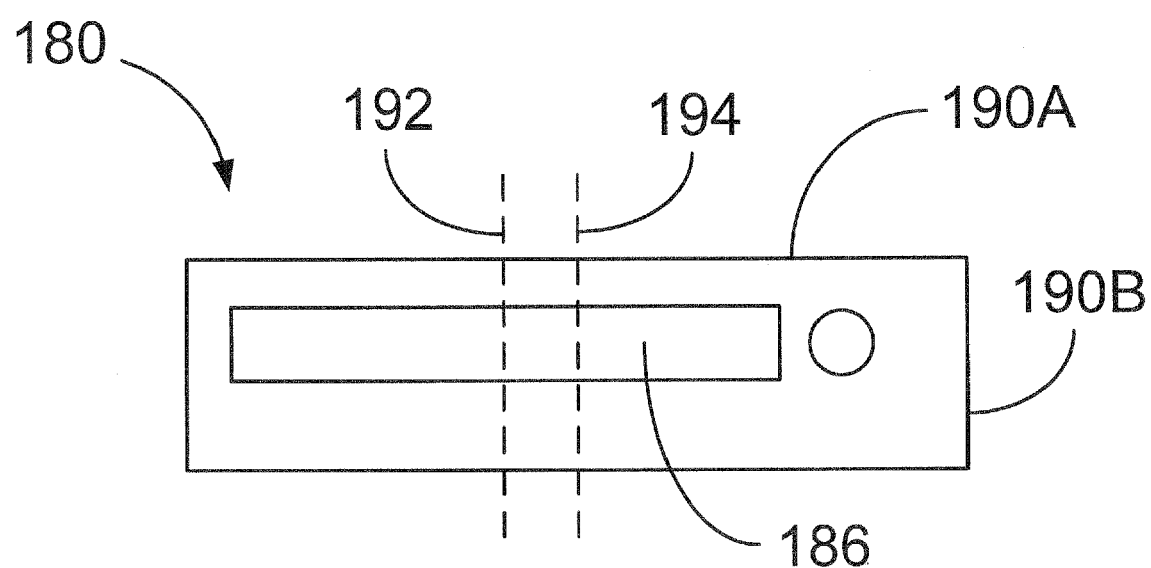
Figure 5C:
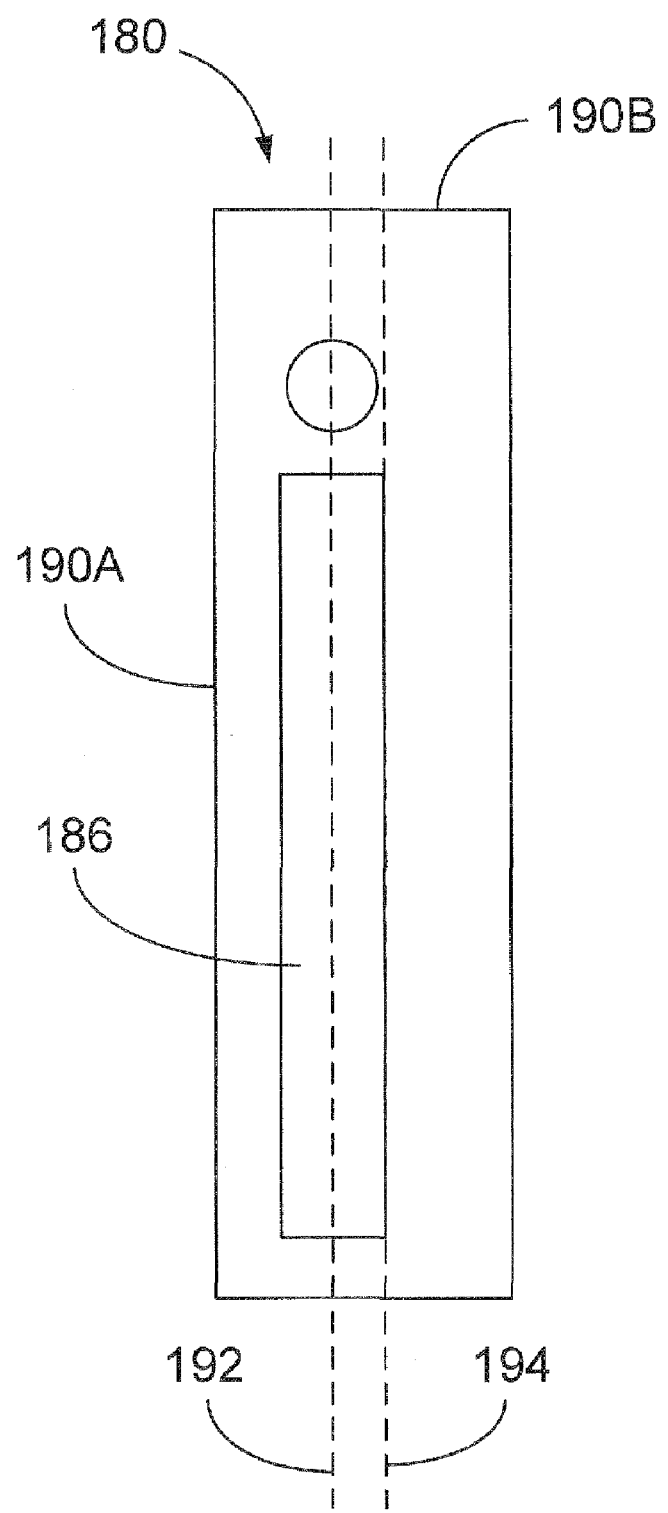
Figure 6A:
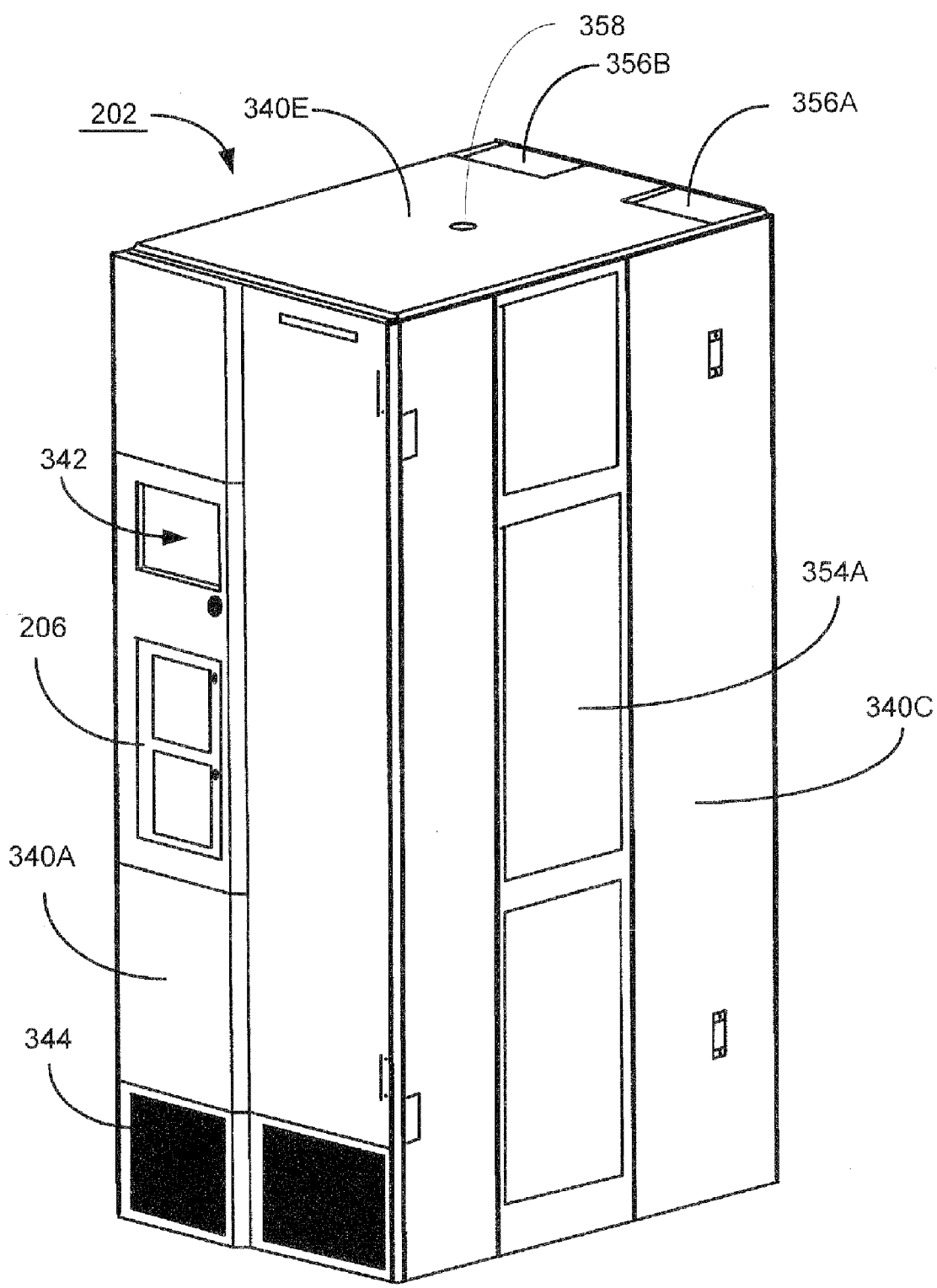
FIGS. 6A-6C are perspective views of the exterior of an embodiment of a magazine-based data cartridge library (hereinafter library)
Figure 6B:
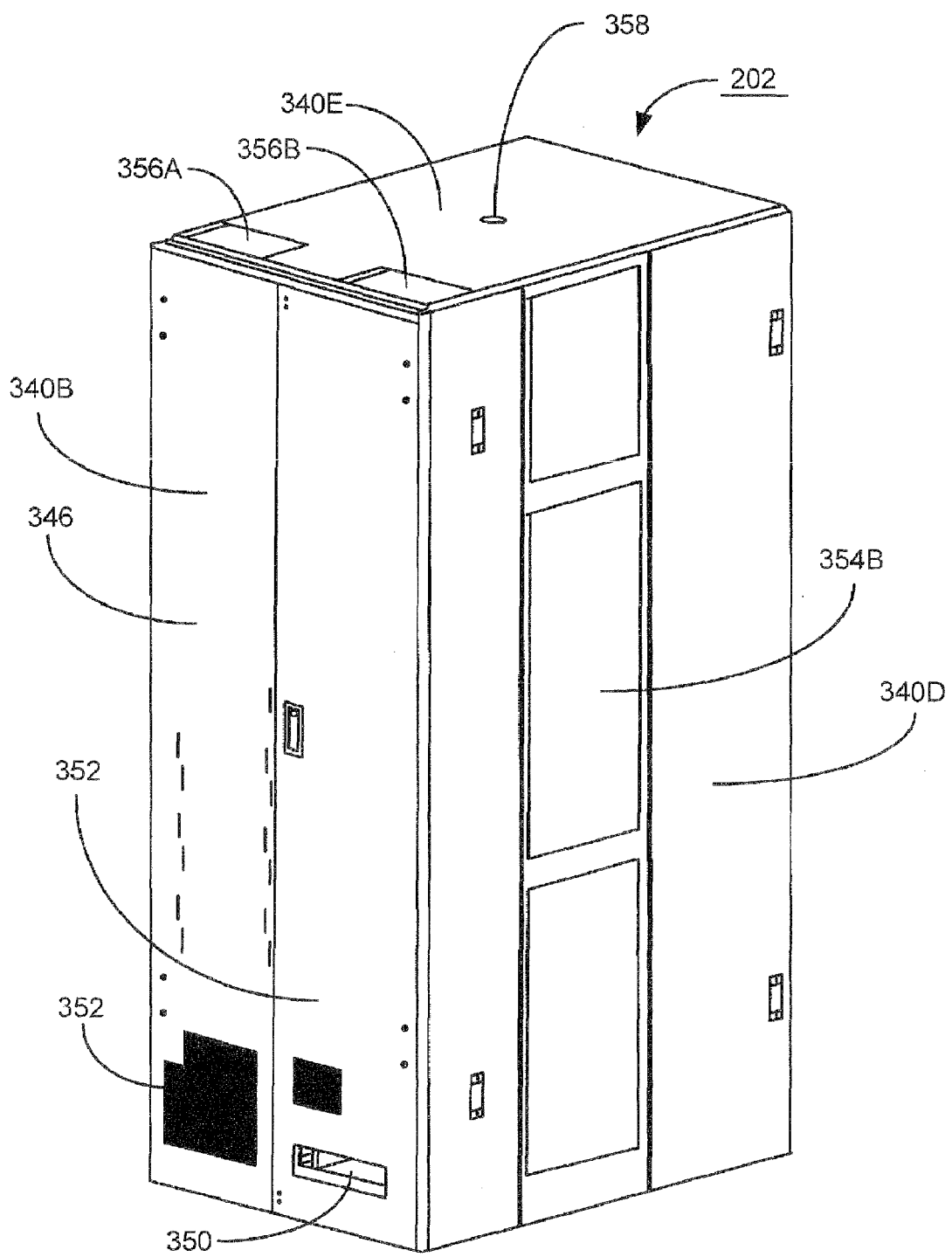
Figure 6C:
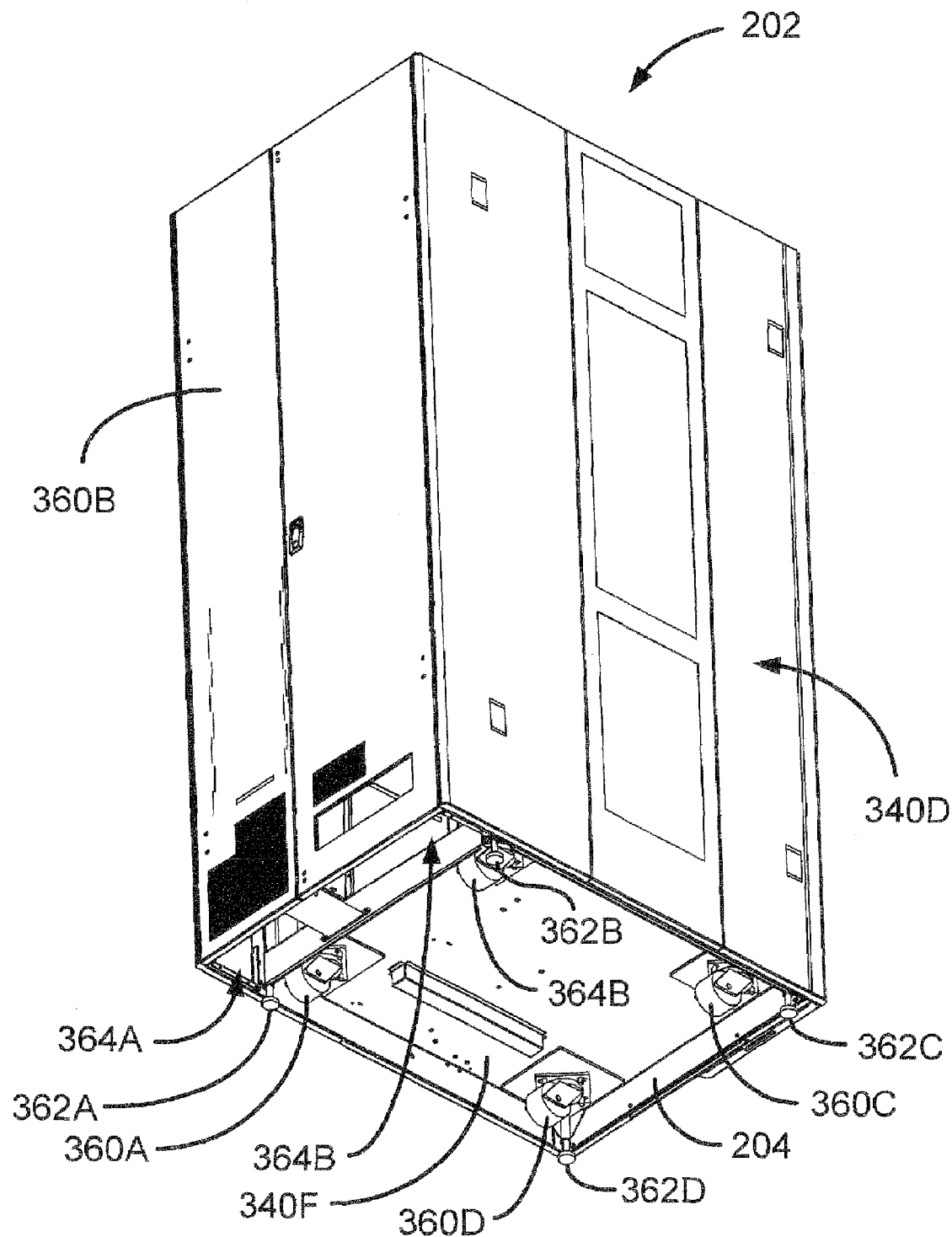

FIG. 5A illustrates a typical drive 180 that is employed in the magazine-based data cartridge library 100. The drive 180 is capable of writing data to and/or reading data from a recording medium that is located within a cartridge 224, shown in FIGS. 9A-B. Typically, the drive 180 is capable of both writing data to and reading data from a recording medium located in the library 100. The drive 180 is comprised of a housing 182 with a front surface 184 that has a receptacle 186 for receiving a cartridge 224. The housing 182 further comprises a back surface 187 and side surface 188 that is comprised of a first surface 190A, a second surface (not shown) that is substantially parallel to the first surface, a third surface 190B that is substantially perpendicular to the first surface 190A, and a fourth surface (not shown) that is substantially parallel to the third surface 190B. Typically, the drive 180 is situated in the library 100 such that the first surface 190A lies in a horizontal plane or in a vertical plane. When the receptacle 186 is longer in one dimension than the other and extends in a direction that is substantially parallel to the first surface 190A, these orientations result in the long dimension of the receptacle 186 extending either horizontally or vertically. FIG. 5B illustrates the drive 180 with an orientation in which the long dimension of the receptacle 186 extends horizontally. In a circular/cylindrical type implementation, either a horizontal receptacle center line 192 or a horizontal drive center line 194 of the drive 180 is typically located: (a) substantially along a radial line/plane, such as radial line 150A of FIG. 3A for example, (b) substantially along a line/plane that is parallel to a radial line/plane, or (b) along a line that is tangent to a circular arc, such as tangent line 158 of FIG. 3C. FIG. 5C illustrates the drive 180 in an orientation in which the long dimension of the receptacle 186 extends vertically. In a circular/cylindrical type implementation, either a vertical receptacle center line 196 or a vertical drive center line 198 of the drive 180 is typically located: (a) substantially along a radial line/plane, (b) substantially along a line/plane that is parallel to a radial line/plane, or (b) along a line that is tangent to a circular arc.

It should be appreciated that the magazine-based data cartridge library 100 is capable of being adapted to any type of drive 106 that is capable of writing date to and/or reading data from a recording medium located in a cartridge. Concomitantly, the magazine-based data cartridge library 100 is also adaptable to any type of data cartridge. For example, the library 100 is capable of being applied to a cartridge with a recording medium that is either a disk, a tape, or a non-moving recording medium (e.g., a solid state memory). Further, the library 100 is capable of being applied to cartridge with a recording medium that is magnetic, optical, magneto-optical or any other type of recording medium. The magazine-based data cartridge library 100 is further capable of being adapted for use with recording mediums that are not located in a cartridge, e.g., CDs.

In many cases, the magazine-based data cartridge library 100 operates on magazine 101 that, unlike the magazines 101 used in cartridge-based data cartridge libraries 100, comprises a structure that allows the magazine 101 to be engaged by the magazine transport 108 so that the transport 108 can move the magazine 101 within the library 100.

With reference to FIGS. 6A-6C, 7A-7B and 8A-8B, an embodiment of a magazine-based data cartridge library 202 (hereinafter referred to as library 202) is described. Generally, the library 202 is comprised of: (a) an embodiment of a frame 204 for supporting elements of the library 202; (b) an embodiment of an entry/exit port 206; (c) an embodiment of a shelf system 208; (d) an embodiment of drives 180; (e) an embodiment of a magazine transport 212; (f) an embodiment of a cartridge transport 214; (g) an embodiment of a power supply system 216; (h) an embodiment of a control system 218; and (i) an embodiment of fans 220 for cooling the library 202. Unless otherwise specified, the LTO data cartridge 224 adapted for use with the LTO magazine 270 will be used herein generically for illustrative purposes.

Figure 7A:
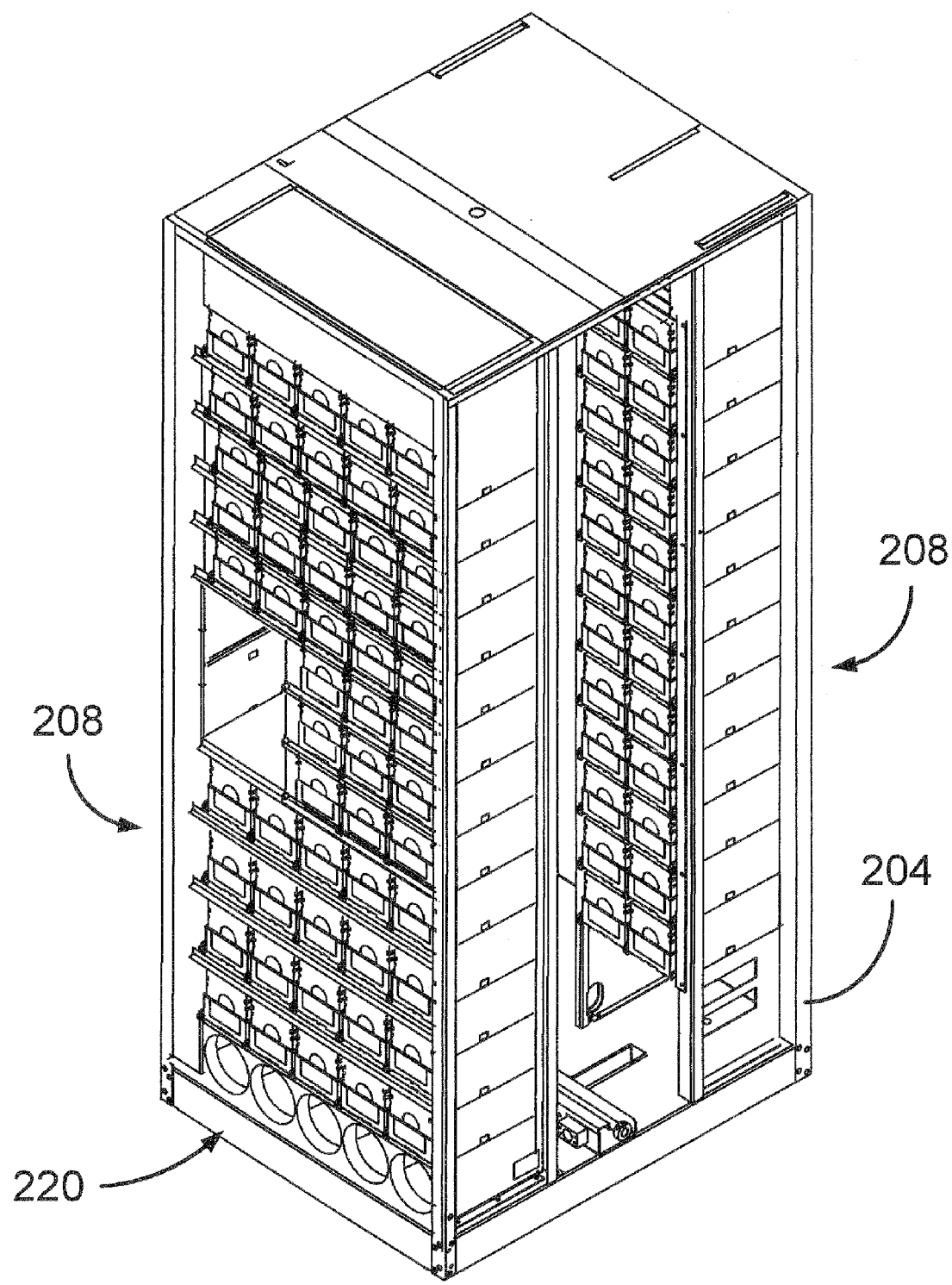
FIG. 7A is a perspective view of the embodiment of the library shown in FIGS. 6A-6C with the various elements, such as certain cabinet surfaces removed, and the library populated with magazines.
Figure 8A:
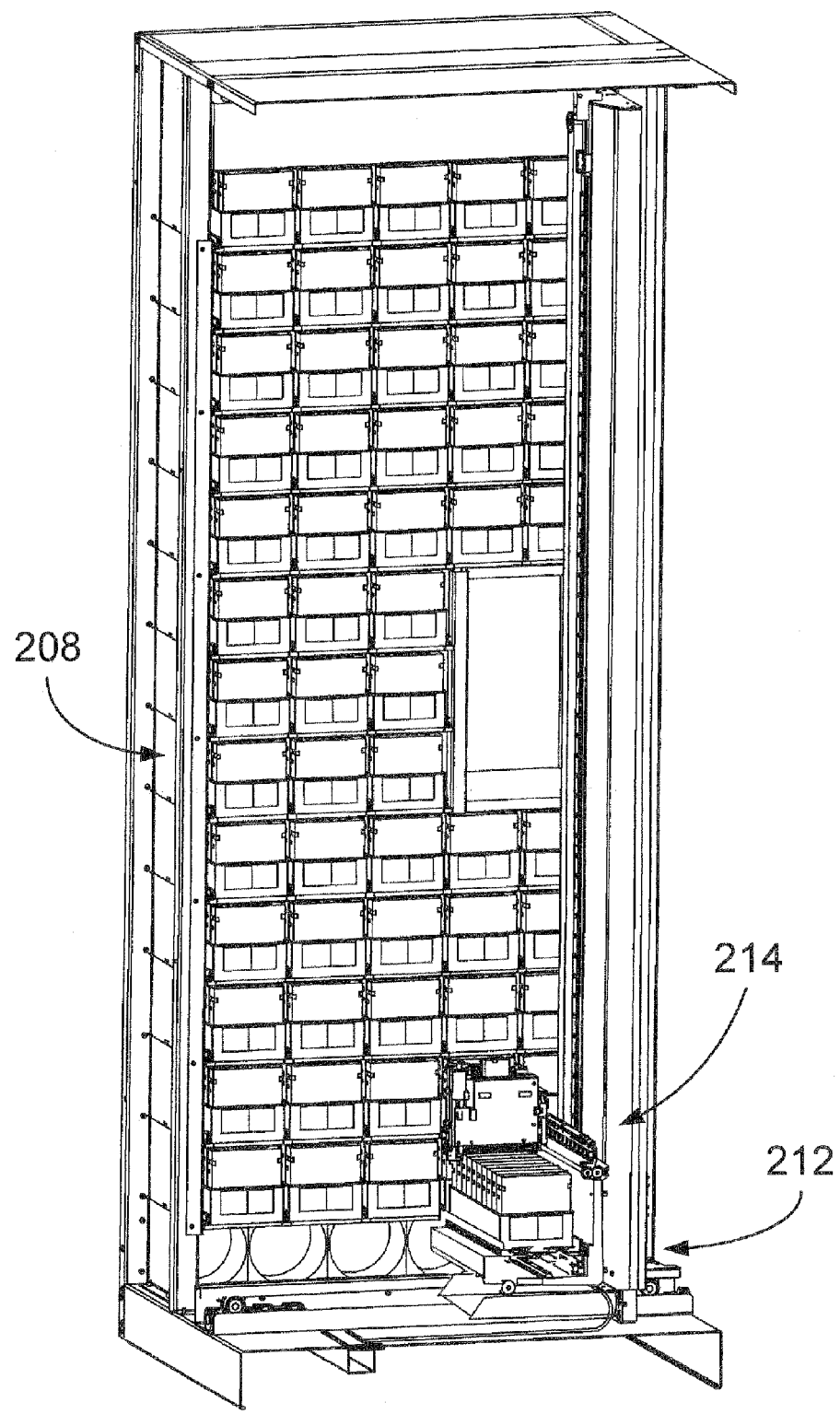
FIG. 8A is a perspective sectional interior view of the library with certain features removed, such as the entry/exit port, and the shelves in the view fully populated with magazines.
Figure 8B:
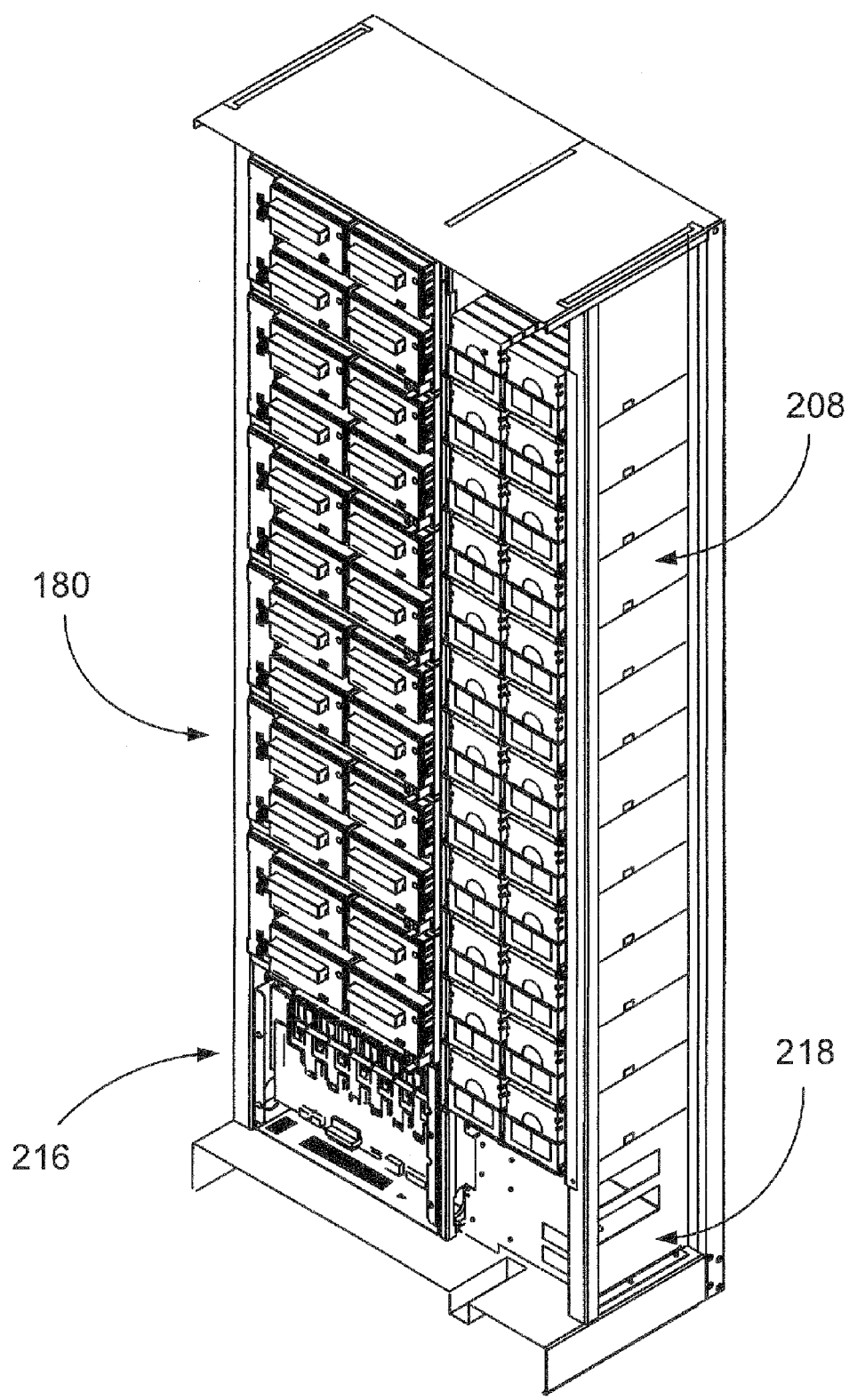
FIG. 8B is a perspective-sectional interior view of the library that is fully populated with drives and the shelves in the fully populated with magazines.

Before describing the library 202 in greater detail, the data cartridges 224, as shown in FIG. 8B, and magazines 270, as shown in FIG. 7A, that the library 202 is adapted to manipulate are described. The library 202 is adapted for operating on magnetic tape cartridges 224 and magazines 270 that contain the tape cartridges 224. Specifically, the library 202 is adapted for operating on cartridges 224 that conform to the following cartridge formats: (a) LTO (linear tape open), (b) SAIT (super advanced intelligent tape, and (c) DLT (digital linear tape). Typically, the library 202 is only used to store magazines 270 that are each used to hold cartridges 224 with the same cartridge format. For instance, the library 202 may be used to store magazines 270 that are each used to hold LTO tape cartridges 224. However, the library 202 is capable of storing magazines 270 that are used to hold cartridges 224 of different types. For instance, the library 202 is capable of storing a magazine 270 that holds LTO tape cartridges 224 and another magazine 320, shown in FIG. 14A, that holds DLT tapes 254, shown in FIG. 11A. Typically, the library 202 is used to store a magazine 270 where the magazine 270 is only used to hold tape cartridges 224 that conform to a single format. For instance, the library 202 may be used to store a magazine 270 that is only used to hold LTO tape cartridges. However, the library 202 is capable of storing a magazine 270 that is used to hold cartridges 224 of different formats. For instance, the library 202 is capable of storing a magazine 270 that is used to hold LTO and SAIT tape cartridges 224, 240.

Figure 9A:
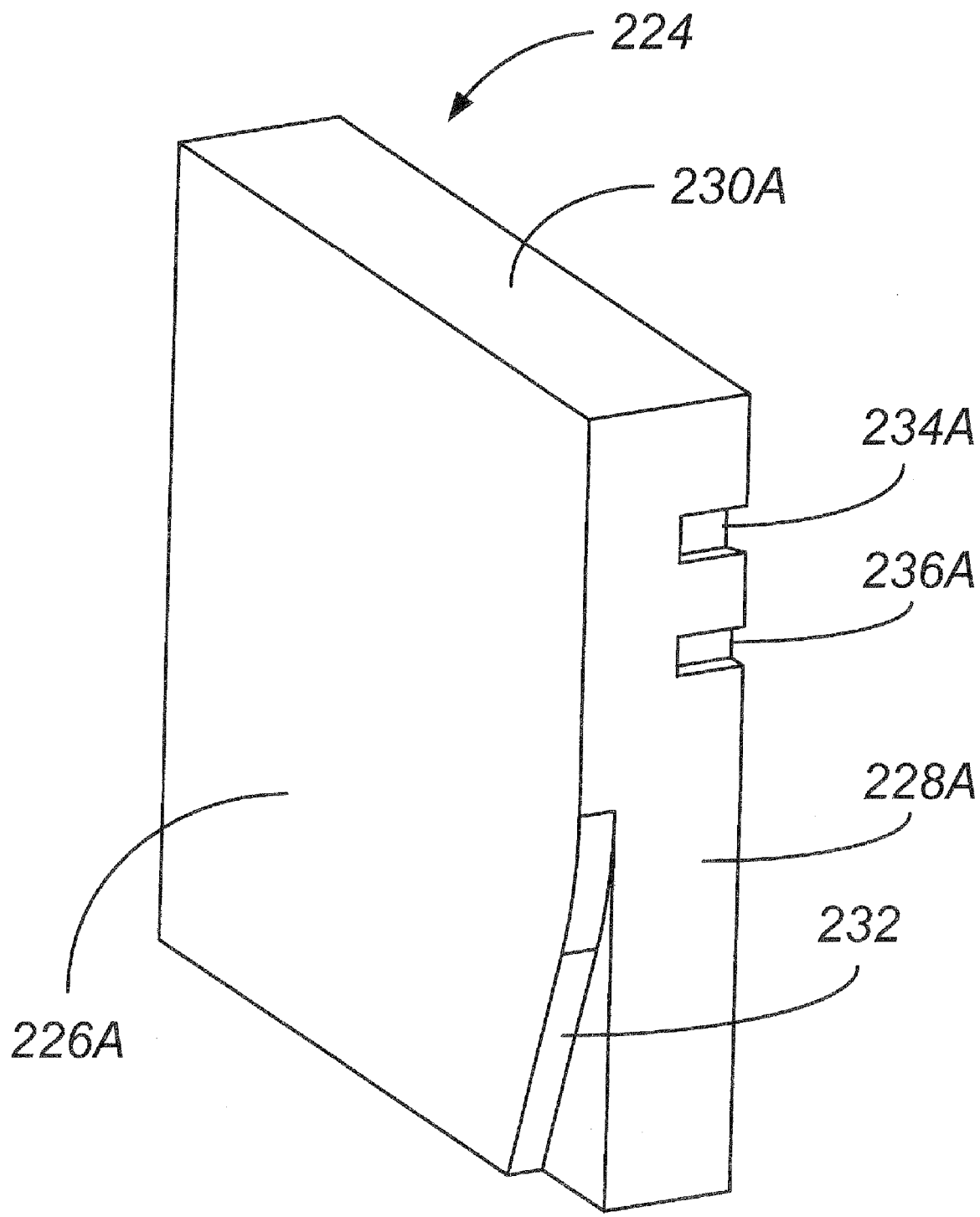
FIGS. 9A-9B illustrate an LTO tape cartridge.
Figure 9B:
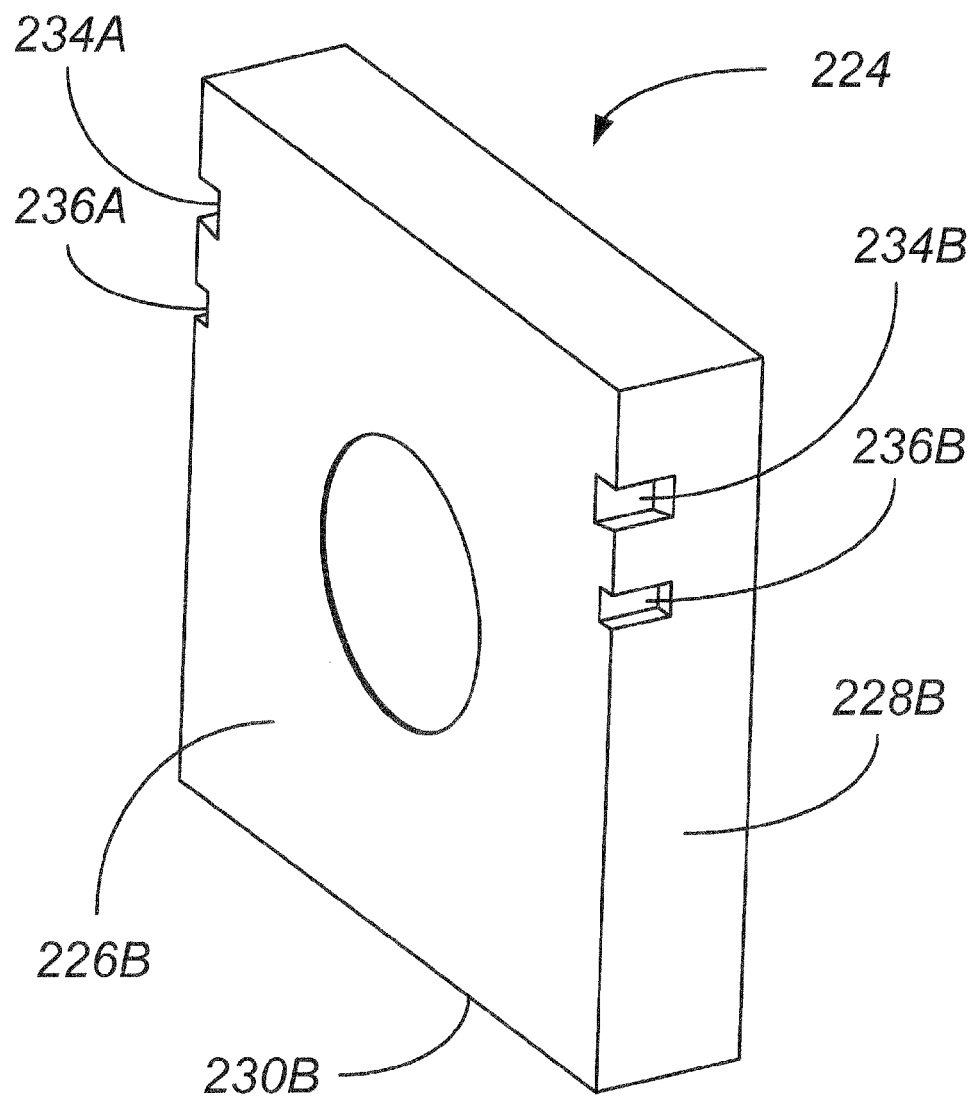

With reference to FIGS. 9A-9B, an LTO tape cartridge 224 comprises a first cartridge face 226A, a second cartridge face 226B, a first cartridge side 228A, a second cartridge side 228B, a first cartridge end 230A, and a second cartridge end 230B. The distance between the first and second cartridge faces 226A, 226B defines the height of the LTO tape cartridge 224, which is 0.85 in. The distance between the first and second side surfaces 228A, 228B defines the width of the LTO tape cartridge 224, which is 4.15 in. The distance between the first and second ends 230A, 230B defines the depth of the LTO tape cartridge 224, which is 4.02 in. The LTO tape cartridge 224 further comprises an orientation feature 232 that provides a basis for properly orientating the cartridge 224 for insertion in to an LTO tape drive (not shown) so that data can be read from and/or written to the recording medium within the cartridge 224. The orientation feature 232 also provides a basis for orienting all of the LTO tape cartridges 224 stored in a particular magazine, such as the magazine 270 of FIG. 7A, in the same manner. The cartridge 224 also comprises a first pair of gripper notches 234A, 234B and a second pair of gripper notches 236A, 236B, with one or both pair of notches typically used by a device (not shown) that grips the cartridge 224 during transport between a magazine 270 and a drive, such as the drive/s 180 of FIG. 7B.

Figure 10A:
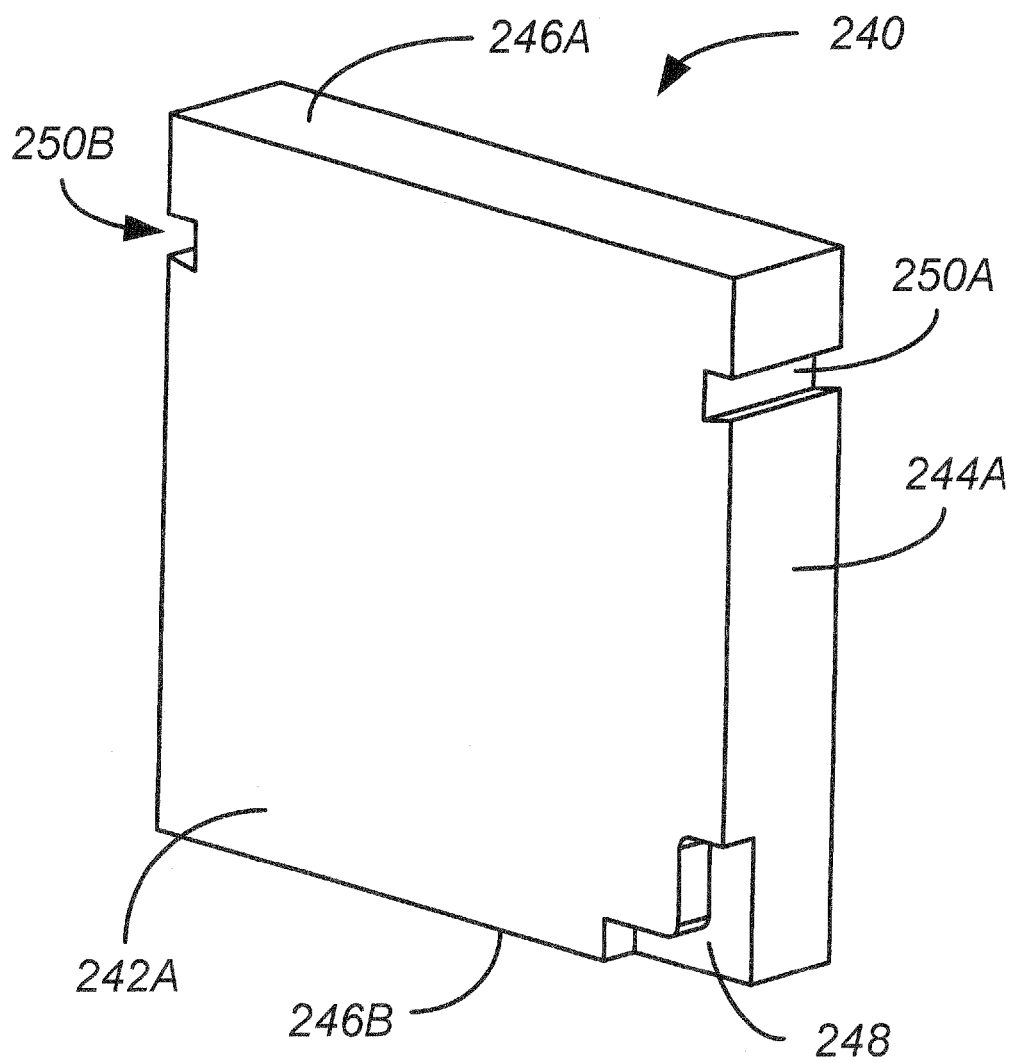
FIGS. 10A-10B illustrate a SAIT tape cartridge.
Figure 10B:
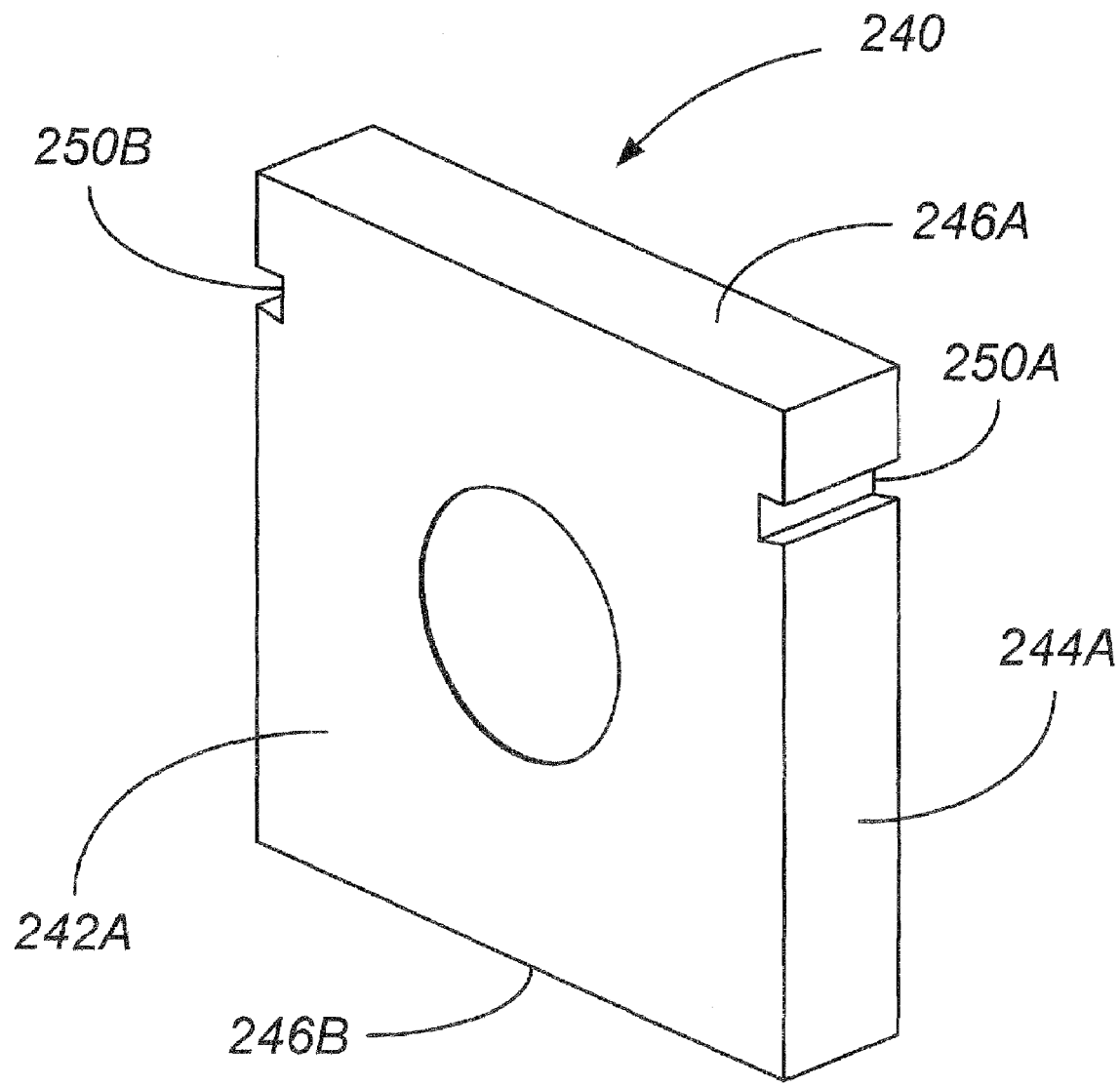

With reference to FIGS. 10A-10B, a SAIT tape cartridge 240 comprises a first cartridge face 242A, a second cartridge face 242B, a first cartridge side 244A, a second cartridge side 244B, a first cartridge end 246A, and a second cartridge end 246B. The distance between the first and second cartridge faces 242A, 242B defines the height of the cartridge 240, which is 0.85 in. The distance between the first and second side surfaces 244A, 244B defines the width of the cartridge 240, which is 4.15 in. The distance between the first and second ends 246A, 246B defines the depth of the cartridge 240, which is 4.02 in. The cartridge 240 further comprises an orientation feature 248 that provides a basis for properly orientating the cartridge 240 for insertion in to an SAIT tape drive (not shown) so that data can be read from and/or written to the recording medium within the cartridge 240. The orientation feature 248 also provides a basis for orienting all of the SAIT tape cartridges 240 stored in a particular magazine, such as the magazine 270 of FIG. 7A, in the same manner. The cartridge 240 also comprises a pair of gripper notches 250A, 250B, which are typically used by a device (not shown) that grips the cartridge 240 during transport between a magazine 270 and a drive, such as the drive/s 180 of FIG. 7B.

Figure 11A:
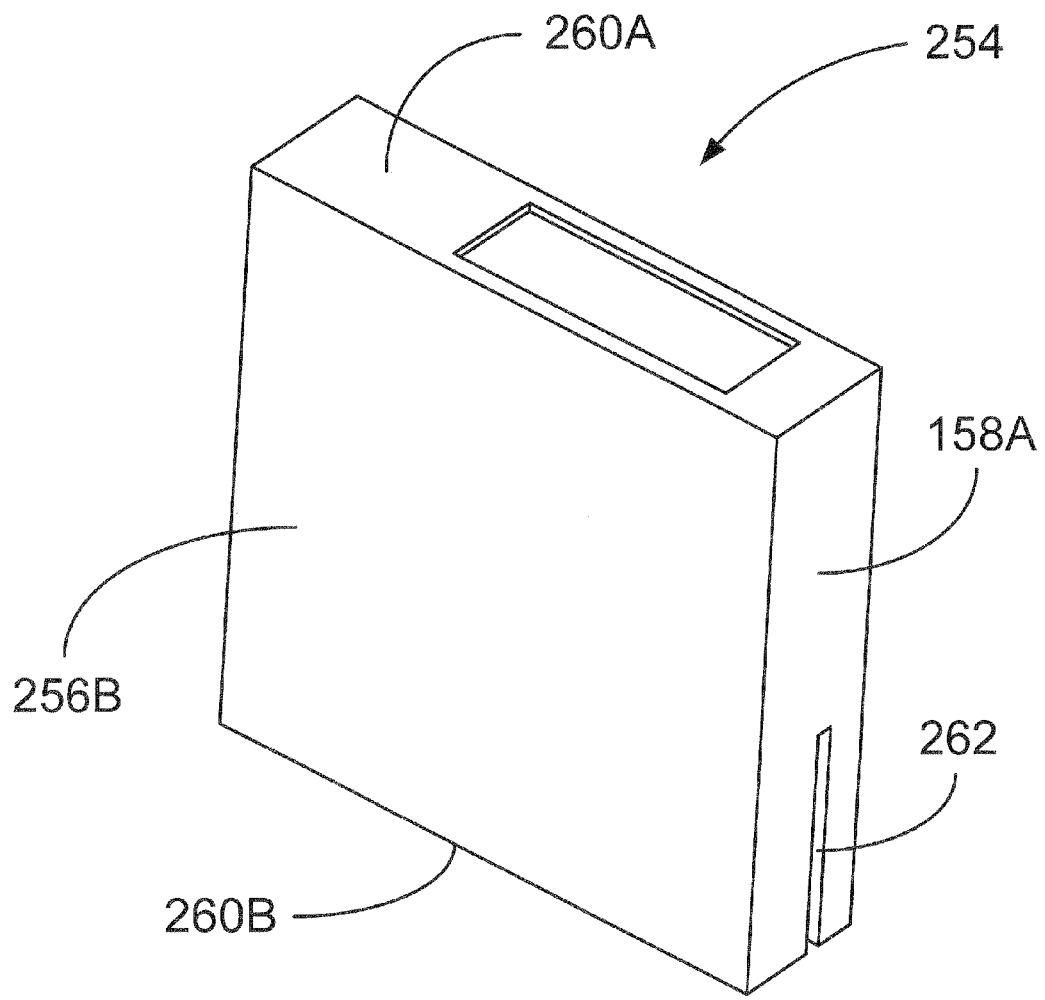
FIGS. 11A-11B illustrate a DLT tape cartridge.
Figure 11B:
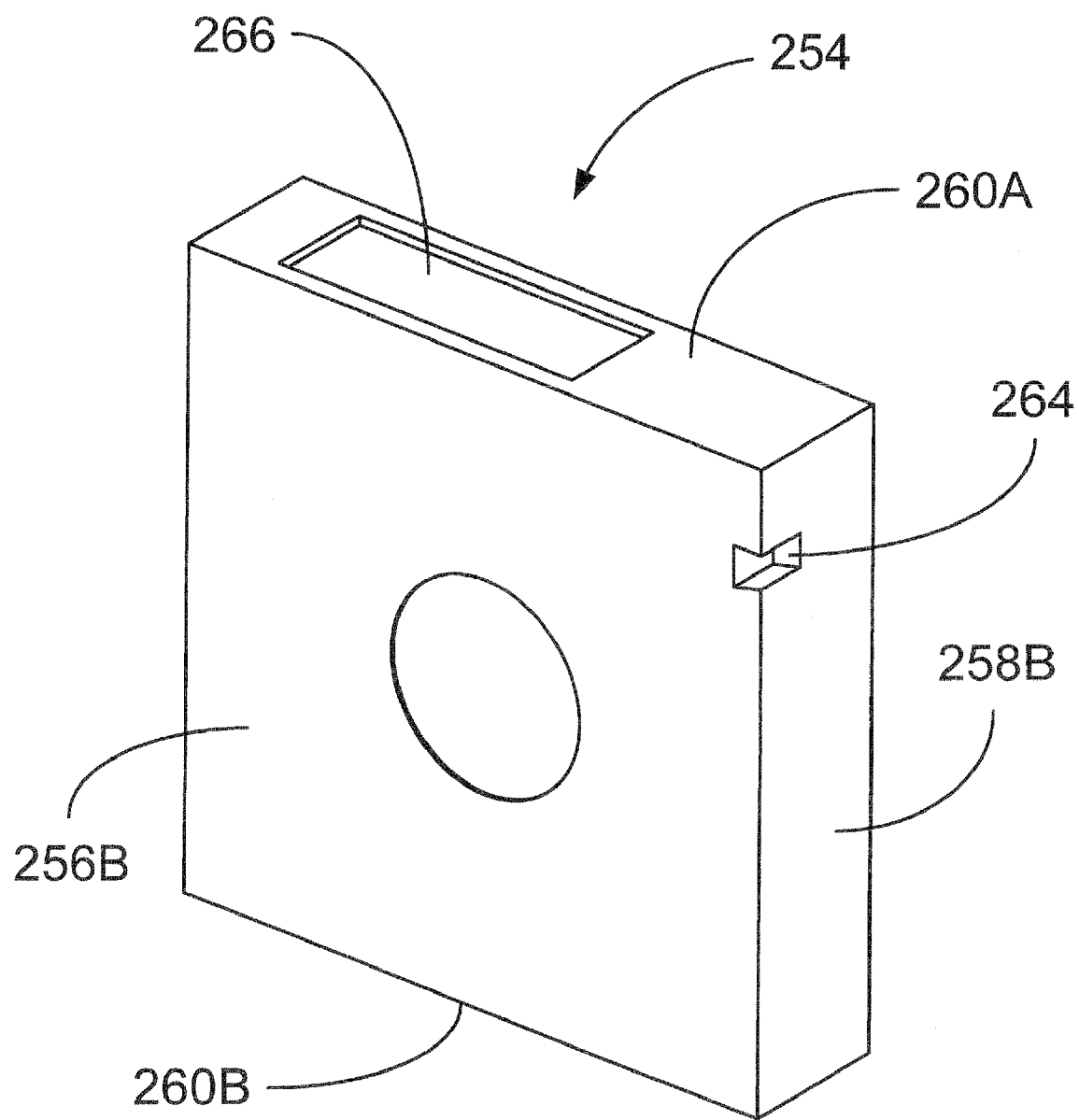

With reference to FIGS. 11A-11B, a DLT tape cartridge 254 comprises a first cartridge face 256A, a second cartridge face 256B, a first cartridge side 258A, a second cartridge side 258B, a first cartridge end 260A, and a second cartridge end 260B. The distance between the first and second cartridge faces 256A, 256B defines the height of the cartridge 254, which is 1.00 in. The distance between the first and second side surfaces 258A, 258B defines the width of the cartridge 254, which is 4.15 in. The distance between the first and second ends 260A, 260B defines the depth of the cartridge 254, which is 4.16 in. The cartridge 254 further comprises an orientation feature 262 that provides a basis for properly orientating the cartridge 254 for insertion into a DLT tape drive (not shown) so that data can be read from and/or written to the recording medium within the cartridge 254. The orientation feature in an actual DLT cartridge 254 is somewhat more complex than the feature shown in FIG. 11A. The orientation feature 262 also provides a basis for orienting all of the DLT tape cartridges 254 stored in a particular magazine, such as the magazine 270 of FIG. 7A, in the same manner. The cartridge 254 also comprises a single gripper notch 264, which is typically used by a device (not shown) that grips the cartridge 254 during transport between a magazine 270 and a drive, such as the drive/s 180 of FIG. 7B. The DLT tape cartridge 254 further comprises a recess 266 in the first end 260A that is typically used for to hold a label, such as a bar-code label, that is used to identify the cartridge 254.

Generally, as will be further elaborated in the description of FIGS. 12A-12D, a magazine, such as an LTO/SAIT accommodating magazine 270, is adapted to hold multiple cartridges, such as LTO and/or SAIT tape cartridges 224 and 240 from FIGS. 11A and 11B for example. The magazine-based library 202 of FIGS. 6A-6C, 7A-7B and 8A-8B will be used for illustrative purposes herein. The magazine 270 is adapted to be moved within the library 202 by the magazine transport 212. An engagement structure (not shown) adapted to cooperate with the magazine transport 212 is capable of displacing the magazine 270 towards and away from a shelf system 208 adapted to support the magazine 270 for archival purposes within the library 202. A magazine, such as the magazine 270, can be an open box like structure, such as a shoe box without a top, with partitions adapted to accommodate a specific cartridge form factor, such as a DLT 254 or LTO 224 form factor. On one embodiment, the magazine 270 is adapted to accommodate a single row of cartridges, such as an LTO 224 cartridge 224. In yet another embodiment, the magazine 270 can be arranged to accommodate two or more rows of cartridges.

Generally, the magazines employed within the library 202 are designed so that when a magazine 270 is operatively situated in the library 202, any tape cartridges 224 held by the magazine 270 are oriented such that the face of the cartridge with the greatest surface area, such as the first cartridge face 256A of DLT tape cartridge 254 from FIG. 11A, lies in a vertical plane.

Figure 12A:
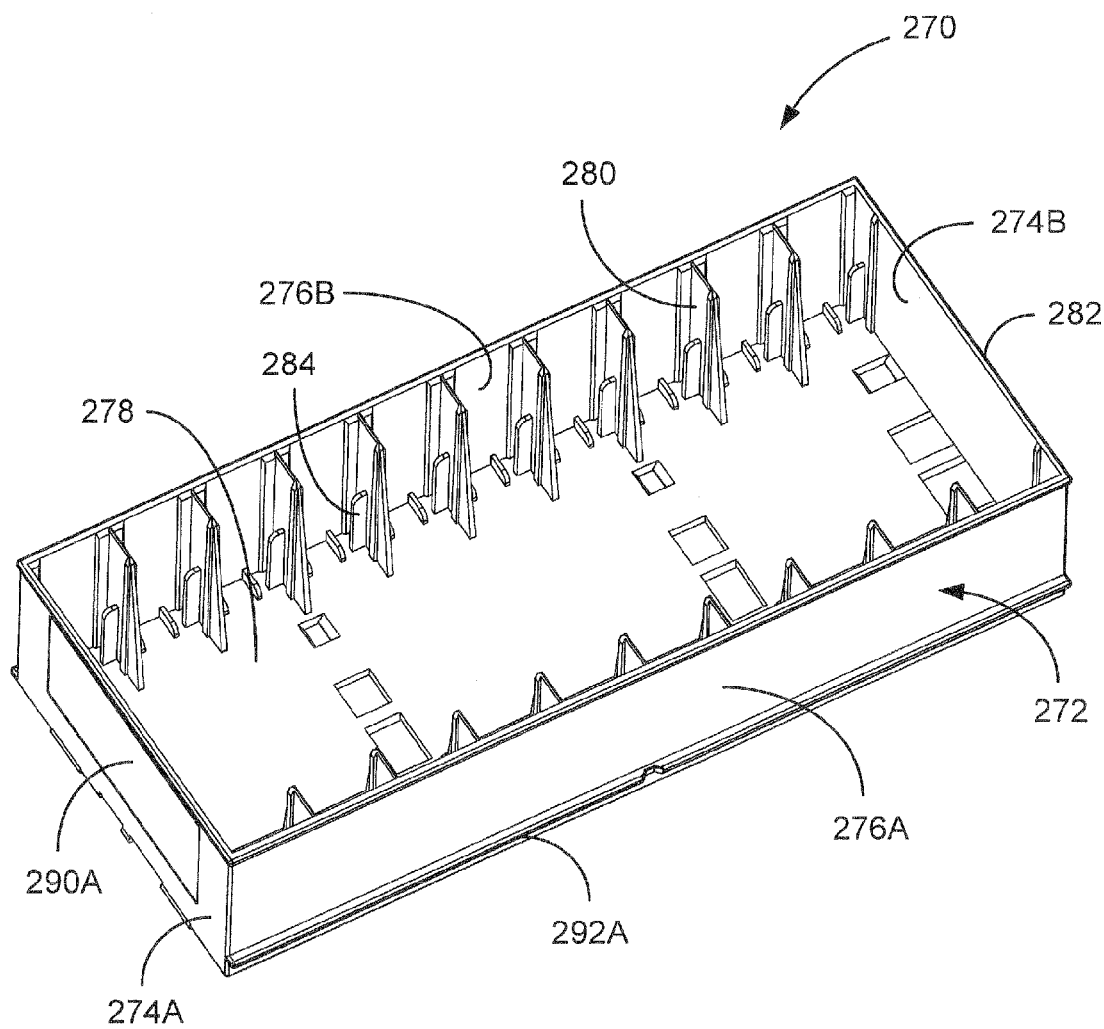
FIGS. 12A-12D illustrate an embodiment of a magazine that is capable of accommodating both LTO and SAIT tape cartridges.
Figure 12B:
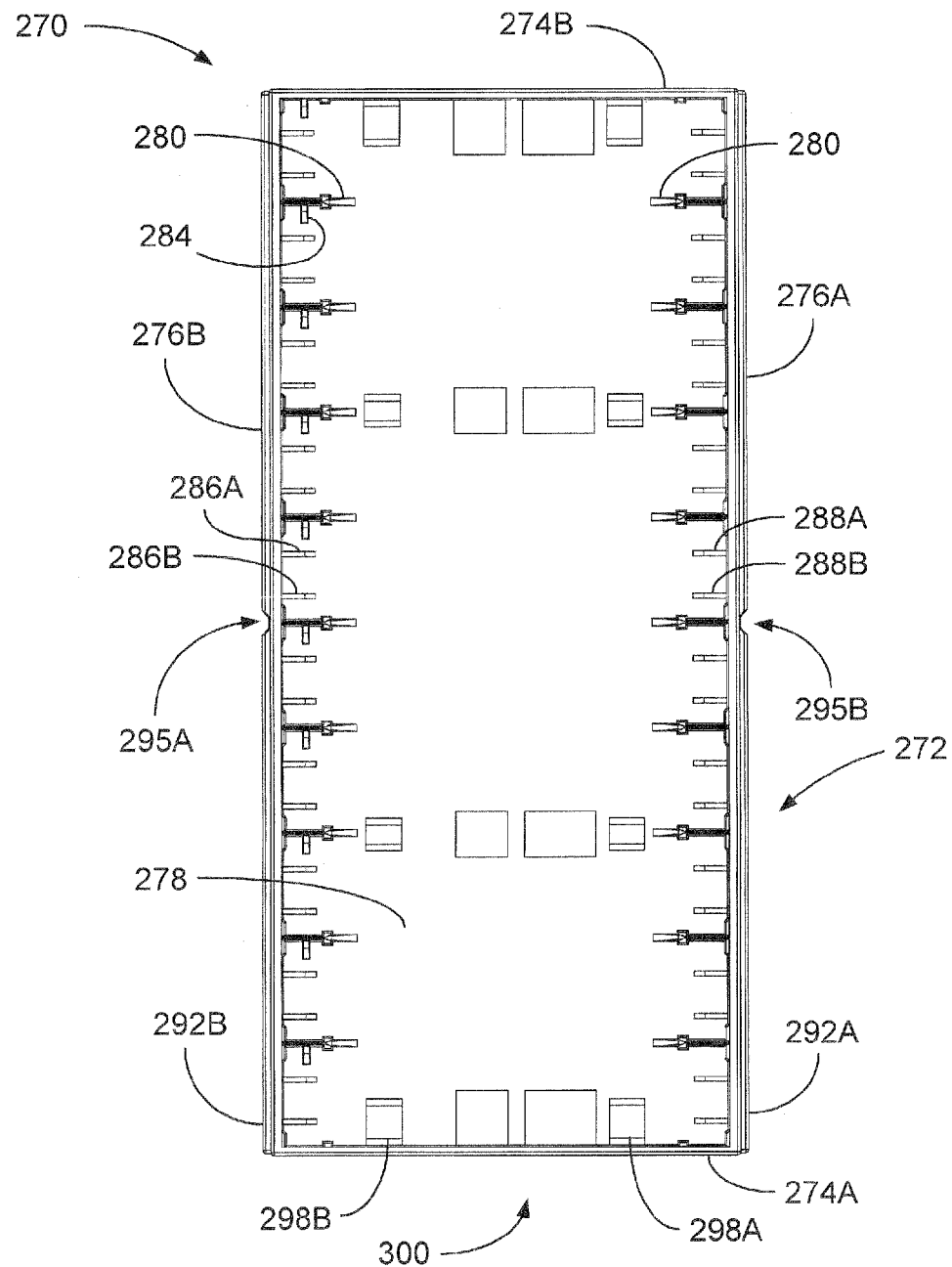
Figure 12C:
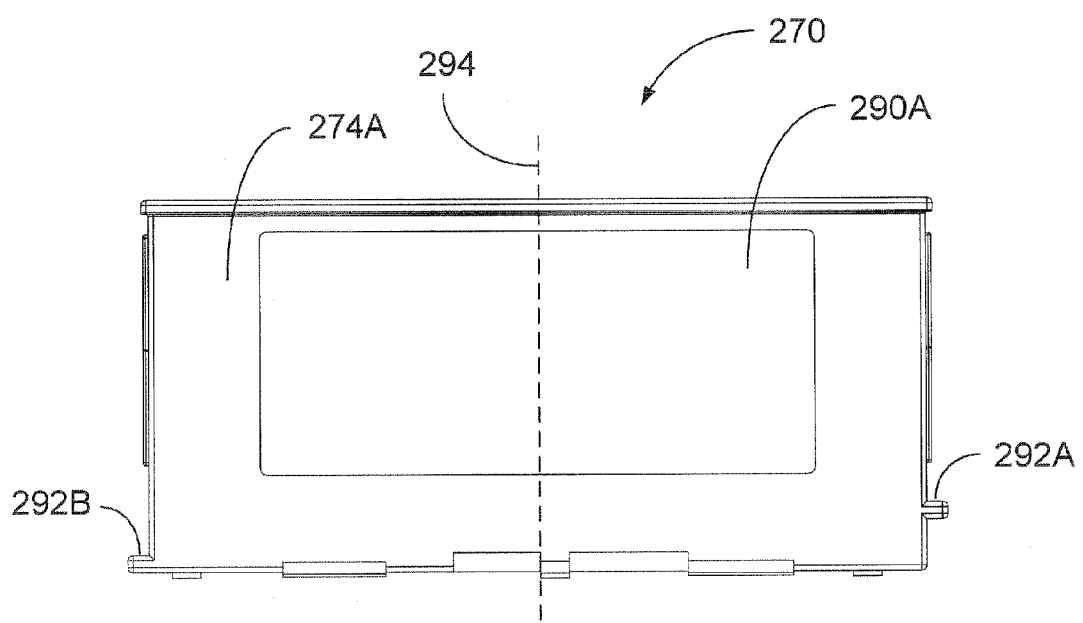
Figure 12D:
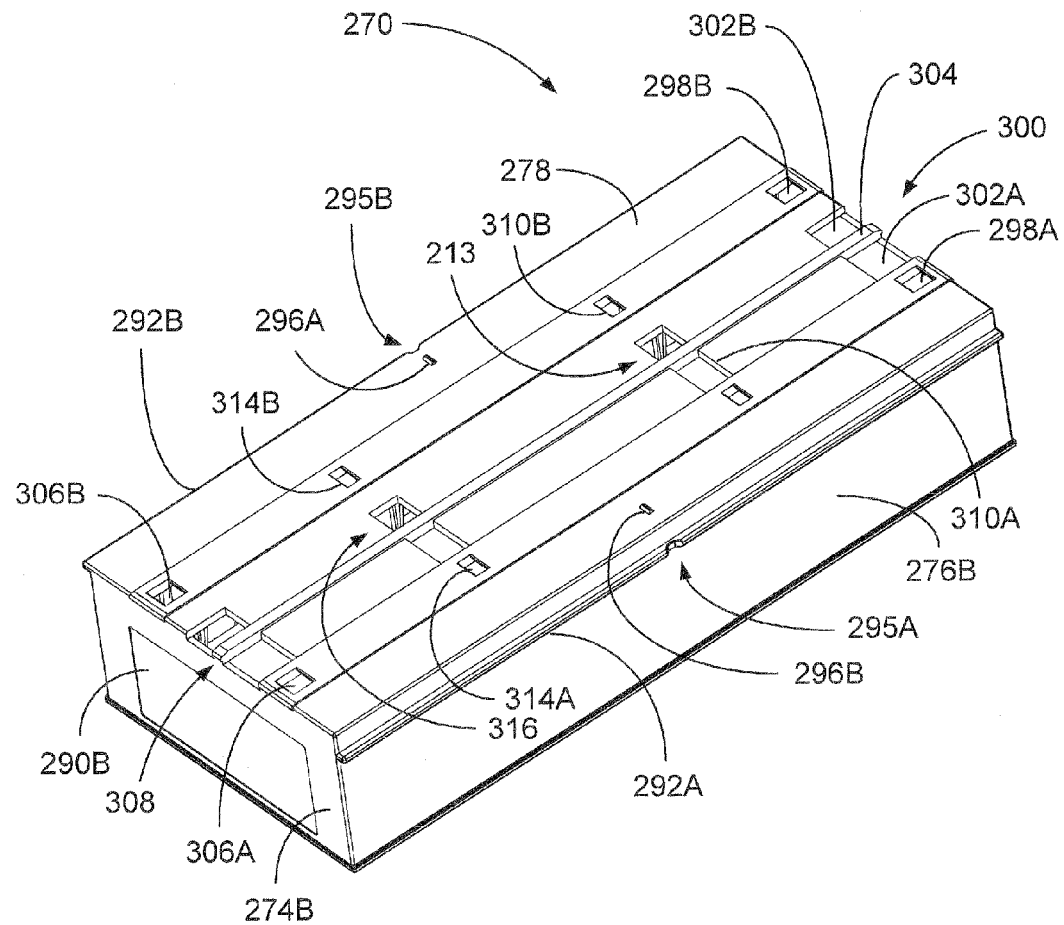
Figure 13A:
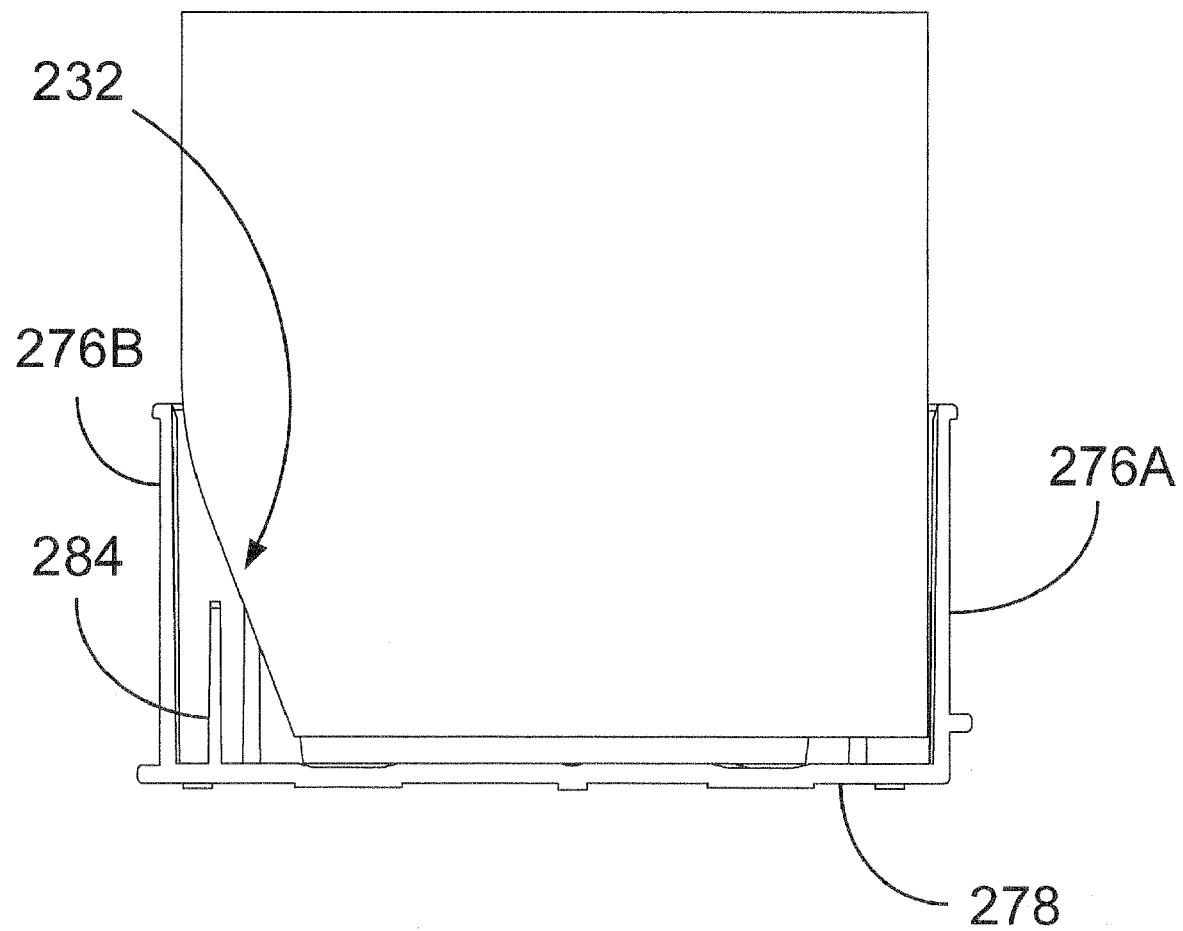
FIGS. 13A-13B are cross-sectional views of the magazine shown in FIGS. 12A-12D that respectively show an LTO tape cartridge and a SAIT tape cartridge within the magazine.
Figure 13B:
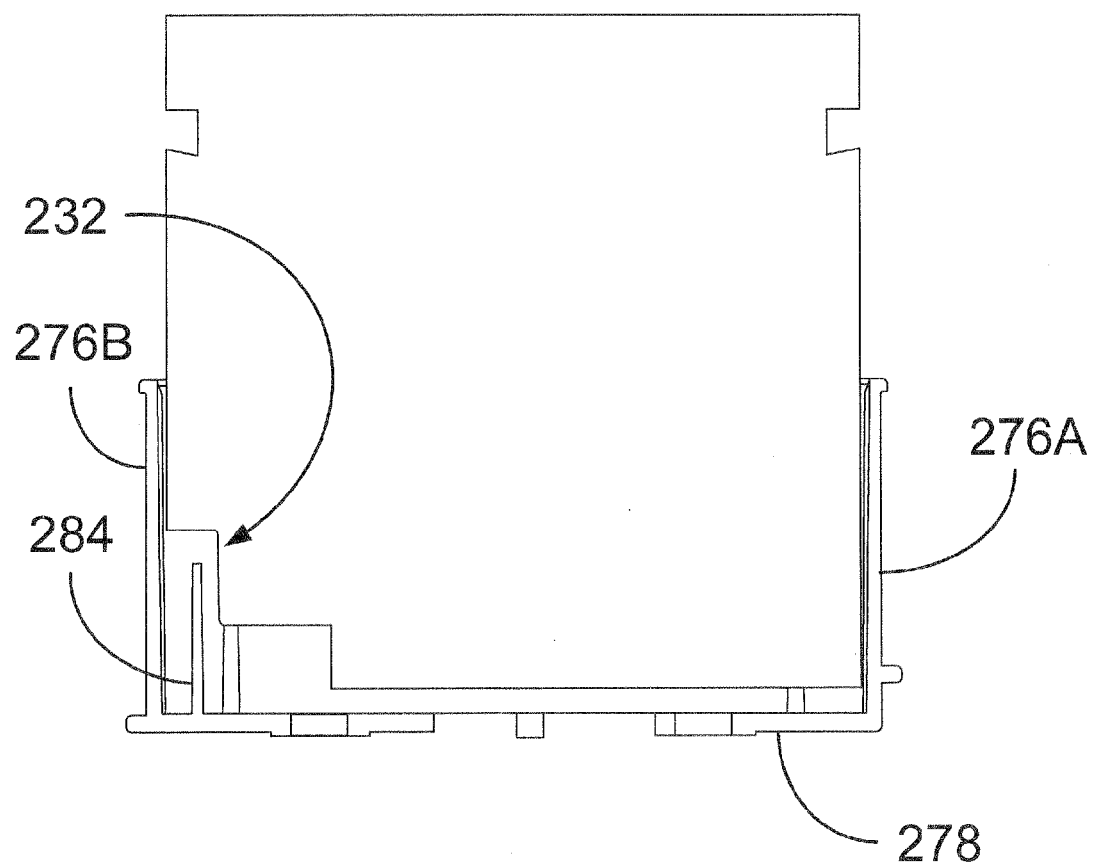
Figure 14A:
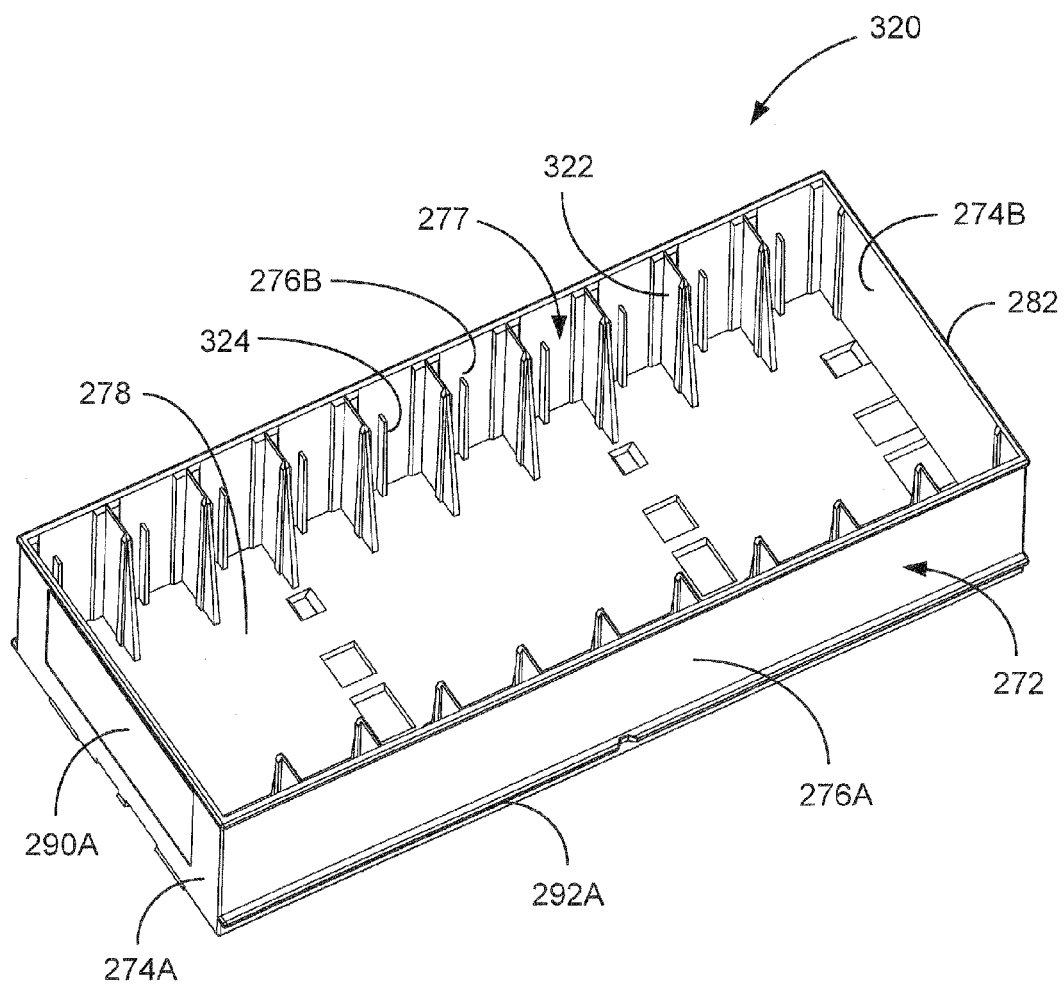
FIGS. 14A-14B illustrate an embodiment of a magazine that is capable of accommodating a DLT tape cartridge.

With reference to FIGS. 12A-12D, an embodiment of an LTO/SAIT magazine 270 that is capable of accommodating LTO and/or SAIT tape cartridges 224 and 240 is described. The magazine 270 comprises: (a) a closed-loop side surface 272 that is comprised of a first and second end sides 274A, 274B, and first and second lateral sides 276A, 276B; (b) a bottom side 278; (c) a top side 271; and (d) a plurality of partitioning elements 280 that divide a space defined by the side surface 272 and bottom side 278 into ten slots. The first and second end sides 274A, 274B, and the first and second lateral sides 276A, 276B extend between the bottom side 278 and an edge 282 that defines the opening through which cartridges, such as the LTO cartridges 224, are inserted into and extracted from the magazine 270. Associated with each slot is an orientation structure 284 that is used to ensure that all of the LTO and/or SAIT cartridges 224 and 240 held by the magazine 270 have a predetermined orientation. FIGS. 13A and 13B respectively illustrate the interaction of the orientation feature 232 of an LTO cartridge 224 with the orientation structure 284 and the orientation feature 248 of the SAIT cartridge 240 with the orientation structure 284. Also associated with each slot are first pair of stand-offs 286A, 286B and a second pair of stand-offs 288A, 288B that position the notches, such as 234A or 250A, of either an LTO or SAIT tape cartridge 224 and 240 at a distance from the bottom side 278 that is substantially the same as the distance between the bottom surface of a DLT tape cartridge magazine 320, as shown in FIG. 14A, and the notch 264 of a DLT cartridge 254 held therein. Consequently, regardless of whether an LTO, SAIT or DLT tape cartridge 224, 240 or 254 is presented to the cartridge transport 214, the respective notch or notches, such as 234A and 236A from the LTO cartridge 224, of the cartridge are at substantially the same distance from the bottom 278 of the magazine 270 or 320. This simplifies the design of the cartridge transport 214. The distance between the first and second end sides 274A, 274B is approximately equal to the distance between the front and backs surfaces of an LTO or SAIT drive (generically shown in FIG. 5A as front surface 184 and back surface 187 of a generic drive), i.e., within about 20% of the distance between the front and back surface of such a drive.

Associated with the first end side 274A of the magazine 270 is a recess 290A for accommodating a label that is used to identify the magazine 270 or distinguish the magazine 270 from other magazines in the library 202. A recess 290B for accommodating an adhesive label is also associated with the second end side 274B. The recesses 290A and 290B are associated with the first and second end surfaces 274A and 274B because, when the magazine 270 is operatively positioned on a shelf of the shelf system 208 in the library 202, either the first end side 274A or the second end side 274B will be exposed or visible so that any label residing in the recess 290A and 290B can be read. One alternative to the use of a recess 290A and 290B adapted to hold an adhesive label is a sleeve or slot structure capable of holding a non-adhesive label. Another alternative to the use of a recess is a radio frequency identification tag (RFID tag). An RFID tag can either be substantially permanently fixed to the magazine 270 or removable. Further, the RFID tag can either have a permanent identification code or be programmable. Moreover, the RFID tag, unlike a bar-code label, does not necessarily require an unobstructed "line of sight" with a RFID tag reader to be read. Consequently, a single RFID tag may be sufficient.

The magazine 270 further comprises a first and second rails 292A, 292B that are respectively associated with the first and second lateral sides 276A, 276B. The LTO data cartridge 224 will be used generically herein for purposes of illustration unless otherwise specified. With reference to FIG. 12C, the first and second rails 292A, 292B are located so as to establish an asymmetry that is used to position the magazine 270 with a predetermined orientation within the library 202. More specifically, the first and second rails 292A, 292B are asymmetric with respect to a plane 294 that bisects the magazine 270. The ability to position the magazine 270 with a predetermined orientation within the library 202 and to position the cartridges 224 held by the magazine 270 with a predetermined orientation, in turn, substantially ensures that the cartridges 224 will also be presented to the cartridge transport 214 in the same orientation. Other structures that establish an asymmetry relative to other planes are also feasible. The rails 292A, 292B also facilitate the guiding of the magazine 270 within the library 202 (e.g., guiding the magazine 270 to a particular location on a shelf of the shelf system 208) and prevent the magazine 270 from being displaced in certain directions. Respectively associated with the rails 292A, 292B are notches 295A, 295B. The notches 295A, 295B are used with complementary structures associated with the magazine transport 212 to hold the magazine 270 in place when the magazine 270 is associated with the transport 214. With reference to FIG. 12D, associated with the bottom side 278 of the magazine 270 are a pair of detents 296A, 296B that cooperate with complementary structures associated with a shelf of the shelf system 208 to prevent the magazine 270 from being displaced away from a shelf of the shelf system 208 in an uncontrolled manner, i.e., being displaced away from the shelf by something other than the magazine transport 212. The detents 296A, 296B and the complementary structures associated with a shelf of the shelf system 208 form a passive latch (i.e., a latch without any moving parts). A latch can also be realized by swapping the detents 296A, 296B and the complementary structures, i.e., associating the detents 296A, 296B with the shelf of the shelf system 208 and the complementary structures (such as the receptacle 530 comprised by the cleat 522A as shown in FIG. 22B with the magazine 270. Also feasible is an active latch in which either an element associated with the magazine 270 or an element associated with the shelf of the shelf system 208 includes a moving component. Typically, the moving element comprises an element that operates in a spring-like fashion to allow the latch to be engaged and disengaged when desired. An example of an active latch mechanism is disclosed in U.S. patent application Publication Ser. No. 2003/0,076,618 A1.

The magazine 270 further comprises a first pair of engagement holes 298A, 298B that are utilized by the magazine transport 212 to displace the magazine 270 towards or away from a shelf in the shelf system 208. More specifically, the magazine transport 212 "hooks" the holes 298A, 298B and then pulls and/or pushes the magazine 270 towards or away from a shelf in the shelf system 208. Associated with the first pair of engagement holes 298A, 298B is a first engagement flag structure 300 that is comprised of a pair of holes 302A, 302B, that are separated by a bar 304. The engagement flag structure 300 operates such that when magazine transport 212 has engaged the magazine 270, the bar 304 breaks a beam of light and when the magazine transport 212 is not engaging the magazine 270, the bar 304 does not break the beam of light. As an alternative to the engagement flag structure 300, the exterior surface of the bottom side 278 of the magazine 270 can be used to indicate when the magazine transport 212 is engaging the magazine 270 and when the magazine transport 212 is not engaging the magazine 270. To elaborate, the bottom side 278 can be used as a reflective surface that can be used to determine whether or not the magazine 270 has been engaged by the magazine transport 212.

The magazine 270 further comprises a second pair of engagement holes 306A, 306B, and a second engagement flag structure 308 that are used in the same manner as the first pair of engagement holes 298A, 298B and the first engagement flag structure 300. Two sets of engagement holes 298A, 298B, 306A, 306B are utilized because when the magazine 270 is associated with a shelf in the shelf system 208 on one side of the magazine transport 212, the first pair of engagement holes 298A, 298B is accessible but the second pair of engagement holes 306A, 306B is not readily accessible. Conversely, when the magazine 270 is associated with a shelf in the shelf system 208 that is located on the opposite side of the magazine transport 212, the second pair of engagement holes 306A, 306B is accessible but the first pair of engagement holes 298A, 298B is not readily accessible. Presently, the magazine 270 has a third pair of engagement holes 310A, 310B with an associated third engagement flag structure 312 and a fourth pair of engagement holes 314A, 314B and an associated fourth engagement flag structure 316 that are capable of being used by the magazine transport 212 to move the magazine 270 but are not currently utilized. It should be appreciated that other structures that are capable of being "hooked" are feasible. For instance, a single hole is feasible. Also, feasible are one or multiple indentations and one or multiple protrusions. Further, while the magazine transport 212 "hooks" the magazine 270, it should be appreciated that the magazine 270 can be adapted to facilitate engagement of the magazine 270 by a device that grasps the magazine 270 between two arms. Possible structures to facilitate grasping of the magazine 270 comprise a pair of holes in the magazine 270, a pair of indentations in the magazine 270, and a pair of protrusions that extend outward from one or more surfaces of the magazine 270.

Figure 14B:
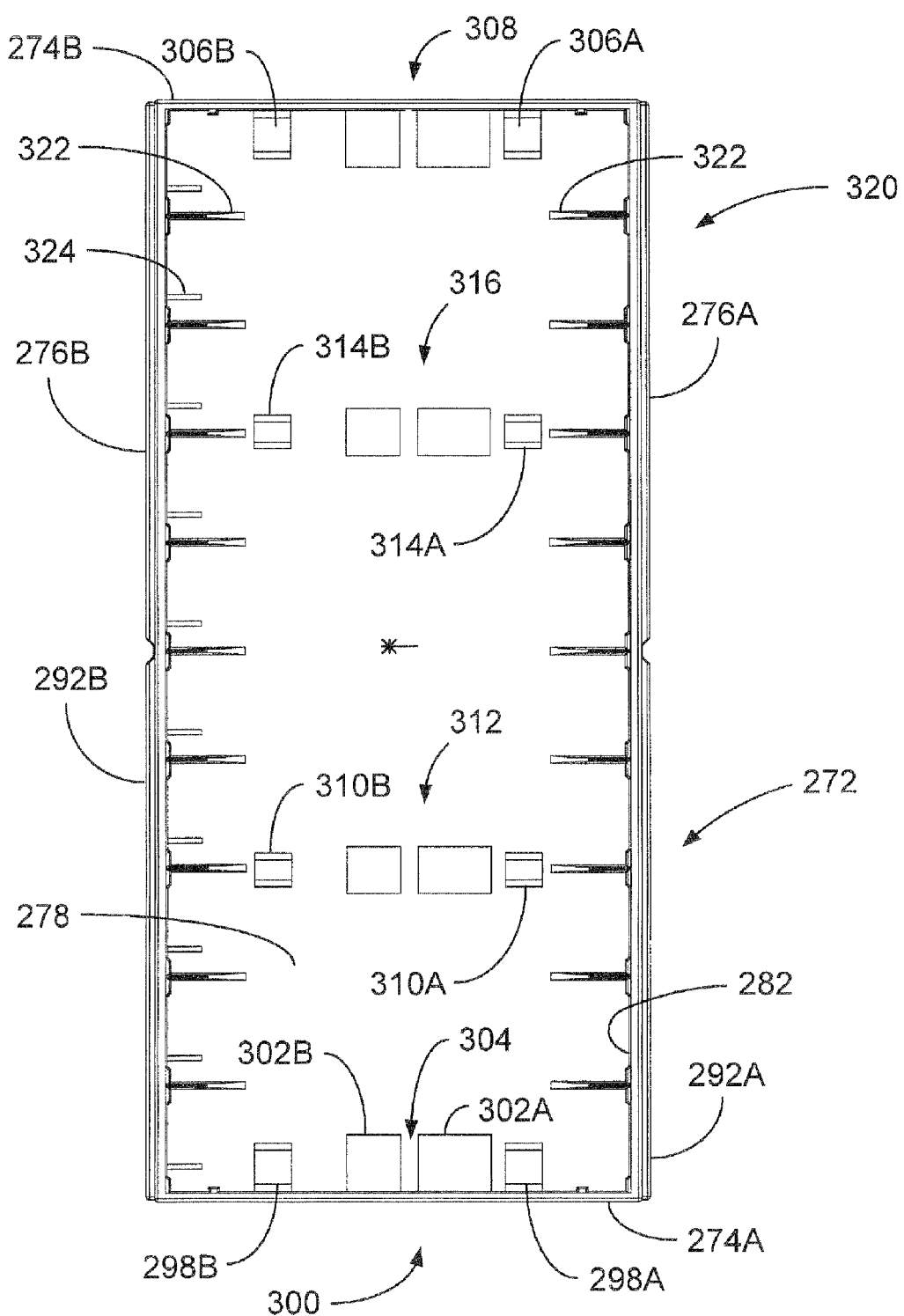
Figure 15:
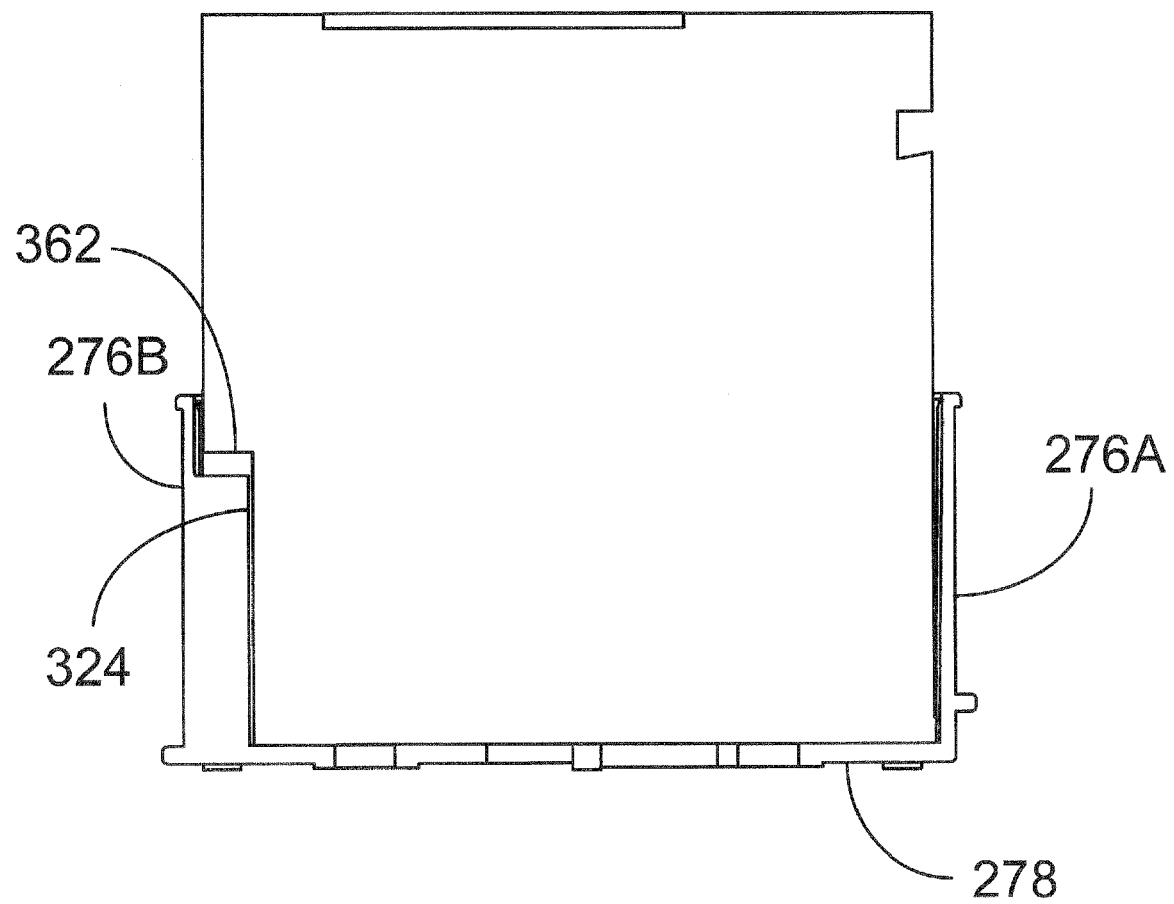
FIG. 15 is a cross-sectional view of the magazine shown in FIGS. 14A-14B that shows a DLT tape cartridge within the magazine.

With reference to FIGS. 14A-14B, an embodiment of a DLT magazine 320 that is capable of accommodating DLT tape cartridges 254 is described. The DLT magazine 320 is substantially identical to the LTO/SAIT magazine 270. Consequently, those elements of the DLT magazine 320 that are common to both the DLT magazine 320 and LTO/SAIT 270 are not described further. Further, in describing the DLT magazine 320, elements of the DLT magazine 320 that are substantially identical to elements in the LTO/SAIT magazine 270 will bear the same reference number as those substantially identical elements in the LTO/SAIT magazine 270. The DLT magazine 320, in addition to the elements that are common to the LTO/SAIT magazine 270, comprises partitioning elements 322 that divide the interior space of the magazine into nine slots 277. Associated with each slot 277 is an orientation structure 324 that is used to ensure that all of the DLT cartridges 254 held by the magazine 320 have a predetermined orientation. FIG. 15 illustrates the interaction of the orientation feature 262 of a DLT cartridge 254 with the orientation feature 324 of the magazine 320. It should also be noted that the DLT magazine 320 does not employ any standoffs.

Figure 16:
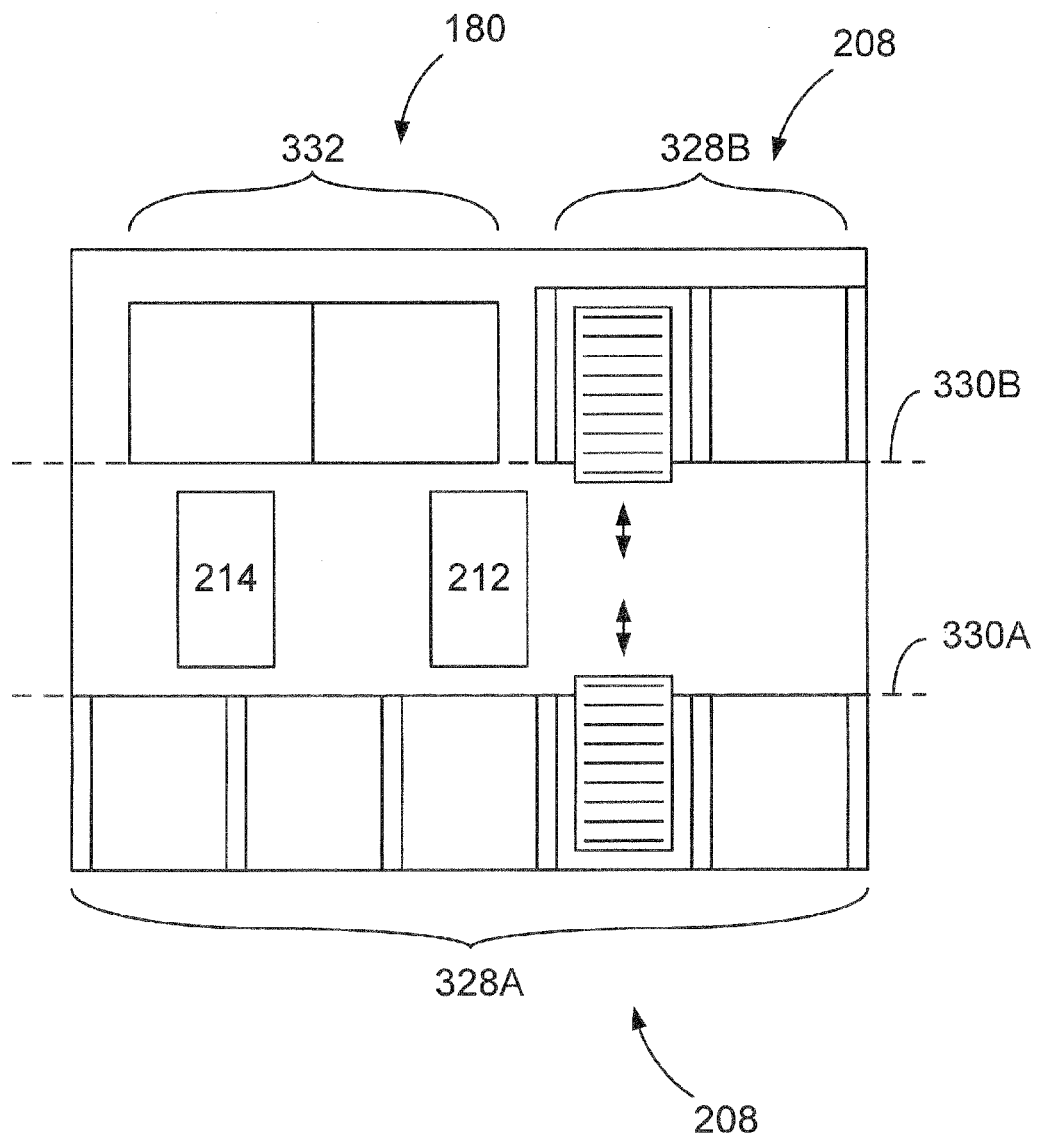
FIG. 16 is a schematic plan view of the general layout of the library.

Having described the cartridges 224, 240 or 254 and magazines 270 and 320 on which the library 202 operates, the general layout of the library 202 is now described. As shown in FIG. 16, the layout of the library 202 is a rectilinear layout that conforms to the specifications for the rectilinear layout illustrated in FIG. 2B. More specifically, the shelf system 208 comprises five columns of shelving 328A located along a first plane 330A, two columns of shelving 328B located along a second plane 330B, and two columns of drives 332 located along the second plane 330B. The magazine transport 212 and cartridge transport 214 are each located in the space between the first and second planes 330A, 330B and each 212 and 214 move at least within a portion of the space between the first and second planes 330A, 330B. Most of the other elements of the library 202 also conform to the rectilinear layout. Specifically, the entry/exit port 206 is located within the five columns of shelving 328A and along the first plane 330A; the power supply 216 is located below the two columns of drives 332 and either along the second plane 330B or along a parallel plane; the control system 218 is located below the two columns of shelving 328B and either along the second plane 330B or along a parallel plane; and the fans 220 are located under the five columns of shelving 328A and either along the first plane 330A or a parallel plane.

In addition to the general layout of the library 202, the user has a choice about the function of certain space in the library 202. To elaborate and with reference to FIG. 7B, the library 202 comprises a user-definable space 332 with six stations that are each capable of accommodating either one of two types of modules. As shown in conjunction with FIG. 23B, each of the stations is capable of accommodating a drive bay module 540, that holds up to four drives, such as 548A-D, or a magazine bay module that provides shelving for up to four magazines 270. A user-definable space with less than six stations is feasible. Further, if multiple stations are employed, each station does not need to have the same dimensions. For instance, a station could accommodate either only one drive 180 or provide shelving for only one magazine 270.

With reference to FIGS. 6A-6C, 7A-7B and 8A, 8B, the frame 204 comprises elements that define the edges of a box-like structure and the surfaces of the box-like structure, [therein defining an interior space]. The surfaces comprise a front surface 340A, a back surface 340B, a first side surface 340C, a second side surface 340D, a top surface 340E, and a bottom surface 340F. Associated with the front surface 340A are the entry/exit port 206, an operator interface 342 that is implemented with a touch screen, and a grill structure 344 that covers the fans 220. Associated with the back surface 340B are a fixed panel 346 that is located adjacent to a series of shelves 208, a hinged door panel 348 that provides access to the drives 180 and the power supply 216, an opening 350 through which an AC cable(s) is/are connected to the power supply 216, and a grill 352 for promoting air circulation within the library 202. The first side surface 340C is removable so that the library 202 can be cascaded with at least one add-on unit to expand the library 202. Also associated with the first side surface 340C is a first clear panel 354A that allows an operator to view the interior of the library 202. Similarly, a second clear panel 354B is associated with the second side surface 340D. The top surface 340E includes a pair of knockouts 356A, 356B that can be used to receive one or more AC cables that are connected to the power supply 216 and/or one or more computer cables that are used to connect the library 202 to a host computer. Also associated with the top surface 340E is a fire suppression system hole 358 for receiving a nozzle or other device for dispensing a fire retardant into the library 202. Associated with the bottom surface 340F are casters 360A, 360B, 360C and 360D that facilitate movement of the library 202 and adjustable stands 362A, 362B, 362C and 362D that allow the library 202 to be leveled after the library 202 has been positioned in a relatively permanent location. Further associated with the bottom surface 340F are openings 364A, 364B for receiving one or more AC cables that are connected to the power supply 216 and/or a computer cable(s) that are used to connect the library 202 to a host computer.

The library 202 has a depth of 43.16 in. as measured from the front surface 340A to the back surface 340B, a width of 30.50 in. as measured from the first side surface 340C to the second side surface; and a height of 74.25 in. as measured from the top surface 340E to the bottom surface 340F.

Generally, the entry/exit port 206 serves to move magazines 270 between: (a) an environment that is exterior to the library 202 and accessible to a user, or operator; and (b) a space located within the library 202 and accessible by the magazine transport 212. When the entry/exit port 206 is exposed to the exterior environment such that an operator can either remove a magazine 270 that has been conveyed from the space within the library 202 or place a magazine 270 in the entry/exit port 206 for conveyance to the space within the library 202, the port 206 is in a first state. Similarly, when the port 206 is exposed to the space located within the library 202 such that the magazine transport 212 can either remove a magazine 270 that is in the space or place a magazine 270 in the space (typically, for conveyance to the exterior environment) the magazine 270 is in a second state.

Figure 17A:
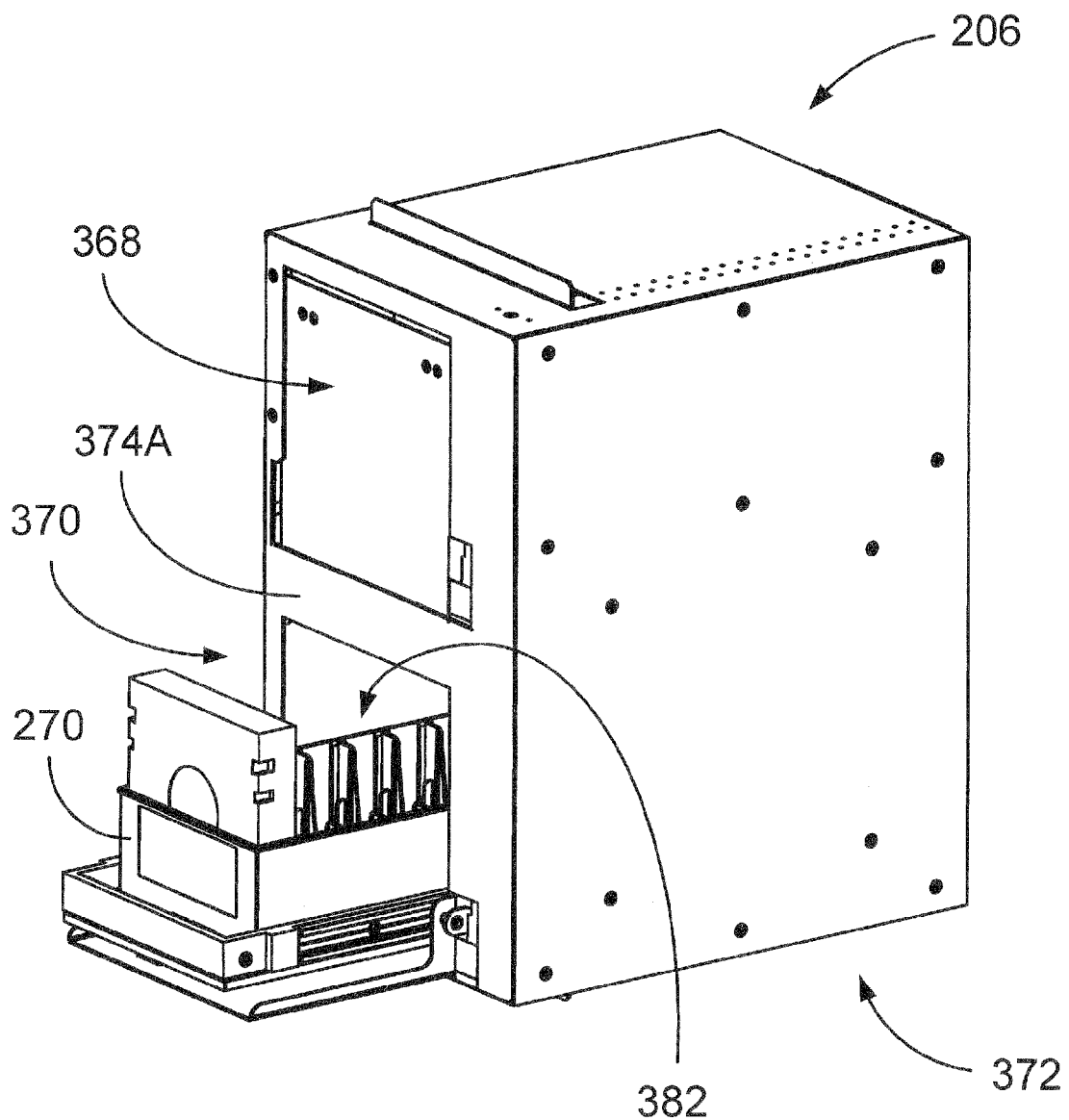
FIGS. 17A-17B respectively are a front perspective view of an embodiment of a dual entry/exit port and a rear view of the dual entry/exit port.
Figure 17B:
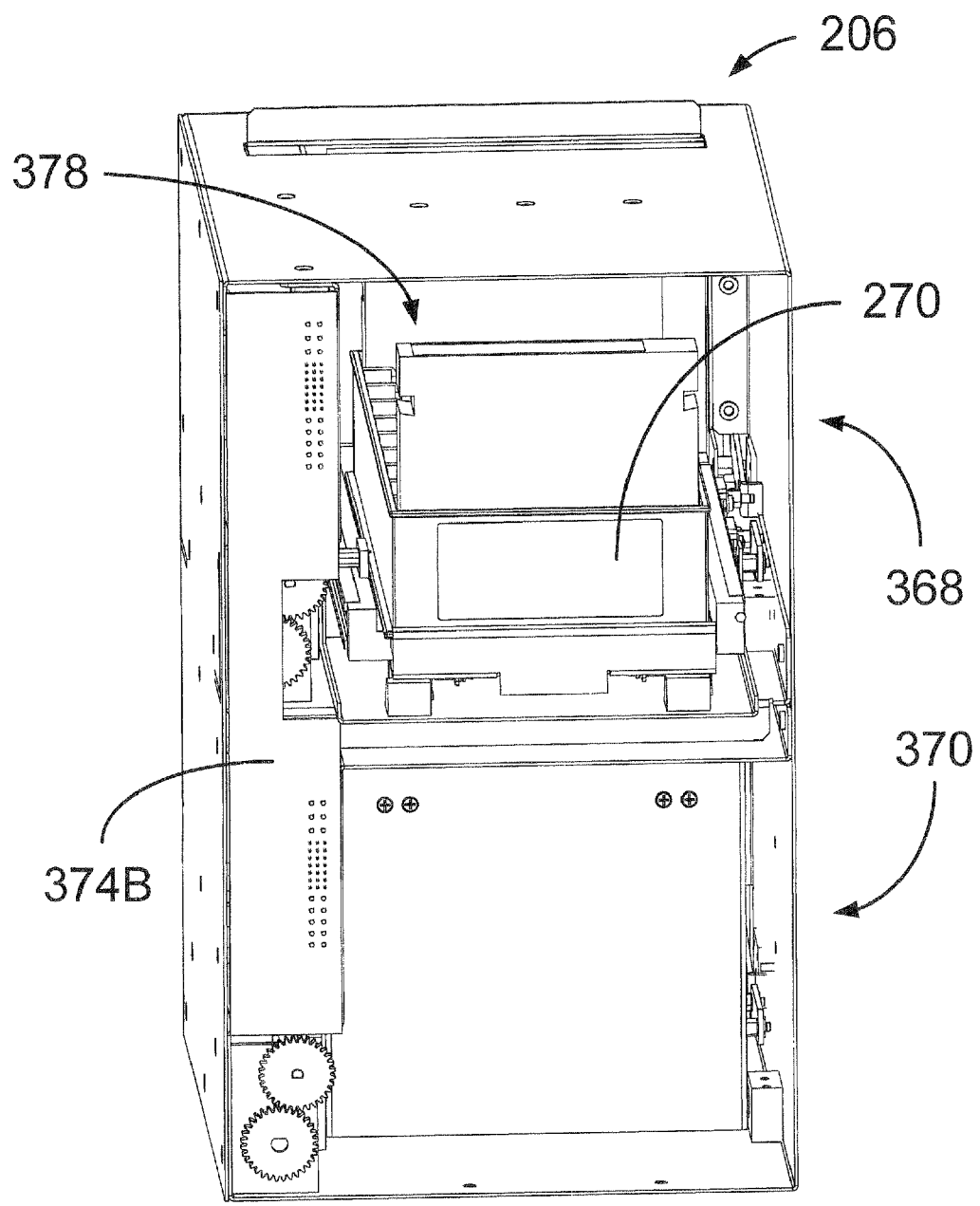

With reference to FIGS. 17A and 17B, the entry/exit port 206 is comprised of a first entry/exit port 368 and a second entry/exit port 370 that operates independently of the first entry/exit port 368. The first and second entry/exit ports 368, 370 provide greater throughput than a single entry/exit port, i.e., more magazines 270 can be moved between the exterior environment and the spaces within the library 202 associated with the first and second entry/exit ports 368, 370 over a given time period than is possible with a single exit/entry port of the same design. In addition, the first and second entry ports 368, 370 provide redundancy. Consequently, if one of the first and second entry/exit ports 368, 370 should become disabled, the other port can, in many cases, still be used to transport magazines 270. A library 202 with a single entry/exit port is also practicable. With continuing reference to FIGS. 17A and 17B, the entry exit port 206 comprises a chassis 372 with an exterior side 374A that is exposed to the exterior environment or adjacent to the front side 340A and an interior side 374B that is exposed to the magazine transport 212 and is substantially located along the plane 330A. In the illustrated embodiment, the first entry/exit port 368 is in the second state, i.e., a magazine 270 can be removed from a space 378 by the magazine transport 212 or a magazine 270 (assuming magazine 270 is no longer present in the space) can be inserted into the space 378 by the magazine transport 212. Conversely, the second entry/exit port 370 is in the first state, i.e., an operator can remove a magazine 270 from the port 370 or an operator can associate a magazine 270 (assuming magazine 270 is no longer present) with the port 370 for transport to the space 382.

Figure 18A:
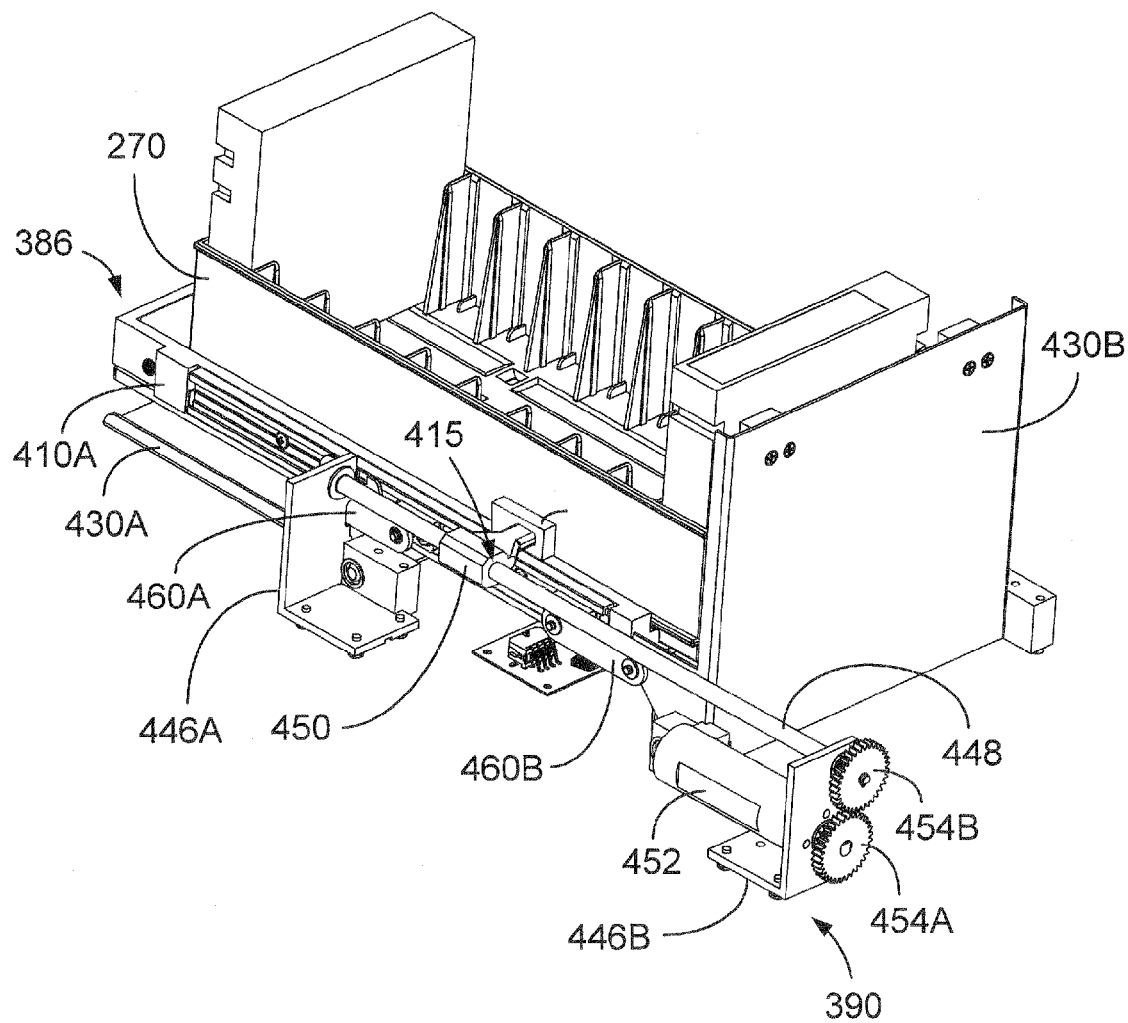
FIGS. 18A-18F illustrate various elements of one port of the dual entry/exit port.
Figure 18B:
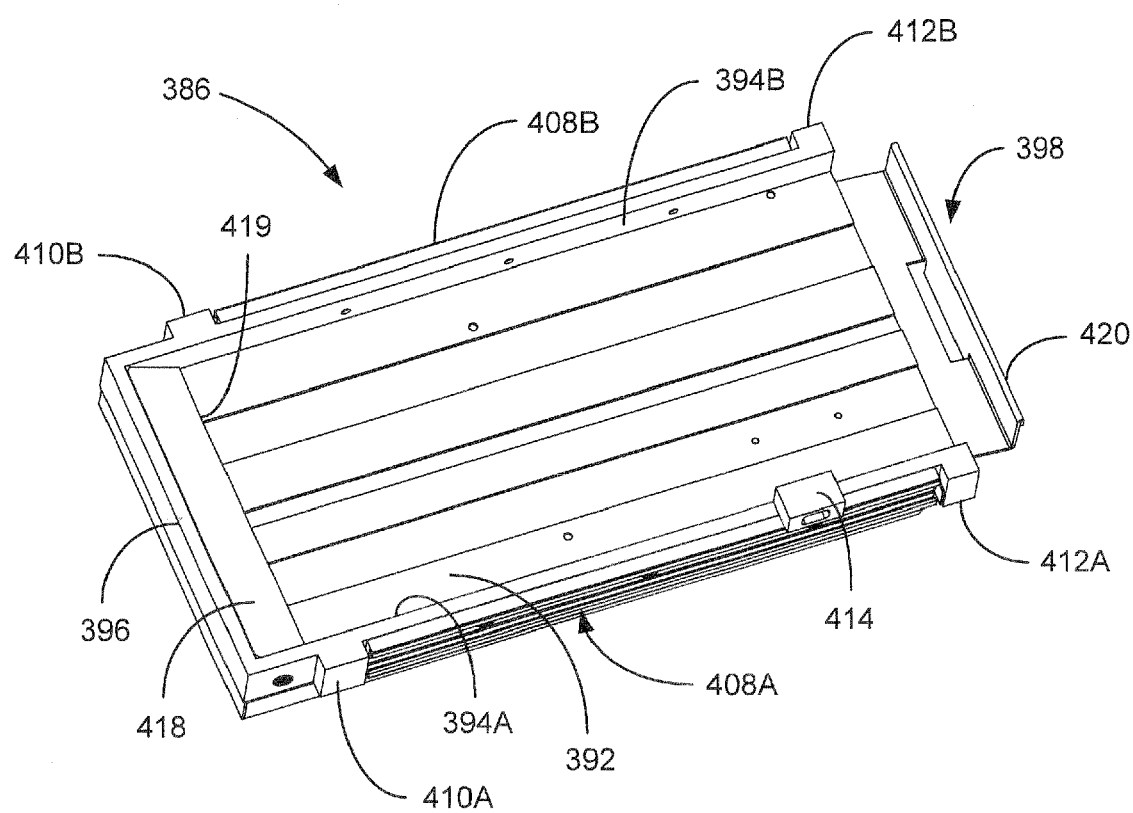
Figure 18C:
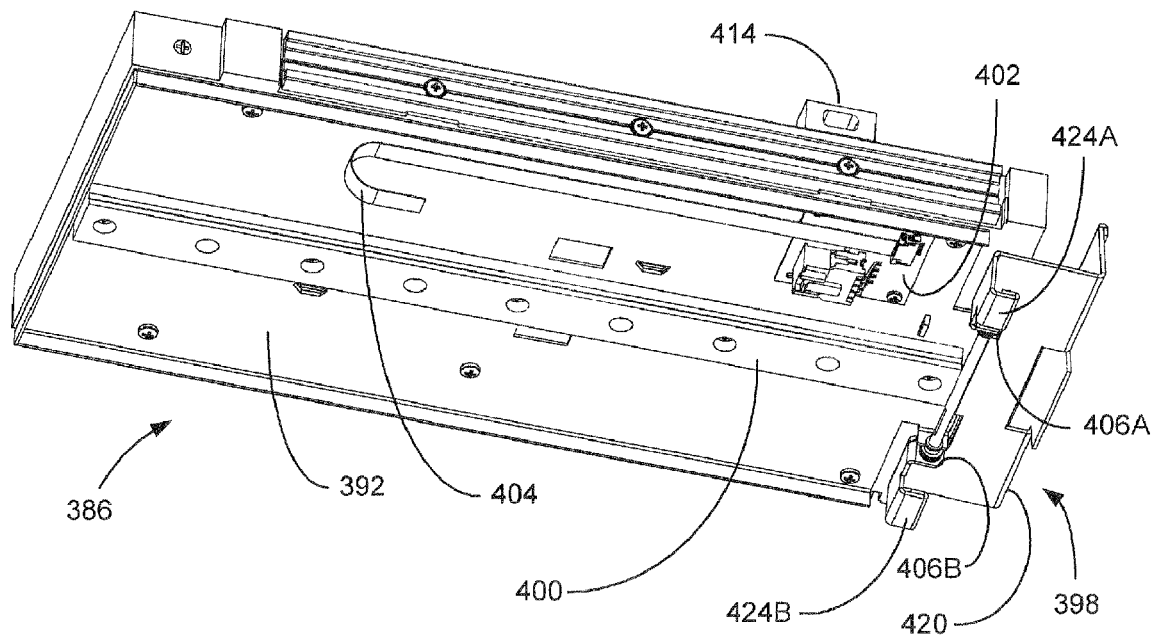
Figure 18D:
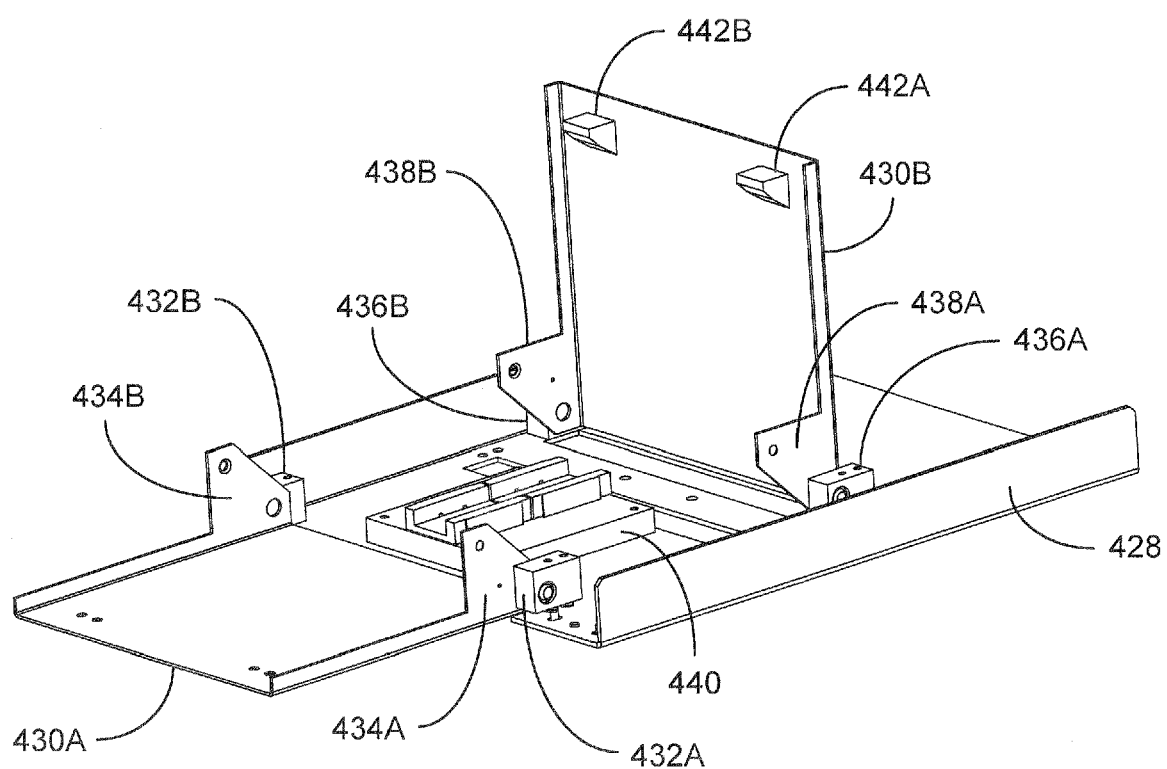
Figure 18E:
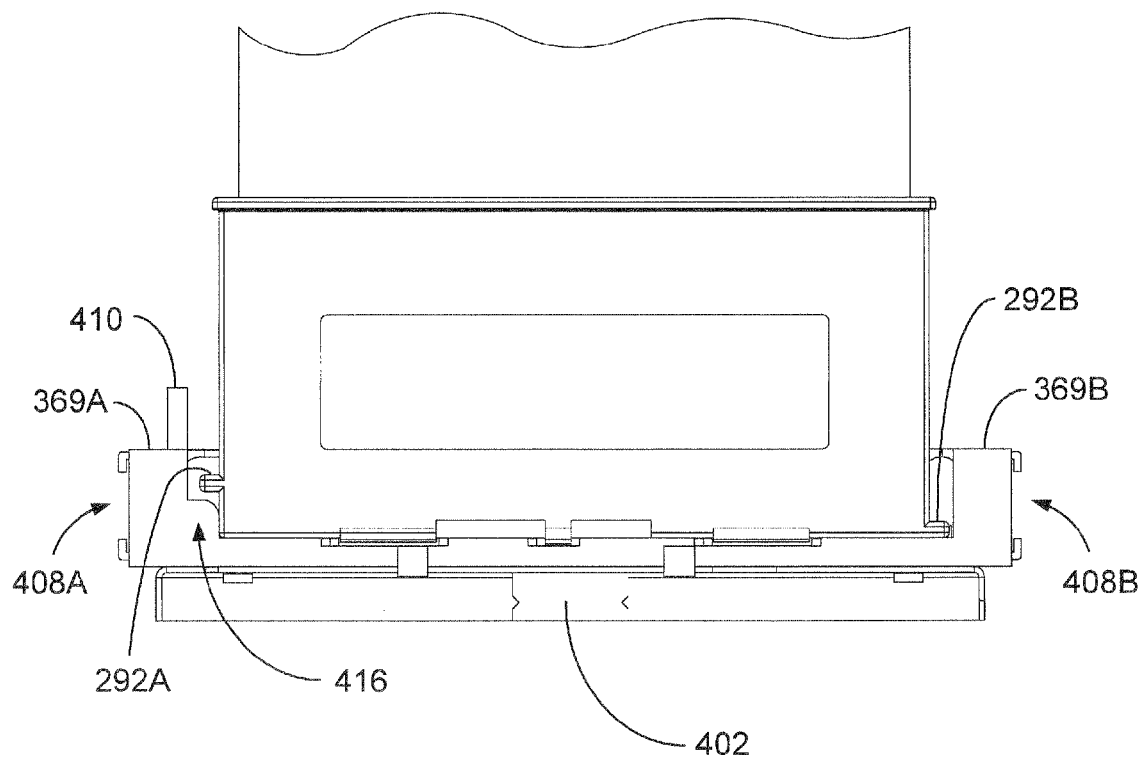
Figure 18F:
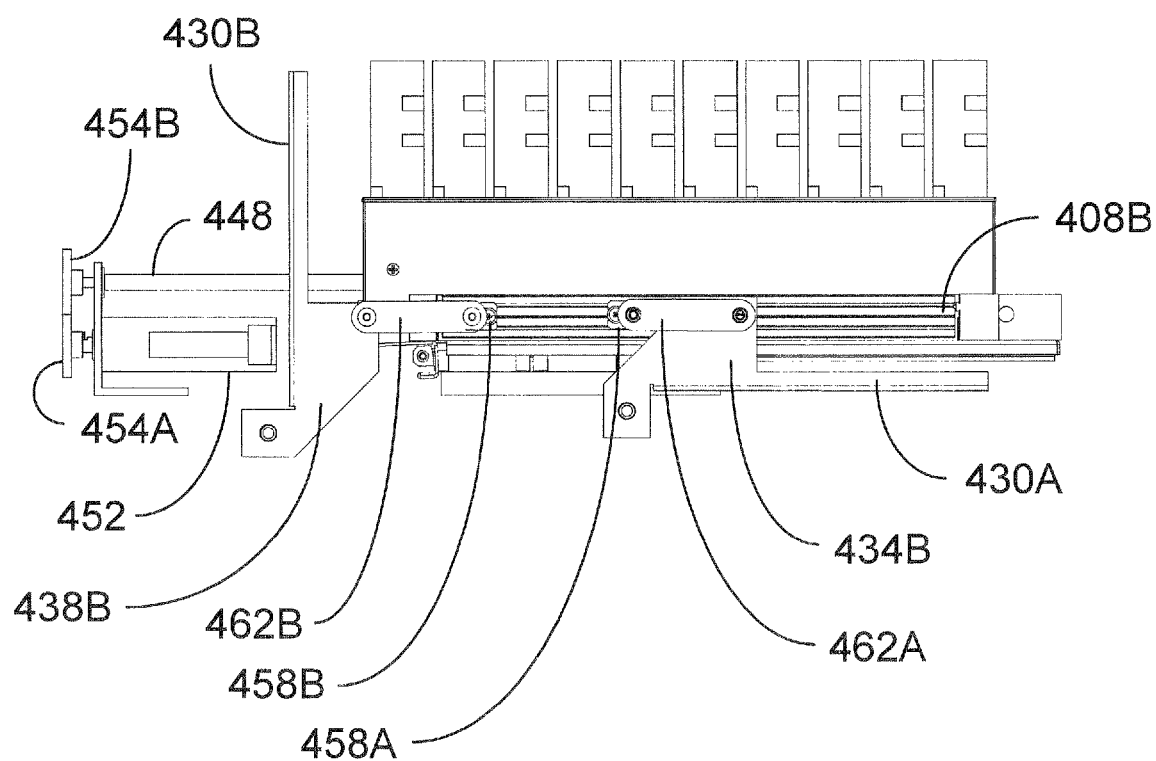

The first entry/exit port 368 is substantially identical to the second entry/exit port 370. Consequently, the first entry/exit port 368 is described with the understanding that the description is also applicable to the second entry/exit port 370. Generally, the first entry/exit port 368 utilizes a support, such as the tray 386 of FIG. 18A, to move a magazine 270 between: (a) a first location at which an operator can either associate a magazine 270 with the support or remove a magazine 270 from the support; and (b) a second location at the magazine transport 212 can either remove a magazine 270 from the support or associate a magazine 270 with the support. Further, the first entry/exit port 368 also utilizes a door system for preventing an operator from accessing the interior of the library 202 and possibly getting injured by one of the moving elements. The door system is comprised of an interior door 430B and an exterior door 430A (as shown in FIG. 18D). The door system operates such that when the support is in the first location, shown in FIG. 17A, such that an operator can either associate a magazine 270 with the support or remove a magazine 270 from the support, the exterior door 430A is open and the interior door 430B is closed or closing to prevent the operator from accessing the interior of the library 202. Conversely, when the support is in the second location (as shown in FIG. 17B), such that the magazine transport 212 can either associate a magazine 270 with the support or remove a magazine 270 from the support, the interior door 430B is open to provide the magazine transport 212 with access to the support and the exterior door 430A is closed or closing to prevent an operator from accessing the interior of the library 202.

With reference to FIGS. 18A-18E, the first entry/exit port 368 is generally comprised of: (a) a tray 386 for supporting a magazine 270; (b) a door assembly 388 that comprises an exterior door 430A and an interior door 430B, is attached to the chassis 372, and used to support the tray 386; and (c) an actuator system 390 for moving the tray 386, the exterior door 430A, and the interior door 430B.

The tray 386 is comprised of a bottom side 392, first and second side walls 394A, 394B, an exterior end wall 396 and a movable end wall 398. The bottom side 392, first and second side walls 394A, 394B and exterior end wall 396 define a shallow interior space for supporting a magazine 270. The first and second side walls 394A, 394B prevent the magazine 270 from moving laterally. The movable end wall 398 prevents a magazine 270 from moving in the direction of movable end wall 398 under certain conditions but permits a magazine 270 to move in the direction of the movable end wall 398 under other circumstances. To elaborate, the movable end wall 398 is moveable between a first position and a second position. In the first position, the movable end wall 398 prevents a magazine 270 that is located in the interior space from moving in the direction of the movable wall 398. The movable end wall 398 performs this preventive function when the tray 386 is moving between the first location and the second location, e.g., when a magazine 270 is being inserted into the library 202 from the exterior environment. In this situation, the magazine 270 acquires momentum that, if the moveable end wall 398 were not in the first position, could potentially cause the magazine 270 to slide on the tray 386 and into the space in which the magazine transport 212 and cartridge transport 214 operate, potentially damaging the library 202. In the second position, the movable end wall 398 allows the magazine transport device 212 to either place a magazine 270 on the tray 386 or remove a magazine 270 from the tray 386. The movable end wall 398 is placed in the second position after the tray 386 has been moved to the second location, i.e., the location at which the magazine transporter 212 is able to either load the tray 386 with a magazine 270 or remove a magazine 270 from the tray 386, or at a time before the tray 386 has reached the second location but at which it is unlikely that any momentum imparted to the magazine 270 is likely to carry the magazine 270 into the magazine transporter 212 or cartridge transport 214 operational space.

Associated with the bottom side 392 of the tray 386 is a linear rail 400 that mates with a rail block located on the door assembly 388 to allow the tray 386 to slide between the first and second locations. Also associated with the bottom side 392 is a sensor assembly 402 that is used to sense the possible presence of a magazine 270 in the interior space of the tray 386 and a flex cable 404 that allow the signals produced by the sensor assembly 402 to be conveyed to the control system 218. Further associated with the bottom side 392 is a pair of brackets 406A, 406B to which the movable end wall 398 is mounted.

Associated with the first and second side walls 394A, 394B are guides 408A, 408B that form part of a linkage that is used to move the exterior and interior doors 430A, 430B between the open and closed positions. A first pair of end blocks 410A, 410B are located at the ends of the guides 408A, 408B that are located adjacent to the exterior end wall 396. A second pair of end blocks 412A, 412B are located at the ends of the guides 408A, 408B that are located adjacent to the movable end wall 398. A drive block 414 that is used to receive the motive forces from the actuator system 390 that cause the tray 386 to slide between the first and second locations is associated with the first side wall 394A. Also associated with the first side wall 394A is an orientation feature 416 that is used in conjunction with the rails 292A, 292B of a magazine 270 to substantially ensure that a magazine 270 that an operator places in the interior space of the tray 386 has a desired orientation. To elaborate, if an operator places a magazine 270 in the interior space of the tray 386 with magazine 270 oriented such that the rails 292A is disposed adjacent to the orientation feature 416, the magazine 270 is properly oriented and the bottom side 278 of the magazine 270 lies flush with the bottom side 392 of the tray 386. If, however, an operator places a magazine 270 in the interior space of the tray 386 with the magazine 270 oriented such that the rail 292B is disposed adjacent to the orientation feature 416, the magazine 270 is not properly oriented and the bottom side 278 of the magazine 270 will not lie flush with the bottom side 392 of the tray 386. Further, the sensors associated with the sensor assembly 402 are able to detect this condition and provide the control system 218 with this information so that the control system 218 can prevent the tray 386 from being moved until the magazine 270 is properly oriented. In one embodiment, the sensor assembly 402 comprises two optical sensors that are disposed laterally across the tray 386. Another sensor is operatively attached to the chassis 372 adjacent to the exterior door 430A and operates to sense the presence of an object adjacent to the door 430A. The signals produced by the two optical sensors and the door sensor are capable of being used to determine if a magazine 270 is not present in the tray 386, if a properly loaded magazine 270 is present in the tray 386, an improperly loaded magazine 270 is present in the tray 386, or something other than a magazine 270 is present in or adjacent to the tray 386.

Associated with the exterior end wall 396 is a sloped surface 418 that facilitates insertion of a magazine 270 into the interior space of the tray 386 when the tray 386 is in the first location. The sloped surface 418 terminates before reaching the bottom side 392 so that a corner 419 is formed for receiving the corner formed by the end side 274A and bottom side 278 of a magazine 270. Further, when the movable end wall 398 is in the first position and a magazine 270 is in the interior space of the tray 386, the magazine 270 is clamped between the corner 419 and the movable end wall 398.

The movable end wall 398 is comprised of an S-shaped member 420 that is pivotally attached to the brackets 406A, 406B. A spring (not shown) biases the S-shaped member 420 so that the S-shaped member 420 is in the first position, as shown in FIG. 18C, to prevent a magazine 270 from entering the operational space of the magazine transport 212 and cartridge transport 214 in an uncontrolled fashion. The S-shaped member 420 further comprises a camming surfaces 424A, 424B that cooperate with camming elements associated with the door assembly 388 to move the S-shaped member 420 into the second position, shown in FIG. 19E, so that the magazine transport 212 can either remove a magazine 270 from the tray 386 or associate a magazine 270 with the tray 386.

With reference to FIG. 18D, the door assembly 388 comprises a door mounting plate 428, exterior door 430A, and an interior door 430B. The exterior door 430A is pivotally connected to the door mounting plate 428 via mounting blocks 432A, 432B, which constrain the exterior door 430A to rotate about a horizontal axis. The exterior door 430A comprises first and second connection flanges 434A, 434B for establishing pivotal connections with a linkage that is used to move the door 430A. Similarly, the interior door 430B is pivotally connected to the door mounting plate 428 via mounting blocks 436A, 436B, which constrain the interior door 430B to rotate about a horizontal axis. The interior door 430B comprises first and second connection flanges 438A, 438B for establishing pivotal connections with a linkage that is used to move the door 430B. Also comprising the door assembly 388 is a rail block 440 that cooperates with the linear rail 400 of the tray 386 to allow the tray 386 to slide between the first and second locations. The door assembly 388 further comprises a pair of cam elements 442A, 442B that interact with a camming surfaces 424A, 424B associated with the movable end wall 398 to move the S-shaped member 420 to the second position so that the magazine transport 412 can either remove a magazine 270 from the tray 386 or place a magazine 270 on the tray 386.

The actuator system 390 operates to move the tray 386 between the first and second positions and to move the exterior and interior doors 430A, 430B between open and closed positions. Moreover, the actuator system 390 coordinates the opening and closing of the interior doors 430A, 430B with the movement of the tray 386 between the first and second positions. To elaborate, the actuator system 390 operates such that during the time that the tray 386 is moving from the first location to the second location (e.g., when a magazine 270 is being inserted into the library 202), the exterior door 430A moves between open and closed positions and the interior door 430B moves between closed and open positions. Conversely, the actuator system 390 operates such that during the time that the tray 386 is moving from the second location to the first location (e.g., when a magazine 270 is being extracted from the library 202), the exterior door 430A moves between closed and open positions and the interior door 430B moves between the open and closed positions.

The actuator system 390 comprises a pair of brackets 446A, 446B that support a lead screw 448, a nut 450 that is attached to the lead screw 448 and has a post that engages a hole 415 in the drive block 414, an electric motor 452, and a pair of gears 454A, 454B that transmit a rotational force produced by the electric motor 452 to the lead screw 448. Further comprising the actuator system 390 is a first pair of slotted blocks 456A, 456B (see FIG. 19A) that are operatively associated with the guide 408A. A second pair of slotted blocks 458A, 458B that are operatively associated with the guide 408B. The actuator system 390 further comprises a first pair of links 460A, 460B that, respectively, pivotally connect the first connection flange 434A of the exterior door 430A with the slotted block 456A and the first connection flange 438A of the interior door 430B with the slotted block 456B. Similarly, a second pair of links 462A, 462B, respectively, pivotally connects the second connection flange 434B of the exterior door 430A with the slotted block 458A and the second connection flange 438B of the interior door 430B with the slotted block 458B. The position of the tray 386 is provided by a detector that operates to detect the presence of a flag associated with the tray 386 when the tray 386 is at a home position and an encoder associated with the motor 452. Other position detecting schemes are feasible.

With reference to FIGS. 19A-19F, the operation of the entry/exit port 368 in moving a magazine 270 between an environment in which the tray 386 is accessible by an operator to a space that is accessible to the magazine transport 212 (i.e., in direction 468) is described.

Figure 19A:
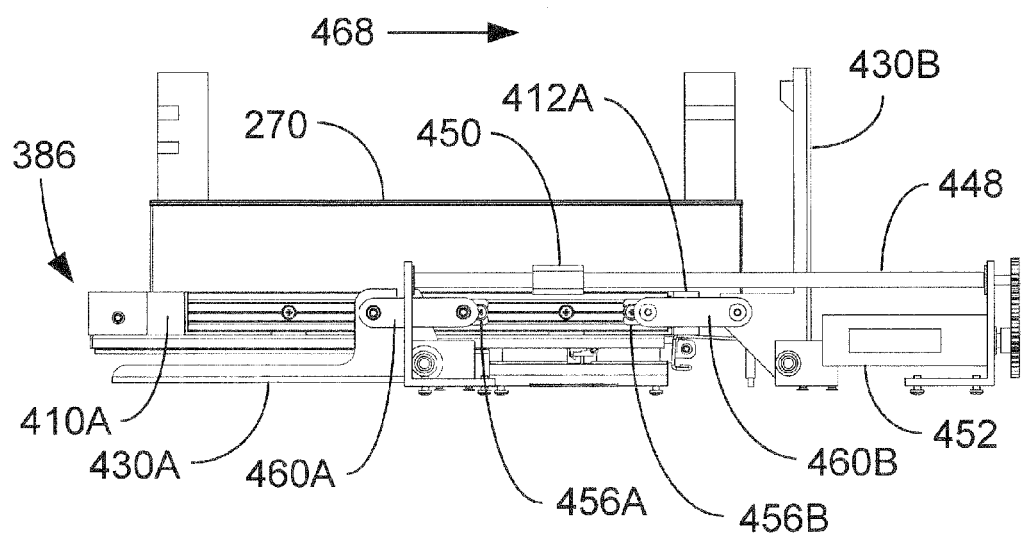
FIGS. 19A-19E illustrate the operation of the port shown in FIGS. 18A-18E in moving a magazine from an exterior environment to a space in which the magazine is accessible by a magazine transport device.

With reference to FIG. 19A, the entry/exit port 368 is in the first state, i.e., the tray 386 is at a location at which an operator can associate a magazine 270 with the tray 386. For illustration, the magazine 270 has been associated with the tray 386. In this regard, the spring associated with the movable end wall 398 has placed the S-shaped member 420 in the first position. As a consequence, the magazine 270 is prevented from sliding in the direction 468. Further, the magazine 270 is clamped between the corner 419 and the S-shaped member 420. At this point, the exterior door 430A is open and the interior door 430B is closed. Additionally, the slotted block 456B is either contacting the rail end block 412A or very close to the rail end block 412A.

Figure 19B:
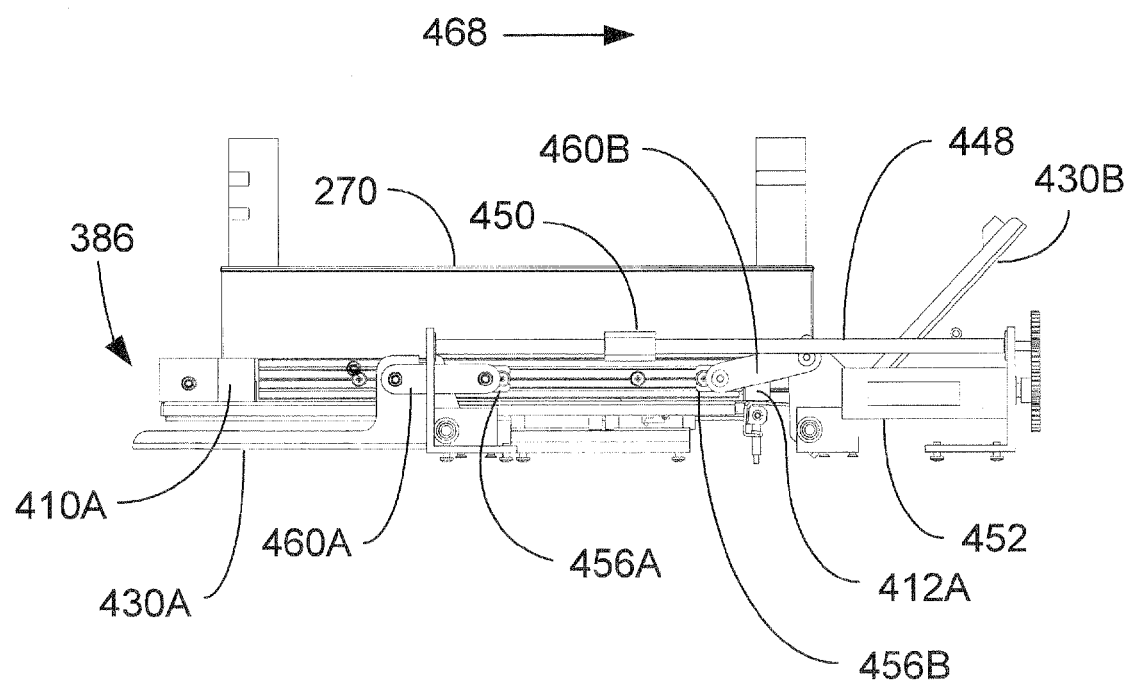

With reference to FIG. 19B, the actuator system 390 has begun to move the tray 386 in the direction 468, the exterior door 430A is still open and the interior door 430B has moved from the closed position towards the open position. More specifically, the electric motor 452 has been used to produce a rotational force that has been transmitted by the pair of gears 454A, 454B to the lead screw 448. The rotation of the lead screw 448 has caused the nut 450 to move towards the electric motor 452. The nut 450, in turn, has applied a force to the tray 386 via the drive block 414 that has caused the tray 386 to slide over the rail block 440 and towards the electric motor 452. As the tray 386 has moved towards the electric motor 452, either gravity or contact with the tray 386 has caused the interior door 430B to begin rotating towards the open position. However, interaction between the rail end block 412A and the slotted block 456B, which is connected to the interior door via the link 460B, has controlled the movement of the interior door 430B.

Figure 19C:
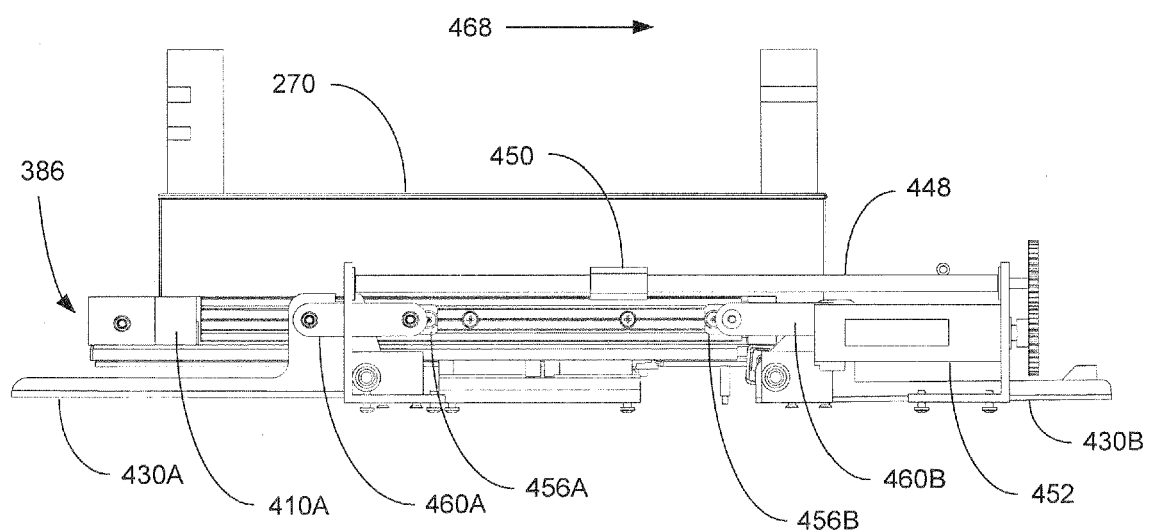

With reference to FIG. 19C, the actuator system 390 has continued to move the tray 386 in the direction 468, the exterior door 430A is still in the open position and the interior door 430B is now also in the open position. More specifically, the electric motor 452 has continued to move the tray 386 in the manner described with respect to FIG. 19B. Further, the interaction between the rail end block 412A and the slotted block 456B has continued to control the movement of the interior door 430B between the closed position and the open position.

Figure 19D:
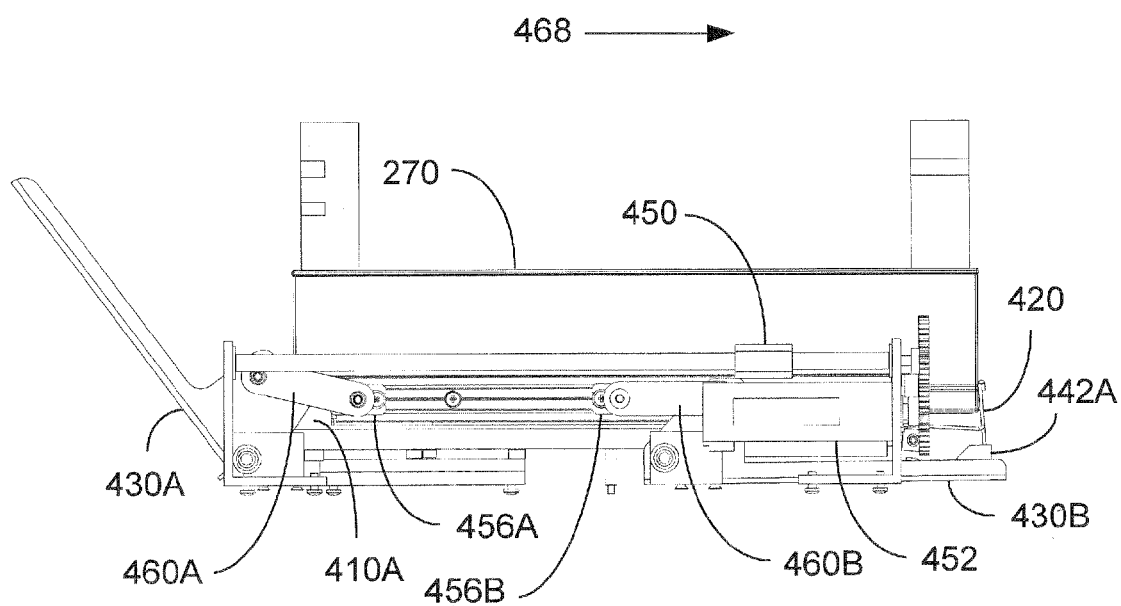

With reference to FIG. 19D, the actuator system 390 has continued to move the tray 386 in the direction 468, the exterior door 430A has now begun to move from the open position towards the closed position, and the interior door 430B remains in the open position. More specifically, the electric motor 452 has continued to move the tray 386 in the manner described with respect to FIG. 19B. In addition, the movement of the tray 386 has caused the rail end block 410A to begin applying a motive force to the slotted block 456A. In turn, the slotted block 456A, due to the connection with the exterior door 430A via the link 460A, has begun to cause the exterior door 430A to rotate towards the closed position.

Figure 19E:
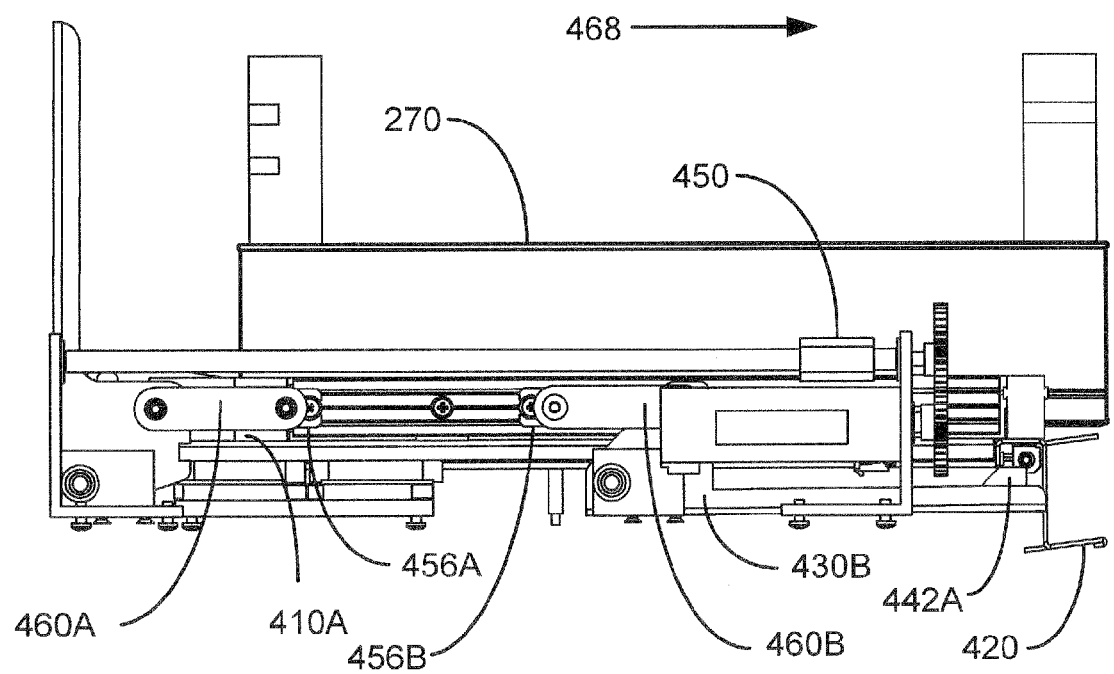

With reference to FIG. 19E, the actuator system 390 has continued to move the tray 386 in the direction 468, the exterior door 430A is now in the closed position, the interior door 430B remains in the open position, and the S-shaped member 420 has been moved to the second position so that the magazine transport 212 can engage the magazine 270. More specifically, the electric motor 452 has continued to move the tray 386 in the manner described with respect to FIG. 19B. In addition, the movement of the tray 386 has caused the rail end block 410A to continue applying a motive force to the slotted block 456A. In turn, the slotted block 456A, due to the connection with the exterior door 430A via the link 460A, has caused the exterior door 430A to rotate to the closed position. In addition, the movement of the tray 386 has caused the cam elements 442A, 442B to engage the camming surfaces 424A, 424B of the S-shaped member 420 and rotate the S-shaped member such that the magazine 270 can be removed from the tray 386 by the magazine transport 212. At this point, the entry/exit port 368 is in the second state.

It should be appreciated by one skilled in the art that to extract a magazine 270 from the library 202 using the entry/exit port 368, the sequence of operations illustrated in FIGS. 19A-19E is reversed.

It should also be appreciated by one skilled in the art that the entry/exit port 368 is capable of being modified in a number of ways, provided a magazine 270 transport is provided that is able to place a magazine 270 in the port 368 or remove a magazine 270 from the port 368. The following sets forth some of these other embodiments. For example, the tray 386 is a support for a magazine 270 that primarily supports a magazine 270 from below. Depending upon the design of a magazine 270, a support that contacts one or both of the sides 276A, 276B of a magazine 270 or the top surface (not shown) of a magazine embodiment is feasible. Further, the tray 386 employs the orientation feature 416 to substantially ensure that magazine embodiments that employ the asymmetrical rails 292A, 292B are properly inserted into the tray 386. The entry/exit port 368 is capable of being adapted to magazine embodiments that employ a different orientation feature.

Additionally, structures other than the movable end wall 398 can be employed to prevent undesired movement of a magazine 270. For instance, a device that clamps the side surface, such as side 276A, of the magazine 270 can be employed. If a particular magazine embodiment has top and bottom surfaces, a device that clamps these surfaces is also feasible. Another alternative to preventing undesired movement of a magazine 270 is to provide a structure that engages a feature of the magazine 270, such as a hole, indentation or protrusion. Further, a movable end wall in which the magazine transport 212, rather than the entry/exit port 368, causes the wall to move between positions is feasible.

Furthermore, while the actuation system 390 employs the electric motor 452 and linkages to cause the tray 386, exterior door 430A and interior door 430B, to move in a coordinated fashion, other approaches are feasible. For example in one embodiment, a system in which separate electrical motors or other motive components (such as solenoids) are associated with the magazine support, such as the tray 386 in one embodiment, and each of the doors 430A, 430B is feasible. In this case, coordination of the movements of the tray 386 and the doors 430A, 430B is achieved by controlling the motors or other motive components. Similarly, a system in which an electrical motor or other motive component is associated with the magazine support and another motor or motive component is associated with the combination of the two doors 430A, 430B is feasible. In this case, the operation of the two doors 430A, 430B is coordinated by a mechanical linkage extending between the doors 430A, 430B, and the movements of the support and the doors 430A, 430B is coordinated by appropriately controlling the motors or other motive components. It should also be appreciated that designs employing linear actuators (such as solenoids) are feasible. Further, other approaches for moving the magazine holder or support, such as a belt-and-pulley and rack-and-pinion systems, are feasible.

Figure 20A:
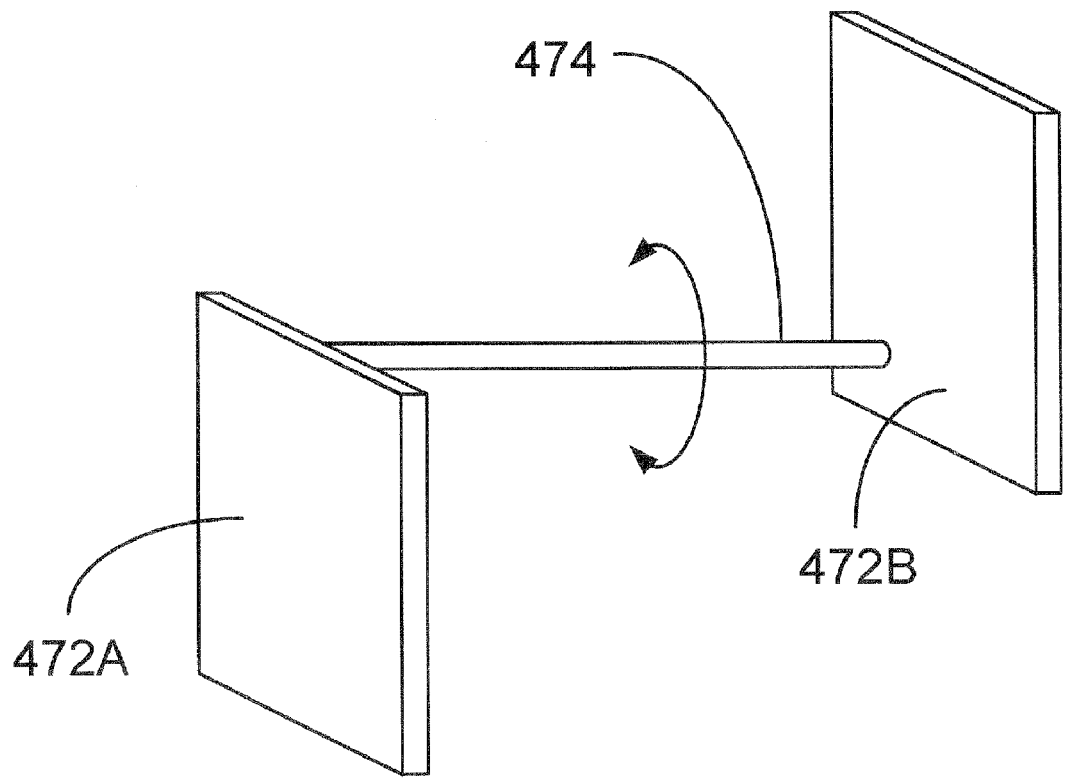
FIGS. 20A-20E illustrate examples of alternative door structures for an entry/exit port.
Figure 20B:
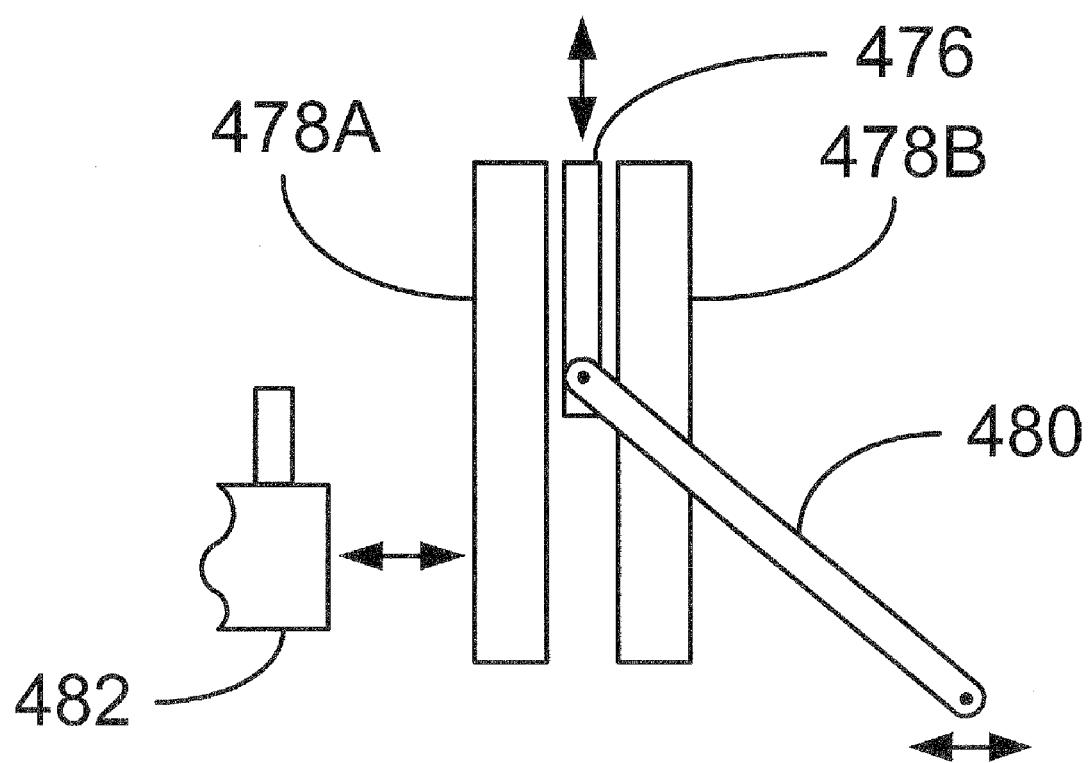
Figure 20C:
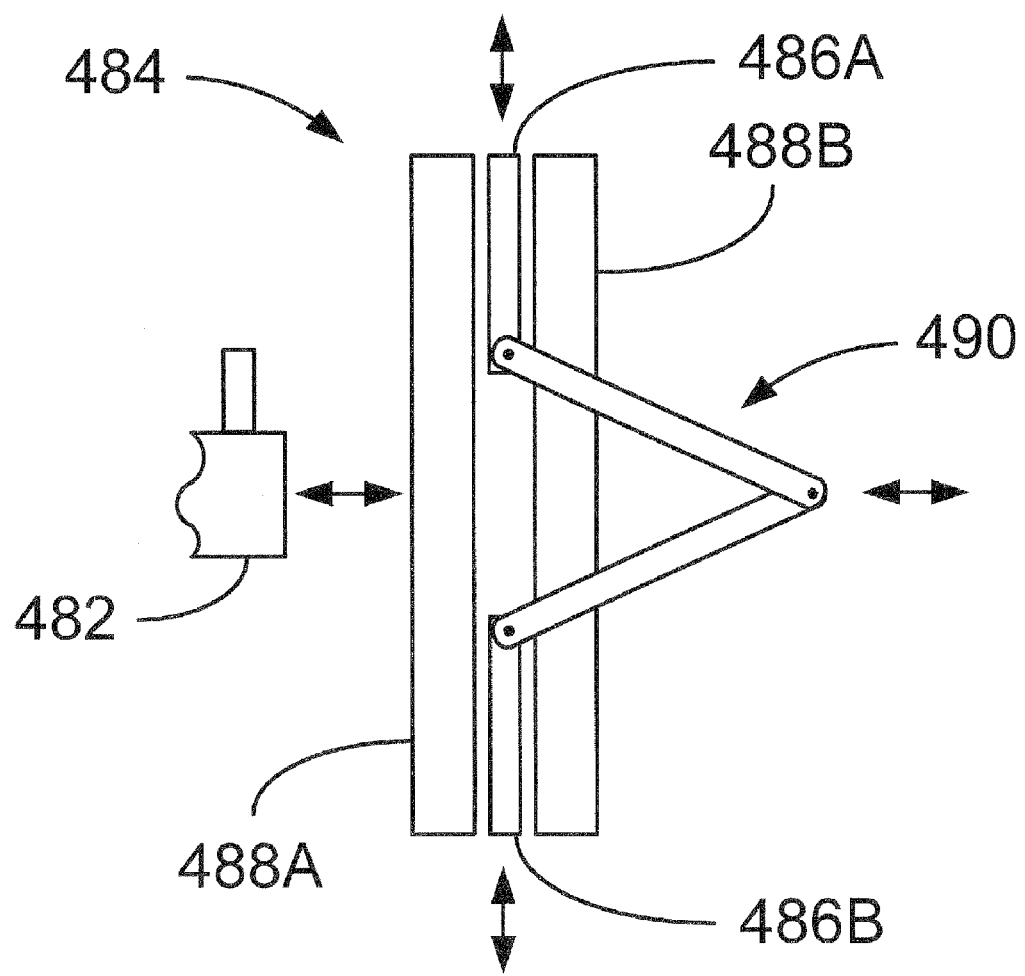
Figure 20D:
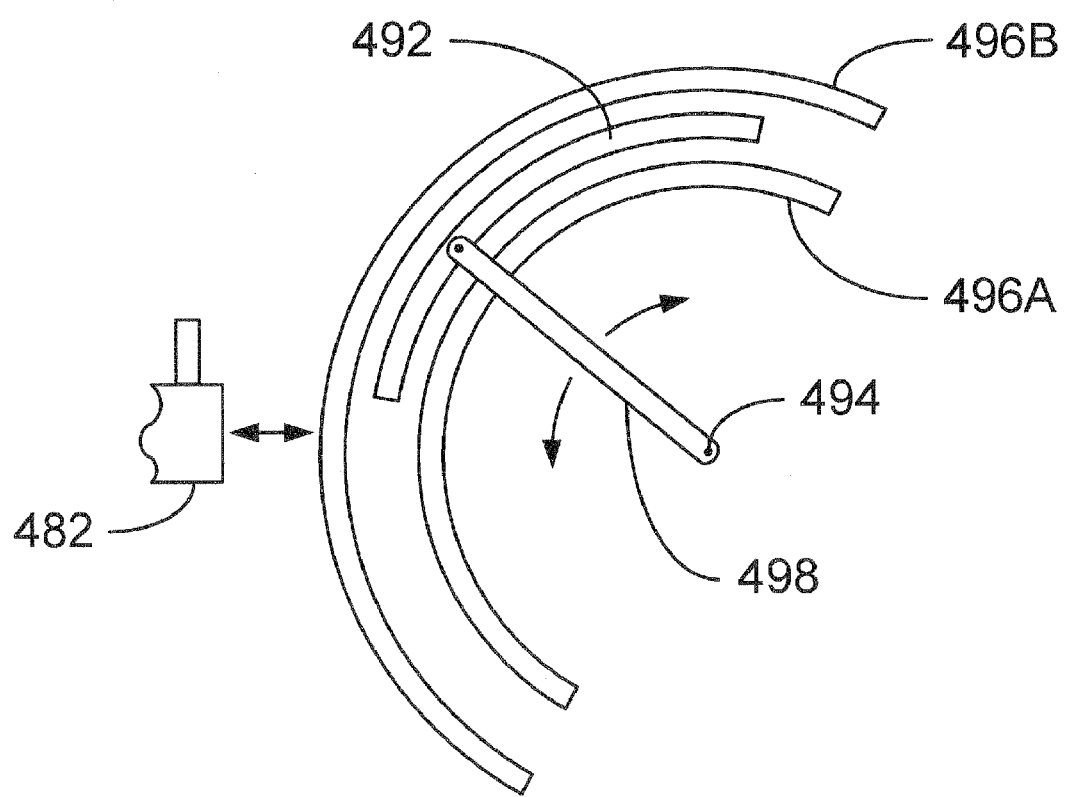
Figure 20E:
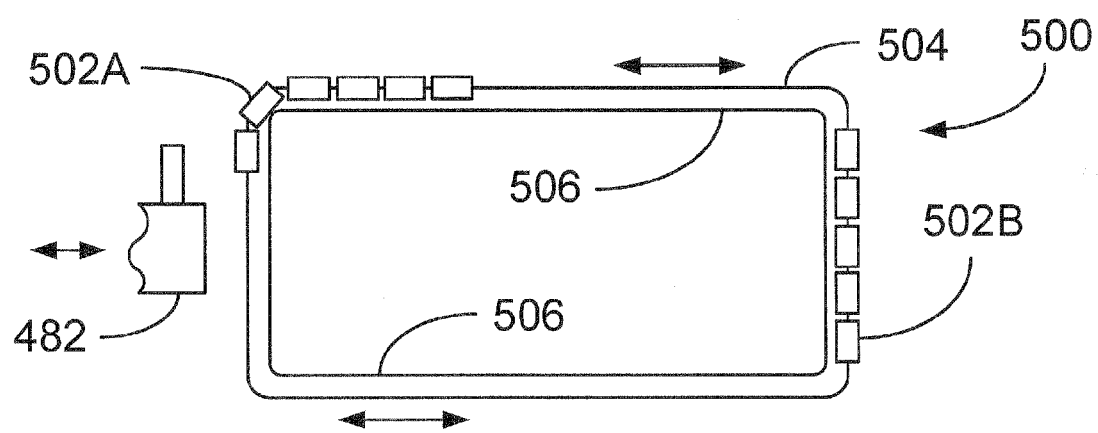

Additionally, while the entry/exit port 368 employs planar doors 430A, 430B that each rotate about horizontal axes that are parallel to the planes of the doors 430A, 430B, many other designs are feasible. For example, designs in which a door 430A, 430B rotates about an axis that is parallel to the plane of the door 430A, 430B but not a horizontal axis (e.g., a vertical axis) is feasible. Designs in which a door 430A, 430B rotates about an axis that is substantially perpendicular to the plane of the door 430A, 430B are also feasible. An example of such a design is shown in FIG. 20A. In this design, both an exterior door 472A and an interior door 472B that resides in a plane that is substantially parallel to the plane of the exterior door 472A rotate about an axis that is perpendicular to the planes of both of the doors 430A, 430B. In addition, the exterior door 472A and the interior door 472B are angularly or rotationally offset. Coordination of the opening and closing of the doors 430A, 430B is achieved by a rod 474 that connects the doors 430A, 430B. It should be noted that with such a design, the exterior door 472A and the interior door 472B move simultaneously. Consequently, when one of the doors such as the exterior door 430A, is moving from the open position to the closed position, the other door, such as the interior door 430B, is moving from the closed position to the open position. Also feasible are designs in which a door embodiment is linearly translated between open and closed positions, rather than rotated between open and closed positions. An example of such a design is shown in FIG. 20B. In this design, a door 476 is disposed between a pair of guides 478A, 478B that constrain the door 476 to move linearly between open and closed positions. A linkage 480 is used to apply the forces needed to move the door 476 between open and closed positions. In FIG. 20B, the door 476 is in an open position so that a magazine 482 can pass through the door structure. Also feasible are door embodiments in which a door is comprised for two or more elements. An example of such a design is shown in FIG. 20C. In this design, a door structure 484 is comprised of a pair of doors 486A, 486B that are constrained to move linearly by guides 488A, 488B. A linkage 490 is used to transmit the forces that cause the doors 486A, 486B to move: (a) towards each other to achieve a closed position, and (b) away from each other to achieve an open position. Further feasible are door embodiments that employ non-planar doors. An example of such a design is shown in FIG. 20D. In this design, a curved door 492 is constrained to rotate about an axis 494 by a pair of curved guides 496A, 496B and a linkage 498. Also feasible is a "roll top" door embodiment. An example of door structure that utilizes roll top doors is shown in FIG. 20E. In this embodiment, a door structure 500 is comprised of a pair of roll-top doors 502A, 502B that are connected to one another by a flexible cable structure 504. A guide structure 506 defines a track around which the doors 502A, 502B. This design also allows for overlap in the times during which one of the doors, such as door 502A, is transitioning between an open position and a closed position and the other door, such as door 502B, is transitioning between a closed position and an open position.

While the entry/exit port 368 employs a movable tray 386, an entry/exit port embodiment that employs a cartridge holder embodiment that does not move is also feasible.

Figure 21A:
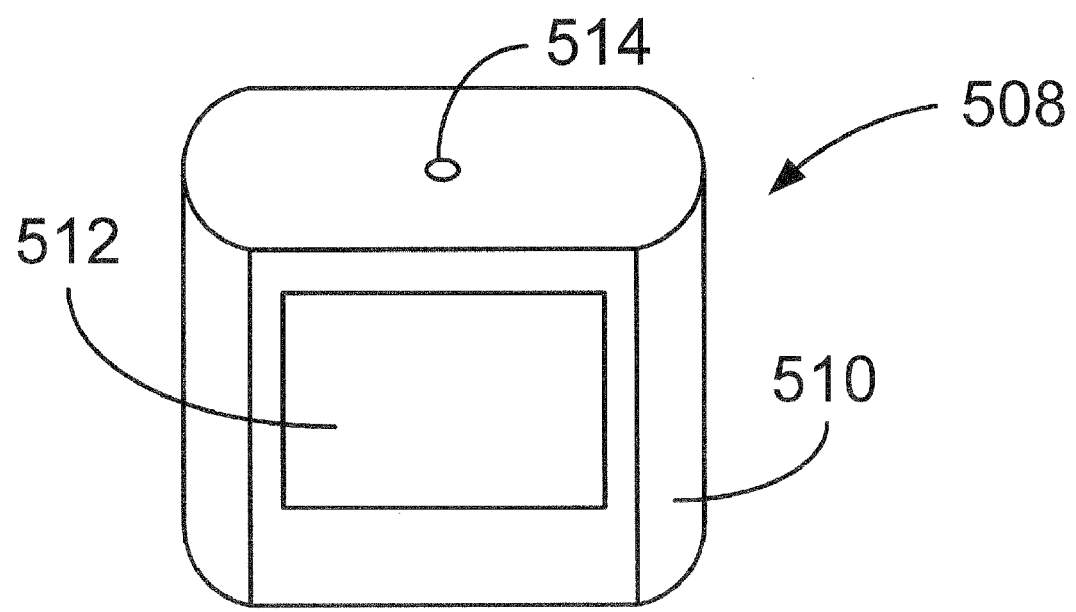
FIGS. 21A-21B illustrate a carousel entry/exit port.
Figure 21B:
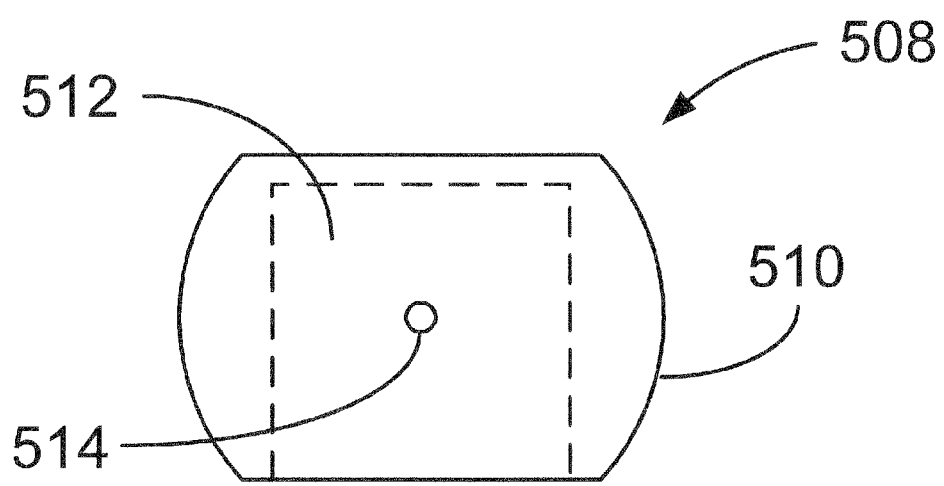

An alternative embodiment to an entry/exit port 368 that employs a pair of doors, such as the interior and exterior doors 430A, 430B, is a carousel entry/exit port. An example of a carousel entry/exit port is shown in FIGS. 21A-21B. In this embodiment, a carousel entry/exit port 508 is comprised of a housing 510 that defines a port 512 for holding a magazine 270. The housing 510 rotates about an axis 514. Rotation is accomplished by an electric motor (not shown). In operation, the carousel exit/entry port 508 rotates between a first location at which an operator can either remove a magazine 270 from the port 512 or associate a magazine 270 with the port 512 and a second location at which a magazine transport device, such as the magazine transport device 212, can either remove a magazine 270 from the port 512 or associate a magazine 270 with the port 512.

Generally, the shelf system 208 serves to support magazines 270 in the library 202 in a preferred or desired orientation. The shelf system 208 orients magazines 270 in the library such that: (a) the magazines 270 are parallel to one another: (b) any cartridges 224 contained in the magazines 270 are oriented to facilitate insertion and extraction by the cartridge transport 214; and (c) a high data density footprint is achieved. Furthermore, the shelf system 208, each of the shelves comprising the shelf system 208 is capable of supporting multiple magazines 270. However, a shelf system 208 with a shelf that is only capable of accommodating a single magazine 270 is feasible.

With reference to FIG. 16, the shelf system 208 is comprised of the five columns of shelving 328A and the two columns of shelving 328B. With reference to FIGS. 7A-7B and 8A-8B, the five columns of shelving 328A are realized by ten, horizontally extending shelves that are each capable of supporting up to five magazines 270 and three, horizontally extending shelves that are each capable of supporting up to three magazines 270. The two columns of shelving 328B are realized by twelve, horizontally extending shelves that are each capable of supporting up to two magazines 270.

Figure 22A:
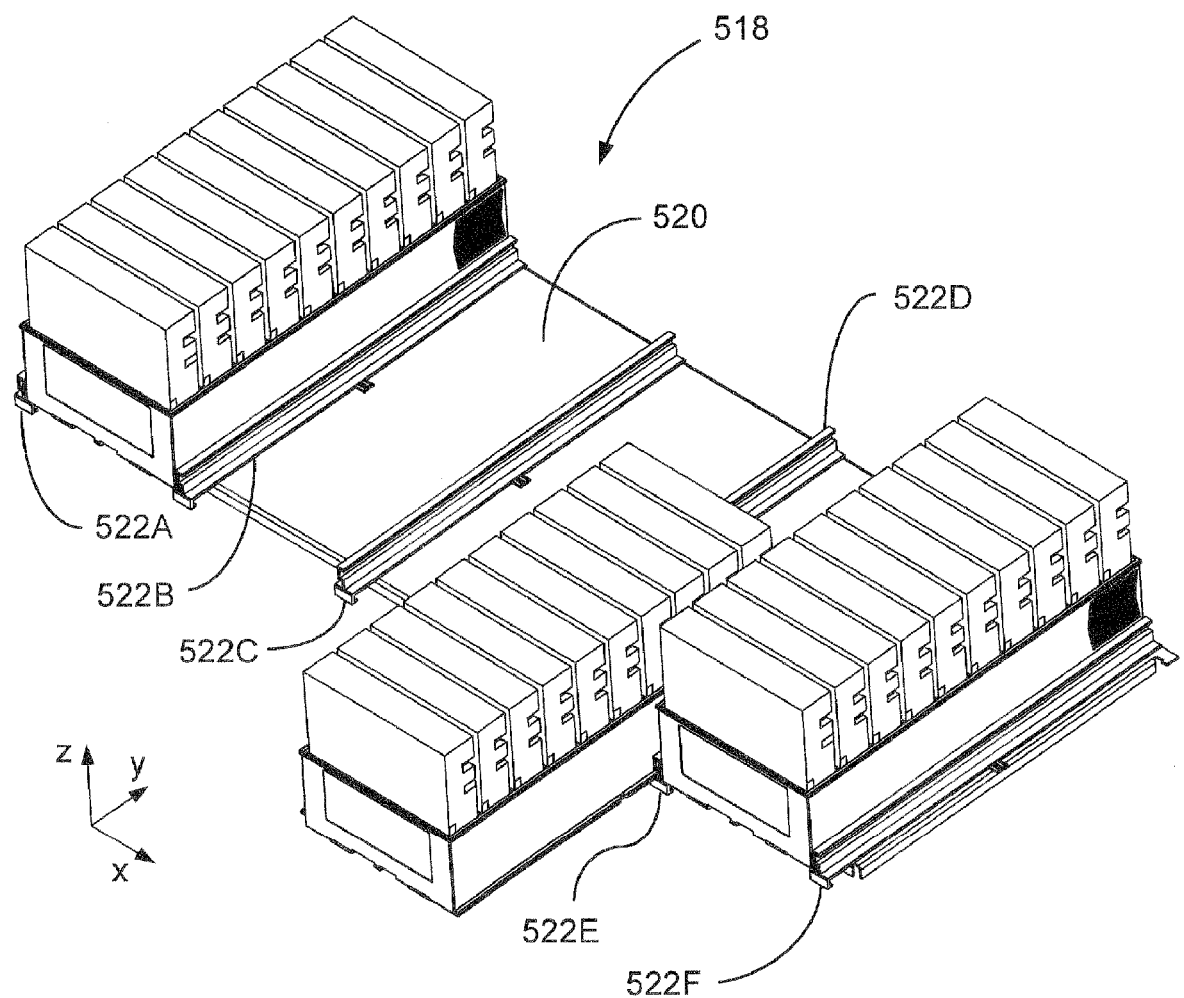
FIGS. 22A-22C respectively illustrate an embodiment of a shelf capable of holding five magazines, an embodiment of a cleat that is associated with the shelf, and the relationship between the shelf and magazine.
Figure 22B:
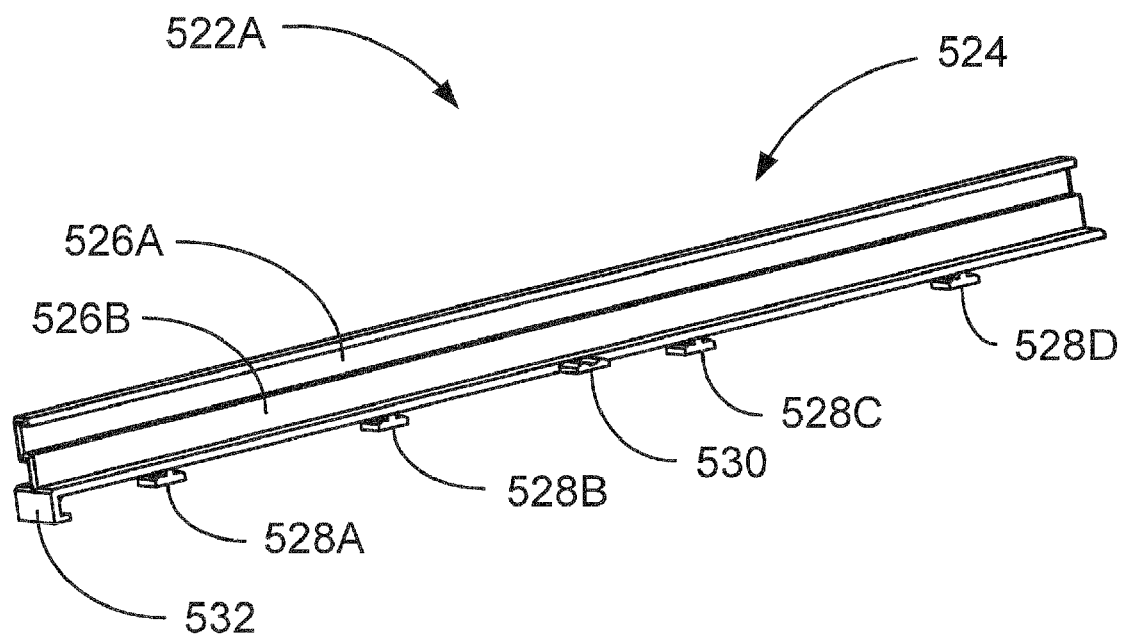

FIG. 22A illustrates a shelf 518 that is capable of accommodating up to five magazines 270. Shelf 518 is described with the understanding that the description is also applicable, with appropriate modifications, to the shelves that are capable of accommodating different numbers of magazines 270, such as the shelves in the library 202 that are capable of accommodating up to three magazines 270 and up to two magazines 270. The shelf 518 comprises a planar member 520 for supporting magazines 270 from underneath. The shelf 518 further comprises six cleats 522A-F that serve a number of purposes. Specifically, the cleats 522A-F: (a) divide the shelf 518 into five cells, each of which is capable of accommodating a single magazine 270; (b) constrain any magazines 270 supported by the shelf 518 to be oriented substantially parallel to one another; (c) constrain any magazines 270 supported by the shelf 518 to be oriented such that any cartridges in the magazines 270 are all oriented in the same manner to facilitate insertion and extraction of the cartridges 224 by the cartridge transport 214; (d) prevent, due to the spacing between consecutive cleats, lateral displacements (i.e., displacements along the x-axis) of any magazines 270 supported by the shelf 518; (e) prevent vertical displacements (i.e., displacements along the z-axis) of any magazines 270 supported by the shelf 518; (f) resist undesired horizontal displacements (i.e., displacements along the y-axis) of a magazine 270 supported by the shelf 518; (g) constrain the direction that a magazine 270 is either moved towards the shelf 518 or away from the shelf 518 to horizontal displacements (i.e., displacements along the y-axis).

With reference to FIG. 22B, the cleat 522A is described with the understanding that the description is also applicable to cleats 522B, 522C, 522D, 522E and 522F. The cleat 522A is comprised of a dual guide structure 524 with an upper guide 526A for receiving the rail 292A of a magazine 270 and a lower guide 526B for receiving the rail 292B of a magazine 270. The cleat 522A also comprises prongs 528A, 528B, 528C and 528D that engage holes (not shown) in the planar member 520 and operate to hold the cleat 522A in place on the planar member 520. Additionally, the cleat 522A comprises a receptacle 530 (which also extends away from the side 524 of the cleat 522A not seen in FIG. 22B) for accommodating one of the detents 296A, 296B associated with a magazine 270, and when accommodating one of the detents 296A, 296B, operating to resist undesired horizontal displacements of the magazine 270. The cleat 522A also comprises an end surface 532 that is detectable by the magazine 270 transport 512 and facilitates positioning of the magazine transport 512 relative to the shelf 512 and relative to a particular magazine 270 supported by the shelf 512. The end surface 532 presently has a reflective character that makes the end surface distinguishable from the adjacent features. A contrasting color approach is also feasible, as well as a tactile approach.

Figure 22C:
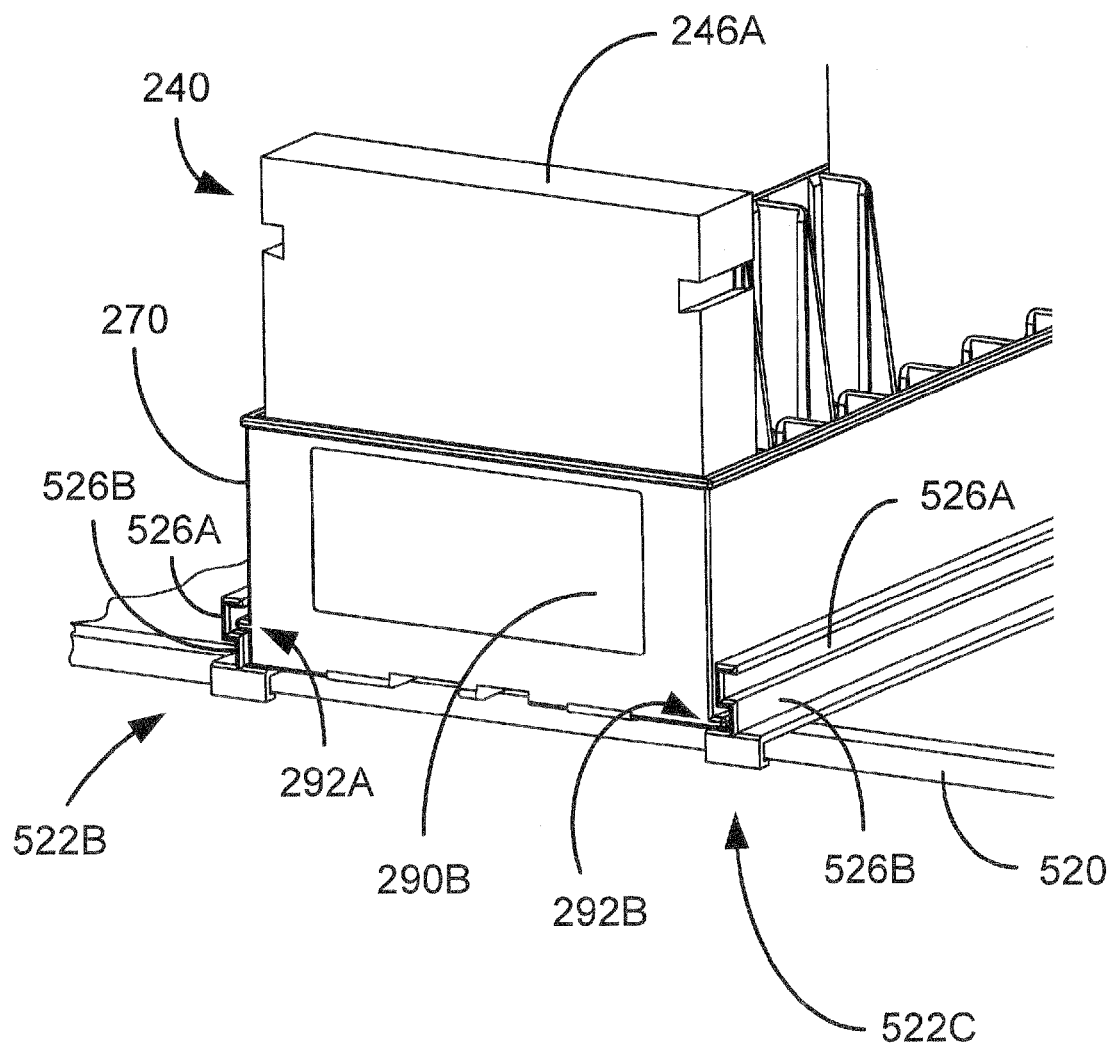

FIG. 22C demonstrates the manner in which two cleats 522B and 522C cooperate to achieve some of the previously noted purposes. The operation of cleats 522B and 522C on a magazine 270 is described with the understanding that other pairs of cleats operate in a substantially similar manner. The cleats 522B and 522C are spaced from one another such that the upper guide 526A of cleat 522B captures the rail 292A of the magazine 270 and the lower guide 526B of the cleat 522C captures the rail 292B of the magazine 270. As a consequence, the cleats 522B and 522C cooperate to prevent the magazine 270 from being laterally and vertically displaced. Additionally, the cleats 522B, 522C limit displacements of the magazine 270 to horizontal displacements along the y-axis. Although not shown in FIG. 22C, it should be appreciated that the detents 296A, 296B of the magazine 270 are respectively engaging the receptacle 530 associated with the cleat 522B and the receptacle 530 associated with the cleat 522C to prevent undesired horizontal displacements of the magazine 270. Further, the cleats 522B, 522C cause the magazine 270 to be oriented such that a cartridge 224 has a particular orientation on the shelf 518 and within the library 202. To elaborate, as previously noted, each magazine 270 has an orientation structure associated with each slot that substantially ensures that all of the SAIT cartridges 240 stored by the magazine 270 have the same orientation in the magazine 270. The rails of the magazines 292A, 292B cooperate with the guides 526A, 526B associated with the pair of cleats 522B, 522C to substantially ensure that the magazine 270 has a particular orientation on the shelf 518. As a consequence, the guides 526A, 526B also substantially ensure that the cartridge 240 has a particular orientation on the shelf 518 and within the library 202. Further, since all of the cleats 522A-522F are oriented on the planar member 520 in the same way, all of the magazines 270 supported by the planar member 520 have the same orientation and all of the cartridges 240 contained by all of the magazines 270 have the same orientation, as shown in FIG. 22A. It should be further appreciated that the shelf 518 and the magazine 270 cooperate such that the cartridge 224 is oriented in the library 202 such that the faces of the cartridge 224 with the greatest surface areas (in this particular case, faces 226A, 226B of the LTO data cartridge 224) each lie in a vertical plane. Moreover, each pair of cleats substantially ensures that the cartridges 224 contained in any magazines 270 are oriented such that the faces 226A, 226B of the cartridge 224 with the greatest surface areas each lie in a vertical plane that is substantially perpendicular to the axis or direction in which the cleats 522B, 522C allow the magazine 270 to be displaced, namely, along the y-axis. Orienting the cartridges 224 in this manner contributes to a high data density footprint.

With continuing reference to FIG. 22C, it should also be appreciated that cleats 522B and 522C each serve as a guide for a magazine 270 that may be disposed on the planar member 520 adjacent to the magazine 270. To elaborate, the upper guide 526A of cleat 522B serves to capture the rail 292A of the magazine 270 and the lower guide 526B of the cleat 522B will serve to capture the rail 292B of any magazine 270 that is disposed on the planar member 520 immediately adjacent to one side of the magazine 270. Likewise, the lower guide 526B of the cleat 522C serves to capture the rail 292B of the magazine 270 and the upper guide 526A of the cleat 522C will serve to capture the rail 292A of any magazine 270 that is disposed on the planar member 520 immediately adjacent to the other side of the magazine 270.

With reference to FIGS. 7A-7B and 8A-8B, each shelf of the shelf system 208 that has an immediately overlying shelf is vertically spaced from the immediately overlying shelf by a distance that is only slightly greater than the distance between the bottom side 278 of the magazine 270 and the surface associated with a cartridge 224 that is properly located in the magazine 270 and furthest from the bottom side 278 of the magazine 270. This spacing between shelves also contributes to achieving a high data density footprint.

It should also be appreciated that the shelf system 208 is capable of being modified in a number of ways. The following sets forth, without limitation, some possible modifications or alternative embodiments. For example, a shelf system embodiment is feasible in which each shelf is capable of supporting only a single magazine 270. An alternative embodiment is a shelf system that employs a structure other than a planar member to support one or more magazines 270. For instance, a shelf that utilizes two, L-shaped brackets to support a magazine 270 is feasible. Further, in yet another alternative embodiment, a shelf system in which a shelf provides support to a magazine 270 other than from a location below the magazine 270 is also practicable. Depending upon the design of a magazine 270, a shelf that provides support to: (a) one side of the magazine 270; (b) both of sides of a magazine 270; or (c) the top surface of a magazine 270 is feasible. An embodiment of a shelf that is tilted to prevent undesired displacements of a magazine 270 is also practicable. Such a shelf would avoid the need for a latch structure, such as receptacle 530. Further, a shelf embodiment that incorporates an active latch or retention structure that is actuated by a magazine transport embodiment is also possible. A shelf system in which there is greater vertical spacing between shelves is practicable but in most cases will compromise the data density footprint of the library 202. Further, the shelf system 208 holds magazines 270 in a grid array or X-Y array. A shelf system 208 embodiment that holds magazines 270 in different arrays is also feasible. Another embodiment of a shelf system comprises one or more fixed slots each for holding a cartridge 224. Among the types of cartridges that can be held in such a fixed slot is a "cleaning" cartridge, i.e., a cartridge that is adapted to clean reading and writing heads associated with a drive 180.

As shown in FIG. 8B, each of the drives 180 has a horizontal orientation with the long dimension of the receptacle for receiving a cartridge 224 extending horizontally. It should be appreciated that it is feasible for each of the drives 180 to have a different orientation, such as vertical orientation. It is also possible to have one or more drives 180 with one orientation and one or more drives 180 with a different orientation. It should also be appreciated that the orientation or orientations of the drives 180, the orientation or orientations of cartridges 224 stored in the library 202, and the orientations of the drives 180 relative to the cartridges 224 generally dictate the manner in which the cartridge transport 212 must manipulate the cartridges 224.

Typically, all of the drives 180 are one of an LTO, SAIT and DLT tape drive. The library 202 is capable of being adapted to accommodate other tape drives. Moreover, the library 202 is adaptable to drives that operate on other types of cartridges, such as disk cartridges, cartridges comprising a disk drive.

With reference to FIG. 8B, the library 202 is capable of accommodating up to twenty-four, full height drives, where each of the drives is one of an LTO, SAIT or DLT tape drive. The library 202 is also capable of accommodating up to forty-eight, half-height drives, where each of the drives is one of an LTO, SAIT or DLT tape drive. The library 202 is capable of being modified to accommodate greater or lesser numbers of drives. However, the library 202 must have at least one drive to be functional. Also feasible are combinations of full-height and half-height drives.

As shown in FIG. 24A-F, each of the drives 180 in the library 202 is mounted in a drive bay assembly, such as the drive bay assembly 540, that provides the ability to relatively quickly mount and demount a drive 180 from the library 202. Generally, this ability is achieved using: (a) a sled, such as 548A used herein as a generic sled element for illustrative purposes, that is capable of holding a drive 180; (b) a housing, such as the drive bay housing 550, for receiving the sled 548A; and (c) a plug structure, such as the plug assembly 588, that allows a drive 180 that has been attached to a sled 548A to be mounted by inserting the sled 548A into the housing and demounted by removing the sled 548A from the housing.

Figure 23A:
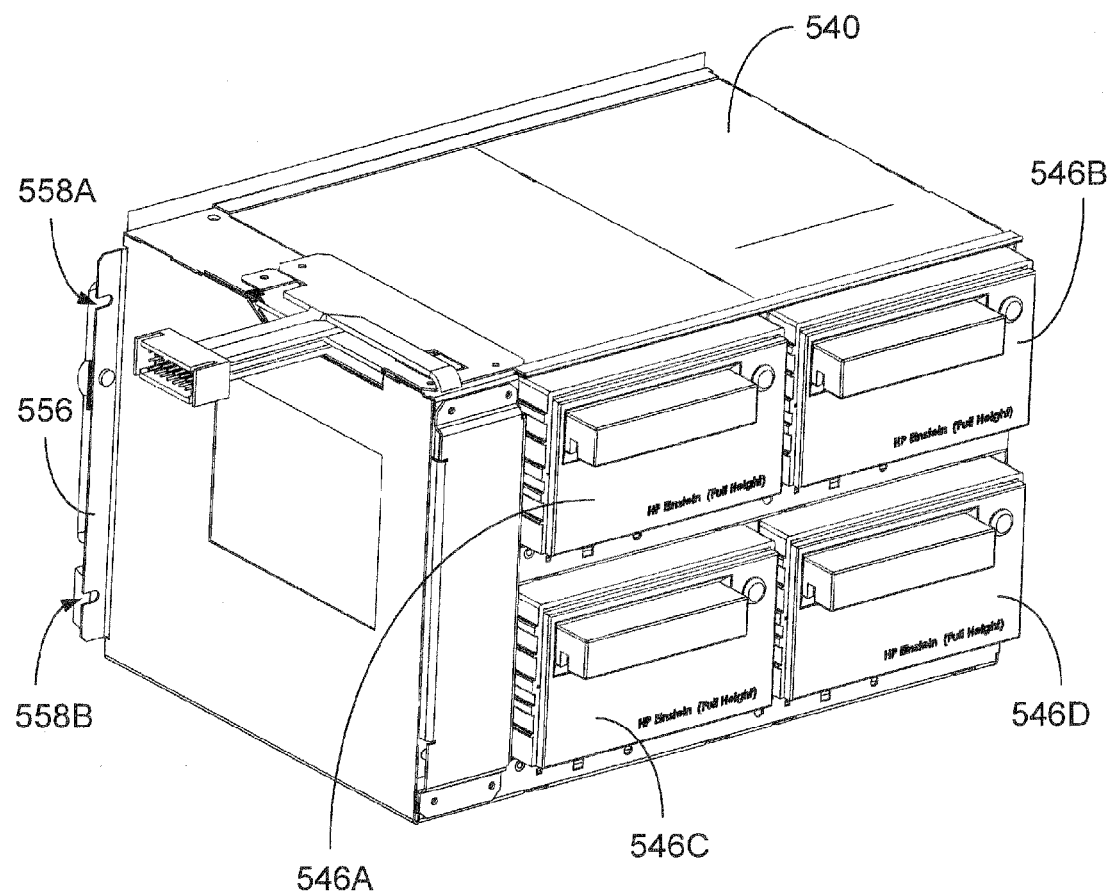
FIGS. 23A-23C are respectively a front perspective view of an embodiment of a four unit, drive bay assembly populated with four drives, a rear perspective of the drive bay assembly, and a rear view of an embodiment of a ladder frame that is used to hold the drive bay assembly in the library.
Figure 23B:
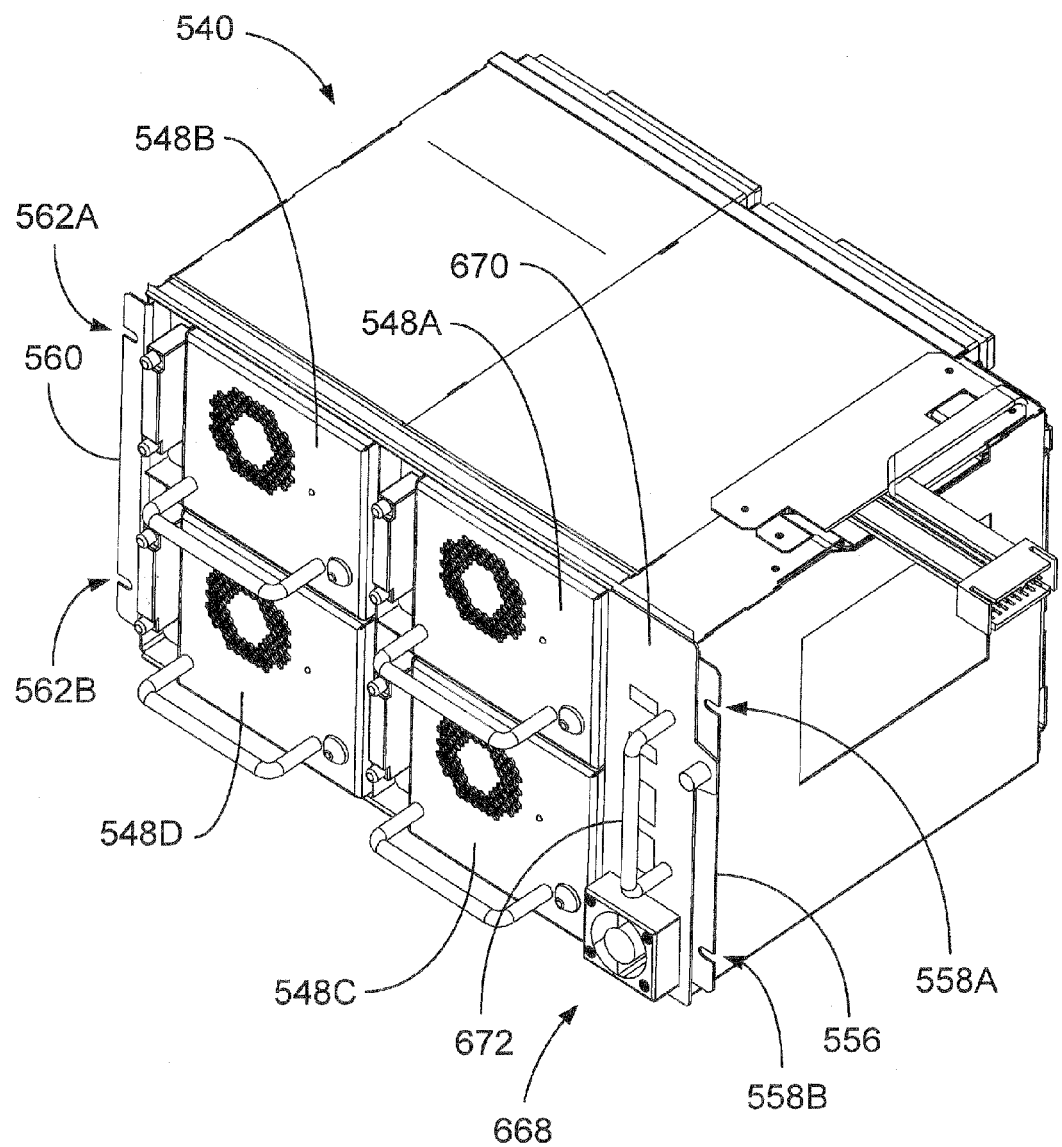
Figure 23C:
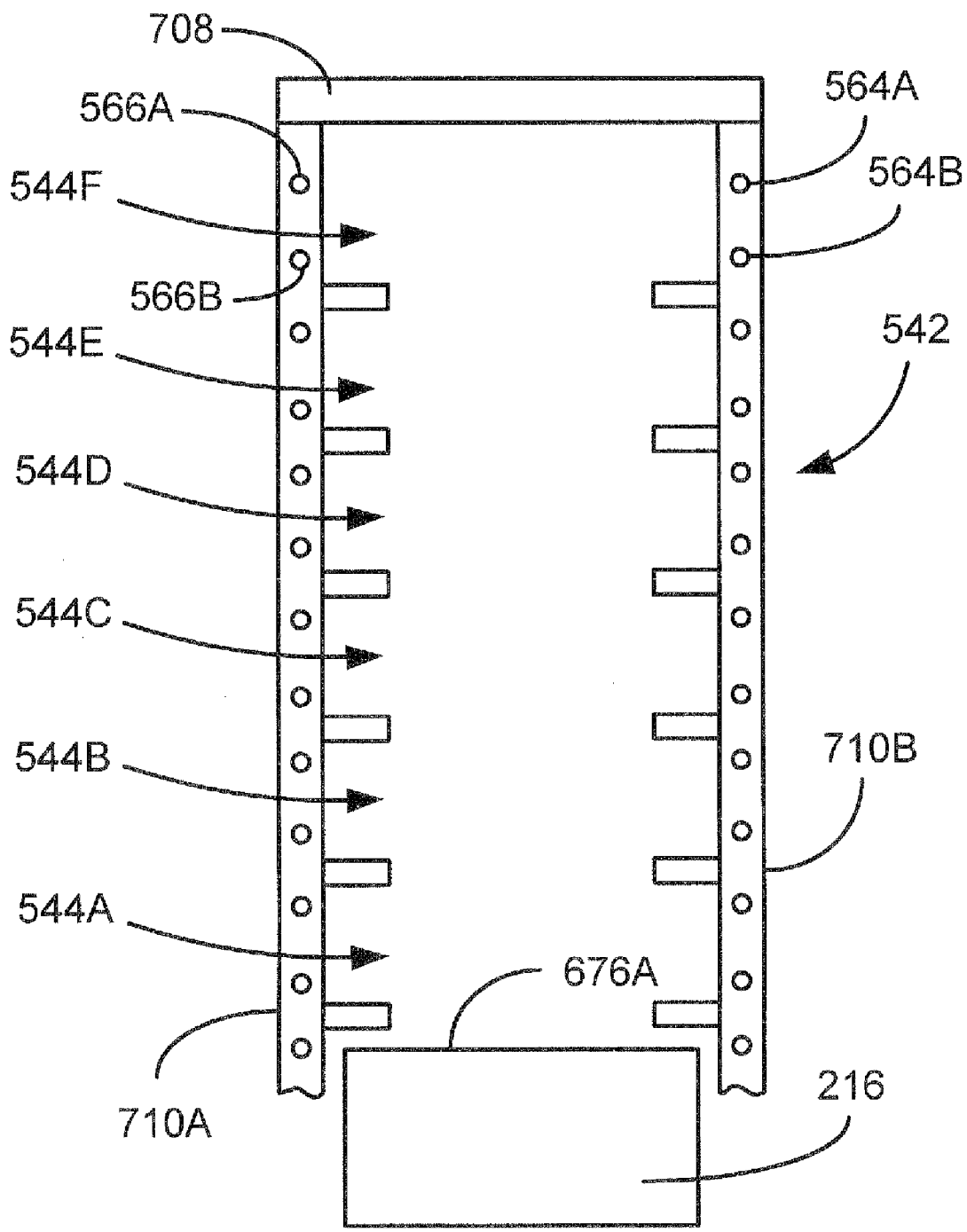

With reference to FIGS. 23A-23C, an embodiment of a drive bay assembly 540 is described. The drive bay assembly 540 is capable of accommodating up to four, full-height drives or up to eight, half-height drives, and various combinations of full-height and half-height drives. The drive bay assembly 540 is mounted to a ladder frame 542 that defines six compartments 544A-544F that are each capable of accommodating one of the drive bay assembly 540. Generally, when the drive bay assembly 540 is mounted in one of the compartments 544A, 544B, 544C, 544D, 544E and 544F and a drive 180 is mounted in the drive bay assembly 540, the receptacle 186 of the drive 180 is positioned so that the cartridge transport 214 can insert a cartridge 224 into and extract a cartridge 224 from the drive 180. The sled 548A holding the drive 180 is accessible to an operator by opening the hinged door 348. Consequently, the operator is able to remove the sled, or drive bay assembly 540 comprising the four sleds 548A-D in one embodiment, and associated drive 180 from the library 202 without substantial exposure to the magazine transport 212 or cartridge transport 214. Similarly, the operator is also able to insert a sled, or drive bay assembly 540 comprising the four sleds 548A-D in one embodiment, and a drive 180 into the library 202 without having any substantial exposure to the magazine transport 212 or the cartridge transport 214. FIG. 23A illustrates the drive bay assembly 540 populated with four drives 546A, 546B, 546C and 546D that, if the drive bay assembly 540 were mounted to the ladder frame 542, would be positioned for insertion and extraction of cartridges 224 by the cartridge transport 214. Similarly, FIG. 23B illustrates the drive bay assembly 540, with the assembly's four sleds 548A, 548B, 548C and 548D that, if the drive bay assembly 540 were mounted to the ladder frame 542, would be positioned for extraction and insertion operations by an operator.

With reference to FIGS. 24A-24F, the drive bay assembly 540 is comprised of a housing 550 that defines four drive bays 552A, 552B, 552C and 552D that are each capable of accommodating a single drive 180. The housing 550 also defines a quad unit interface processor bay 554 for holding a Quad unit Interface Processor ("QIP") 668 that is used to receive power, control and data signals and distribute the signals to any drives residing in the housing 550. The housing 550 further includes a first mounting flange 556 with a first pair of notches 558A, 558B and a second mounting flange 560 with a second pair of notches 562A, 562B. The first pair of notches 558A, 558B and second pair of notches 562A, 562B respectively corresponds with a first pair of threaded holes 564A, 564B and a second pair of threaded holes 566A, 566B associated with each compartment of the ladder frame 542. To mount the drive bay assembly 540 to the ladder frame 542, the notches 558A, 558B of the mounting flange 556 and the notches 562A, 562B of the mounting flange 560 are respectively aligned with the threaded holes 564A, 564B, 566A and 566B of the ladder frame 542 and then bolts or screws are used to secure the drive bay assembly 540 to the ladder frame 542. Demounting of the drive bay assembly 540 from the ladder frame 542 is accomplished by removing the bolts or screws.

Figure 24A:
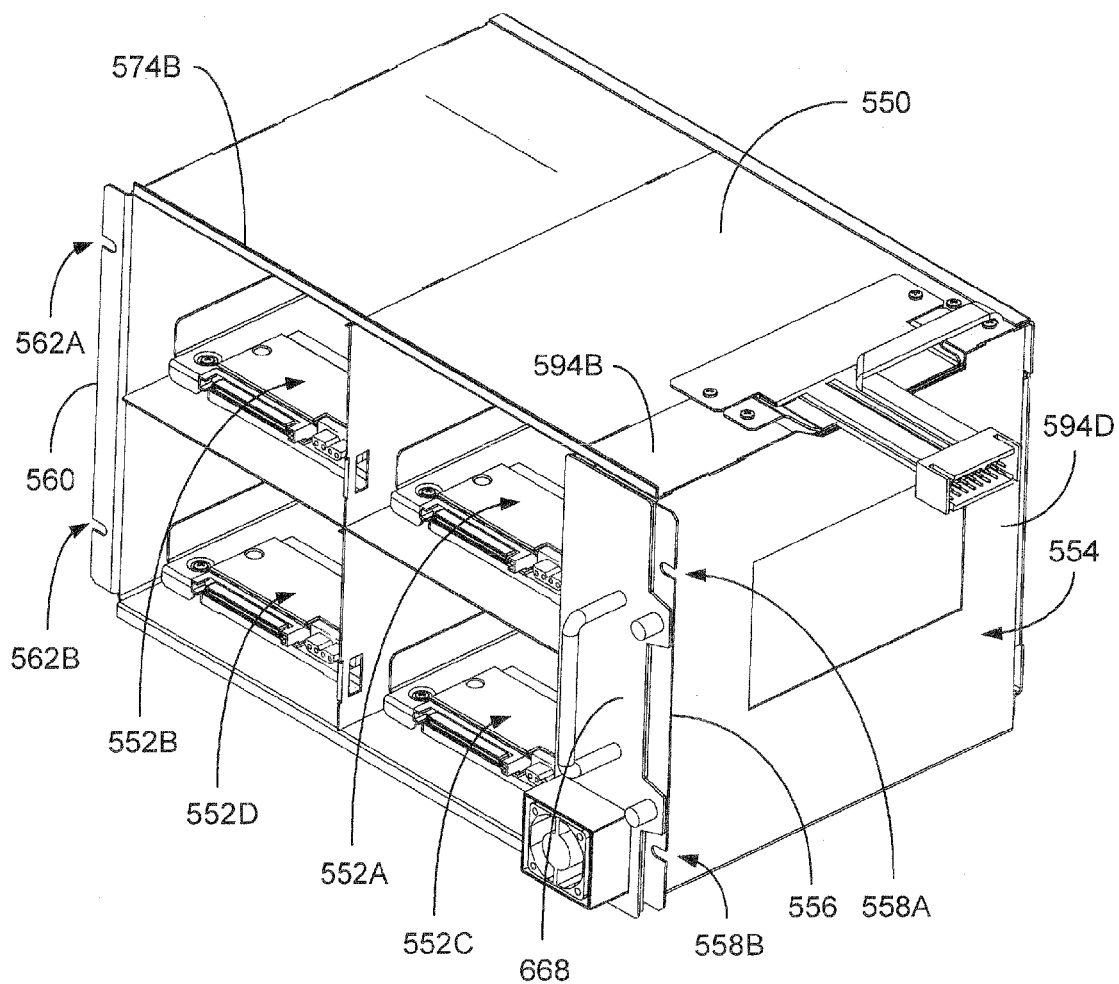
FIGS. 24A-24F illustrate features of the housing portion of the drive bay assembly.
Figure 24B:
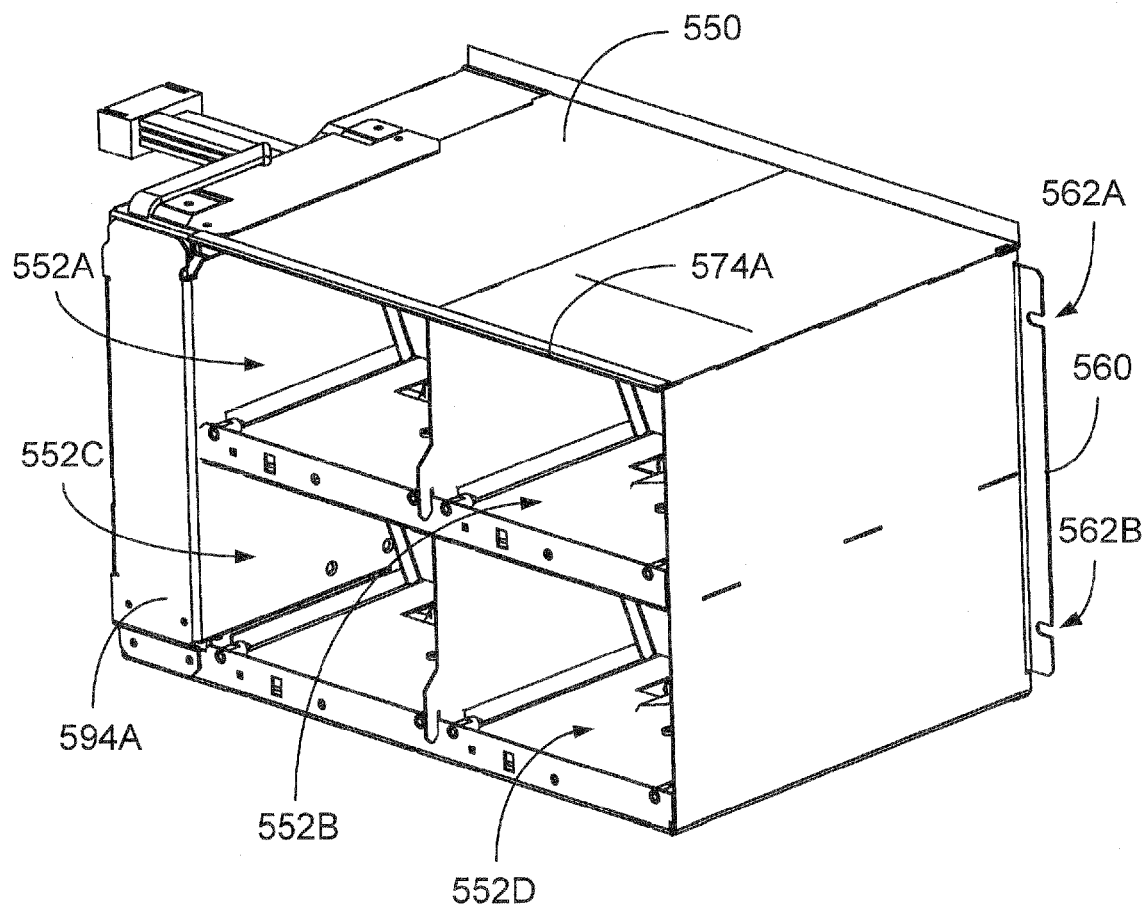
Figure 24C:
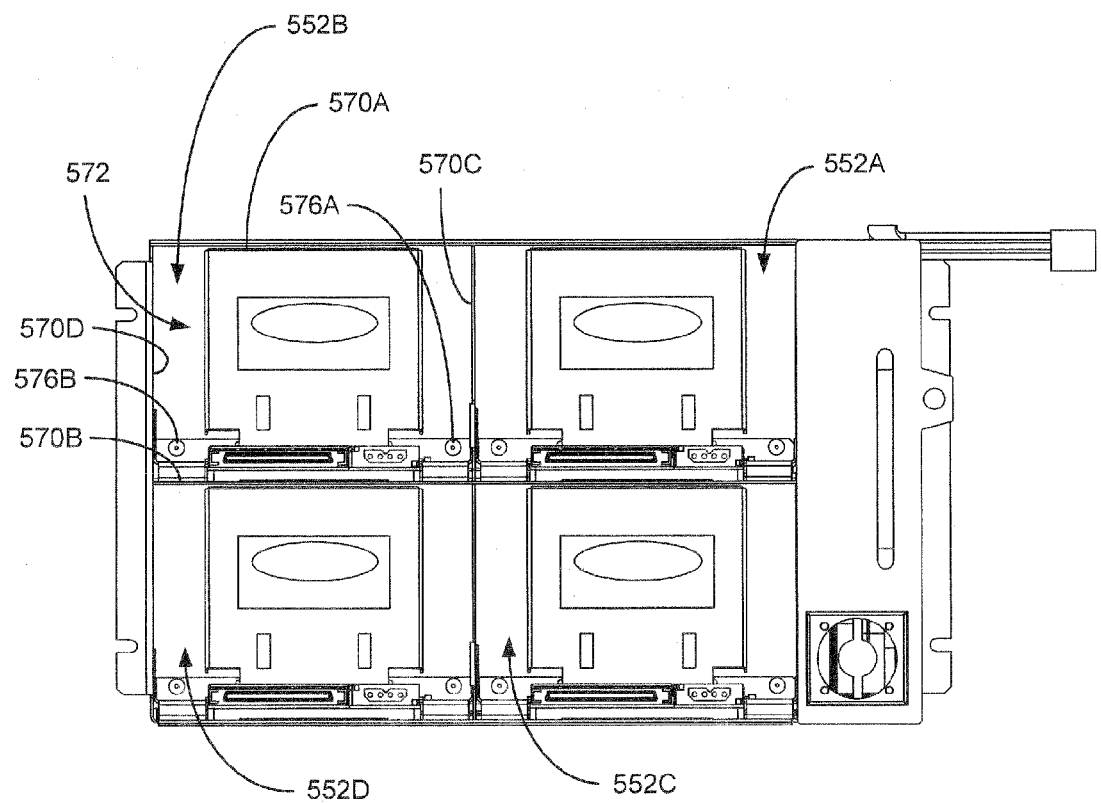
Figure 24D:
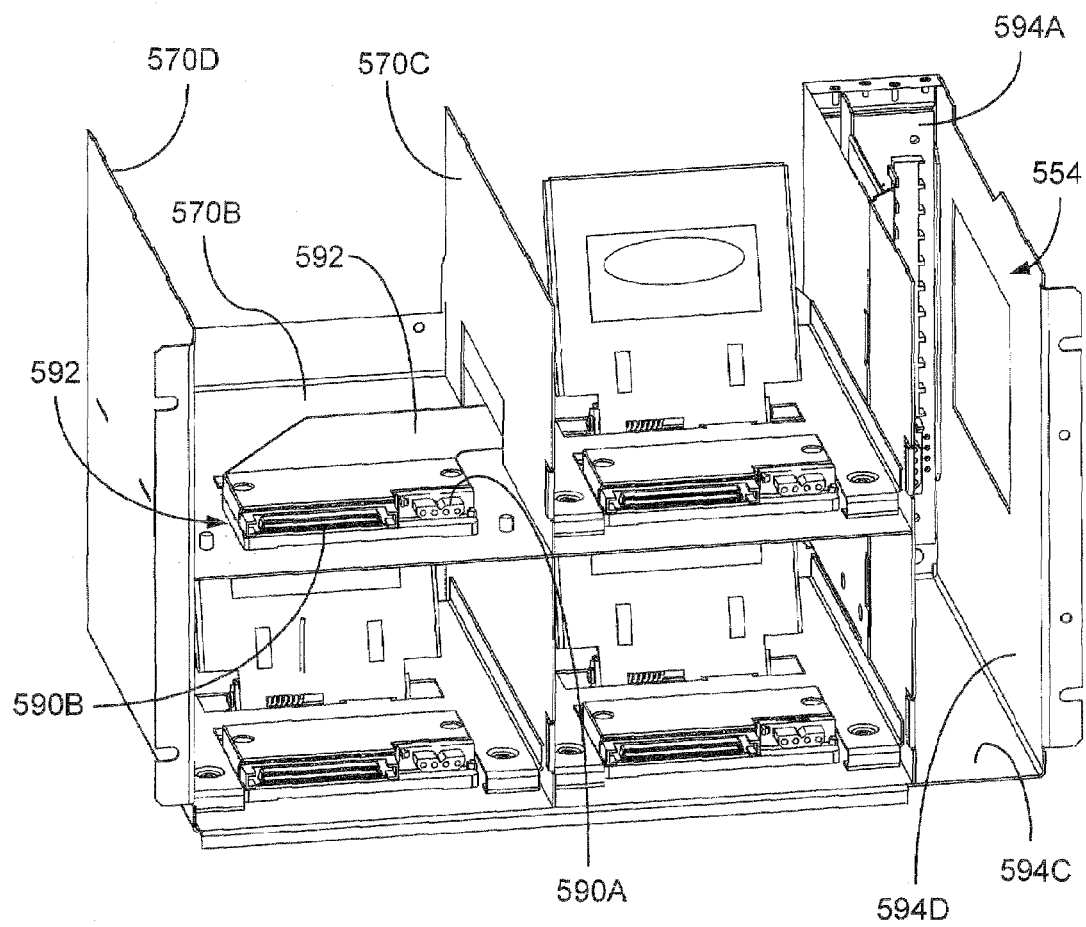
Figure 24E:
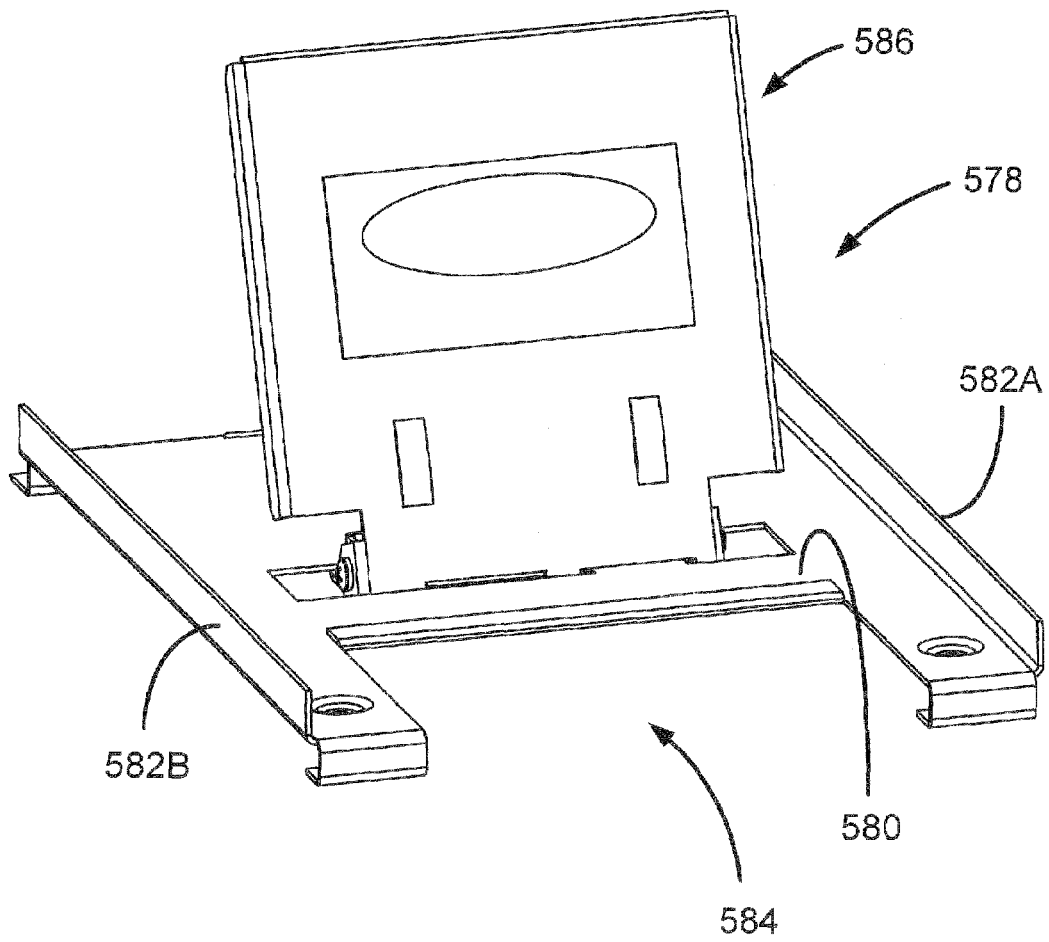
Figure 24F:
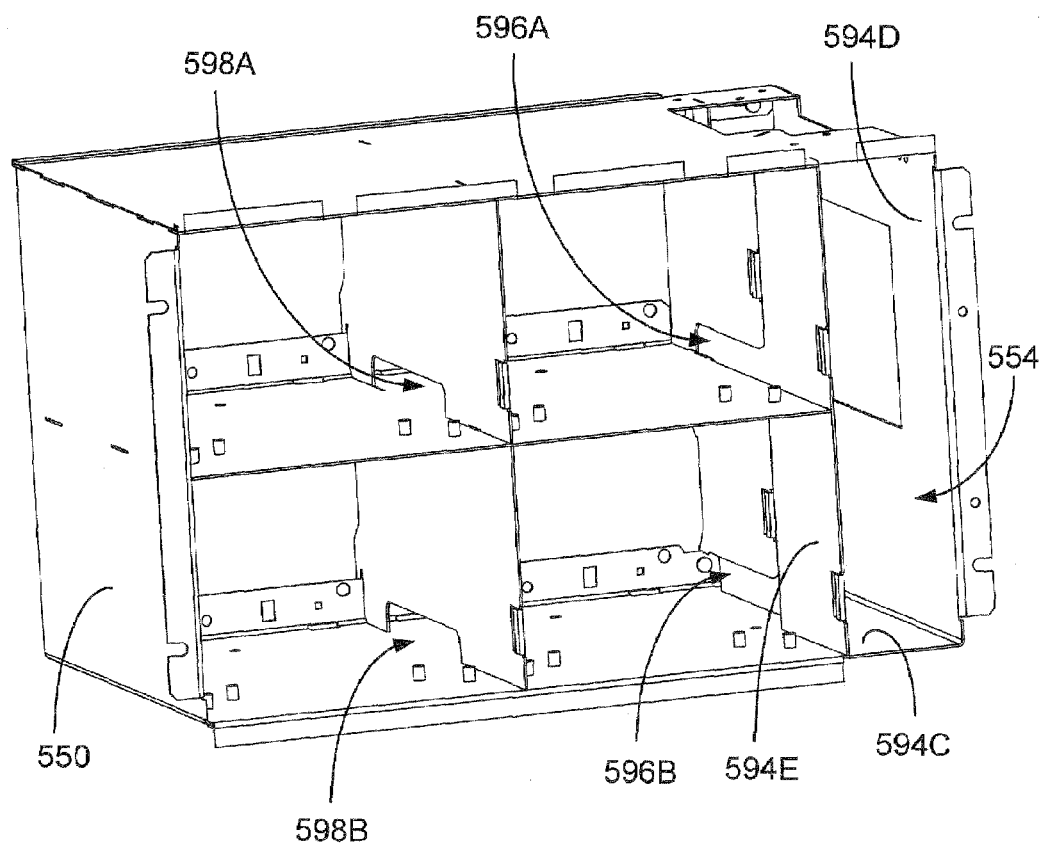

The drive bays 552A-552D are substantially identical to one another. Consequently, only drive bay 552B is described with the understanding that the description is also applicable to the other drive bays. Drive bay 552B is comprised of a top wall 570A, a bottom wall 570B, a first side wall 570C, and a second side wall 570D that define an interior space 572 for accommodating a sled 548B, a first open side 574A, and a second open side 574B. When the drive bay assembly 540 is mounted in the library 202, the first open side 574A is adjacent to the space within which the cartridge transport 214 operates and the second open side 574B is adjacent to the hinged door panel 348. Associated with the first open side 574A are a pair of alignment pins 576A, 576B that cooperate with a pair of alignment holes (not shown) associated with the sled 548B to align the sled 548B in the bay 552B. Associated with the bottom wall 570B is a sled guide 578. The sled guide 578 comprises a base member 580 and two side members 582A, 582B that cooperatively form a guide for a sled 548B. The base member 580 also defines a plug notch 584 that accommodates a plug, such as the plug assembly 588, that is also associated with the bottom wall 570B. The base member 580 is supported above the bottom wall 570B to form a space for accommodating the conductors, such as the plugs 590A and 590B, that provide power, control and data signals to a drive associated with a sled 548B. A spring-loaded flag 586 is attached to the base member 580. In operation, the spring associated with the flag 586 causes the flag 586 to be oriented as shown in FIG. 24C when no sled 548B is associated with the drive bay 552B. In this orientation, the flag 586 prevents or inhibits an operator from reaching through the drive bay 552B and into the space where the magazine transport 212 and/or cartridge transport 214 could possibly injure the operator. When a sled 548B is inserted into the drive bay 552B, the insertion of the sled causes the flag 586 to rotate towards the base member 580. Also associated with the bottom wall 570B is a plug assembly 588 that comprises a first female plug 590A for receiving one or more power-related signals for a drive 180, a second female plug 590B for receiving control and/or data signals for a drive 180, and a multi-conductor ribbon cable 592 for conveying the power-related signals and the control and/or data signals to and from the QIP 668.

The QIP bay 554 has a front side wall 594A, top side wall 594B, bottom side wall 594C, first side wall 594D, and second side wall 594E. The front side wall 594A accommodates a plug interface (not shown) that mates with a plug interface associated with the QIP 668 and with one or more plugs (not shown) that is/are connected to the ribbon cables associated with the plug assemblies of each of the drive bays 552A-552D. The second side wall 594E and the first side walls associated with the drive bays 552A, 552C respectively define gaps for the ribbon cables 592 associated with the plug assemblies 588 of each of the drive bays 552A-552D. The gap 596A receives the ribbon cables 592 associated with the plug assemblies 588 of drive bays 552A, 552B. The gap 596B receives the ribbon cables 592 associated with the plug assemblies 588 of drive bays 552C, 552D. The ribbon cable 592 associated with the drive bay 552B extends through a passageway 598A and under the base member 570B of the sled guide 578 associated with drive bay 552A to reach the gap 596A. Similarly, the ribbon cable 592 associated with the drive bay 552D extends through the passageway 598B and under the base member 570B of the sled guide 578 associated with drive bay 552C to reach the gap 596B.

Figure 25:
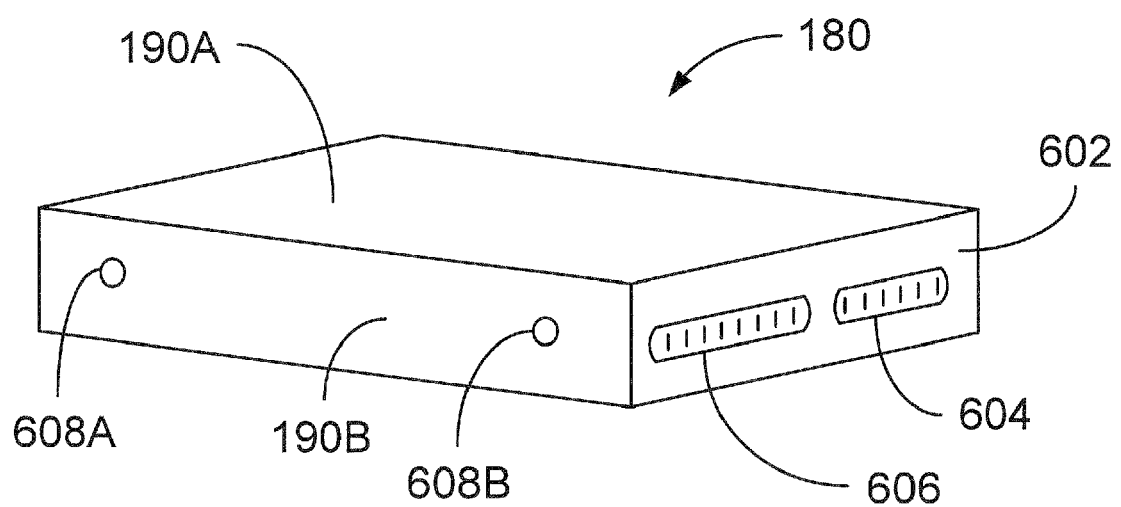
FIG. 25 illustrates the plug interface of a typical drive.

The drive bay assembly 540 further comprises the four sleds 548A, 548B, 548C and 548D, which are substantially identical to one another. Consequently, only sled 548A is described in combination with one drive bay 552A with the understanding that the description is also applicable to sleds 548B-548D and sleds 552B-D. As will be appreciated to one skilled in the art, one drive sled, such as 548A is capable of cooperating with any of the drive bays 552A-D. Before describing the sled 548A, the plug interface associated with a typical drive 180 is described. With reference to FIG. 25, the typical drive 180 (see FIGS. 5A-5C) comprises a back surface 602 that typically comprises a power plug 604 for receiving a power signal (typically, +5V and +12V signals) and a control/data plug 606 for receiving control signals and data signals. In the absence of the drive bay assembly 540, the drive 180 would be oriented in the library 202 such that the receptacle 186 would be accessible by the cartridge transport 214. Typically, the drive 180 would also be fixed to a frame within the library 202 with screws that engage a first pair of threaded holes 608A, 608B associated with the third surface 190B of the drive and a second pair of threaded holes (not shown) associated with the opposite surface of the drive 180. In such a situation, removal of the drive 180 from the library 202 would require that: (a) the cable that provides power to the drive 180 be disconnected from the power plug 604, which typically involves unscrewing screws or unlatching latches in addition to manipulating the cabling; (b) the cable that provides control and data signals to the drive 180 be disconnected from the control/data plug 606, which also typically involves unscrewing screws or unlatching latches in addition to manipulating the cabling; and (c) the screws connecting the drive 180 to the sled 548A be removed.

With the foregoing description of the plug interface of a typical drive 180 and the manner in which the drive 180 is typically fixed in place in a library 202 in mind, the sled 548A generally serves to: (a) provide a structure to which a drive 180 can be fixedly mounted; and (b) provide a plug interface for the drive 180 that faces the opposite direction from plug interface associated with the drive 180. As a consequence, when the sled 548A is used in combination with the drive bay 552A or any other drive bay 552B-D of the housing 550, a drive 180 held by the sled 548A can be removed from the library 202 without having to undo screws or other fasteners, as required by the conventional approach. Further, when the sled 548A and an associated drive 180 are removed from the library 202, the electrical connections with the drive 180 are severed by removing the sled 548A from the drive bay 552A. Conversely, a drive 180 can be inserted into the library 202 using the sled 548A and the drive bay 552A without having to manipulate screws or fasteners in the manner required by the conventional approach. Further, during such an insertion, the electrical connections for the drive 180 are established by inserting the sled 548A into the drive bay 552A.

Figure 26A:
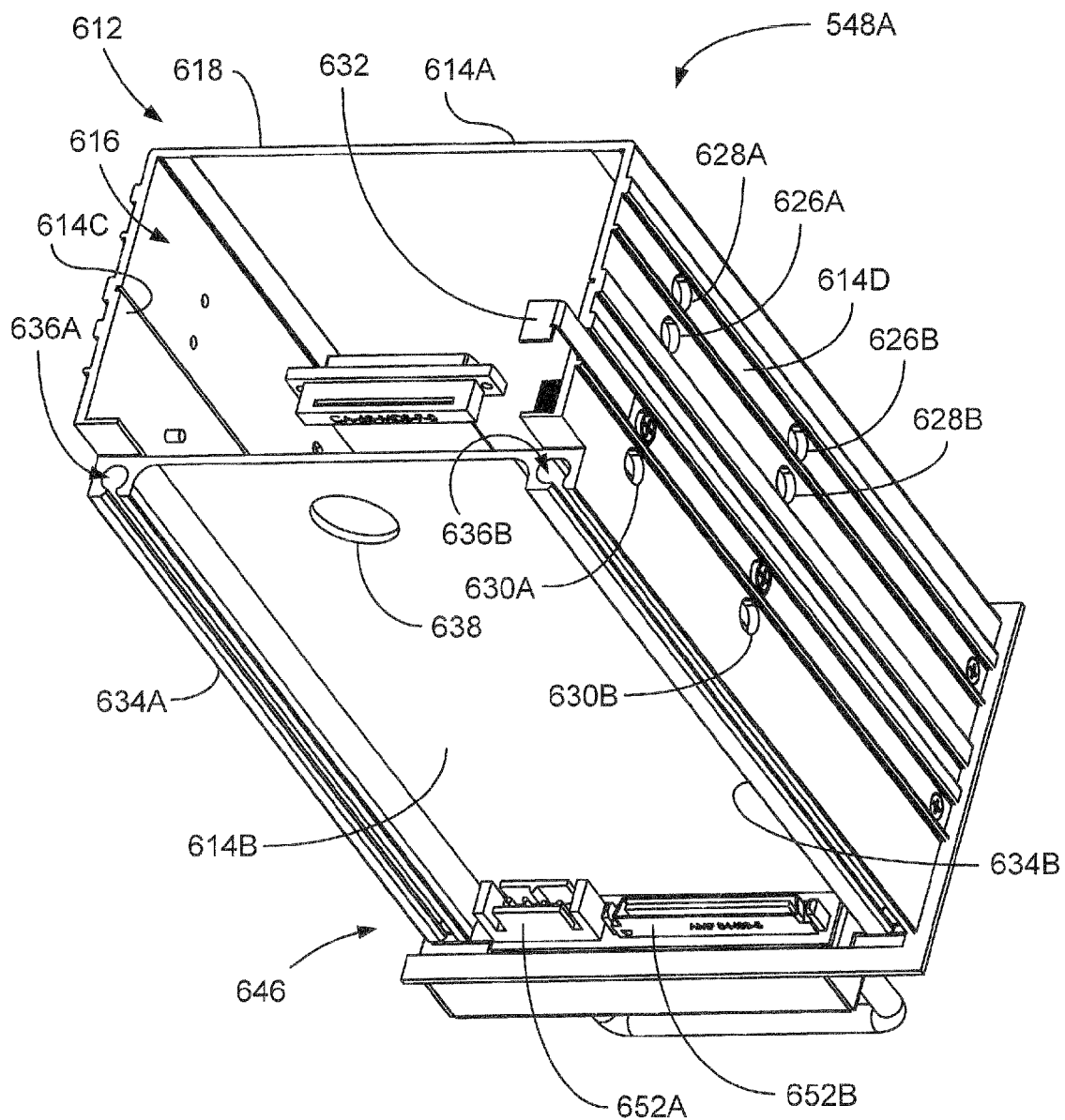
FIGS. 26A-26C illustrate the sled portion of the drive bay assembly.
Figure 26B:
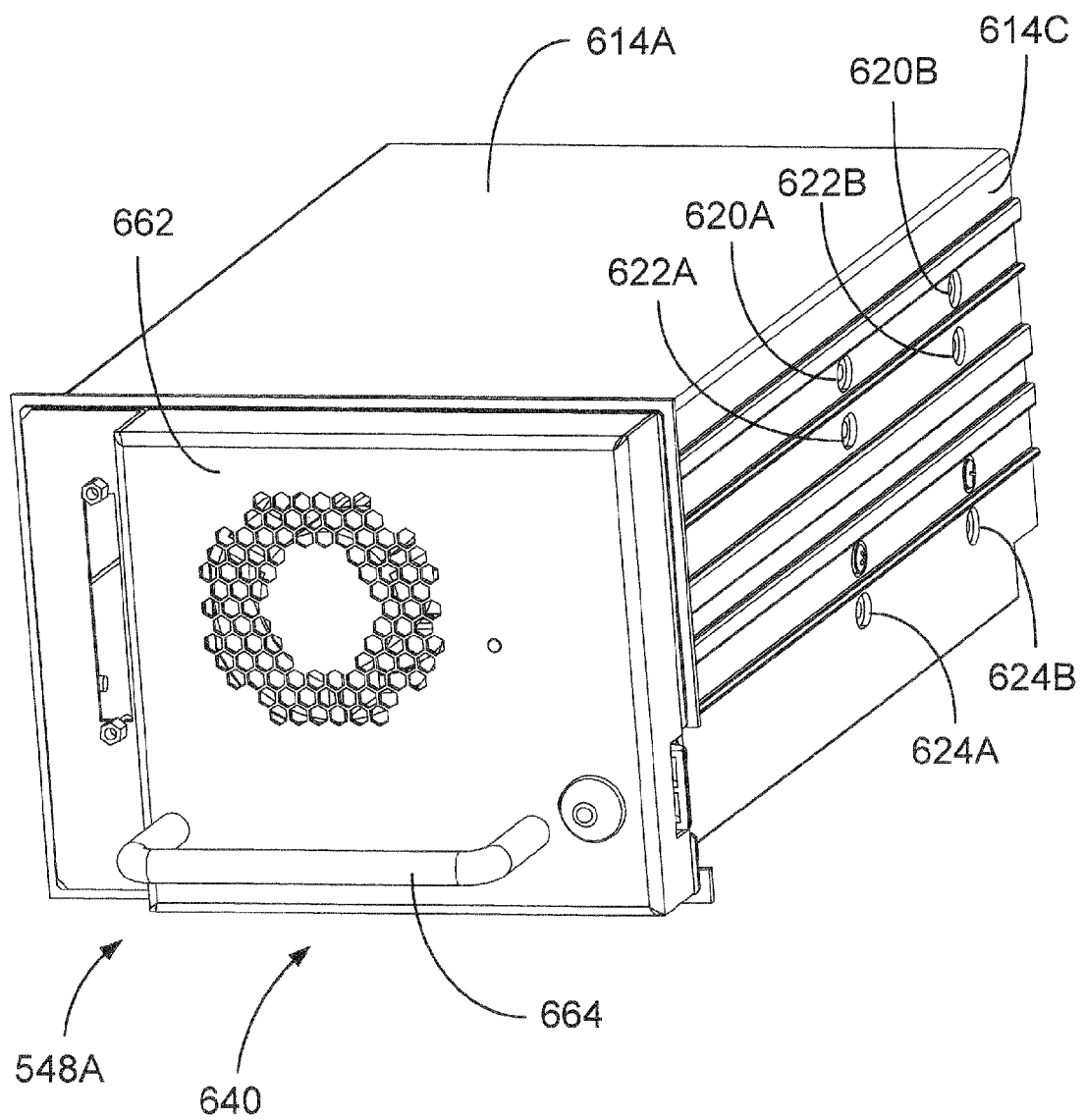
Figure 26C:
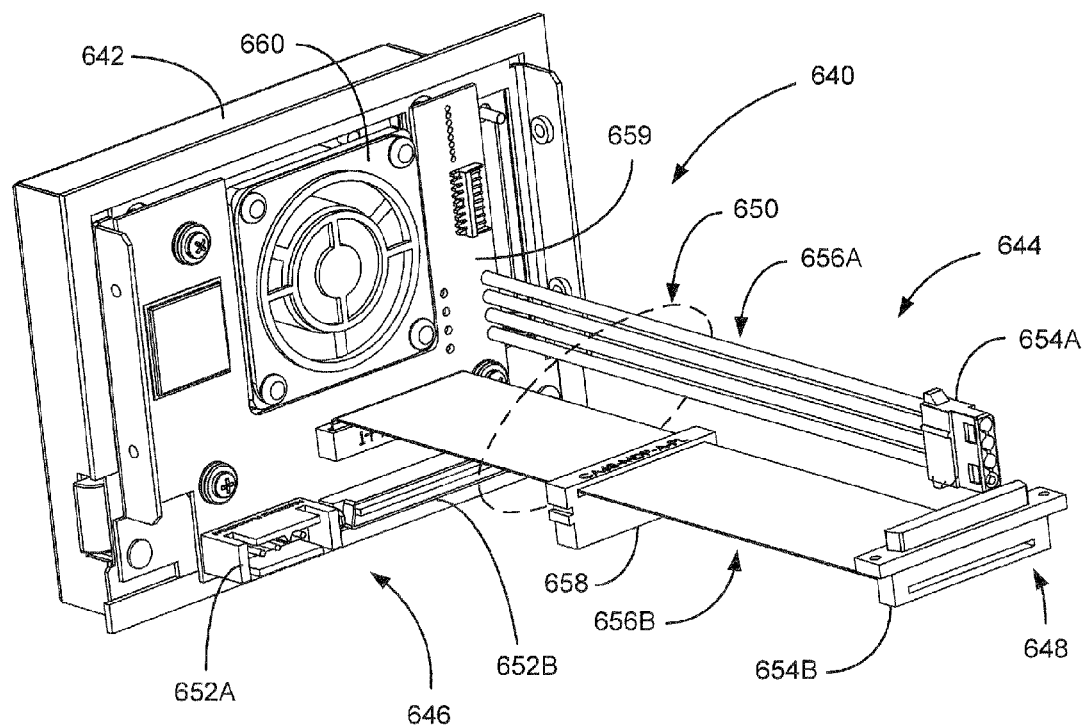

With reference to FIGS. 26A-26C, the sled 548A comprises a housing 612 that is capable of accommodating a full-height LTO, SAIT or DLT tape drive or two, half-height LTO, SAIT or DLT tapes drives. The housing 612 comprises a top wall 614A, bottom wall 614B, first side wall 614C, and second side wall 614D that define an interior space 616 for holding a full-height drive or two, half-height drives and an opening 618 for receiving the drive or drives into the interior space. Associated with the first side wall 614C are three pairs of holes 620A, 620B, 622A, 622B, 624A and 624B. Similarly, associated with the second side wall 614D are three pairs of holes 626A, 626B, 628A, 628B, 630A and 630B. These holes 620A, 620B, 622A, 622B, 624A, 624B, 626A, 626B, 628A, 628B, 630A and 630B allow most, if not all, of the presently known LTO, SAIT and DLT tape drives, both full-height and half-height, to be mounted in the housing 612. Also, associated with the second side wall 614D is a reference flag 632 for use by the magazine transport 212 and/or the cartridge transport 214 in locating a sled 548A and any drive held by the sled 548A. Associated with the bottom wall 614B are a pair of rails 634A, 634B. The rails 634A, 634B are spaced so as to be received by the guide formed by the base member 580 and two side members 582A, 582B of the sled guide 578. The rails 634A, 634B respectively include receptacles 636A, 636B. The receptacles 636A, 636B respectively receive the alignment pins 576A, 576B when the sled 548A is properly inserted into the drive bay 552A. A hole 638 that provides access to a "tape wind" screw of a drive 180 located in the housing 612 is also associated with the bottom wall 614B of the housing 612.

The sled 548A further comprises a back wall assembly 640 that adjoins the top wall 614A, bottom wall 614B, first side wall 614C, and second side wall 614D. The back wall assembly 640 comprises a housing 642 that supports a plug structure 644 for connecting a drive 180 held by the housing 612 with the plug assembly 588 associated with any one of the drive bays 552A-552D. The plug structure 644 comprises: (a) a first plug interface 646 that is located to engage the plug assembly 588 associated with the drive bay 552A when the sled 548A is properly aligned and inserted into the drive bay 552A; (b) a second plug interface 648 for engage the plug interface associated with the back surface 602 of a drive 180; and (c) conductors 650 extending between the first and second plug interfaces 646, 648. More specifically, the first plug interface 646 comprises a first power plug 652A and a first data/control plug 652B that are respectively located to engage the power plug 590A and data/control plug 590B of the plug assembly 588 when the sled 548A is properly inserted into the drive bay 552A. The second plug interface 648 comprises a second power plug 654A and a second data/control plug 654B for respectively engaging the power plug 604 and data/control plugs 606 associated with the back surface 602 of a drive 180. The conductors 650 comprise: (a) power conductors 656A that connect the first power plug 652A and the second power plug 654A; and (b) data/control conductors 656B that connect the first data/control plug 652B and the second data/control plug 654B. For accommodating two, half height drives, the second plug interface 648 further comprises an additional data/control plug 658 and an additional power plug (not shown) that passes through holes 659 of the housing 642.

Also associated with the housing 642 is a fan 660 that is used to cool any drive 180 located within the housing 612 by causing air to move from the interior space 616 of the housing 612 to the exterior of the housing 612 via a grill 662. Further associated with the housing 642 is a handle 664 that facilitates insertion/removal of the sled 548A into/from the drive bay 552A.

By way of example, use of the drive bay assembly 540 comprises mechanically associating a drive 180 with a sled 548 by using screws to attach the drive 180 to the housing 612 and electrically associating the drive 180 with the sled 548 using the second plug interface 648. Once the drive 180 has been mechanically and electrically associated with the sled 548A, the drive 180 can be associated with the library 202 by inserting the sled 548A into one of the drive bays 552A-552D, such as 552A for example, and dissociated from the library 202 by removing the sled 548A from the drive bay 552A.

The drive bay assembly 540 further comprises a QIP 668 that is housed in the QIP bay 554 and operates to distribute power, control signals and data to each of the drive bays 552A-552D. The QIP 668 comprises a back panel 670 with a handle 672 that facilitates insertion/extraction of the QIP 668 into/from the QIP bay 554.

It will be appreciated by one skilled in the art that the drive bay assembly 540 suitable is capable of numerous modifications. The following sets forth, with limitation, some possible modifications. For instance, a drive bay assembly 540 is feasible in which the drive bay housing 550 is not susceptible to being readily mounted and demounted from the frame 542 of a library 202. Further, a drive bay assembly 540 is feasible that has a different number of drive bays, such as the drive bay 552A. Additionally, a drive bay assembly 540 that is adapted to hold one or more drives 180 in an orientation other than a horizontal orientation is feasible in one embodiment. Further, a drive bay, such as the drive bay 552A, that accommodates different types of drives, such as disk drive, is also practicable. In yet another alternative embodiment, a drive bay 540 without a QIP bay 554 and/or QIP 668 is likewise feasible. Further, it should also be appreciated that a drive bay assembly 540 is not required for a functional magazine-based data cartridge library 202.

Generally, the power supply system 216 provides DC power to the drives 180 using a flat conductor 686 that has a substantially rectangular cross-section, rather than a conventional conductor that has circular cross-section. The use of a flat conductor 686 allows the space within a library 202 to be more efficiently used or used to accommodate more cartridges 224 and/or more drives 180.

With reference to FIGS. 27A-27D, the power supply system 216 comprises a power supply 217 comprised of a box-like housing structure with a top side 676A, bottom side 676B, front side 676C, back side 676D, first side 676E, and second side 676F. Associated with the front side 676C are seven power supply bays 678 each capable of accommodating a sub-power supply (not shown). Generally, the power supply 217 includes a sub-power supply in one of the bays 678 for providing DC power to elements in the library 202 other than the drives 180. The six other bays 678 are populated with sub-power supplies depending on the number of drive bay assemblies 540 that are attached to the ladder frame 542. Generally, one sub-power supply is required for each drive bay assembly 540 attached to the ladder frame 542. Also associated with the front side 676C of the power supply 217 is a pair of AC receptacles 680, with each receptacle 680 capable of accommodating an AC plug through which AC power is provided to the power supply 216 for conversion to DC power. Also associated with the front side 676C, is a set of breakers 682 that operate to sever the connection with the source of AC power when the power supply 216 is in an undesirable operating state, such as when the power supply 216 is drawing too much current from the AC source. The first side wall comprises a slot for accommodating an embodiment of a flat electrical power conductor 686 that has a first flat exterior face 686A and a second flat exterior face 686B that extends substantially parallel to the first flat exterior face 686B.

The flat, electrical power conductor 686 extends vertically and adjacent to one side of the ladder frame 542. In the illustrated embodiment, only one vertical standard 688 of the ladder frame 542 is shown. The flat, electrical power conductor 686 is supported by a channel member 690, which is attached to the ladder frame 542. The channel member 690, in addition to supporting the flat, electrical power conductor 686, also supports six power plugs 692A,692B, 692C, 692D, 692F and 692F, one plug for each of the compartments 544A, 544B, 544C, 554D, 554E and 544F of the ladder frame 542. Each compartment 544A-544F of the ladder frame 542 is capable of accommodating a drive bay assembly 540 that, in turn, is capable of accommodating up to four full height drives and up to eight half-height drives.

The flat, electrical power conductor 686 is attached to the channel member 690 using a plurality of hole hangers 694 that are attached to the conductor 686 and that each fit over a stud 696 extending from the channel member 690. The electrical connection between the flat, electrical power conductor 686 and each of the plugs 692A-692F is achieved with taps 698A, 698B, 698C and 698D that are each connected to one of the planar electrical conductors comprising the flat, electrical power conductor 686. To elaborate, any of the drives 180 that can be associated with a drive bay assembly 540 and the QIP 668 associated with a drive bay assembly 540 presently require a +5V signal, a +12V signal, and two ground paths (one for each of the voltage signals). Consequently, the flat, electrical power conductor 686 is a laminate of four electrical conductors, one for each of the two voltage signals and one for each of the two ground paths. If the library 202 is modified so that different electrical signals are required, the flat, electrical power conductor 686 can be modified accordingly.

Figure 27A:
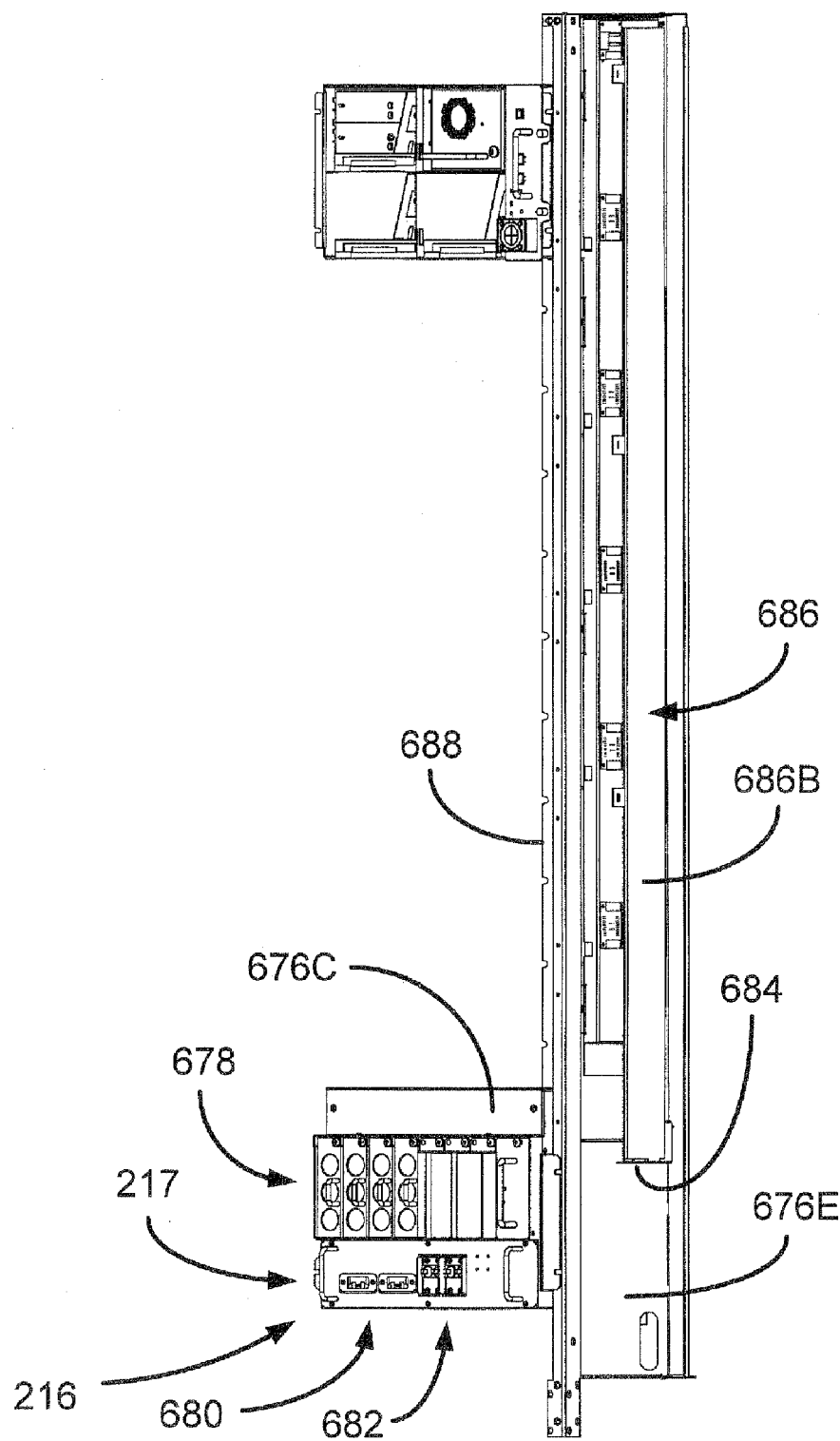
FIGS. 27A-27E illustrate an embodiment of a power supply system that utilizes a flat power conductor to provide DC power to the drives in the library.
Figure 27B:
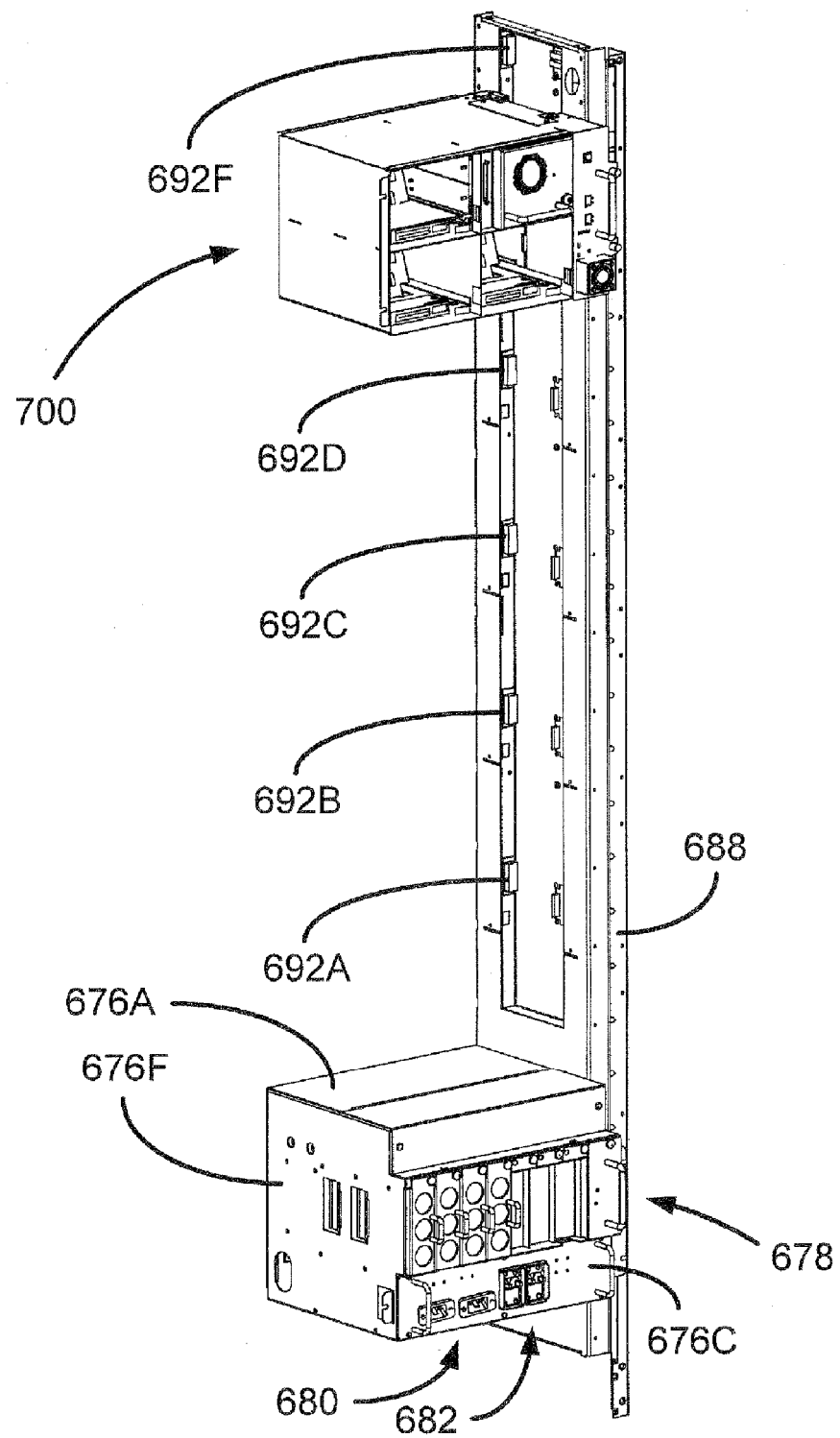
Figure 27C:
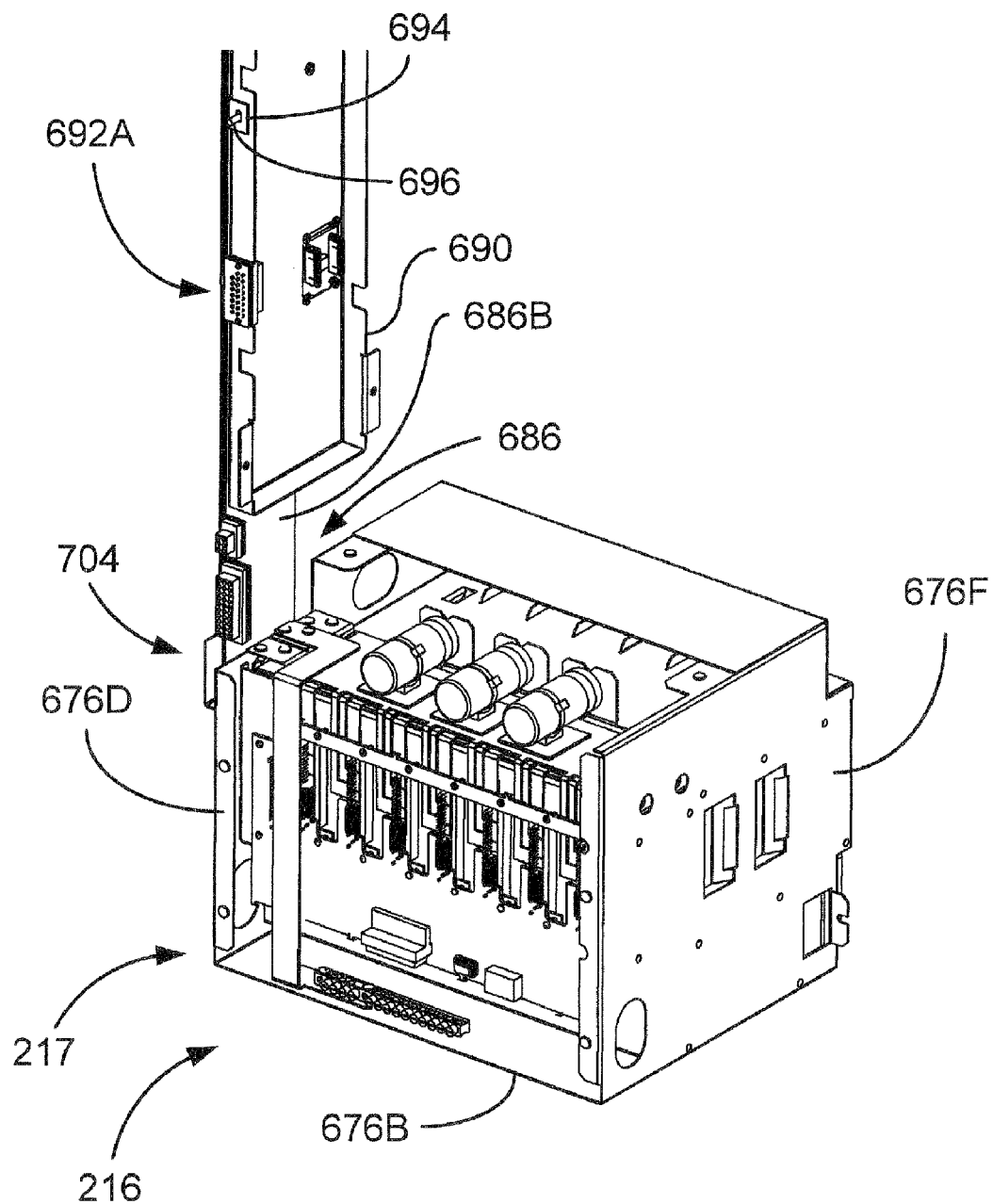
Figure 27D:
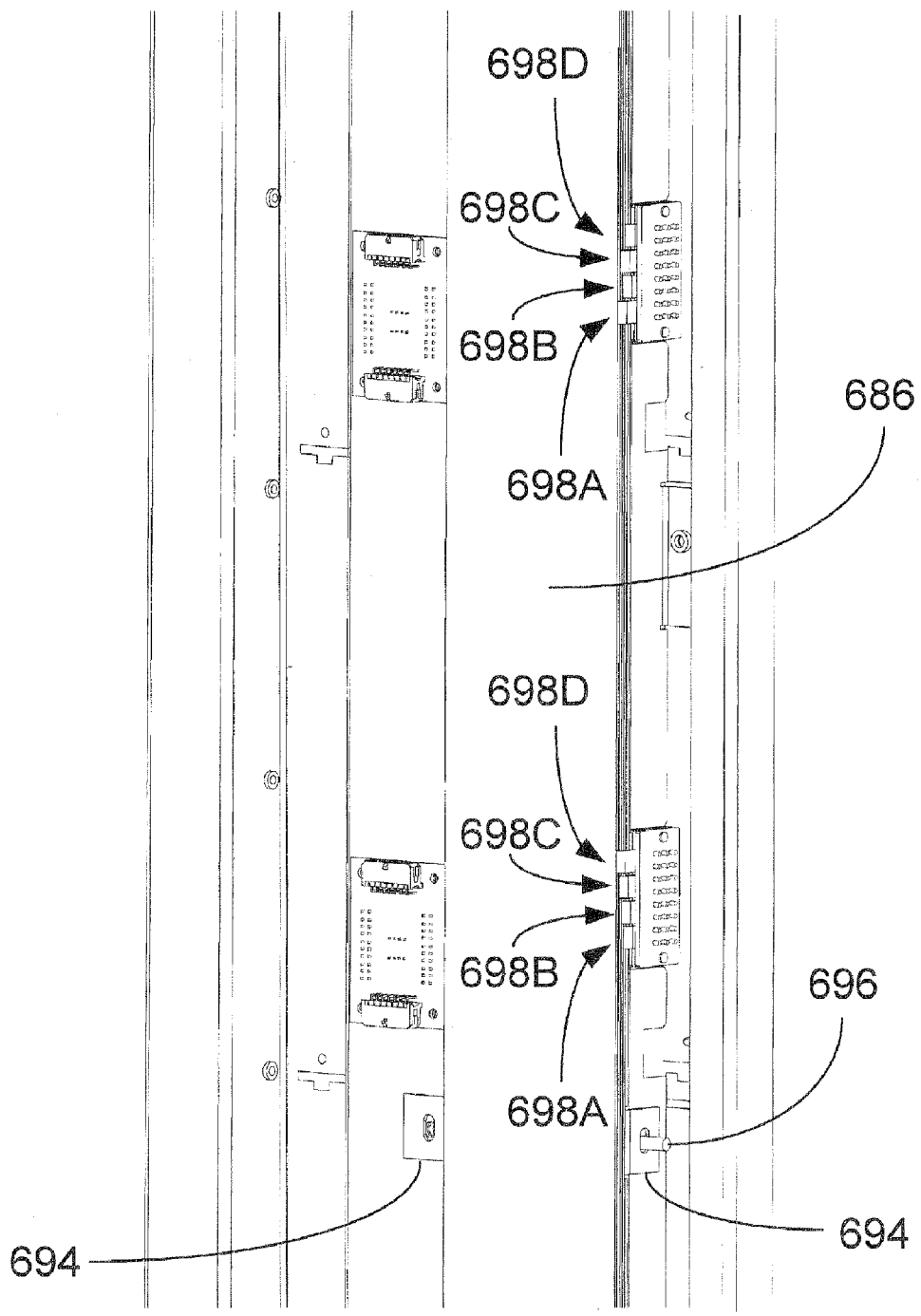
Figure 27E:
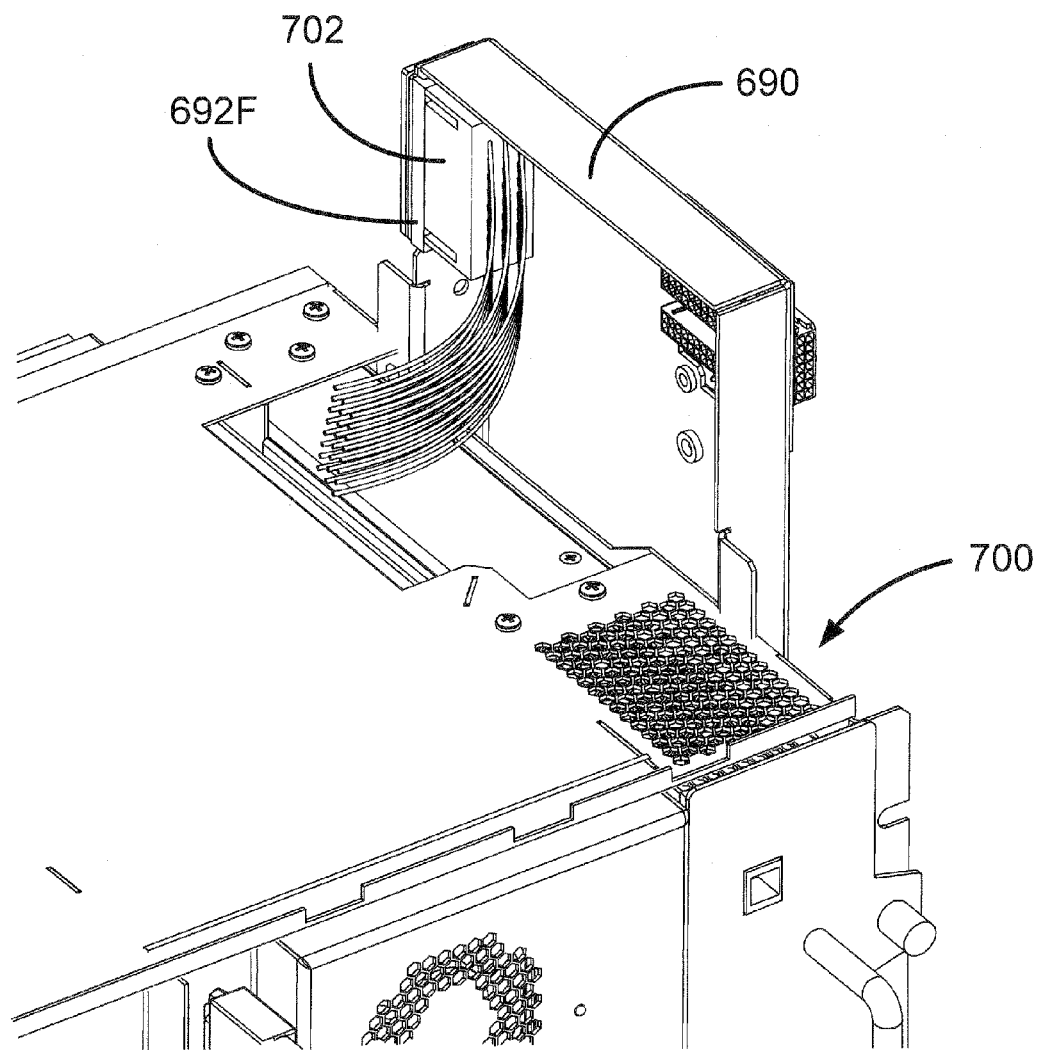

As shown in FIG. 27E, an electrical power connection is established between the flat, electrical power conductor 686 and a drive bay assembly 700 in compartment 544F using a plug 702 that is associated with the QIP 668 of the drive bay assembly 700 and that mates with the plug 692F. An electrical connection is established between the flat, electrical conductor 686 and the power supply 216 by a tap assembly 704 that extends between the conductor 686 and the points in the power supply 216 that provide the necessary voltage signals and ground paths. It should be appreciated that the tap assembly 704 comprises a horizontally extending flat power conductor.

The distance between the first and second flat external faces 686A, 686B of the flat, electrical power conductor 686 is approximately 0.32 inches. In contrast, if a conventional round cable or bundled group of round cables were designed to be able to provide power to the same twenty-four drives 180, the cable or group of cables would have a cross-sectional measurement on the order of 3-4 inches.

It should be appreciated that the substantially rectangular cross-section shape of the flat, electrical power conductor 686 is complementary to the shapes of most of the other elements in the library 202. As a consequence, the flat, electrical power conductor 686 facilitates the layout of the library 202. In this regard, the flat surfaces 686A, 686B are located so as extend substantially parallel or perpendicular to many of the surfaces associated with elements residing in the library 202. For instance, the flat surfaces 686A, 686B extend substantially parallel or perpendicular to the exterior surfaces of the housing 550 of the drive bay assembly 700. A horizontally extending flat, electrical power conductor, should one be needed, is also likely to facilitate the layout of a library 202.

It will be appreciated by one skilled in the art that the flat, electrical power conductor 686 provides benefits in addition to spatial and/or layout related benefits. Namely, the power conductor 686 has a large capacitance that allows power to be provided to the drives in a highly responsive manner. Further, "noise" generated by the electrical power conductor 686 is lower than conventional means. In addition, relative to the conventional round conductors, the flat electrical power conductor 686 utilizes fewer connectors and/or plugs resulting in additional noise reduction. It will be further appreciated to one skilled in the art that a flat, electrical power conductor 686 can also be applied to a cartridge-based library.

Figure 7B:
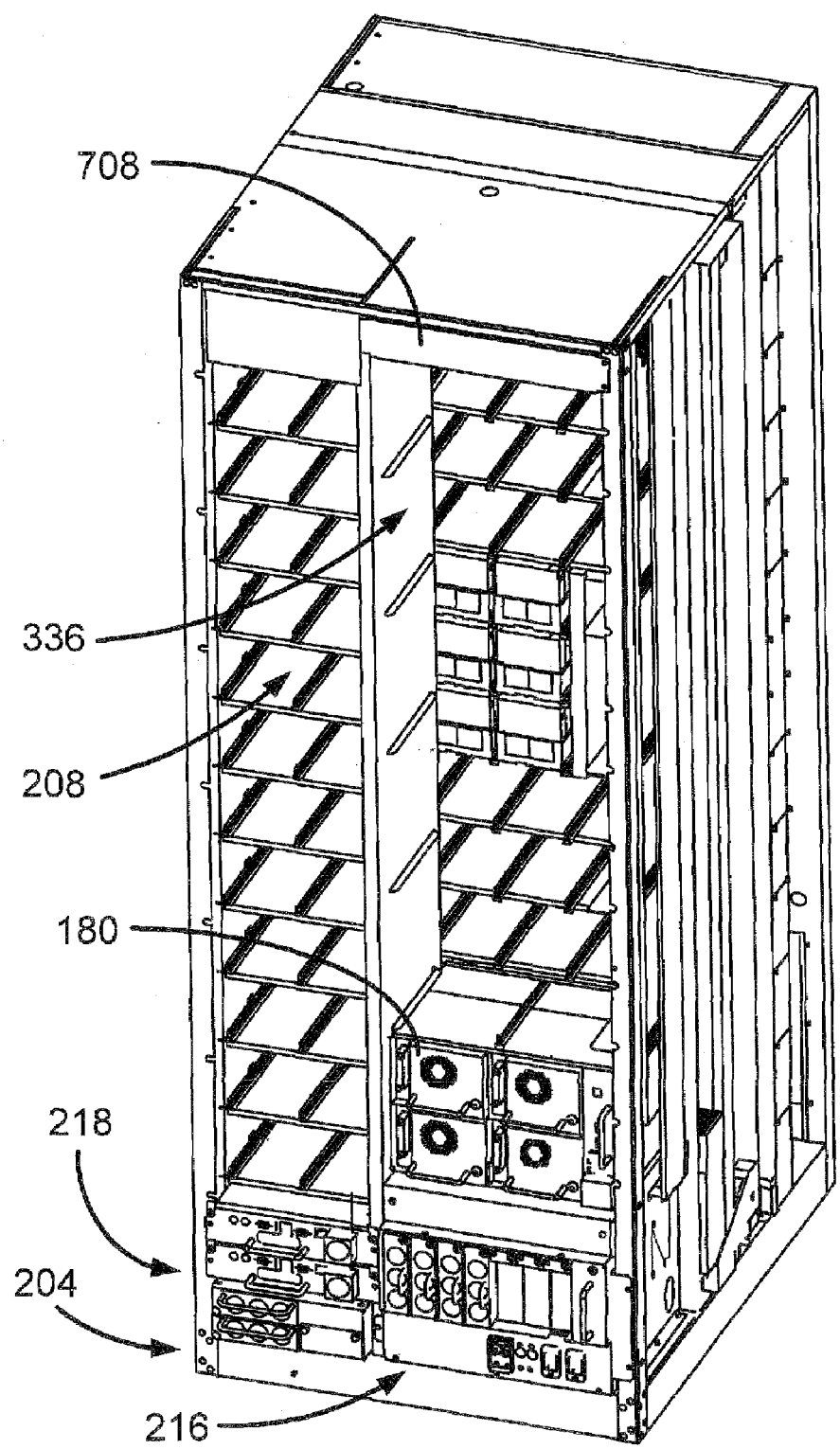
FIG. 7B is a perspective view of the embodiment of the library shown in FIGS. 6A-6C with certain elements removed, including all but one drive bay, and populated with a few magazines.

With reference to FIGS. 7B and 23C, the user definable space 336 is a space in which the operator of the library 202 has a choice as to the identity of the functional element or elements of the library 202 that occupies all or a portion of the space.

The extent of the user definable space 336 of the library 202 is largely defined by the ladder frame 542. To elaborate, the user definable space 336: (a) extends vertically from approximately the top side 676A of the power supply 216 (which is located immediately under the lower-most compartment of the ladder frame 542, namely, compartment 544A) to the bottom side of cross-member 708; and (b) extends laterally between first and second sides 710A, 710B of the ladder frame 542. With reference to FIG. 16, the depth of the user definable space 336 extends from plane 330B to a substantially parallel plane located adjacent to the back surface 340B of the library 202. Further, the ladder frame 542 substantially divides the user-definable space 336 into six, equally sized spaces, namely, the compartments 544A-544F.

As previously noted, each of the compartments 544A-544F is capable of accommodating one of the drive bay assembly 540. Moreover, the ladder frame 542 and the first and second mounting flanges 556, 560 facilitate the mounting and demounting of the drive bay assembly 540 from any one of the compartments 544A-544F. To reiterate, mounting of the drive bay assembly 540 in one of the compartments 544A-544F is accomplished by aligning: (a) the first pair of notches 558A, 558B associated with the first mounting flange 556 of the drive bay assembly 540 and the first pair of threaded holes 556A, 556B associated with a selected one of the compartments 544A-544F; and (b) the second pair of notches 562A, 562B associated with the second mounting flange 560 of the drive bay assembly 540 and the second pair of threaded holes 566A, 566B associated with the selected one of the compartments 544A-544F. Once the notches are aligned, bolts or screws are then used to secure the drive bay assembly 540 to the ladder frame 542. Demounting of the drive bay assembly 540 from the ladder frame 542 is accomplished by first removing the bolts or screws, and then removing the drive bay assembly 540 from the ladder frame 542.

Figure 28A:
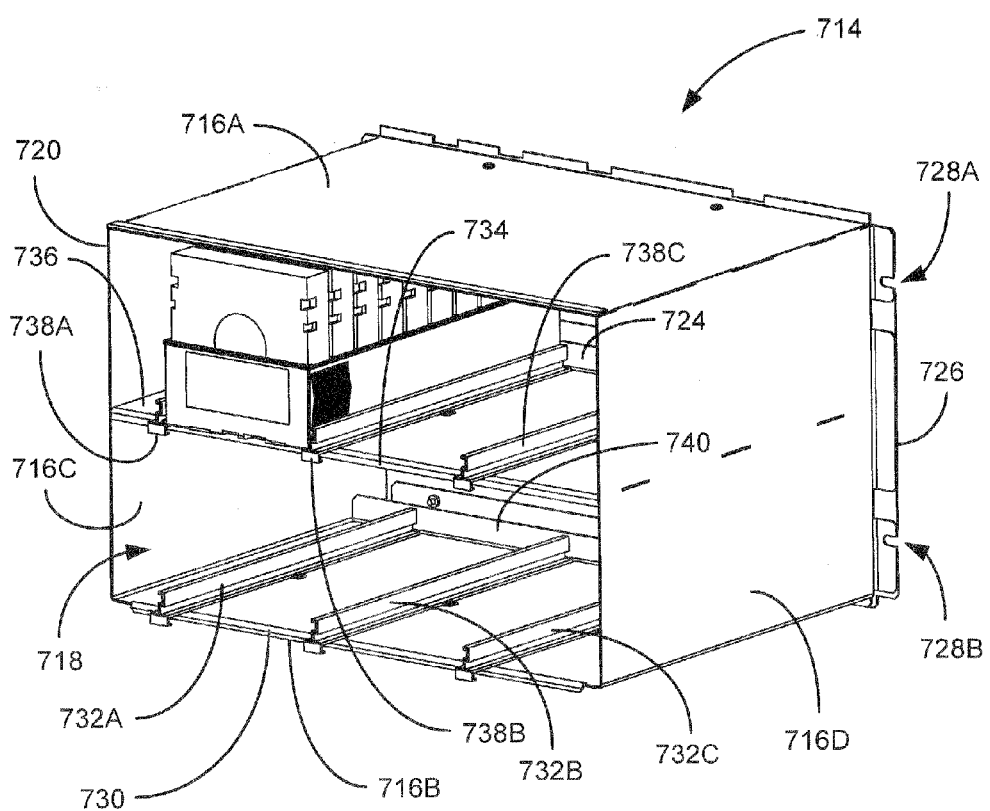
FIGS. 28A-28B illustrate an embodiment of a magazine bay assembly.
Figure 28B:
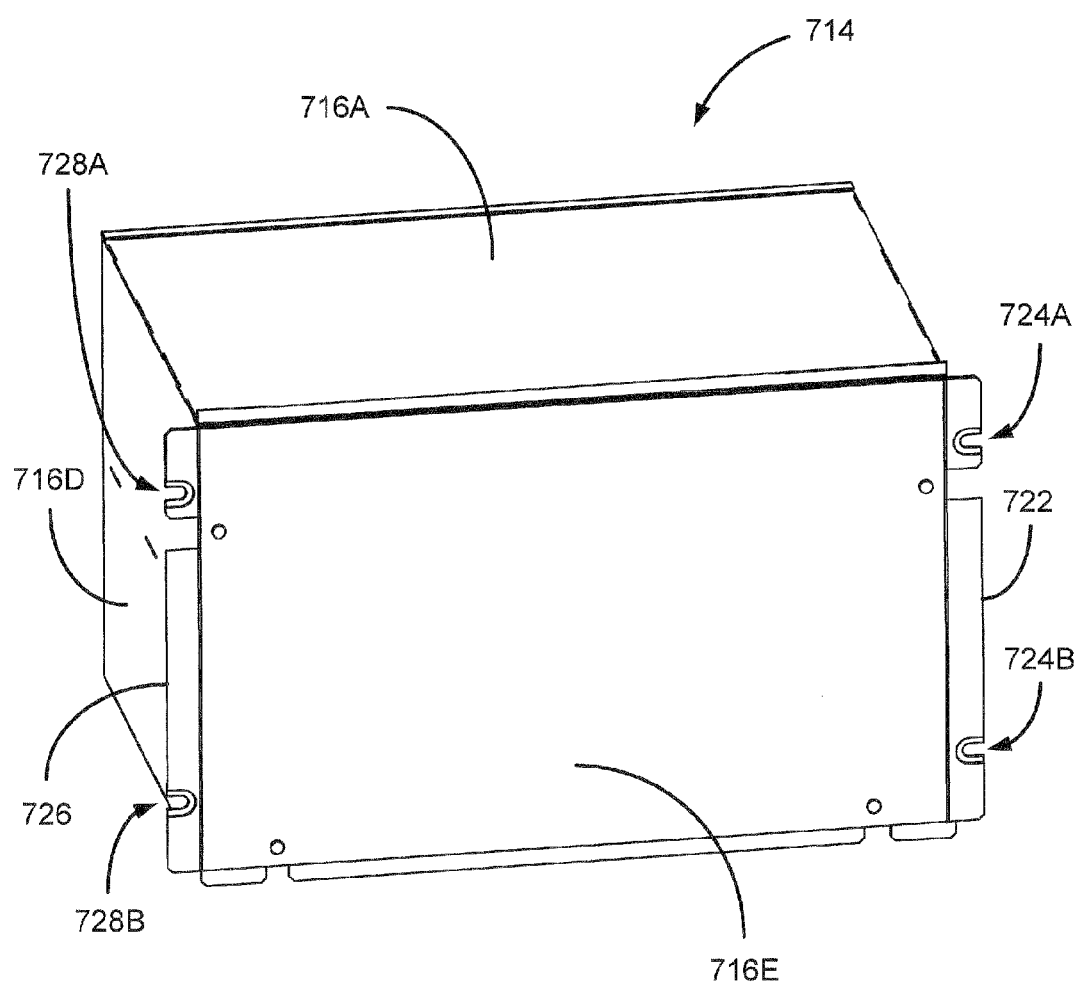

With reference to FIGS. 28A-28B, each of the compartments 544A-544F is also capable of accommodating a magazine bay assembly 714 that provides two shelves, namely first and second shelves 730 and 734, that are each capable of accommodating two magazines 270. The magazine bay assembly 714 comprises a housing with a top wall 716A, a bottom wall 716B, a first side wall 716C, a second side wall 716D, and a back wall 716E that define an interior space 718 for holding up to four magazines 270. The top wall 716A, bottom wall 716B, first side wall 716C and second side wall 716D also define an opening 720 through which any magazines 270 can be inserted into and removed from the interior space 718.

The magazine bay assembly 714 further comprises a first mounting flange 722 with a first pair of notches 724A, 724B, and a second mounting flange 726 with a second pair of notches 728A, 728B. Mounting of the magazine bay assembly 714 to the ladder frame 542 and demounting the magazine bay assembly 714 from the ladder frame 542 are done in substantially the same manner as the drive bay assembly 540 is mounted and demounted from the ladder frame 542. Consequently, the mounting and demounting of the magazine bay assembly 714 is not described further.

The magazine bay assembly 714 further comprises a first shelf 730 capable of accommodating up to two magazines 270. The first shelf 730 is formed from the bottom wall 716B and three cleats 732A, 732B and 732C that are each substantially identical to the previously described cleat 522A. The magazine bay assembly 714 further comprises a second shelf 734 that is also capable of accommodating up to two magazines 270. The second shelf 734 is formed from: (a) a planar member 736 that extends between and is attached to the first and second side walls 716C, 716D; and (b) three cleats 738A, 738B and 738C, that are each substantially identical to the previously described cleat 522A. The operation of each of the first and second shelves 730, 734 is substantially identical to the operation of the previously described shelf 518. Consequently, the operation of the shelves 730, 734 is not described. It should, however, be noted that located between the back wall 716E and the cleats 732A-732C is a bias element 740 that applies a force to the cleats 732A-732C that prevents the cleats 732A-732C from coming out of the holes (not shown) that receive the cleats 732A-732C in the bottom wall 716B. A bias element 742 performs the same function with respect to cleats 738A-738C. Such bias elements 742 are also present in the fixed shelving of the shelf system 208 in the library 202 and perform the same bias function.

Based on the foregoing, a user or operator is able to choose whether a drive bay assembly 540 or a magazine bay assembly 714 resides in each of the compartments 544A-544F associated with the user-definable space 336. Moreover, altering a choice is, due to the mounting structures employed, relatively easy. It will be appreciated by one skilled in the art that: (a) the user-definable space 336 is a fixed space; (b) the compartments 554A-F each have a fixed size, a fixed location and substantially the same size as the other compartments; and (c) the drive bay assembly 540 and the magazine bay assembly 714 are also of substantially of the same size. A number of modifications to the user-definable space 336 or alternative embodiments are feasible. Among the possible modifications or alternative embodiments are, without limitation, a user definable space that has an alterable size; compartments of varying number, location, and/or size; and/or assemblies for placing in the space that are of different sizes are feasible. Further, other mounting structures are feasible. For example, a ladder frame 542 or similar structure with a mounting structure that provides a high degree of flexibility as to the location that a module is mounted is feasible.

Generally, the magazine transport 212 is comprised of: (a) a magazine picker 880 that operates to move a magazine 270 to and from a magazine storage location, such as a shelf from the shelf system 208 in the library 202; and (b) an elevator 750 that operates to move the magazine picker 880 adjacent to the locations in the library 202 at which magazines 270 can be stored. It will be appreciated by one skilled in the art that the locations in a magazine-based library 202 at which magazines 270 can be stored include: (a) a fixed shelf or shelves 208; (b) an entry/exit port 206; and (c) a pass-through port, such as the magazine pass-through port 1358 from FIG. 45A. Further, in certain embodiments, the elevator 750 also positions the magazine picker 880 adjacent to the drive 180 or drives in the library 202.

With reference to FIGS. 29A-29H, the magazine transport 212 comprises an elevator 750 for moving a magazine picker 880 along horizontal and vertical axes so that the magazine picker 880 can be positioned adjacent to the entry/exit port 206, any shelf of the shelf system 208, and any of the drives 180. In this regard, the elevator 750 comprises: (a) a vertical axis assembly 752 for moving a magazine picker 880 vertically within the library 202, and (b) a horizontal axis assembly 754 for moving the magazine picker 880 horizontally within the library 202. The vertical axis assembly 752 supports or carries the magazine picker 880 and generally extends from a first end 756A to a second end 756B.

Generally, the horizontal axis assembly 754 supports the first and second ends 756A, 756B of the vertical axis assembly 752 and is capable of applying a horizontal driving force to each of the first and second ends 756A, 756B to horizontally displace the vertical axis assembly 752 within the library 202. In this regard, the horizontal axis assembly 754 comprises: (a) top assembly 758A for supporting and applying a horizontal force to the first end 756A of the vertical axis assembly 752; (b) a bottom assembly 758B for supporting and applying a horizontal force to the second end 756B of the vertical axis assembly 752; and (c) a coordination assembly 758C for coordinating the application of horizontal forces to the first and second ends 756A, 756B of the vertical axis assembly 752 by the top assembly 758A and the bottom assembly 758B.

Figure 29A:
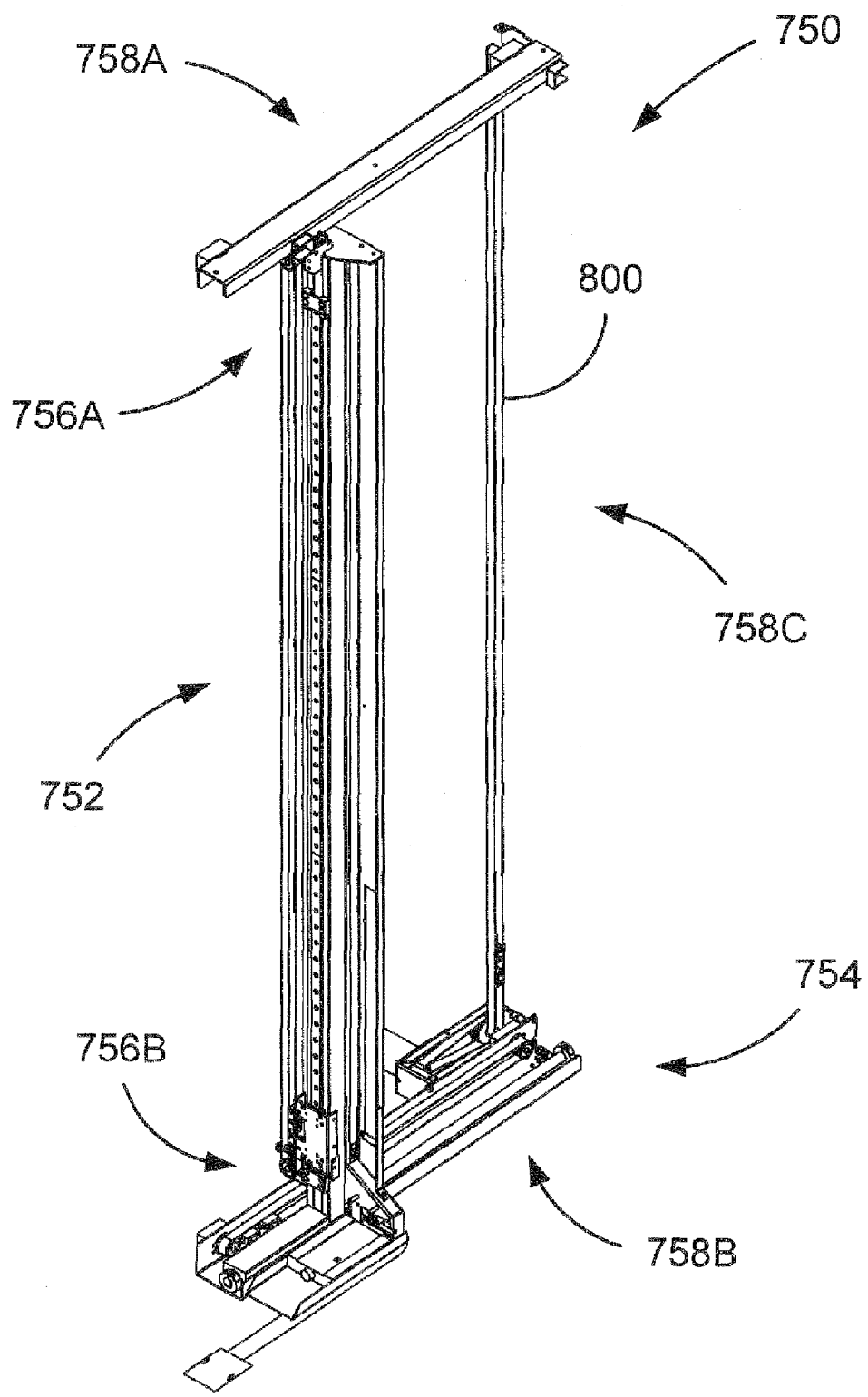
FIGS. 29A-29H illustrate features of an embodiment of an elevator that is used to move a magazine picker.
Figure 29B:
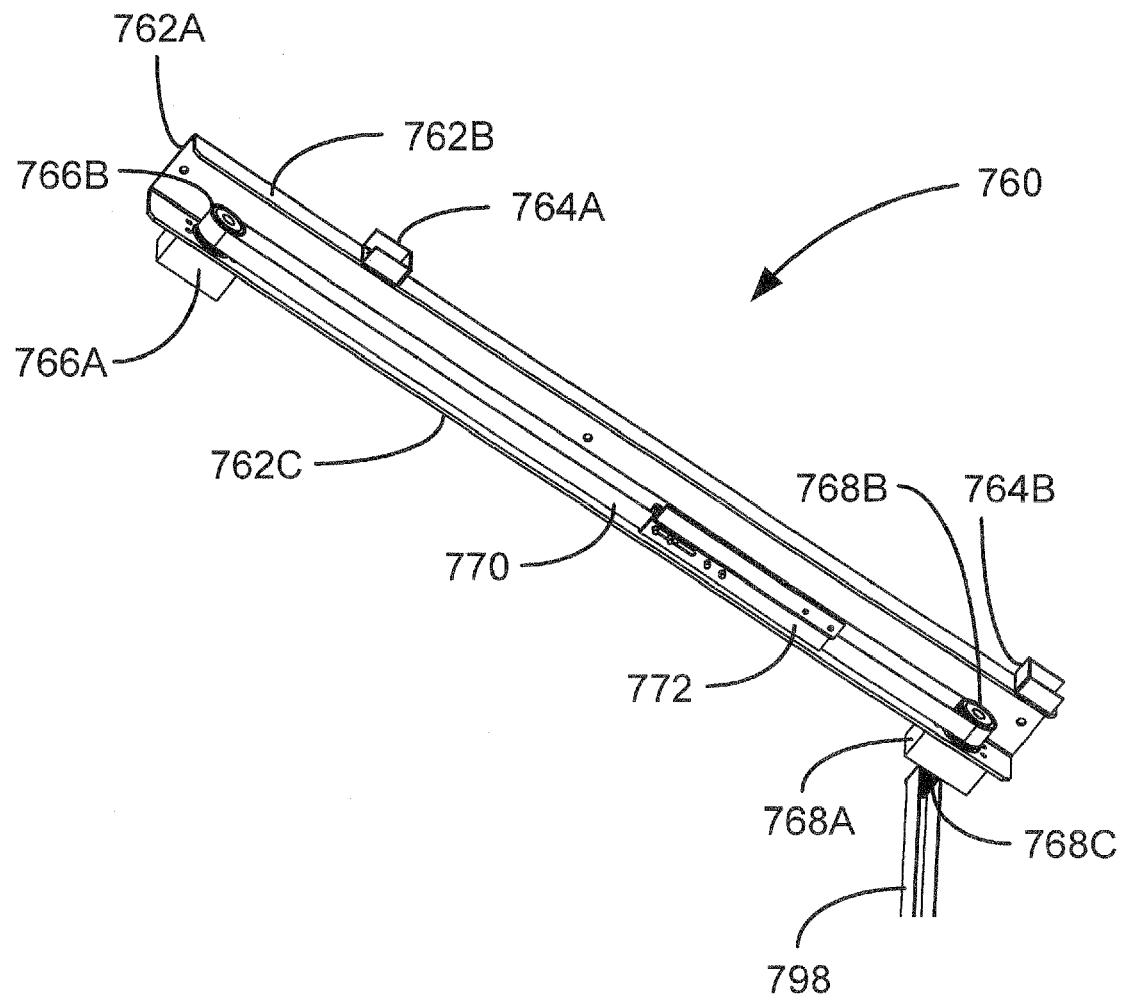

With reference to FIG. 29B, the top assembly 758A comprises a U-shaped channel 760 with a first side, second side 762B and third side 762C. The first side 762A is operatively attached to the interior side of the top surface 340E of the frame 102. The second side 762B serves as a guide for a set of rollers 816A, 816B associated with the first end 756A of the vertical axis assembly 752. In addition, the second side 762B also supports a pair of horizontal stops 764A, 764B that cooperate with a stop block 820 that is associated with the first end 756A of the vertical axis assembly 752 to limit the horizontal extent over which the horizontal axis assembly 754 can move the vertical axis assembly 752. The third side 762C supports a first pulley block 766A and associated pulley 766B. In addition, the third side supports a second pulley block 768A and associated pulleys 768B, 768C. Extending between the pulley 766B and the pulley 768B is a belt 770. Associated with the belt 770 is a mount 772 for connecting the belt 700 to the first end 756A of the vertical axis assembly 752. The mount 772 also incorporates a structure that allows the tension of the belt 770 to be adjusted. The pulley 768C is associated with another belt 798 that is used to: (a) transmit the forces that are used to horizontally displace the first end 756A of the vertical axis assembly 752 via the belt 770 and mount 772; and (b) coordinate the operation of the top assembly 758A with the bottom assembly 758B.

Figure 29C:
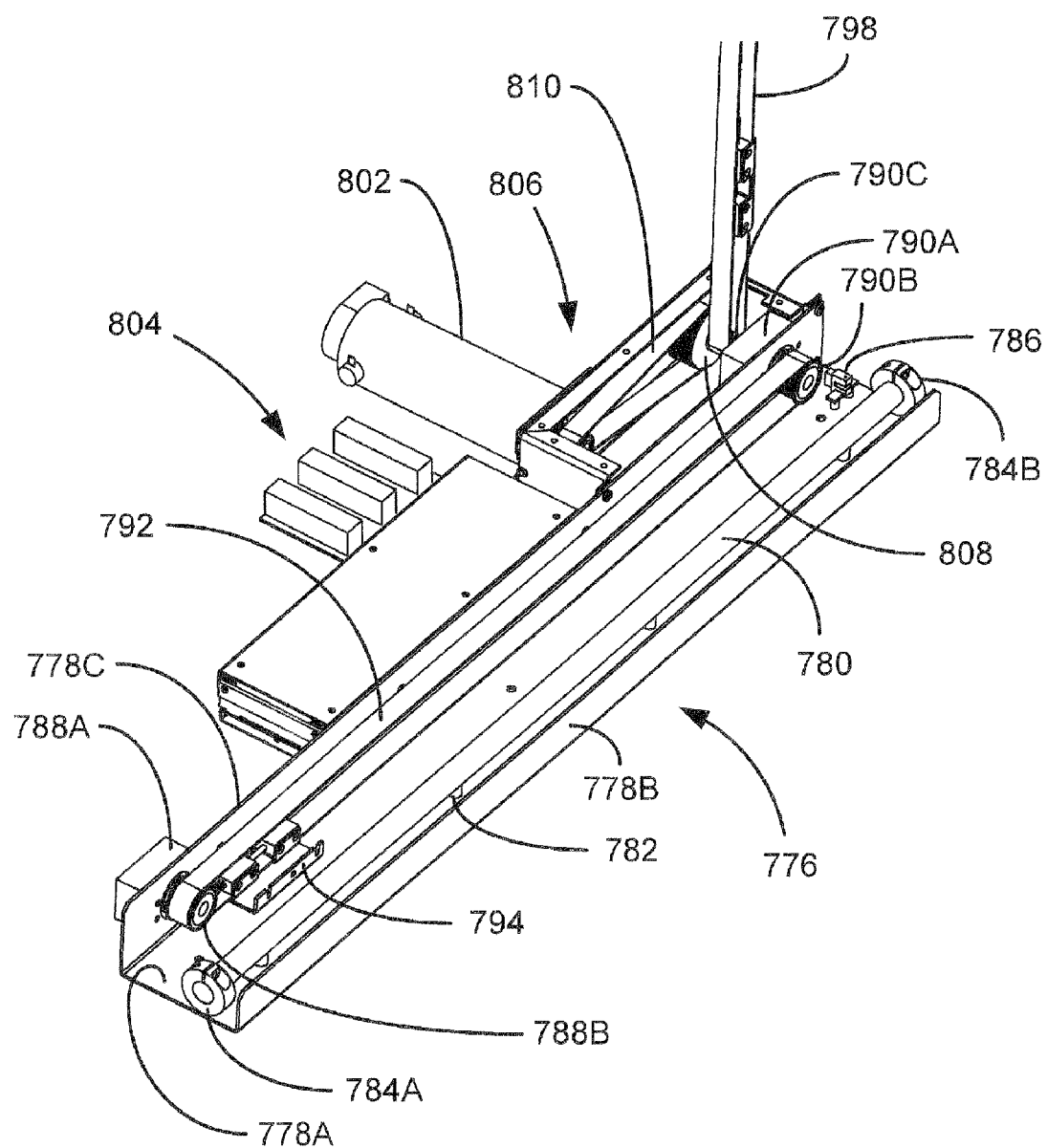
Figure 29D:
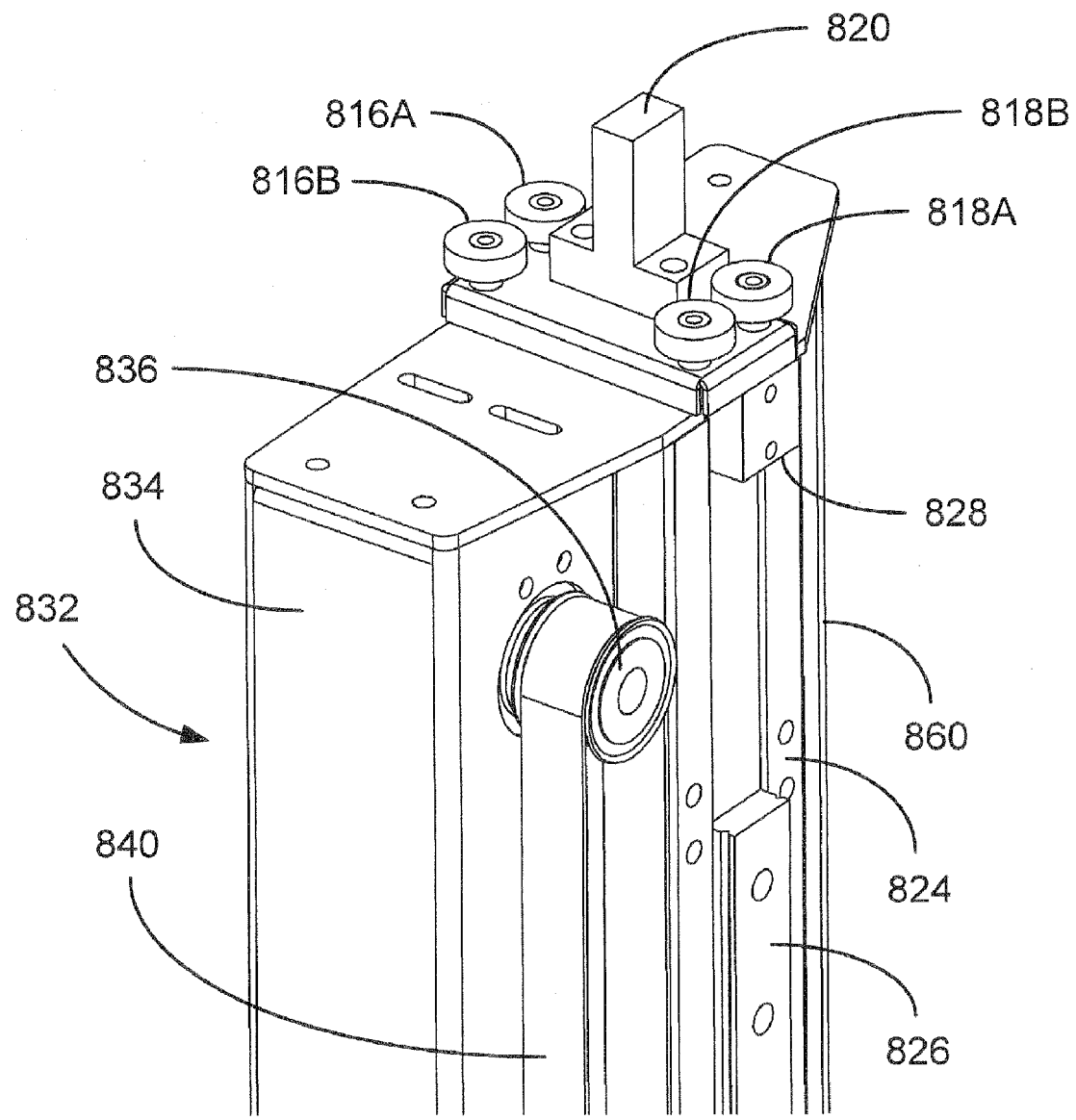
Figure 29E:
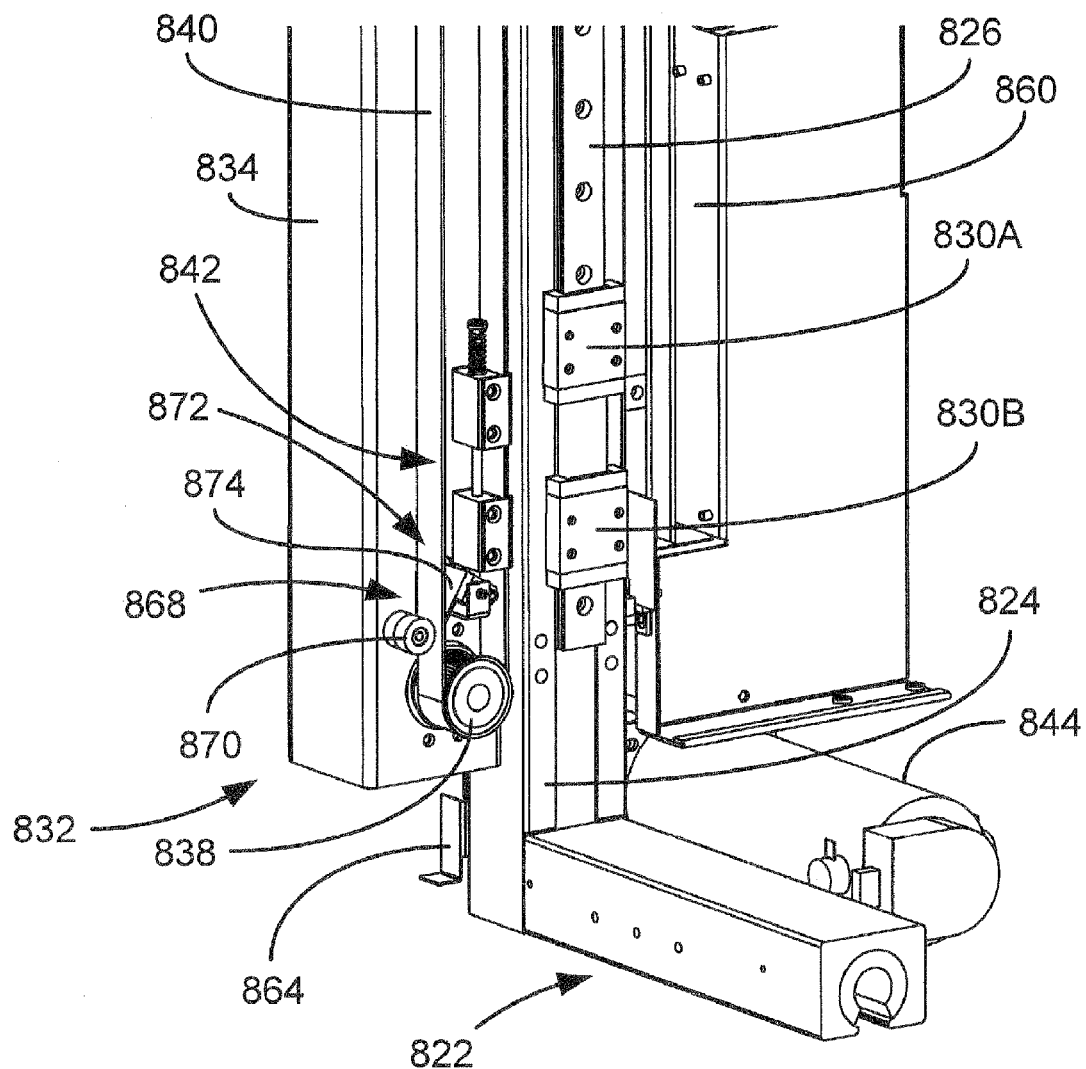
Figure 29F:
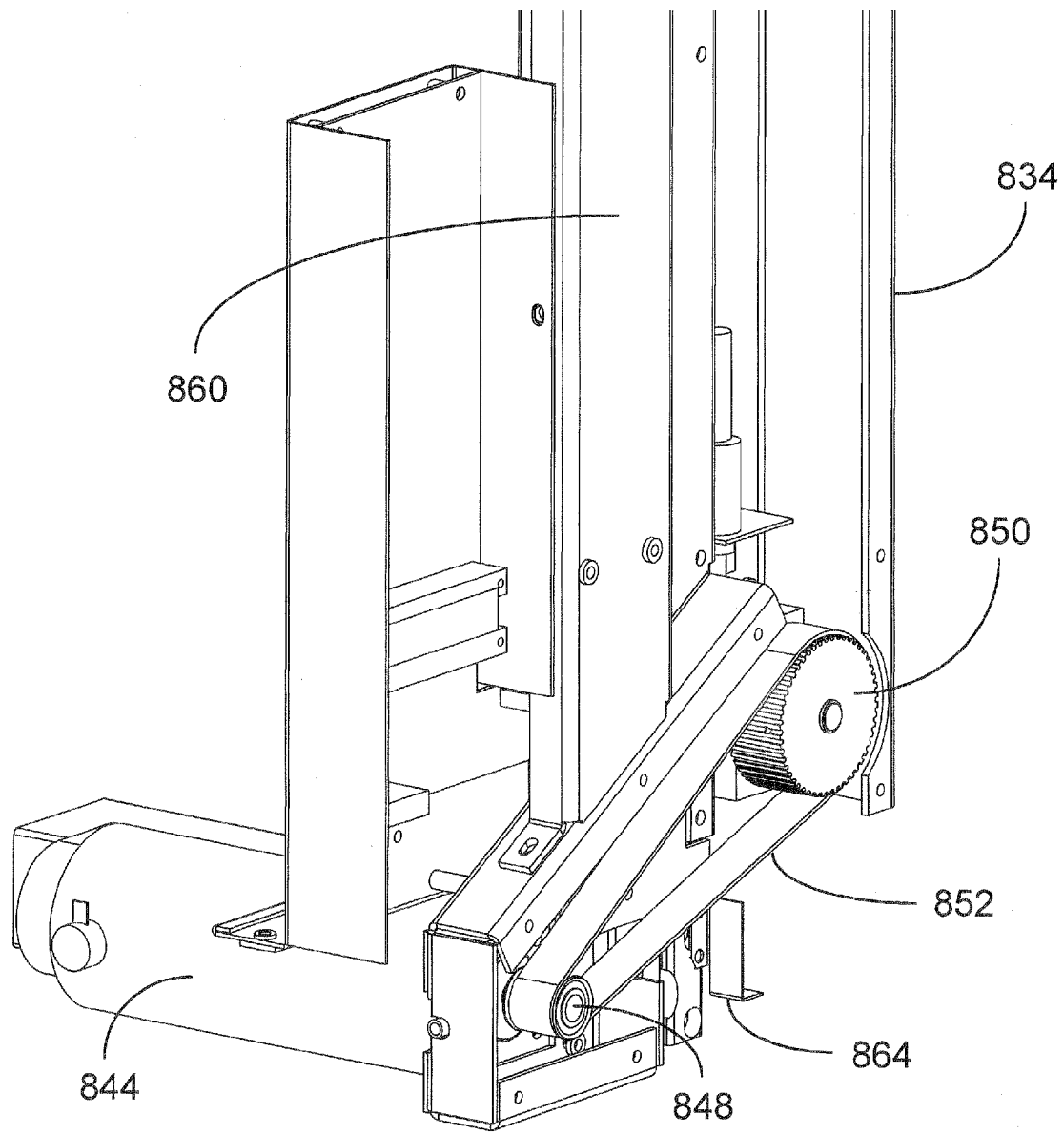

With reference to FIG. 29C, the bottom assembly 758B comprises a U-shaped channel 776 with a first side 778A, second side 778B and third side 778C. The first side 778A is operatively attached to the interior side of the bottom surface 340F of the frame 102 and supports a guide shaft 780 that receives a linear bearing 822 associated with the second end 756B of the vertical axis assembly 752. The guide shaft 780 is supported by a set of stand-offs 782 that are operatively connected to the first side 778A. The guide shaft 780 also comprises a pair of guide stops 784A, 784B that limit the horizontal extent over which the horizontal axis assembly 754 can move the vertical axis assembly 752. The first side 778A also supports a home position sensor 786 that detects when the vertical axis assembly 752 is positioned adjacent to the end of the guide shaft 780. The third side 778C supports a first pulley block 788A and associated pulley 788B. In addition, the third side 778C supports a second pulley block 790A and associated pulleys 790B, 790C. Extending between the pulley 788B and the pulley 790B is a belt 792. Associated with the belt 792 is a mount 794 for connecting the belt 792 to the second end 756B of the vertical axis assembly 752. The mount 794 also incorporates a structure that allows the tension of the belt 792 to be adjusted. The pulley 790C is associated with another belt 798 that is used to: (a) transmit the forces that are used to horizontally displace the first end 756A of the vertical axis assembly 752 via the belt 770 and mount 772; and (b) coordinate the operation of the top assembly 758A with the bottom assembly 758B.

With reference to FIGS. 29A-29C, the coordinating assembly 758C comprises the pulley 768C associated with the top assembly 758A, the pulley 790C associated with the bottom assembly 758, and a belt 798 that extends between the pulley 768C and the pulley 790C. As can be appreciated, the coordinating assembly 758C interfaces with the top assembly 758A and the bottom assembly 758B so that movements of the mount 772 associated with the top assembly 758A and the mount 794 associated with the bottom assembly 758C are mirrored. As a consequence, when the first and second ends 756A, 756B of the vertical axis assembly 752 are respectively attached to the mounts 772, 790 and a motive force is applied to the mounts 772, 790, the first and second ends 756A, 756B are displaced in the same manner. It should also be noted that the belt 798 is enclosed within a housing 800.

Also associated with the bottom assembly 758B are a DC electrical motor 802 and associated motor controller 804 that are used to provide the motive force for horizontally displacing the vertical axis assembly 752. To elaborate, any rotational force produced by the electrical motor 802 is transmitted by a motor drive pulley system 806 comprised of a pulley (not shown) that is connected to the electrical motor 802, a drive pulley 808, and a belt 810 extending between the pulleys 808 and (not shown). The drive pulley 808 resides on the same axle (not shown) that the pulley 790C and 790B reside. Consequently, rotation of the drive pulley 808 produces a corresponding rotation of the pulleys 790B, 790C. Rotation of the pulley 790B causes the mount 794 to be horizontally displaced. Similarly, rotation of the pulley 790C ultimately causes the mount 772 to be horizontally displaced in a manner that mirrors the horizontal displacement of the mount 794. The home position sensor 786 is used in conjunction with an encoder associated with the electrical motor 802 or other position sensor known in the art to determine the horizontal location of the vertical axis assembly 752.

With reference to FIGS. 29D-29H in conjunction with FIGS. 30A-30G, the vertical axis assembly 752 generally comprises: (a) structures that interface the vertical axis assembly 752 with the top and bottom assemblies 758A, 758B; (b) a rail structure that supports a carriage 882 that holds the magazine picker 880 and defines the vertical extent through which the carriage 882 and associated magazine picker 880 can be displaced; and (c) an actuation system that provides the motive force for vertically displacing the carriage 880 along the rail structure.

With the foregoing general description in mind, the vertical axis assembly 752 comprises a first pair of guide roller bearings 816A, 816B and a second pair of guide roller bearing 818A, 818B for interfacing the vertical axis assembly 752 with the top assembly 758A of the horizontal axis assembly 752. More specifically, the second side 762B of the U-shaped channel 760 associated with the top assembly 758A is received between the first pair of guide roller bearing 816A, 816B and between the second pair of guide roller bearings 816A, 816B to interface the vertical axis assembly 752 with the top assembly 758A of the horizontal axis assembly 752. A stop block 820 located adjacent to the roller bearings cooperates with the horizontal stops 764A, 764B of the top assembly 758A to limit the horizontal displacement of the vertical axis assembly 752. The vertical axis assembly 752 further comprises a linear bearing assembly 822 that receives the guide shaft 780 to interface the vertical axis assembly 752 to the bottom assembly 758B of the horizontal axis assembly 752.

The vertical axis assembly 752 further comprises a rail mount 824 that holds a linear rail 826 that can be displaced along the length of the rail mount 824. An upper rail stop 828 defines the upper limit along the rail mount 824 that the linear rail 826 can be displaced. The linear bearing assembly 822 defines the lower limit along the rail mount 824 that the linear rail 826 can be displaced. Associated with the linear rail 826 is a pair of carriage blocks 830A, 830B that provide an interface for a carriage bracket 854 that connects the linear rail 826 to the actuation system and to the carriage 882 that supports the magazine picker 880.

The vertical axis assembly 752 further comprises a pulley system 832 is used to vertically displace the linear rail 826 along the rail mount 826. The system 832 comprises a housing 834 that supports an upper pulley 836 and a lower pulley 838. Extending between the upper pulley 836 and the lower pulley 838 is a belt 840. Associated with the belt 840 is a mount 842 for connecting the belt 780 to the carriage bracket 854 that is, in turn, connected to the carriage blocks 830A, 830B associated with the linear rail 826. The mount 842 also comprises a structure for tensioning the belt 780.

The vertical axis assembly 752 further comprises a DC electric motor 844 and motor controller 846 for providing the motive force for moving the linear rail 826 along the rail mount 826. To elaborate, any rotation force produced by the DC electric motor 844 is transmitted to the lower pulley 838 of the pulley system 832 by another pulley system comprised of a motor pulley 848, a drive pulley 850 that is attached to the same axle as the lower pulley 838, and a belt 852 that extends between the motor pulley 848 and the drive pulley 850. Rotation of the lower pulley 838, in turn, causes the linear rail 826 to be displaced along the rail mount 826.

Figure 29G:
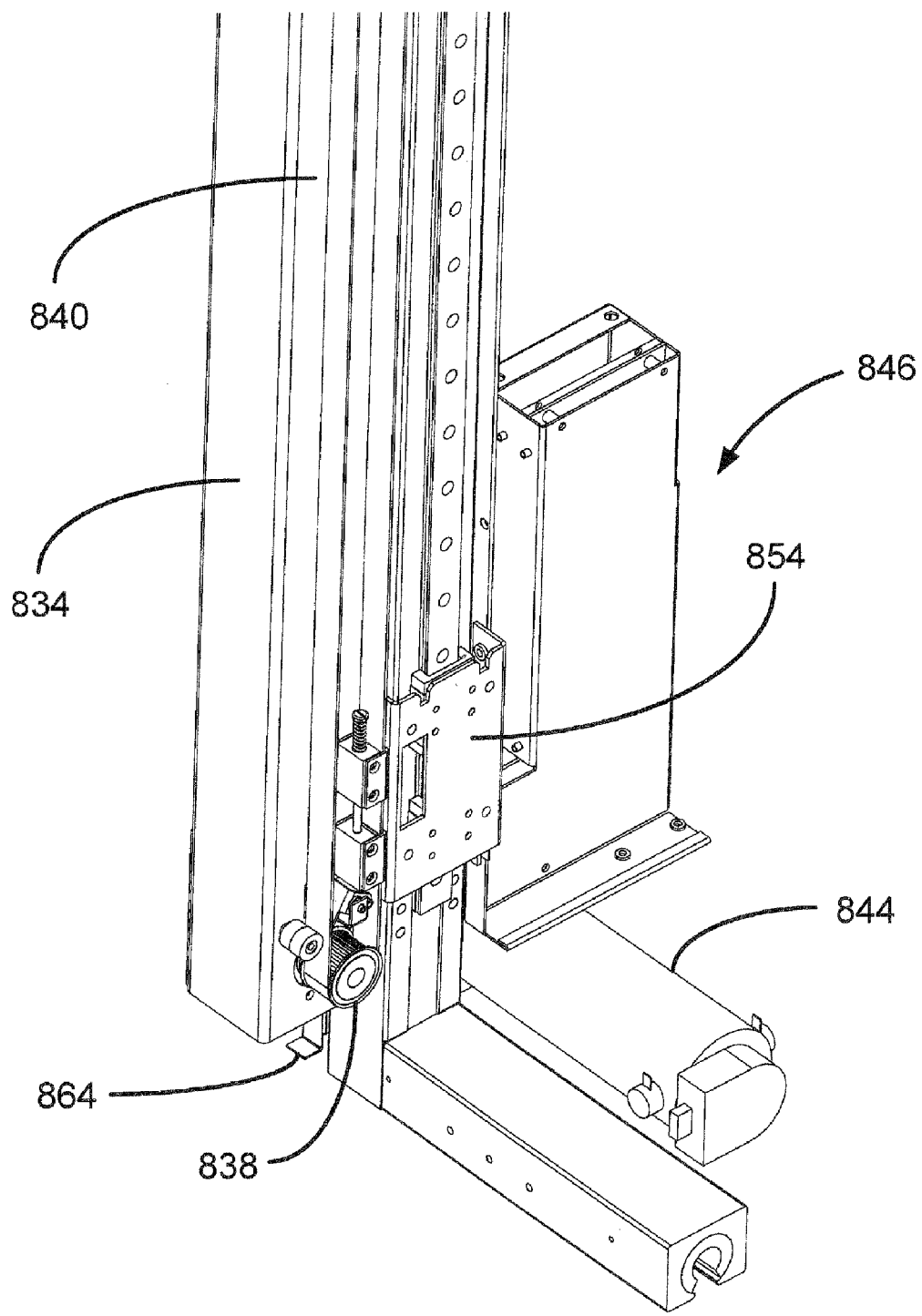
Figure 29H:
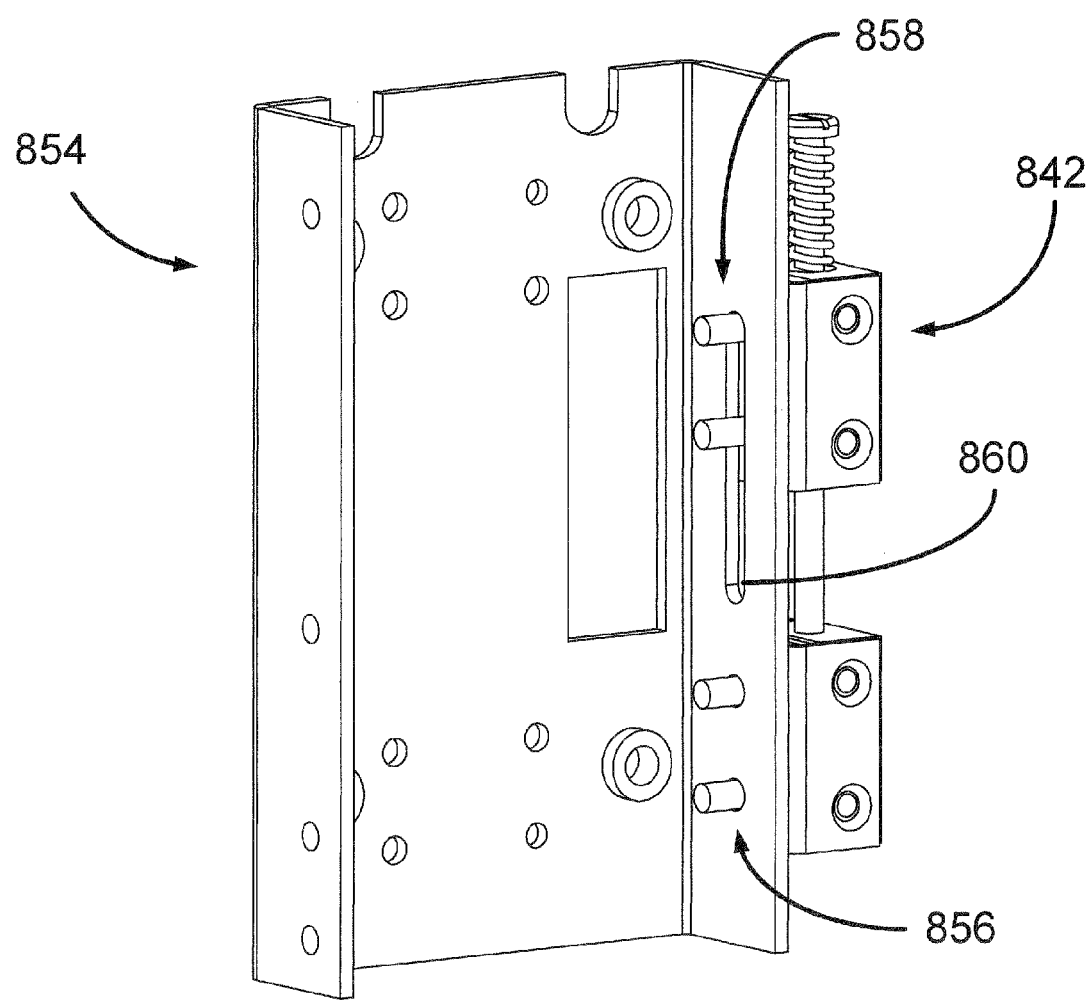

With reference to FIGS. 29G-29H, the vertical axis assembly 752 further comprises a carriage bracket 854 that is used to: (a) mechanically connect the linear rail 826 and the belt 840; and (b) mechanically connects the linear-rail 826 to a carriage 882 that supports the magazine picker 880. To elaborate, the carriage bracket 854 is connected to the linear rail 826 by screws (not shown) that pass through holes in the carriage bracket 854 and engage threaded holes in the carriage blocks 830A, 830B, which are fixedly attached to the linear rail 826. The carriage bracket 854 is connected to the belt 840 by: (a) a first pair of pins 856 that are associated with the mount 842 and pass through a pair of holes associated with the bracket 854; and (b) a second pair of pins 858 that are associated with the mount 842 and pass through a single slot 860 associated with the bracket 854. The slot 860 allows the second pair of pins 858 to move when the tensioning device associated with the mount 842 is actuated and still maintain a connection with the bracket 854.

The vertical axis assembly 752 also comprises a channel guide 860 that holds a flex cable that is used to transmit signals between the control system 218 and magazine picker 880 (as well as any other elements associated with the magazine picker 880) as the magazine picker 880 is vertically displaced.

Further comprising the vertical axis assembly 752 is a flag 864 that interacts with the home position sensor 786 to indicate when the vertical axis assembly 752 is located adjacent to the end of the guide shaft 780. To elaborate, the flag 864 interrupts an optical signal output by the home position sensor 786 to indicate when the vertical axis assembly is located adjacent to the end of the guide shaft 780. Other sensing schemes are feasible.

The vertical axis assembly 752 further comprises a brake mechanism 868 that operates to engage the belt 840 during a loss of power and thereby prevent the magazine picker 880 from dropping to the bottom of the library 202 and potentially being damaged or damaging other components of the library 202. The brake mechanism 868 comprises a roller 870 and a solenoid actuated brake assembly 872 that includes a brake shoe 874. The brake mechanism 868 operates so that when power is removed from the library 202, the solenoid actuated brake assembly 872 causes the brake shoe 874 to move so that the belt 840 is pinched between the brake shoe 874 and the roller 870, thereby preventing further movement of the belt 840. Conversely, when power is being applied to the library 202, the solenoid actuated brake mechanism 872 operates to hold the brake shoe 874 away from the belt 840 so that the belt 840 can be moved as needed for the operation of the library 202.

The vertical location of the carriage 882 or related elements is provided using an encoder associated with the DC motor 844 or other position sensors known in the art.

It should be appreciated that the elevating function within the library 202 and other magazine-based data cartridge libraries can be accomplished with a number of different elevator designs. For example, a counter-weight elevator is feasible.

With reference to FIGS. 30A-30G, the magazine transport 212 comprises a magazine picker 880 for moving a magazine 270 towards and away from a magazine storage location, such as a shelf in the shelf system 208, once the picker 880 has been positioned adjacent to the storage location by the elevator 750. Generally, the magazine picker 880 comprises: (a) a magazine support 884 for supporting a magazine 270 during movement of the magazine 270 towards and away from a storage location in the library 202; and (b) a magazine transport device 212 for moving a magazine 270 between the magazine support 884 and a storage location in the library 202.

Figure 30A:
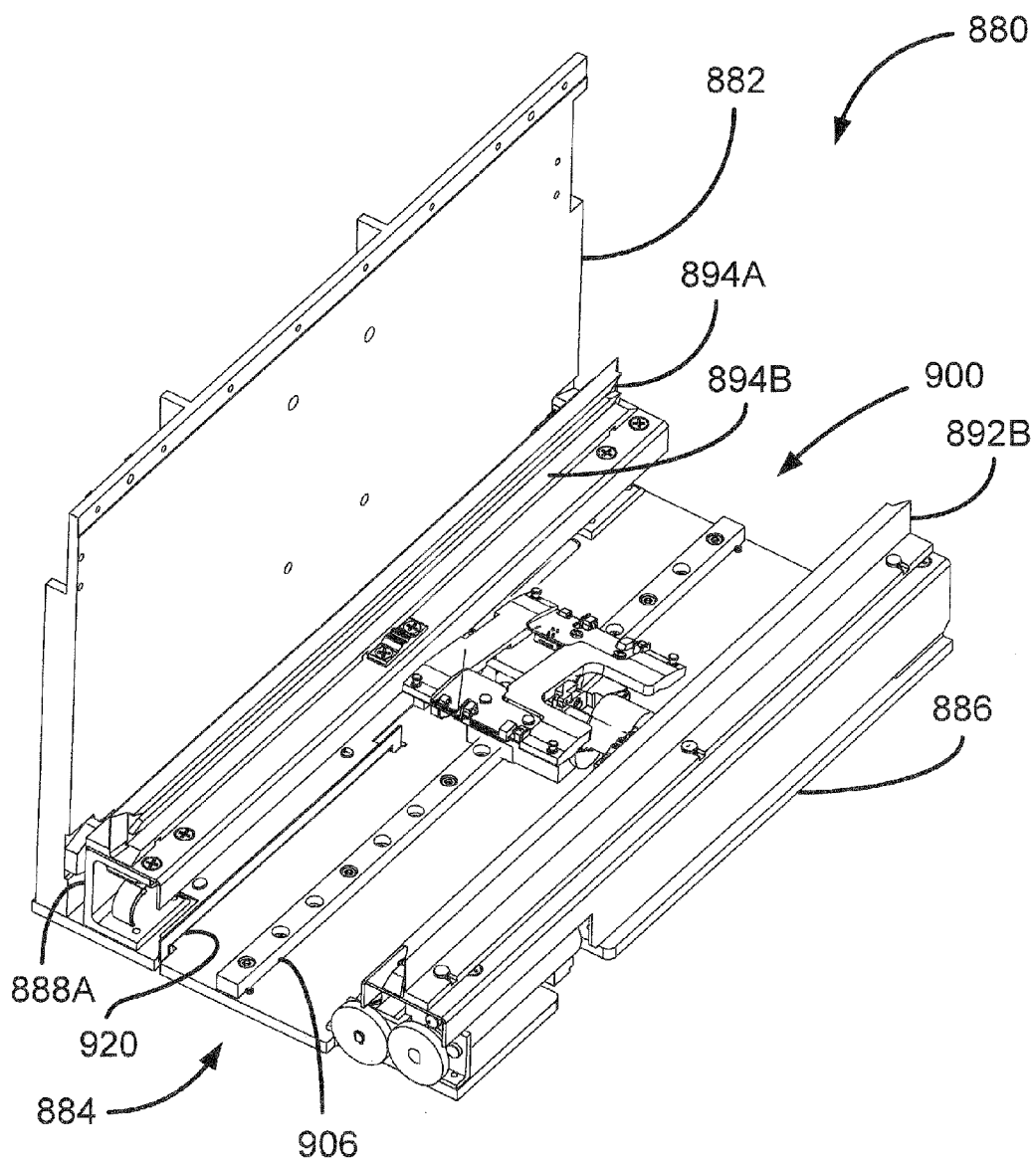
FIGS. 30A-30G illustrate an embodiment of a magazine picker.
Figure 30B:
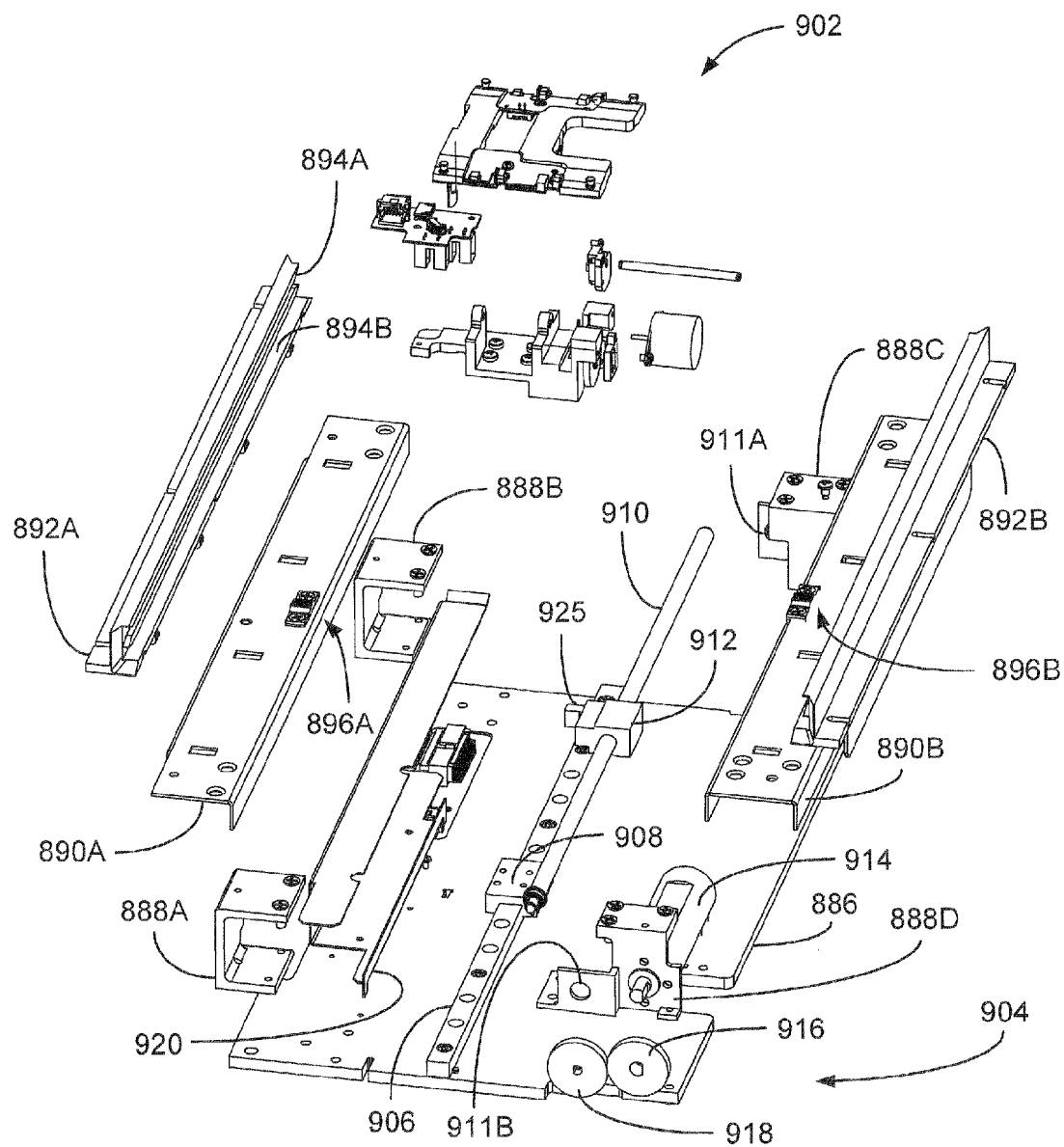
Figure 30C:
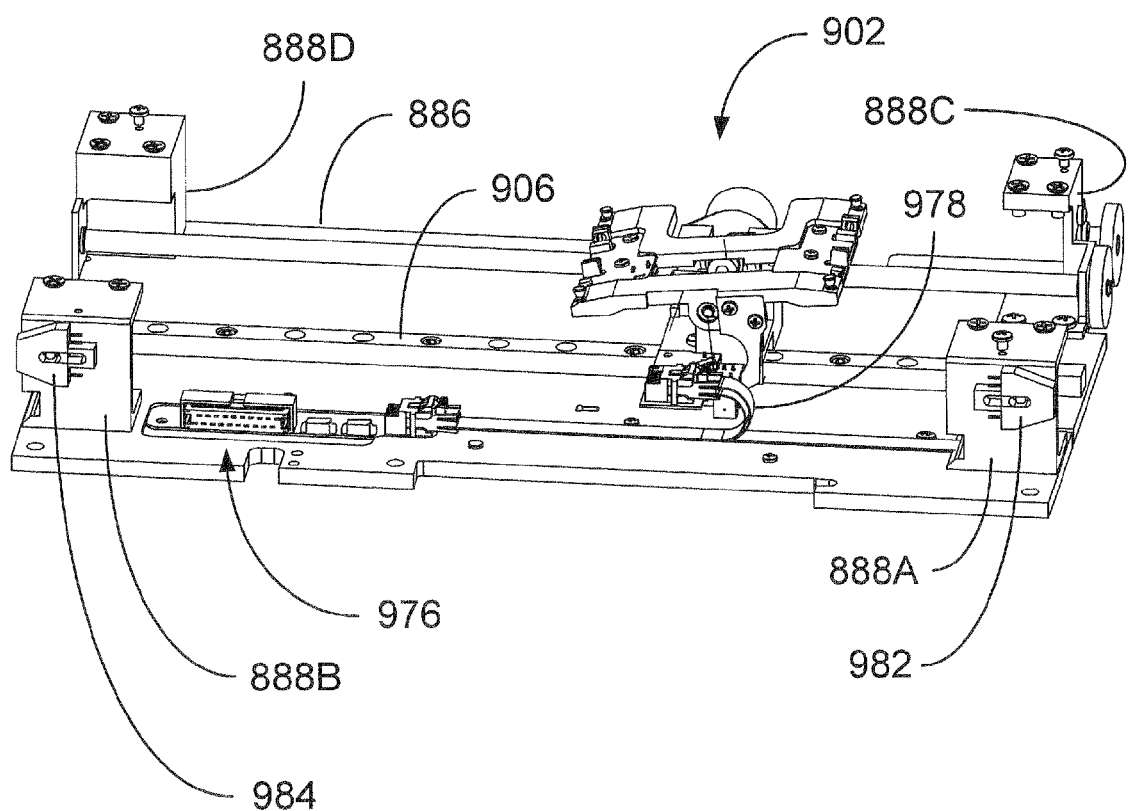
Figure 30D:
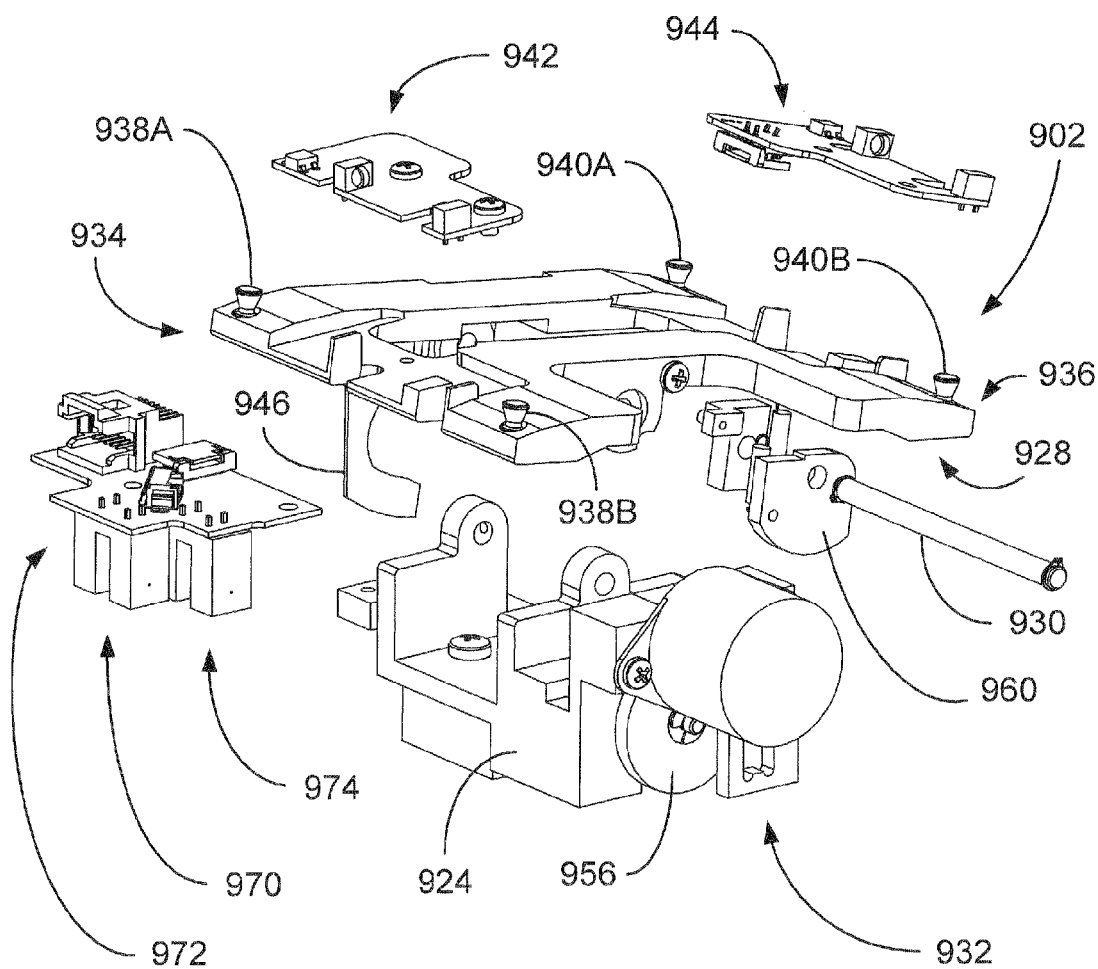
Figure 30E:
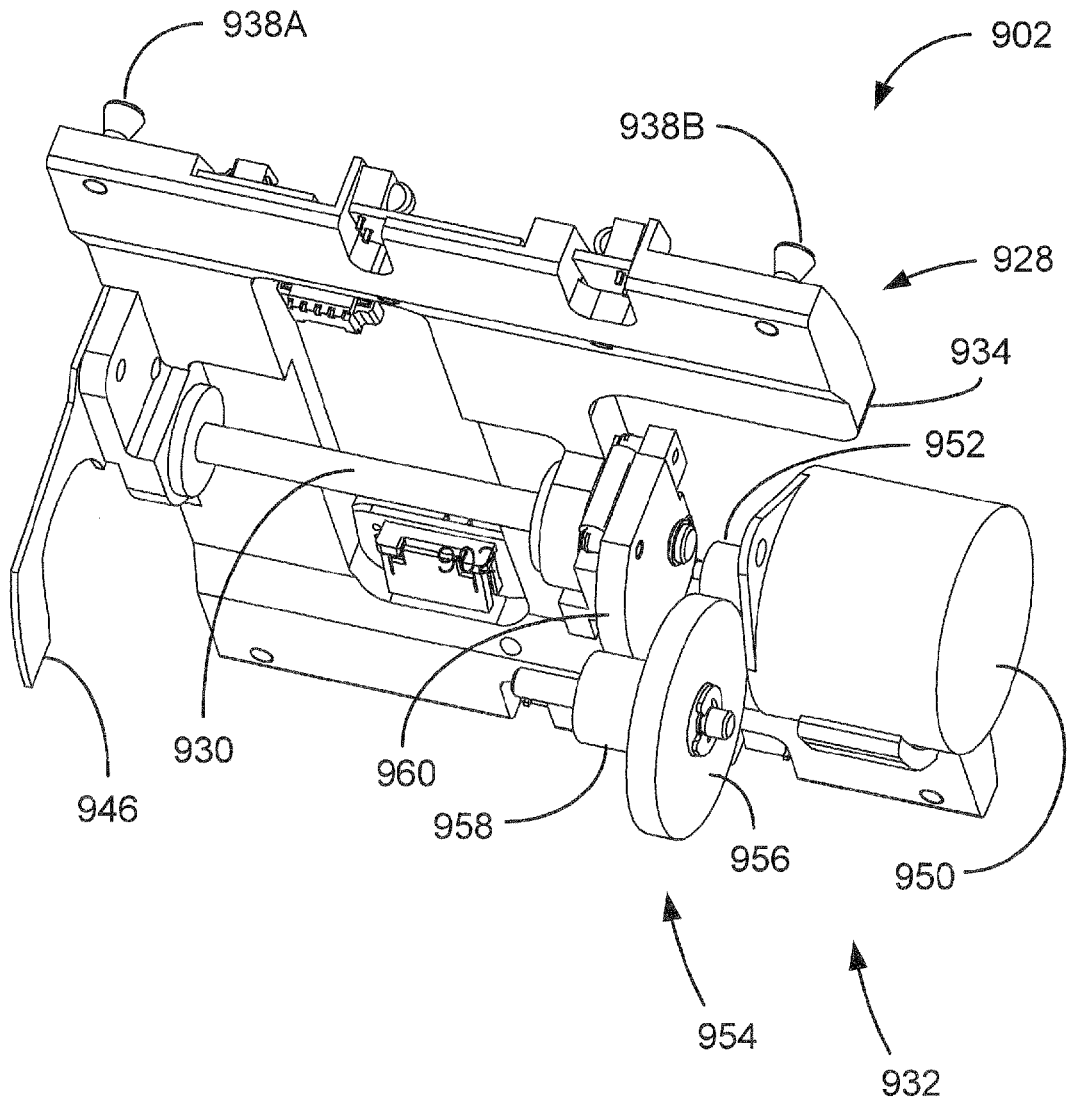
Figure 30F:
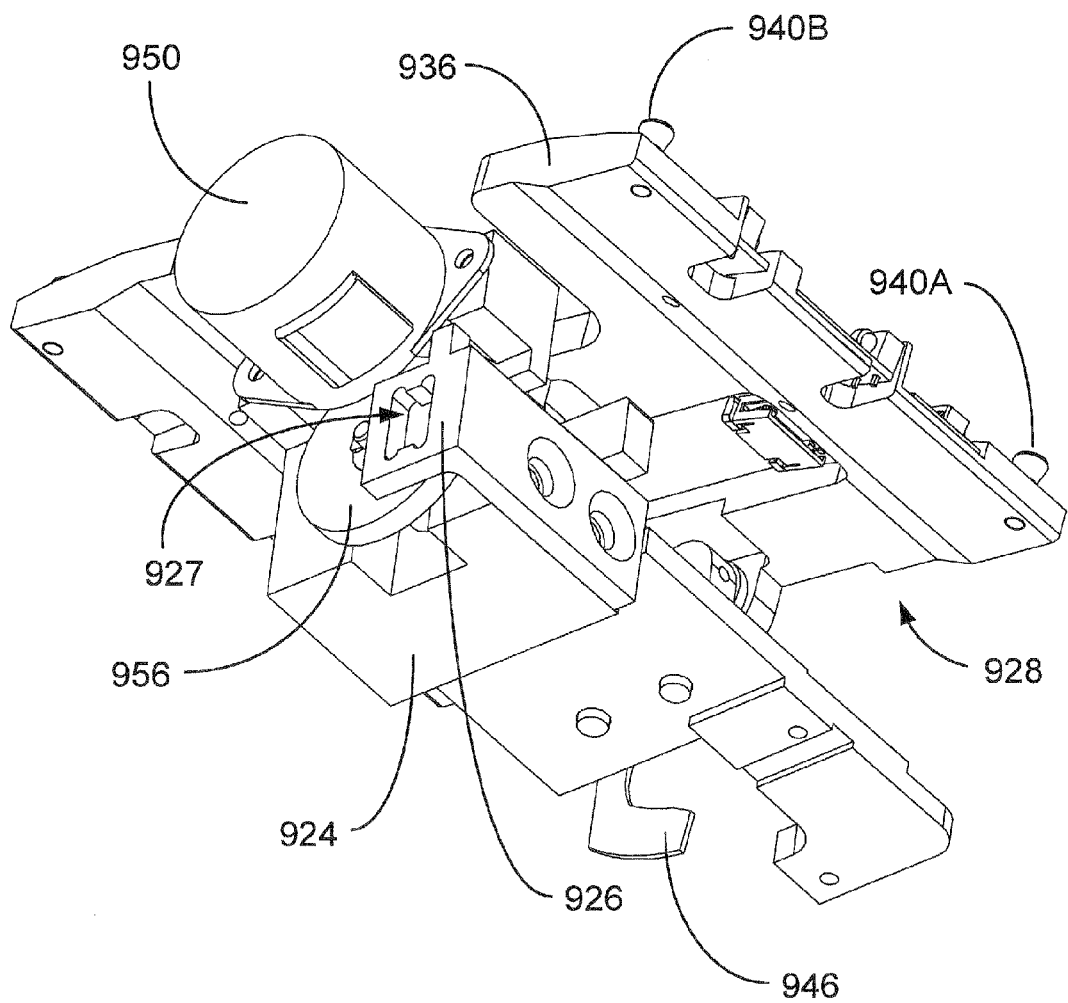
Figure 30G:
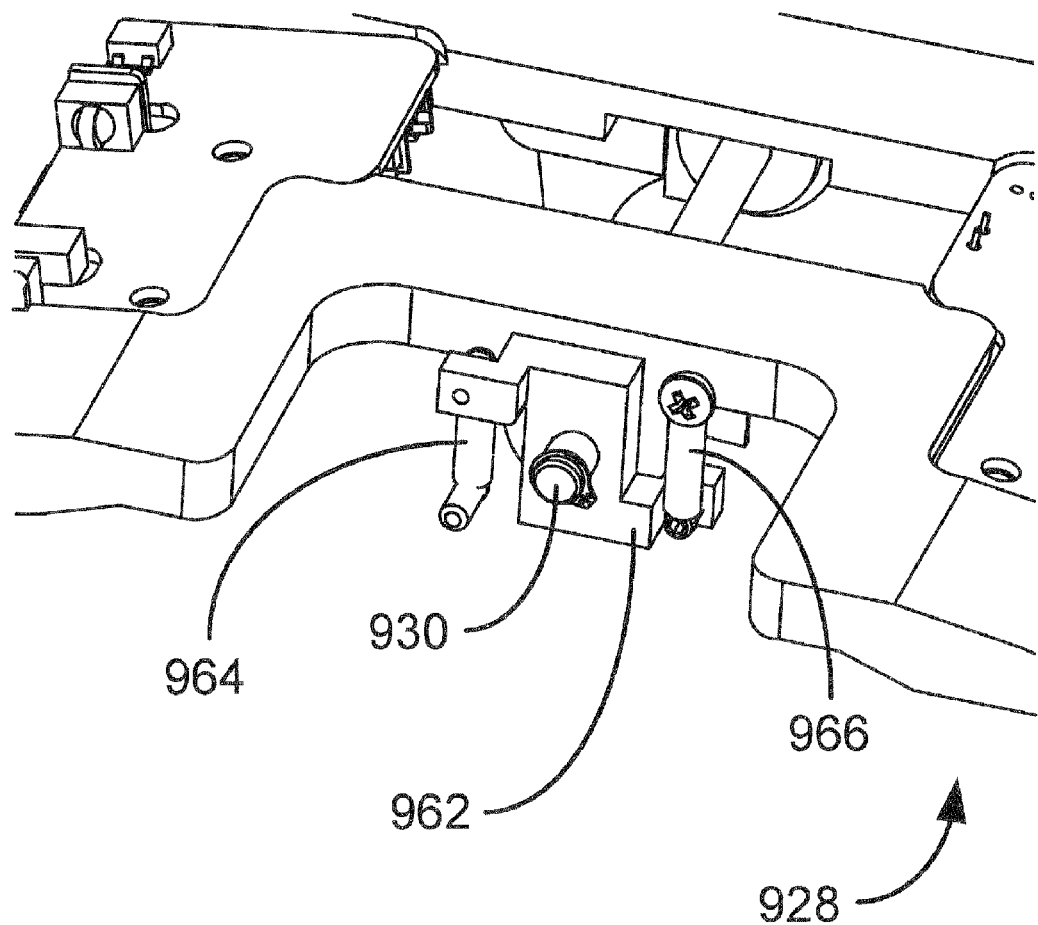

Before describing the magazine picker 880, the structure for attaching the magazine picker 880 to the vertical axis assembly 752 is described. With reference to FIG. 30A, the magazine picker 880 is operatively connected to a carriage 882 that is, in turn, connected to the carriage bracket 854 associated with the vertical axis assembly 752.

The magazine picker 880 comprises a support structure 884 for supporting a magazine 270 during transport of the magazine 270 towards and away from a storage location in the library 202. The support structure 884 comprises: (a) a base plate 886; (b) four brackets 888A, 888B, 888C and 888D mounted to the base plate 886; (c) a pair of rail mounting plates 890A, 890B, with the rail mounting plate 890A supported by the brackets 888A, 888B and the rail mounting plate 890B supported by the brackets 888C, 888D; (d) a pair of rails 892A, 892B, with the rail 892A being attached to the rail mounting bracket 890A, and the rail 892B attached to the rail mounting bracket 890B. Each of the rails 892A, 892B comprises two grooves 894A, 894B, one for accommodating rail 292A of a magazine 270 and one for accommodating rail 292B of a magazine 270. In library 202, the shelf system 208 is configured so that all of the magazines 270 stored in the library 202 have the same orientation. Consequently, only one of the grooves 894A, 894B associated with each of the 892A, 892B is utilized. For example, groove 894A of rail 892A may be used to accommodate rail 292A of a magazine 270, and groove 894B of the rail 892A would not be utilized. Continuing with the example, groove 894B of rail 892B would accommodate rail 292B of a magazine 270, and groove 894A of the rail 892B would not be utilized. The rail mounting plates 890A, 890B and the rails 892A, 892B form a guide during movements of a magazine 270 to and from a storage location and a support for a magazine 270 during transport of a magazine 270 and during movements of a magazine 270 to and from a storage location. Receptacles 896A, 896B are respectively associated with the rail mounting plates 890A, 890B and engage the detents 296A, 296B located on the bottom side 278 of a magazine 270 to inhibit undesired movement of a magazine 270, especially during transportation of a magazine 270 from one storage location to another storage location.

The magazine transport 212 comprises a magazine transport device 900 for moving a magazine 270 between the support formed by the rail mounting plates 890A, 890B and the rails 892A, 892B and a storage location in the library 202. The magazine transport device 900 comprises: (a) a magazine engagement device 902 that is capable of selectively engaging a magazine 270 and disengaging from a magazine 270; and (b) a displacement device 904 for moving the magazine engagement device 902.

The displacement device 904 comprises: (a) a linear rail 906; (b) a bearing block 908 that is mounted to the linear rail 906, capable of moving along the linear rail 906, and supports the magazine engagement device 902; (c) a lead screw 910 that is supported by bearings 911A, 911B associated with the brackets 888C, 888D; (d) a lead screw nut 912 for applying a motive force to the magazine engagement device 902 to move the device 902 to a desired location along the linear rail 906; (e) a DC motor 914 that is supported by the bracket 888C and provides the rotational motive force that causes the lead screw nut 912 to move along the lead screw 910; (f) a first gear 916 and a second gear 918 that are used to transfer the rotational force produced by the DC motor 914 to the lead screw 910; and (g) a center position flag 920 that cooperates with a detector that is associated with the magazine engagement device 902 to indicate when the displacement device 904 has positioned the magazine engagement device 902 over the center of the linear rail 906.

As can be appreciated, when the magazine engagement device 902 is attached to the bearing block 908 and the lead screw nut 912 engages the magazine engagement device 902, the production of a rotational force by the DC motor 914 causes the lead screw nut 912 to move along the lead screw 910 and, as a consequence, the magazine engagement device 902 to move along the linear rail 906. The location of the magazine engagement device 902 is determined using an encoder associated with the motor 914 or other position sensing device known in the art.

Generally, the magazine engagement device 902 operates so as to "hook" a magazine 270 by rotating a toggle plate 928 with pins 938A, 938B that are located so as to pass through one of the pair of engagement holes 298A, 298B associated with a magazine 270. Disengagement or "un-hooking" of the magazine 270 is accomplished by counter-rotating the toggle plate 928.

With the foregoing general description in mind, the magazine engagement device 902 comprises a toggle base 924 that is mounted to the bearing block 908 and a drive block 926 with a hole 927 for receiving a post 925 associated with the lead screw nut 912. The magazine engagement device 902 further comprises: (a) a toggle plate 928 that is pivotally mounted to the toggle base 924 with a toggle axle 930; and (b) a toggle actuator system 932 for rotating the toggle plate 928 so as to engage a magazine 270 and disengage from a magazine 270. The toggle plate 928 has a first end 934 and a second end 936 with the axis of rotation for the toggle plate 928 located between the first and second ends 934, 936. Associated with the first end 934 is a first pair of engagement pins 938A, 938B for passing through a pair of engagement holes 298A, 298B associated with a magazine 270. Likewise, a second pair of engagement pins 940A, 940B are associated with the second end 936 and also serve to engage a magazine 270 via a pair of engagement holes 298A, 298B associated with the magazine 270. Also associated with the first end 934 is a first sensor assembly 942 that operates to detect the engagement flag structure 300 associated with a pair of engagement holes 298A, 298B. To elaborate, when the engagement pins 938A, 938B pass through the engagement holes 298A, 298B of a magazine 270 (i.e., when a magazine 270 has been "hooked"), the sensor 942 detects the engagement flag structure 300, thereby confirming that the magazine 270 has been captured. A second sensor assembly 944 is associated with the second end 936 of the toggle plate 928 and operates in substantially the same manner as the first sensor assembly 942. In an alternative embodiment, an optical sensor system is used to detect the presence or absence of the exterior of the bottom side 278 of the magazine 270 to determine whether or not a magazine 270 has been engaged. The optical sensor system comprises a beam producing element and a reflected beam detecting element. If the magazine 270 has been engaged, the beam produced by the beam producing element is reflected by the exterior of the bottom side 278 of the magazine 270 and detected by the detecting element. If the magazine 270 has not been engaged, the beam produced by the beam producing element is not detected by the detecting element. One optical sensing system is associated with each of the first end 934 and second end 936 of the toggle plate 928. Also associated with the toggle plate 928 is a rotational position flag 946 that is used with a detector to indicate the rotational position of the toggle plate 928.

The toggle actuator system 932 comprises: (a) a stepper motor 950 that is attached to the toggle base 924; (b) a pinion 952 that is attached to the spindle of the motor 950; (c) a cluster gear 954 that is attached to attached to the toggle base 924 and has a first gear 956 that engages the pinion 952 and a second gear 958; (d) a driven gear 960 that engages the second gear 958; (e) an overdrive arm 962; (f) a first spring assembly 964 for connecting the driven gear 960 and the overdrive arm 962; and (g) a second spring assembly 966 for connecting the overdrive arm 962 and the toggle plate 928. In normal operation, the stepper motor 950 produces a rotation force for rotating one of the first and second ends 934, 936 into position to engage a magazine 270. The rotation force is transmitted to the toggle plate 928 by the pinion 952, cluster gear 954, driven gear 960, first spring assembly 964, overdrive arm 962 and the second spring assembly 964. If, however, the rotation of the toggle plate 928 is inhibited such that the toggle plate 928 cannot reach the desired rotational position, one of the spring assemblies 964 or 966 comes into play to allow the toggle plate 928 to cease rotating before the desired rotational position is reached. By allowing the toggle plate 928 to cease rotating damage to the motor 950 and engagement pins 940A, 940B is avoided, as well as damage to whatever is inhibiting the rotation of the toggle plate 928. For example, if the stepper motor 950 is applying a force to produce a clockwise rotation of the toggle plate 928, as viewed from the stepper motor side of the engagement device 902, and an obstruction is causing a counter-clockwise force to be applied to the toggle plate 928, the second spring assembly 966 elongates to permit the toggle plate 928 to cease rotating. When the obstruction is no longer present, the energy stored in the elongated spring assembly 966 causes the toggle plate 928 to rotate to the desired position. The first spring assembly 964 operates in a similar fashion when an obstruction prevents rotation of the toggle plate 928 in the counter-clockwise direction.

Also attached to the toggle base 924 is a sensor block 970 that includes: (a) a first sensor assembly 972 for cooperating with the center position flag 920 to provide an indication as to when the rotational axis of the toggle plate 928 is positioned over the center of the linear rail 906; and (b) a second sensor assembly 974 for cooperating with the rotational position flag 946 to provide a signal indicative of the rotational position of the toggle plate 928. The electrical signals produced at the sensor block 970 are conveyed to a plug 976 by a flex cable 978. The plug 976 extends through the carriage 882 and receives a plug (not shown) that is connected to a controller located on the opposite side of the carriage 882 from the magazine picker 880.

A first detector 982 is attached to bracket 888A and is used to detect, on one side of the magazine picker 880, the end surface 532 of a cleat associated with a shelf storage location for a magazine 270 and the reference flag 632 associated with a sled, such as sled 548A, in a drive bay assembly 540 located on the one side of the magazine picker 880. A second detector 984 is attached to the bracket 888B and serves the same purpose as the first detector 982 but with respect to any cleats and/or reference flags located on the other side of the magazine picker 880.

With reference to FIGS. 31A-31L, the operation of the magazine picker 880 is described with respect to the moving of a magazine 270 from a first shelf 990 that is associated with the two columns of shelving 528B to a second shelf 992 that is associated with the five columns of shelving 528A is described. For clarity, the only elements of the magazine picker 880 that are substantively shown in the noted figures are the base plate 886, rail mounting plate 890A, rail 892A, and the magazine engagement device 902. Associated with the first shelf 990 is a cleat 994 that is functionally equivalent to the cleat 522A that was previously discussed. Likewise, a cleat 996 is associated with the second shelf 992. The magazine 270 is shown in cross-section so that the interaction of the magazine engagement device 902 with the engagement holes 298A, 298B of the magazine 270 can be seen.

Figure 31A:
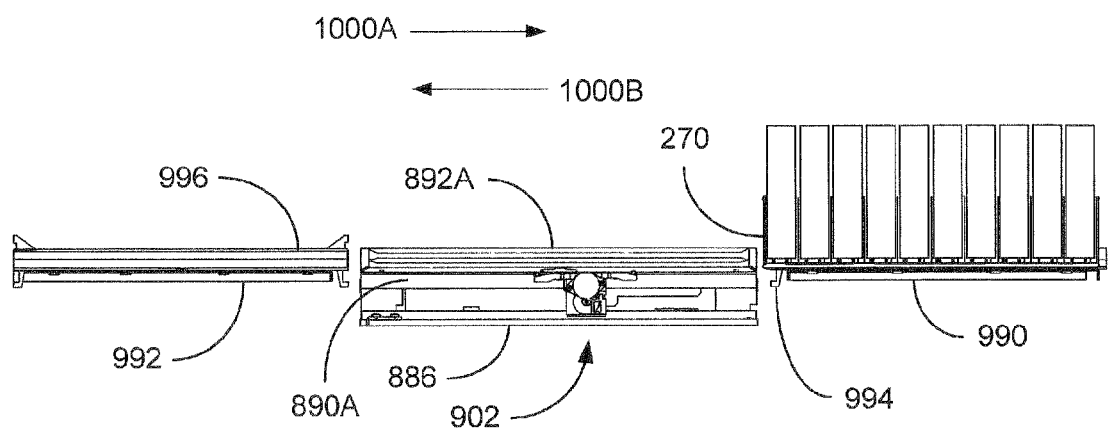
FIGS. 31A-31L are cross-sectional and free body diagrams that illustrate the operation of the magazine picker in moving a magazine from one shelf to another shelf.
Figure 31B:
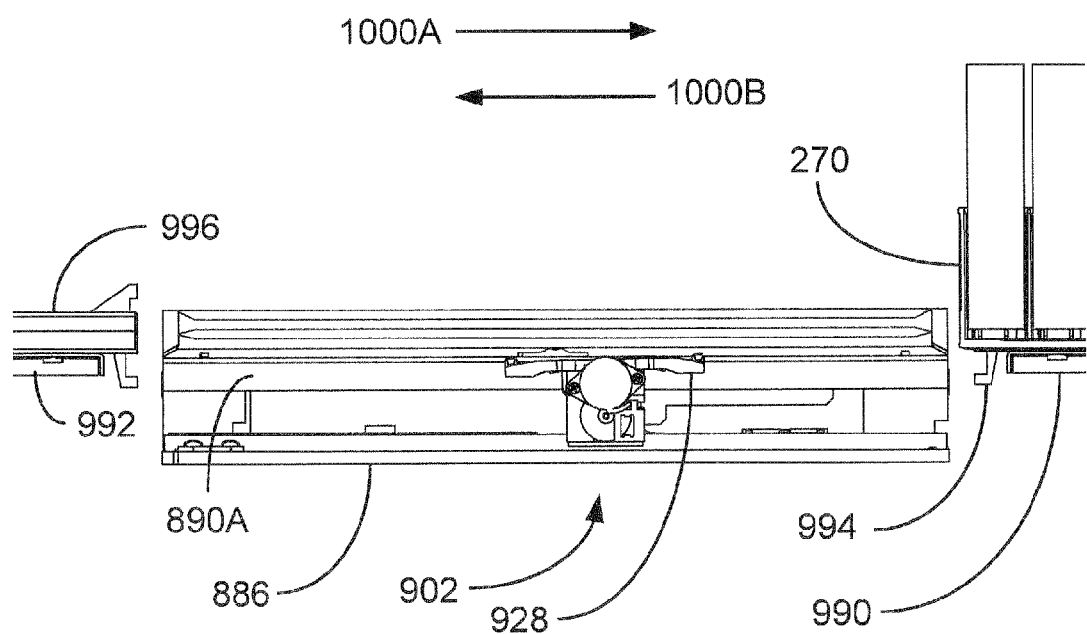

FIGS. 31A-31B illustrate a preferred idle state for the magazine picker 880, namely, with the rotational axis of the toggle plate 928 of the magazine engagement device 902 disposed over the center of the linear rail 906 and the toggle plate 928 in a neutral position. Before describing the movement of the magazine 270, it should be appreciated that the elevator 750 has been used to position the magazine picker 880 adjacent to the first shelf 990. In this regard, the detector 984 has been used to produce a signal that is used to cause the elevator 750 to position the magazine picker 880 so that the magazine picker 880 can remove the magazine 270 from the first shelf 990.

Figure 31C:
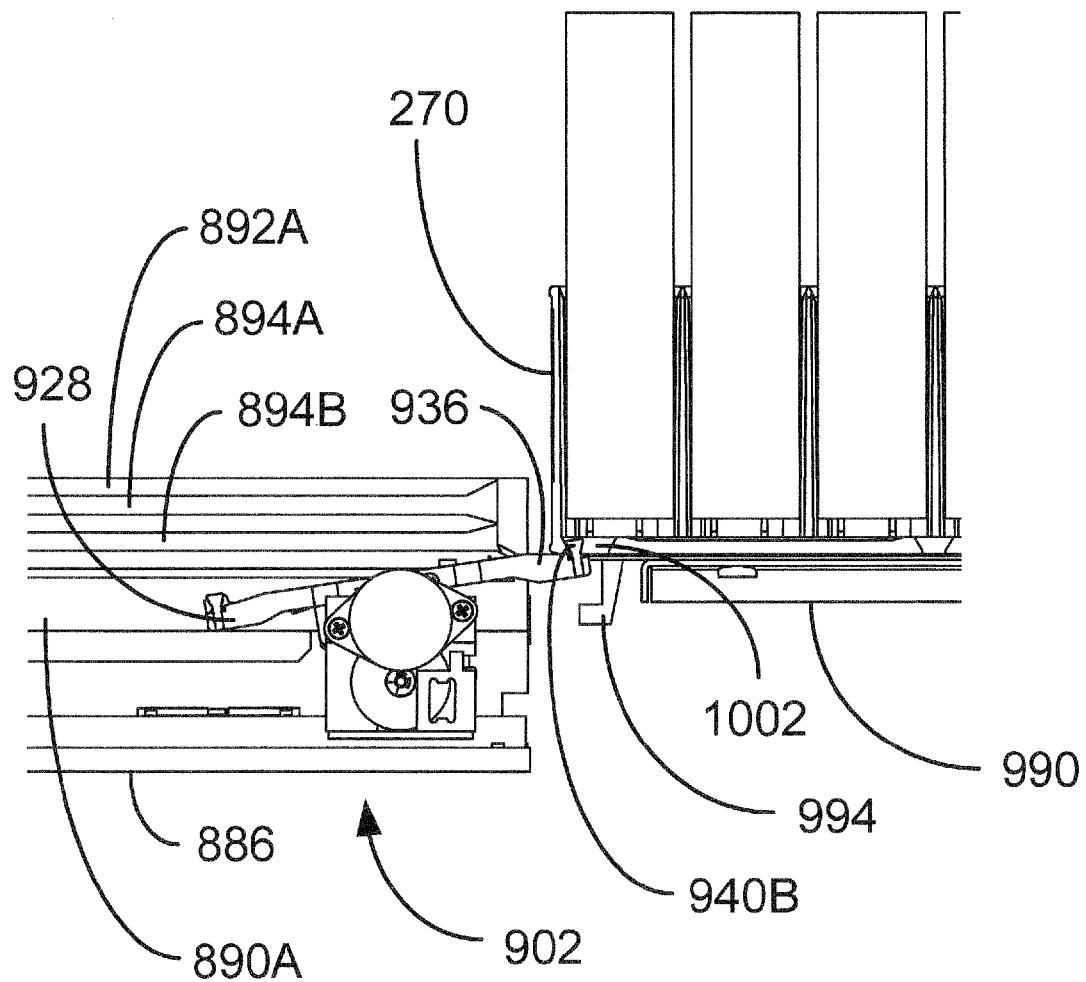

With reference to FIG. 31C, movement of the magazine 270 commences with the magazine displacement device 904 moving the magazine engagement device 902 from the idle state location illustrated in FIGS. 31A-31B and in direction 1000A to a location sufficiently adjacent to the magazine 270 for the magazine engagement device 902 to engage the magazine 270. Engagement of the magazine 270 by the magazine engagement device 902 is accomplished by rotating the toggle plate 928 such that the engagement pins 940A, 940B associated with the second end 936 of the toggle plate 928 can pass through first engagement holes 1002 (e.g., engagement holes 298A, 298B) of the magazine 270 to engage the magazine 270. The engagement of the magazine 270 is confirmed by the interaction of the second sensor assembly 944 with the engagement flag structure (e.g., engagement flag structure 300) of the magazine 270. Alternatively, the optical sensor system that detects a signal reflected by the exterior of the bottom side 278 of the magazine 270 is used to confirm the engagement.

Figure 31D:
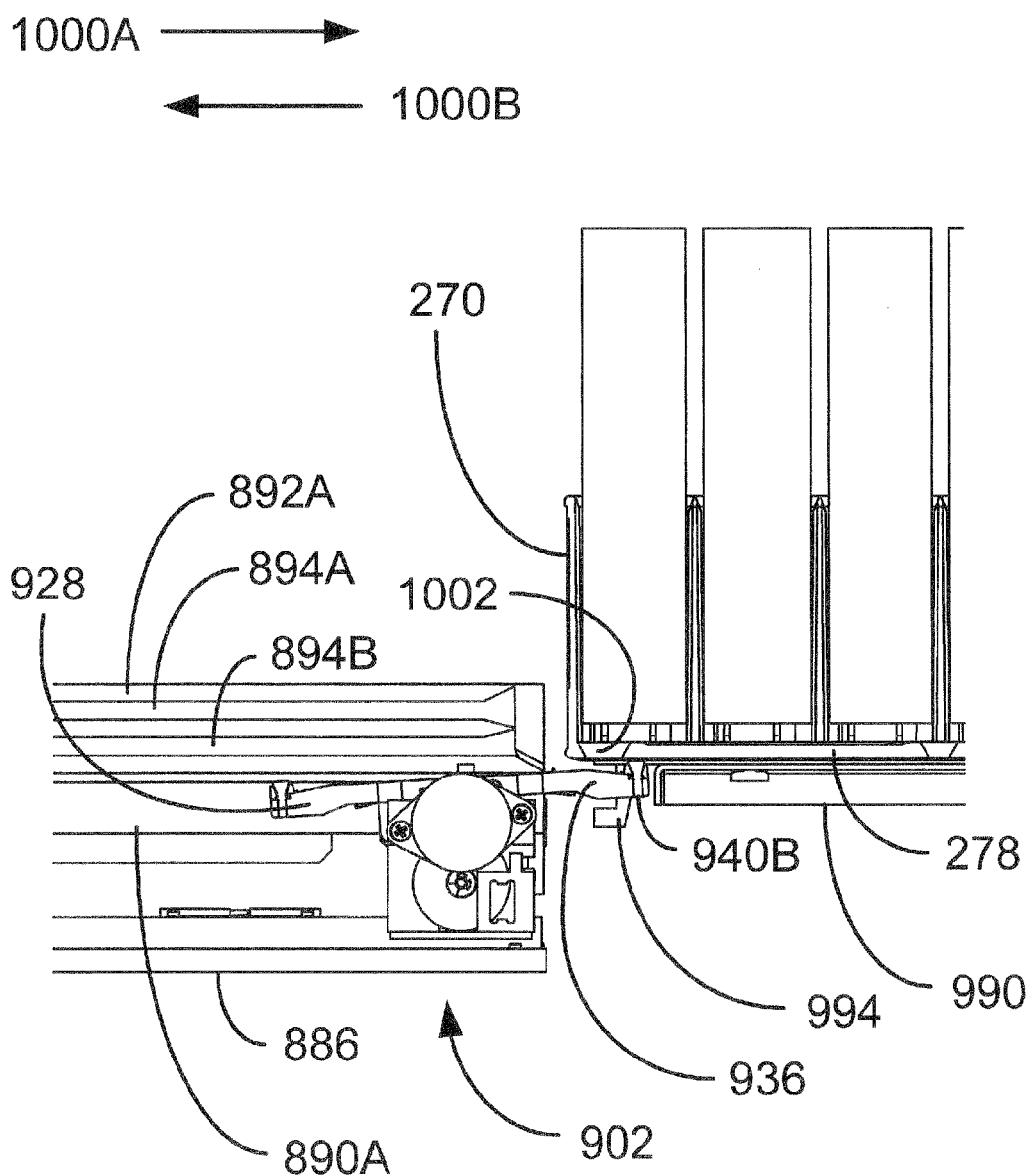

FIG. 31D illustrates an "over travel" condition that may occur in the course of using the magazine engagement device 902 to engage the magazine 270 as shown in FIG. 31C. In an "over travel" situation, the magazine displacement device 904 has moved the magazine engagement device 902 in the direction that is opposite to the direction in which the magazine 270 is to be moved and has moved the magazine engagement device 902 so far in this direction that the magazine engagement device 902 cannot engage the magazine 270. In the illustrated case, the magazine displacement device 904 has moved the magazine engagement device 902 too far in the direction 1000A for the magazine engagement device 902 to engage the magazine 270. As a consequence, when the toggle plate 928 is rotated, the engagement pins 940A, 940B contact the bottom surface 278 of the magazine 933, rather than pass through the engagement holes 1002. In this situation, the spring assembly 964 allows the toggle plate 928 to cease rotating, thereby preventing potential damage to at least the stepper motor 950 and the magazine 270.

In one embodiment of the present invention, the "over travel operation" can have the desired effect of the engagement device 902 engaging the magazine 270 in a first attempt. In an over travel operation, the magazine displacement device 904 purposely moves the magazine engagement device 902 in a direction 1000A that is opposite to the direction 1000B in which the magazine 270 is to be moved and moves the magazine engagement device 902 so far in this direction 1000A that the engagement pins 940A, 940B of the magazine engagement device 902 cannot engage the magazine 270 and instead, upon rotation of the toggle plate 928, contact the bottom surface 278 of the magazine 270. When the engagement pins 940A, 940B of the toggle plate 928 contact the bottom surface 278 of the magazine 270, one of the spring assemblies 964A, 964B allows the toggle plate 928 to cease rotating. Subsequently, when the magazine displacement device 904 moves the magazine engagement device 902 in the direction that the magazine 270 is to be moved and the engagement pins 940A, 940B reach the engagement holes 1002 of the magazine 270, the energy stored in one of the spring assemblies 964A, 964B causes the toggle plate 928 to rotate and the engagement pins 940A, 940B to enter the engagement holes 1002 of the magazine 270 and thereby positively engage the magazine 270 on the first try.

To illustrate the use of the over travel operation, assume the magazine 270 is positioned further in the direction 1000B than is illustrate in FIG. 31C. In such a situation, the magazine engagement device 902 may not be able to engage the magazine 270 if the magazine engagement device 902 is operated in a manner that assumes that the engagement holes 1002 are in the location illustrated in FIG. 31C. If the magazine 270 is not engaged or cannot be engaged with the magazine engagement device 902 in this position, the magazine engagement device 902 will have to be repositioned and the engagement operation repeated. Alternatively, should an over travel operation be performed so that the magazine engagement device 902 is positioned further in direction 1000A than is shown in FIG. 31C, the magazine engagement device 902 can then contact the bottom side 278 of the magazine 270 as shown in FIG. 31D. Once the magazine 270 is contacted in this manner, movement of the magazine engagement device 902 in direction 1000B (which is the direction in which the magazine 270 is to be moved anyway) and the operation of the first spring assembly 964 will cause the engagement pins 940A, 940B to pass through the first engagement holes 1002 of the magazine 270, thereby engaging the magazine 270.

Figure 31E:
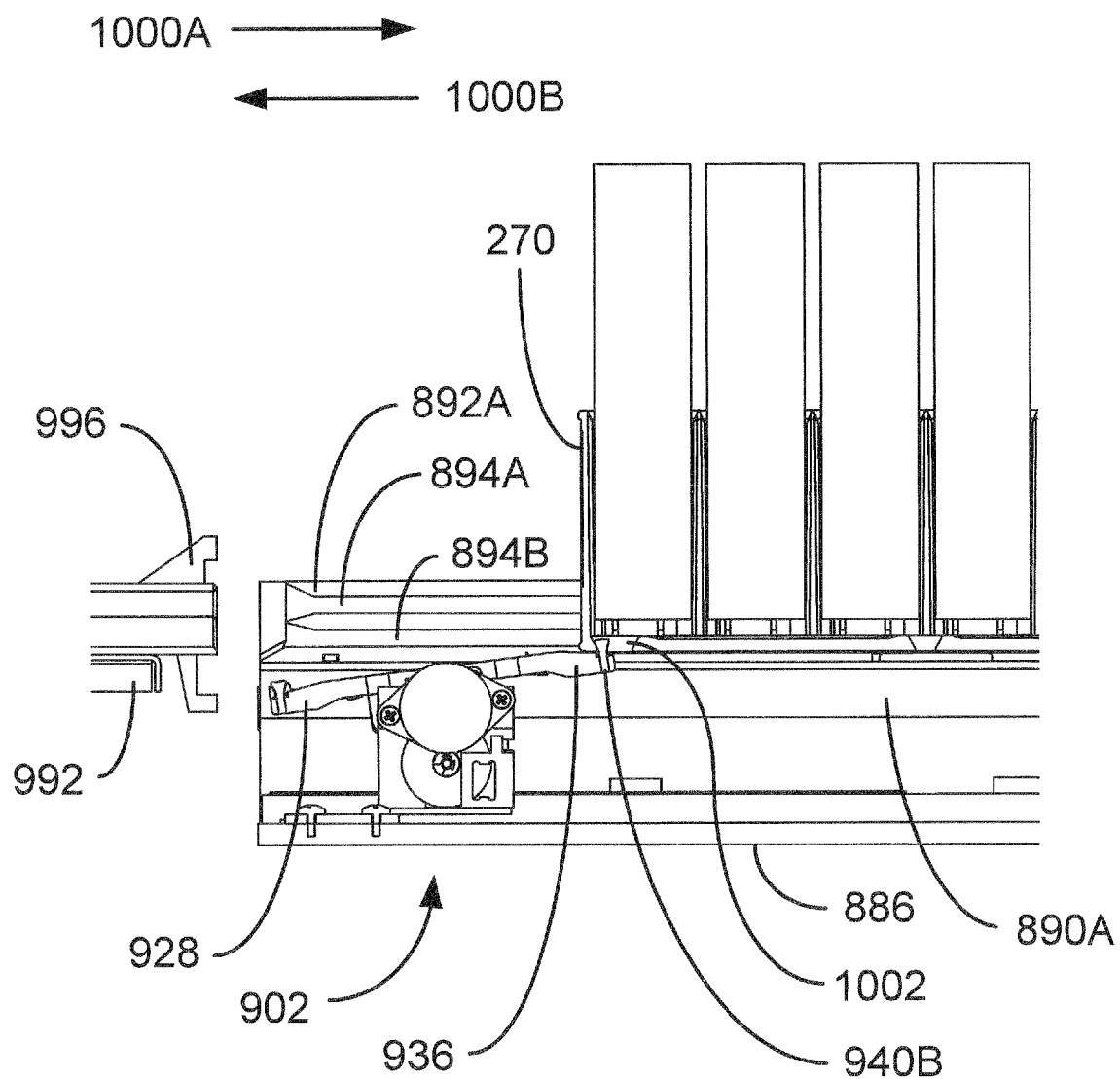

With reference to FIG. 31E, once the magazine 270 has been engaged, the magazine displacement device 904 is used to pull the magazine engagement device 902 and the engaged magazine 270 in direction 1000B and onto the support formed by the rail mounting plates 890A, 890B and into engagement with the rails 892A, 892B.

Figure 31F:
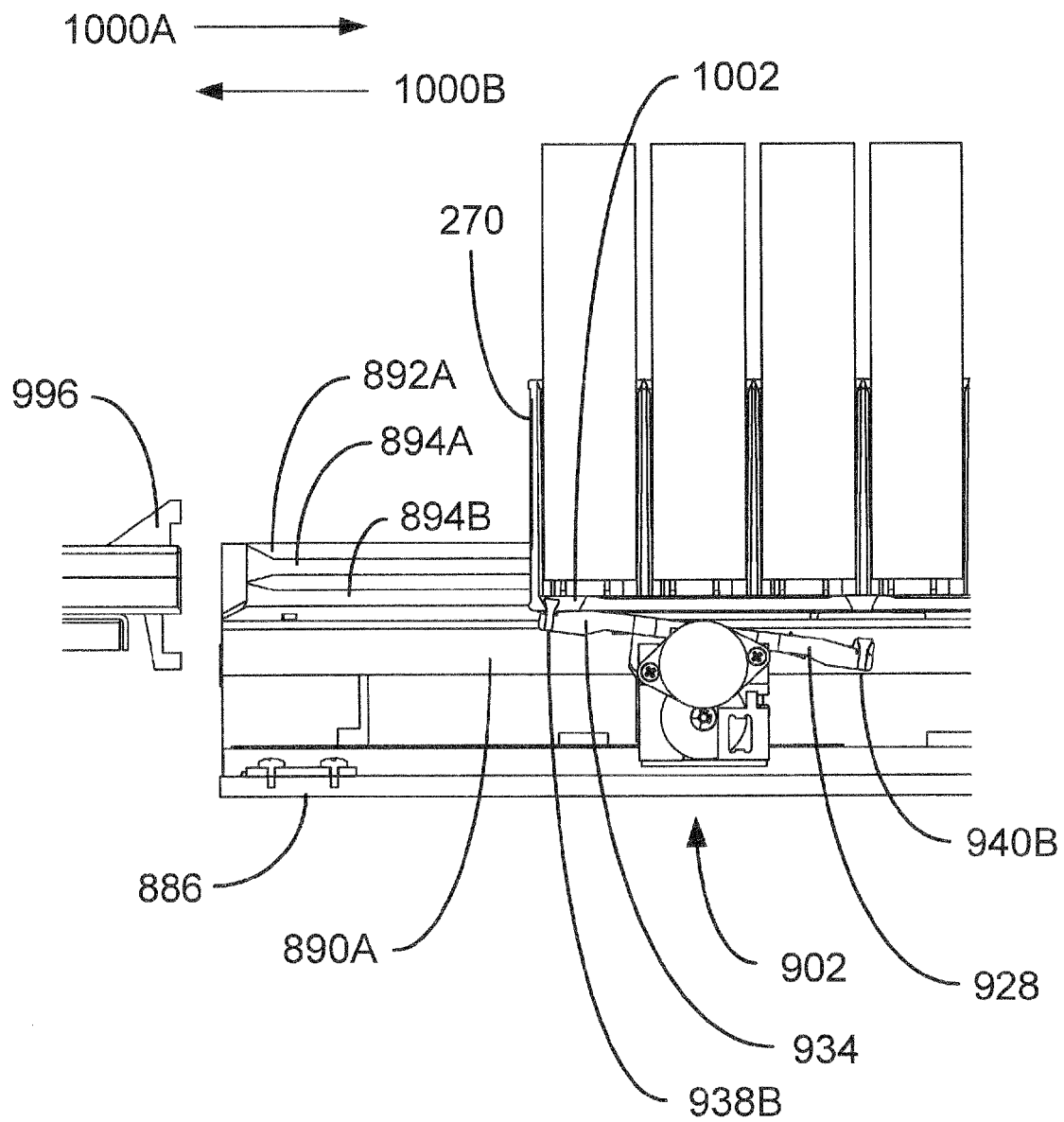

With reference to FIG. 31F, the magazine displacement device 904 is unable to move far enough in the direction 1000B to move the engaged magazine 270 either completely onto the support structure of the magazine picker 880 or completely off of the first shelf 990. Consequently, the following operations have occurred relative to the state of the magazine picker 880 shown in FIG. 31E: (a) the toggle plate 928 has been rotated in the counter-clockwise direction to disengage the toggle pins 940A, 940B from the magazine 270; (b) after disengagement, the magazine displacement device 904 has been moved in direction 1000A so as to position the magazine engagement device 902 to re-engage the magazine (an "over-travel operation" may be employed); and (c) the toggle plate 928 has been rotated in the clock-wise direction so that the engagement pins 938A, 938B associated with the first end 934 of the toggle plate 928 pass through the engagement holes 1002 to re-engage the magazine 270.

Figure 31G:
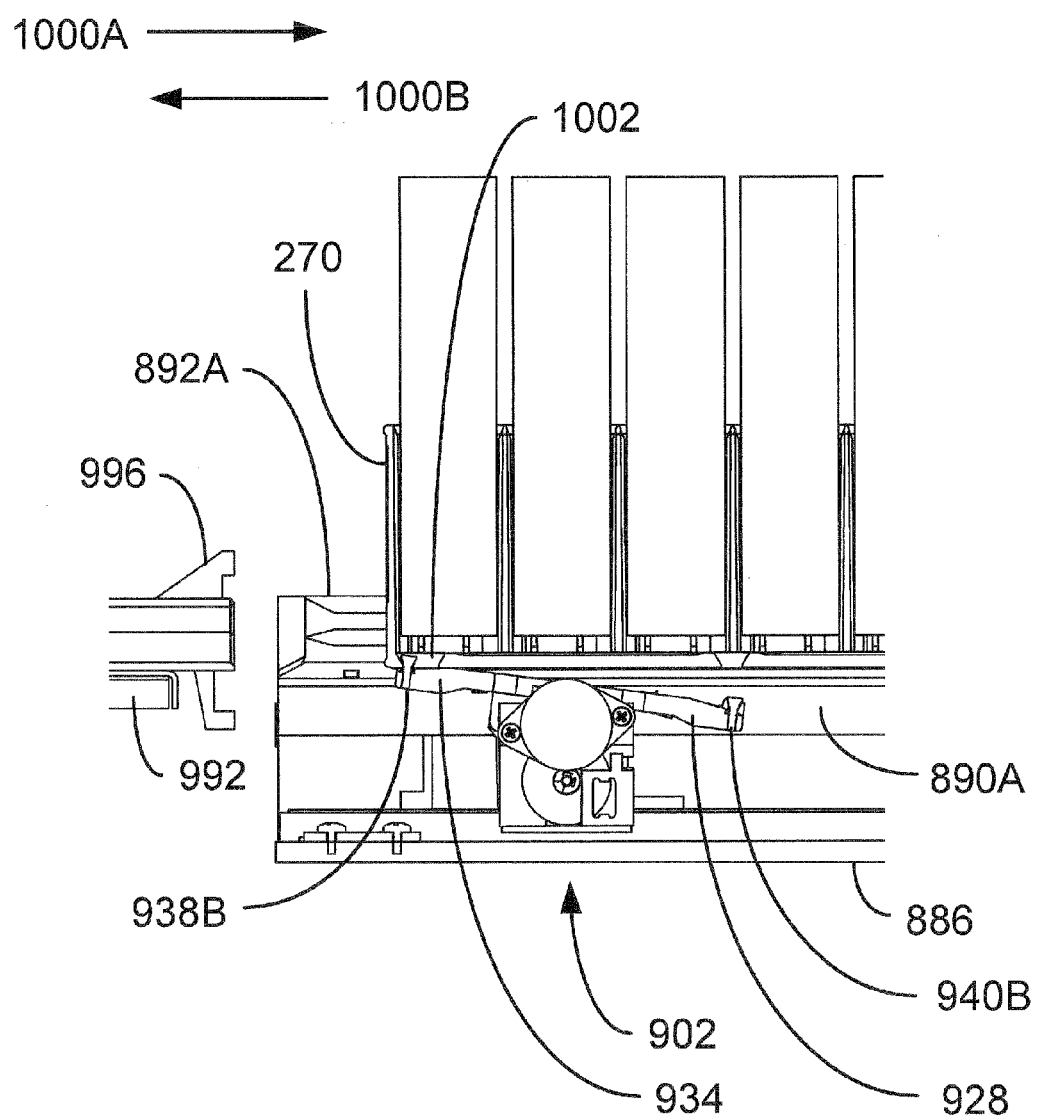

With reference to FIG. 31G, after re-engagement of the magazine 270 by the magazine engagement device 902, the magazine displacement device 904 is used to push the magazine engagement device 902 and the engaged magazine 270 further in the direction 1000B. At this point, the magazine 270 is completely supported by the magazine picker 880 and completely removed from the first shelf 990.

At this point, it should be appreciated that: (a) the steps associated with moving the magazine 270 from the first shelf 270 to the magazine picker 880 are exemplary of the steps associated with moving a magazine from any shelf in the library or from the entry/exit port to the magazine picker 880; (b) the movement of the magazine 270 from the first shelf 990 to the magazine picker 880 required two separate displacements that were separated from one another by an amount of time associated with the disengagement and re-engagement of the magazine; (c) with the magazine 270 fully supported by the magazine picker 880 and completely removed from the first shelf 990, the elevator 750 can be used to move the magazine picker 880 and the magazine 270 to other locations in the library; and (d) the magazine 270 could be moved back onto the first shelf 990 or any other shelf associated with the two columns of shelving 528B.

Figure 31H:
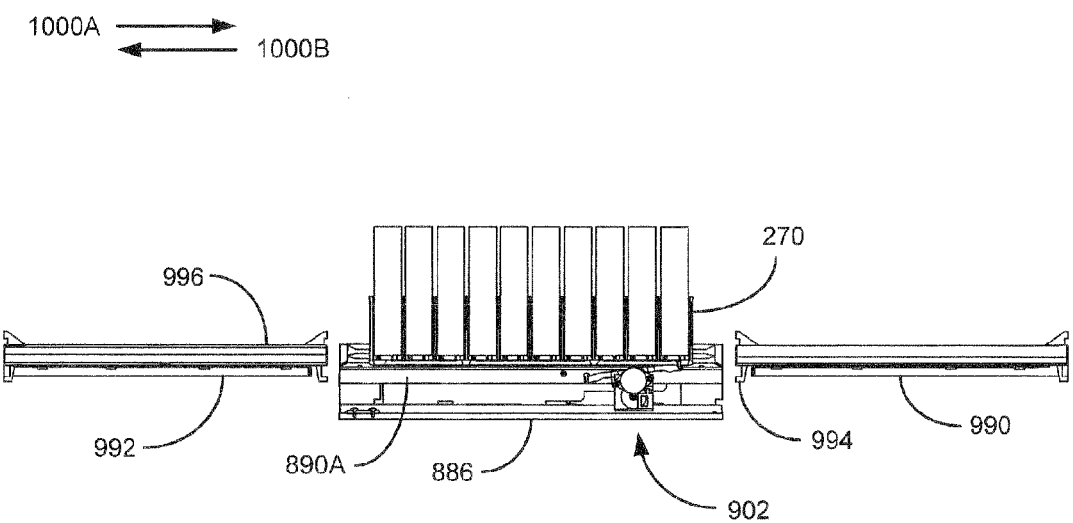
Figure 31I:
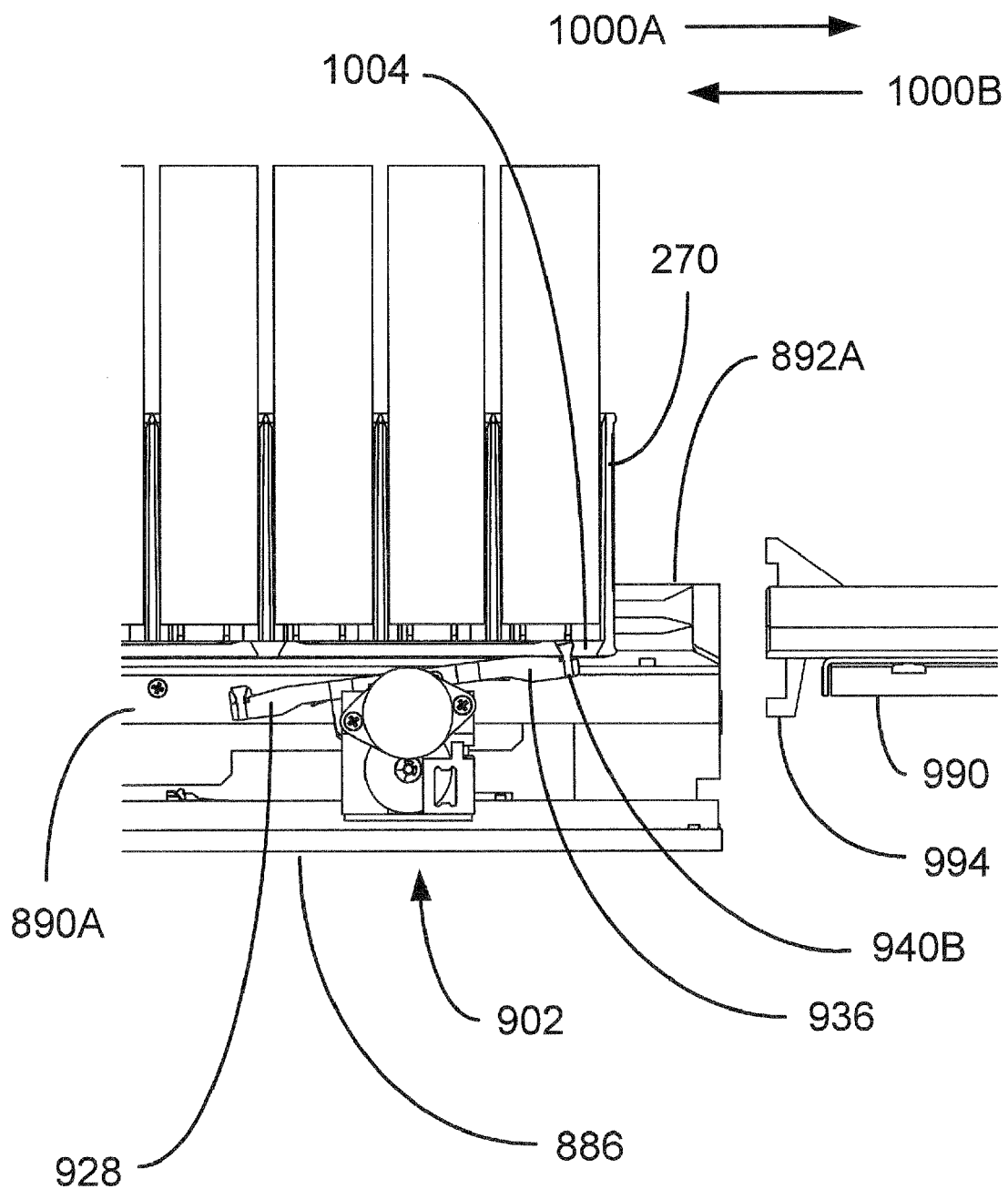

With reference to FIGS. 31H-31I, the use of the magazine picker to move the magazine 270 from the magazine picker 880 to the second shelf 992 is described. It should be appreciated that the movement of the magazine 270 to any shelf of the shelf system 208 involves similar operations to those described hereinafter. Relative to the state of the magazine picker 880 shown in FIG. 31G, the following operations have occurred: (a) the toggle plate 928 has been rotated counter-clockwise to disengage the magazine engage device 902 from the engagement holes 1002; (b) after disengagement, the magazine displacement device 904 has moved the magazine engagement device 902 in the direction 1000A to position the magazine engagement device 902 for engaging the magazine 270; and (c) the toggle plate 928 has been rotated in a counter-clockwise direction so that the engagement pins pass through engagement holes 1004 (e.g., engagement holes 306A, 306B) and thereby engage the magazine 270. An "under travel operation" may be performed so that it is unlikely that engagement of the magazine will require more than one attempt. In an under travel operation, the magazine displacement device 904 purposely moves the magazine engagement device 902 in a direction that is opposite to the direction in which the magazine is to be moved and before the magazine engage device 904 is at a location at which the magazine can be engaged, rotates the toggle plate 928 so that the engagement pins contact the bottom surface 278 of the magazine. When the engagement pins of the toggle plate 928 contact the bottom surface 278 of the magazine, one of the spring assemblies 964A, 964B allows the toggle plate 928 to cease rotating. Subsequently, when the magazine displacement device 904 moves the magazine engagement device 902 further in the direction that is opposite to the direction in which the magazine is to be moved, the engagement pins reach the engagement holes of the magazine and the energy stored in one of the spring assemblies 964A, 964B causes the toggle plate 928 to rotate and the engagement pins to enter the engagement holes of the magazine and thereby positively engage the magazine on the first try.

Figure 31J:
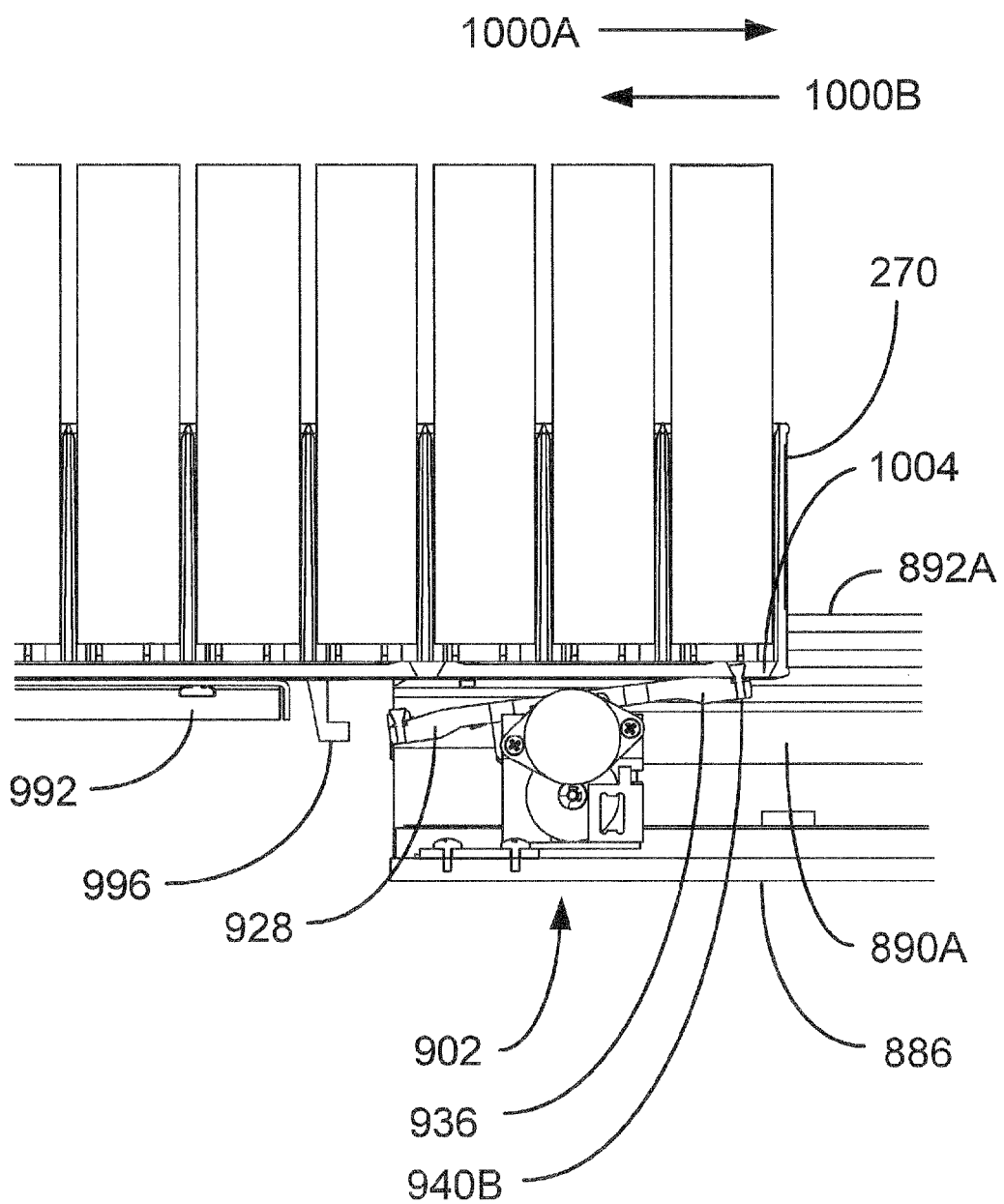

With reference to FIG. 31J, the magazine displacement device 904 is used to pull the magazine engagement device 902 and the engaged magazine 270 in direction 1000B. At this point, the magazine 270 is supported partially by the second shelf 992 and partially by the magazine picker 880.

Figure 31K:
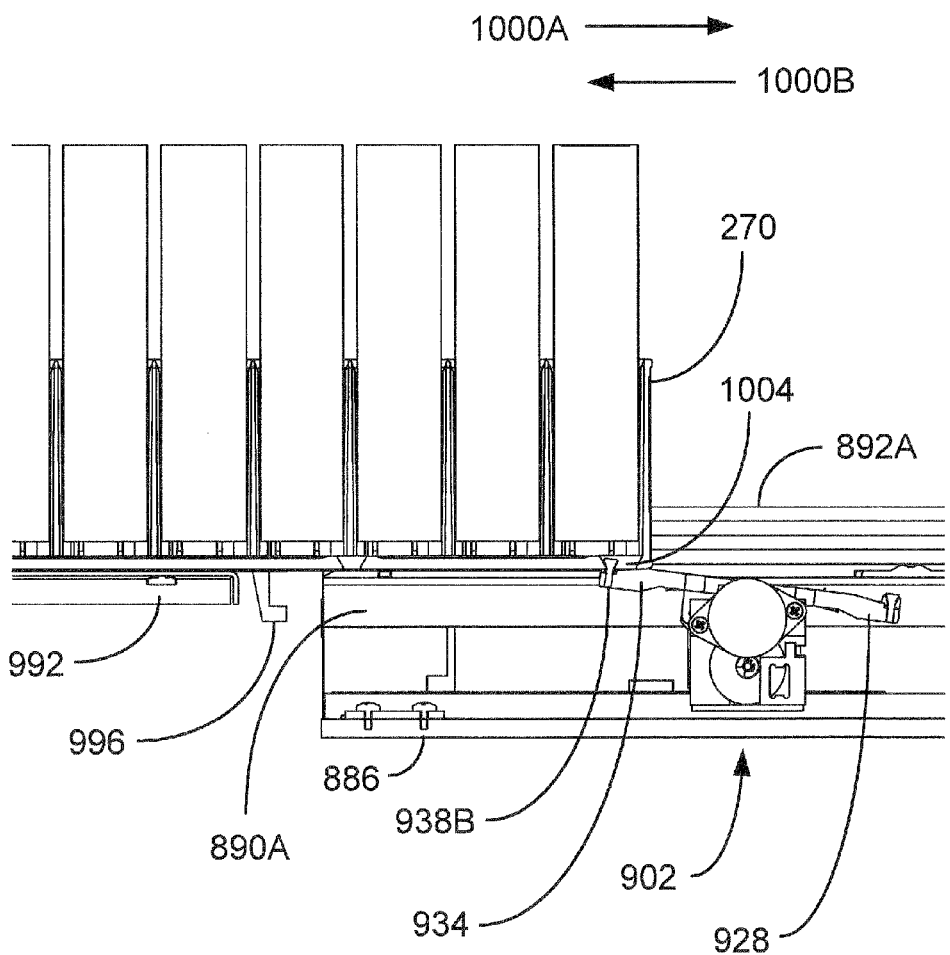

With reference to FIG. 31K, the magazine displacement device 904 is unable to move far enough in the direction 1000B to move the engaged magazine 270 either completely off of the support structure 884 of the magazine picker 880 or completely on to the second shelf 992. Consequently, the following operations have occurred relative to the state of the magazine picker 880 shown in FIG. 31J: (a) the toggle plate 928 has been rotated in the clockwise direction to disengage the toggle pins 940A, 940B from the magazine 270; (b) after disengagement, the magazine displacement device 904 has been moved in direction 1000A so as to position the magazine engagement device 902 to re-engage the magazine 270 (an "under-travel operation" may be employed); and (c) the toggle plate 928 has been rotated in the clockwise direction so that the engagement pins 938A, 938B associated with the first end 934 of the toggle plate 928 pass through the engagement holes 1002 to re-engage the magazine 270.

Figure 31L:
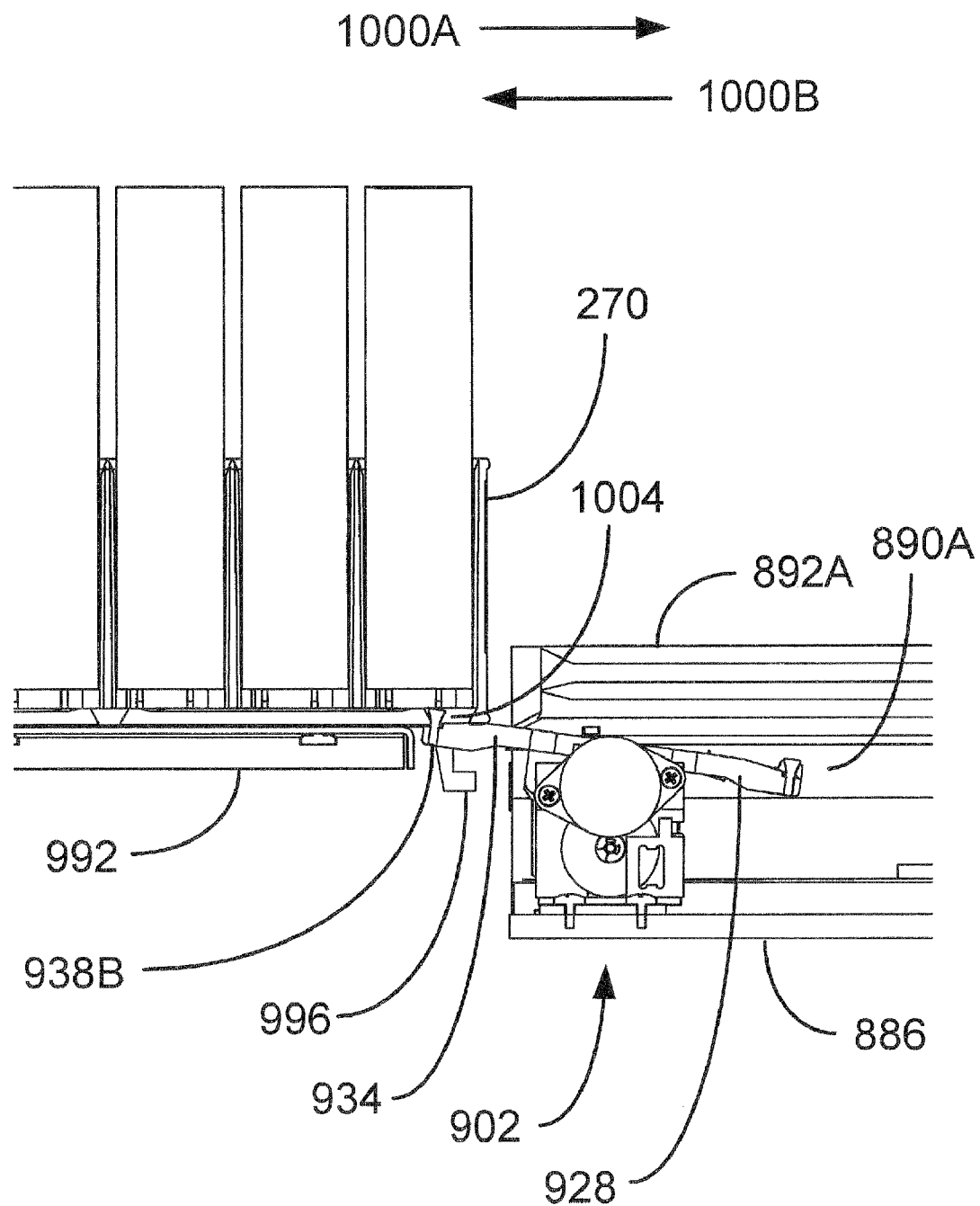

With reference to FIG. 31L, the magazine displacement device 904 has pushed the magazine engagement device 902 and the engaged magazine 270 in direction 1000B so that the magazine 270 is completely supported by the second shelf 992.

At this point, it should be appreciated that: (a) the steps associated with moving the magazine 270 from the magazine picker 880 to the second shelf 992 are exemplary of the steps associated with moving a magazine 270 from the magazine picker 880 to any shelf of the shelf system 208 in the library 202 or to the entry/exit port 206; and (b) the movement of the magazine 270 from the magazine picker 880 to the second shelf 992 required two separate displacements that were separated from one another by an amount of time associated with the disengagement and re-engagement of the magazine 270.

At this point, the toggle plate 928 can be rotated in a counter-clockwise direction to disengage the magazine 270. After any disengagement, the magazine 270 displacement device 904 can then be used to move the magazine engagement device 902 in direction 1000A and return the magazine engagement device 902 to the preferred idle position.

Figure 32:
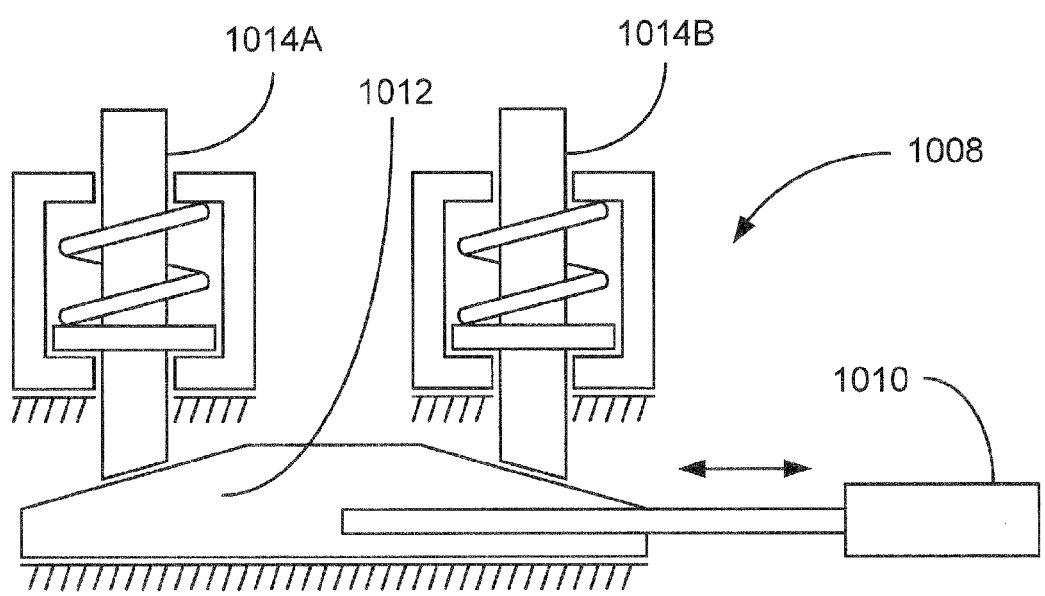
FIG. 32 illustrates an alternative magazine engagement device.

The foregoing has described the magazine transport device 212 used in the library 202. It should, however, be appreciated that other the invention is not limited to the particular design of the elevator 750. For example, an elevator that operates based on a counter-weight principle is also feasible. Further, the invention is not limited to the design of the magazine picker 880. For instance, a magazine engagement device that operates by grasping oppositely situated surfaces of a magazine 270 between two members, with either one member moving towards the other member to grasp the magazine 270 or each member moving towards the other member to grasp a magazine 270, is possible. A magazine engagement device that operates by linearly translating one or more engagement pins to engage a magazine 270 and disengage from a magazine 270 is also feasible. For example, FIG. 32 illustrates a magazine engagement device 1008 that uses a linear actuator 1010 to displace a camming device 1012 that, in turn, causes engagement pins 1014A, 1014B to be linearly translated to engage a magazine 270 and disengage from a magazine 270. Yet another approach is to use a conveyor belt to engage and move a magazine 270 between a support structure 884 and a shelf of the shelf system 208.

Figure 33A:
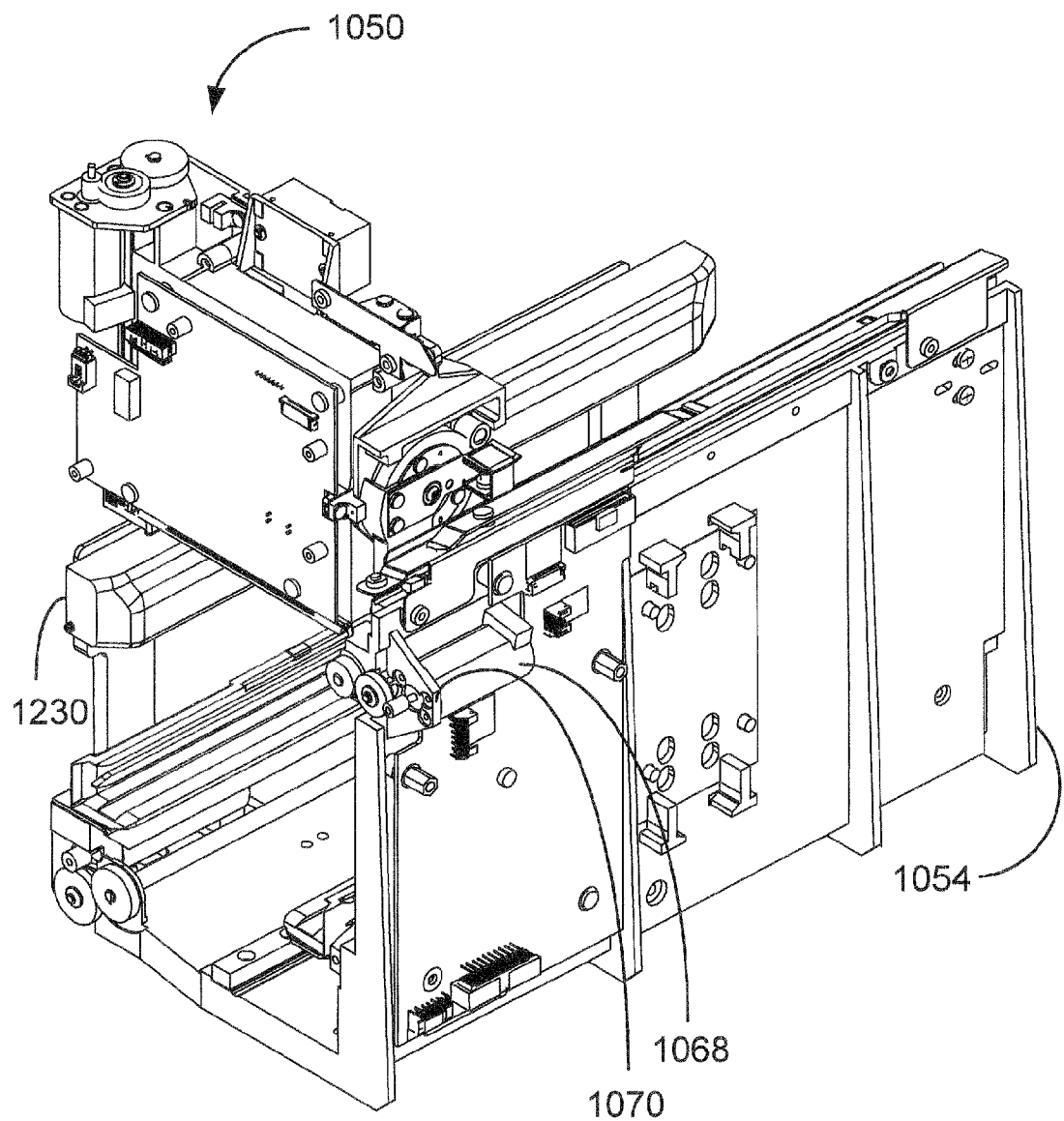
FIGS. 33A-33N illustrate an embodiment of a cartridge transport.
Figure 33B:
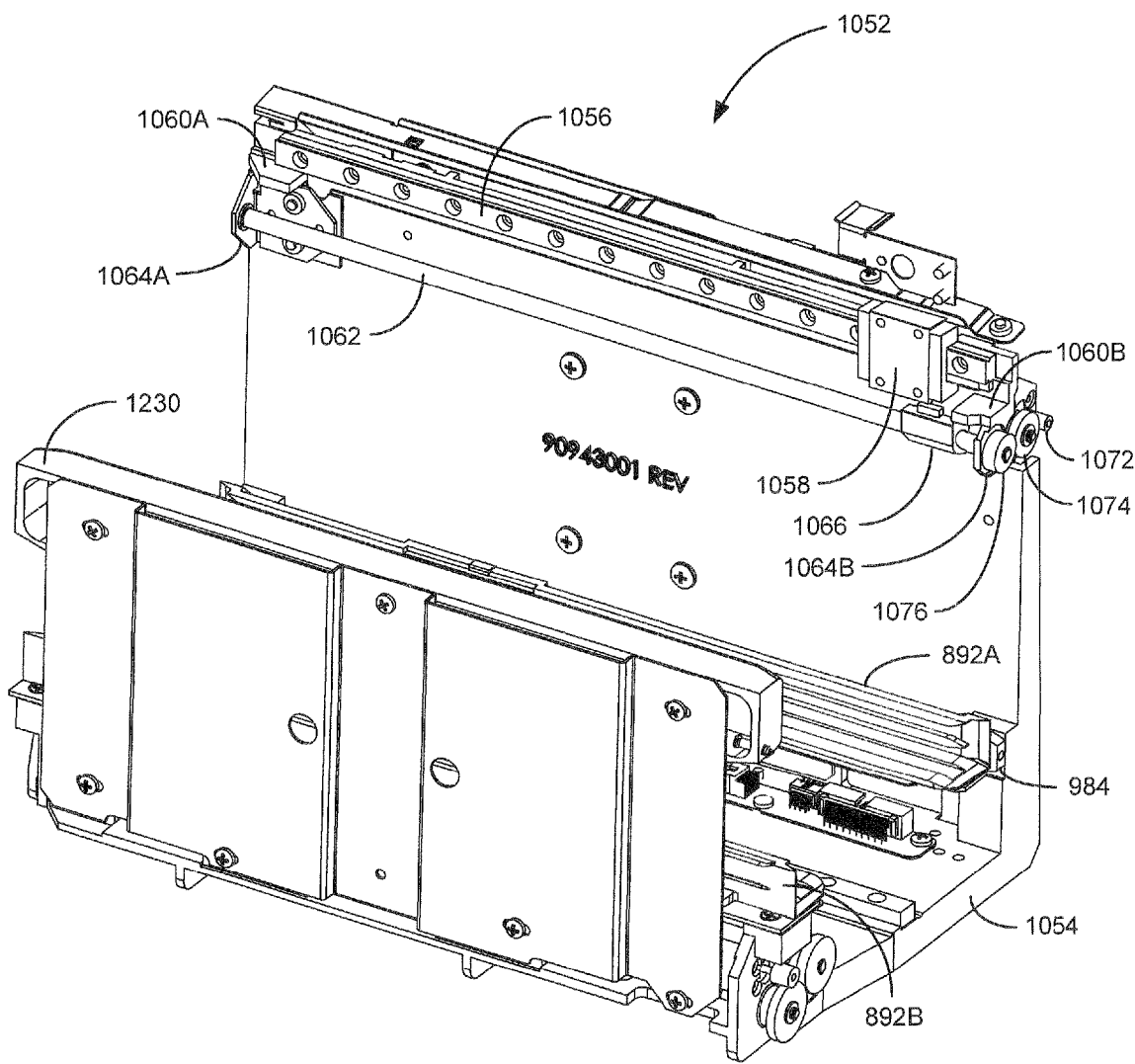

Generally, the cartridge transport 214 operates to move a data cartridge 224 between a magazine 270 and a drive 180. With reference to FIGS. 33A-33B, the cartridge transport 214 is comprised of: (a) a cartridge transport unit 1050; (b) a horizontal transport unit 1052 for horizontally displacing the cartridge transport unit 1050; and (c) the elevator 750.

With continuing reference to FIGS. 33A-33B, the horizontal transport unit 1052 is attached to a transport chassis 1054 that is, in turn, attached to the vertical axis assembly 752 of the elevator 750. The transport chassis 1054, in this embodiment, is an integration of the carriage 882, the base plate 886, and the brackets 888A-888D, previously described with respect to the magazine transport 212. It should also be noted that the rail 892A comprises a spring-loaded detent 1055 for engaging one of the notches 295A, 295B associated with a magazine 270 to secure a magazine 270 on the transport chassis 1054. A second spring-loaded detent (not shown) is associated with the rail 892B and is used to engage the other of the notches 295A, 295B associated with a magazine 270.

The horizontal transport unit 1052 comprises: (a) a linear rail 1056 that is attached to the transport chassis 1054; (b) a rail block 1058 that is mounted to the linear rail 1056, capable of moving along the linear rail 1056, and supports the cartridge transport unit 1050; (c) a pair of stop blocks 1060A, 1060B for limiting the range over which the rail block 1058 can move along the linear rail 1056; (d) a lead screw 1062 that is supported by a pair of brackets 1064A, 1064B that are attached to the transport chassis 1054; (e) a lead screw nut 1066 for applying a motive force to the cartridge transport unit 1050 to move the unit 1050 to a desired location along the linear rail 1056; (e) a DC motor 1068 that provides the rotational motive force that causes the lead screw nut 1066 to move along the lead screw 1062, and is supported by bracket 1070 that is attached to the transport chassis 1054; (f) a pinion 1072 that is attached to the spindle of the DC motor 1068; and (g) first gear 1074 and a second gear 1076 that are used to transfer the rotational force produced by the DC motor 1068 to the lead screw 1062.

Figure 33C:
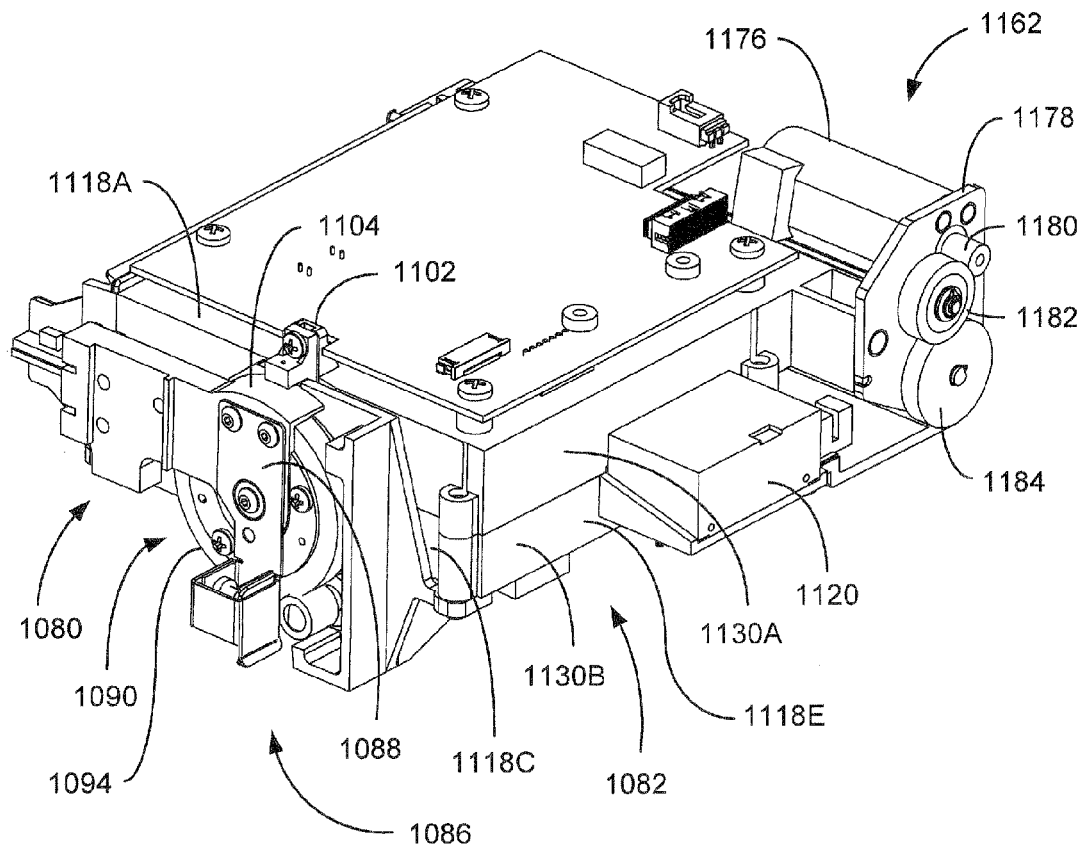
Figure 33D:
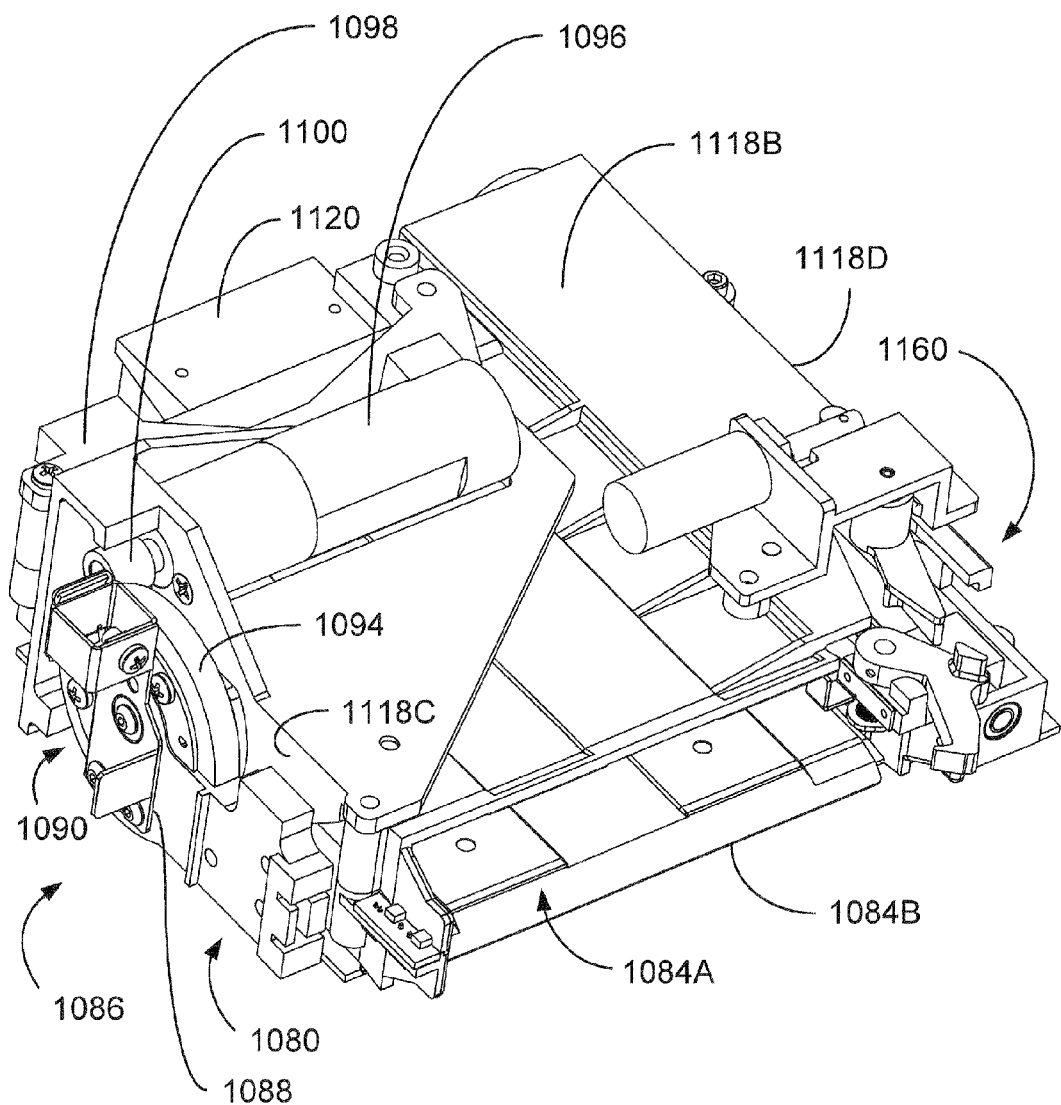
Figure 33E:
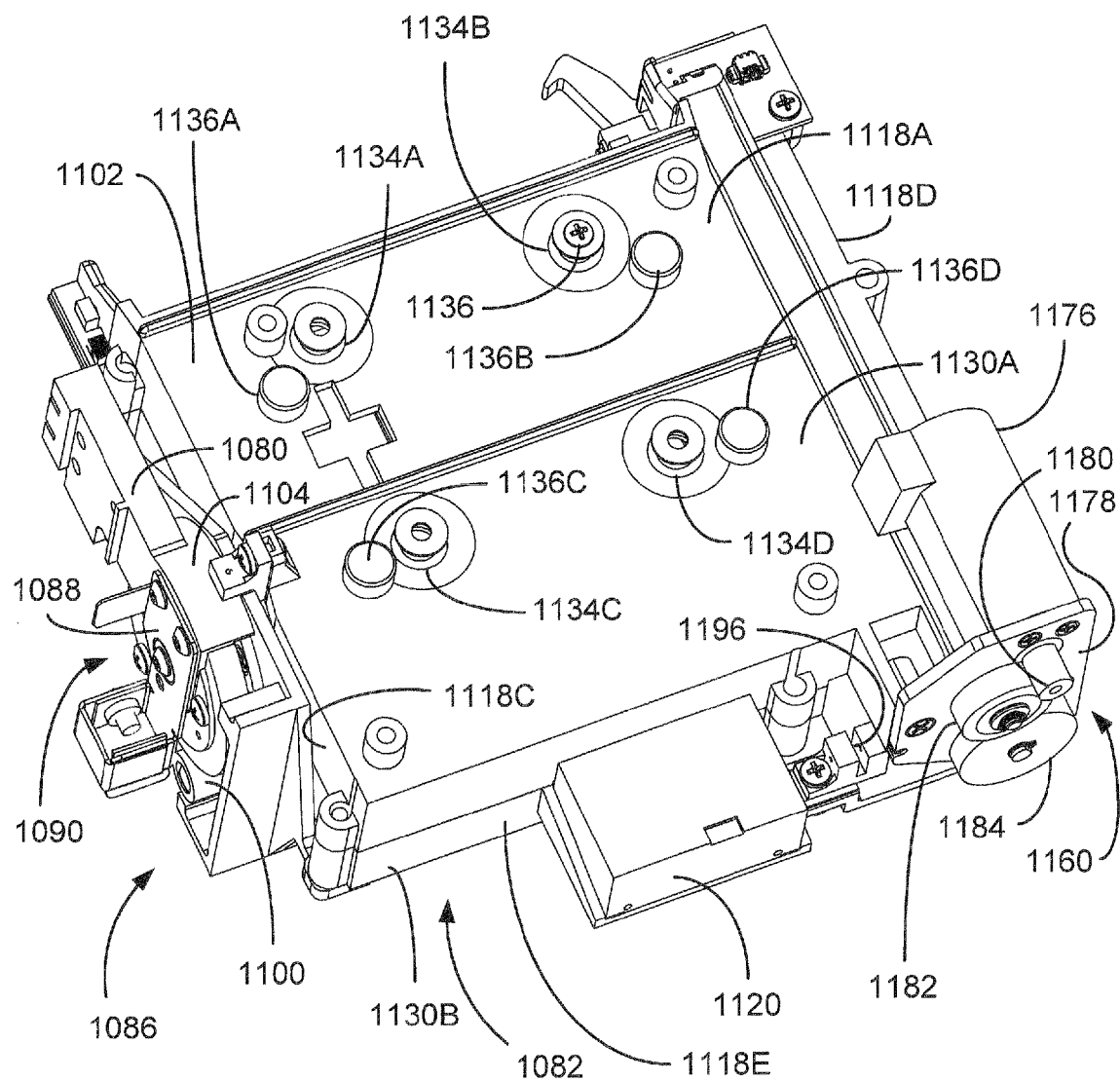
Figure 33F:
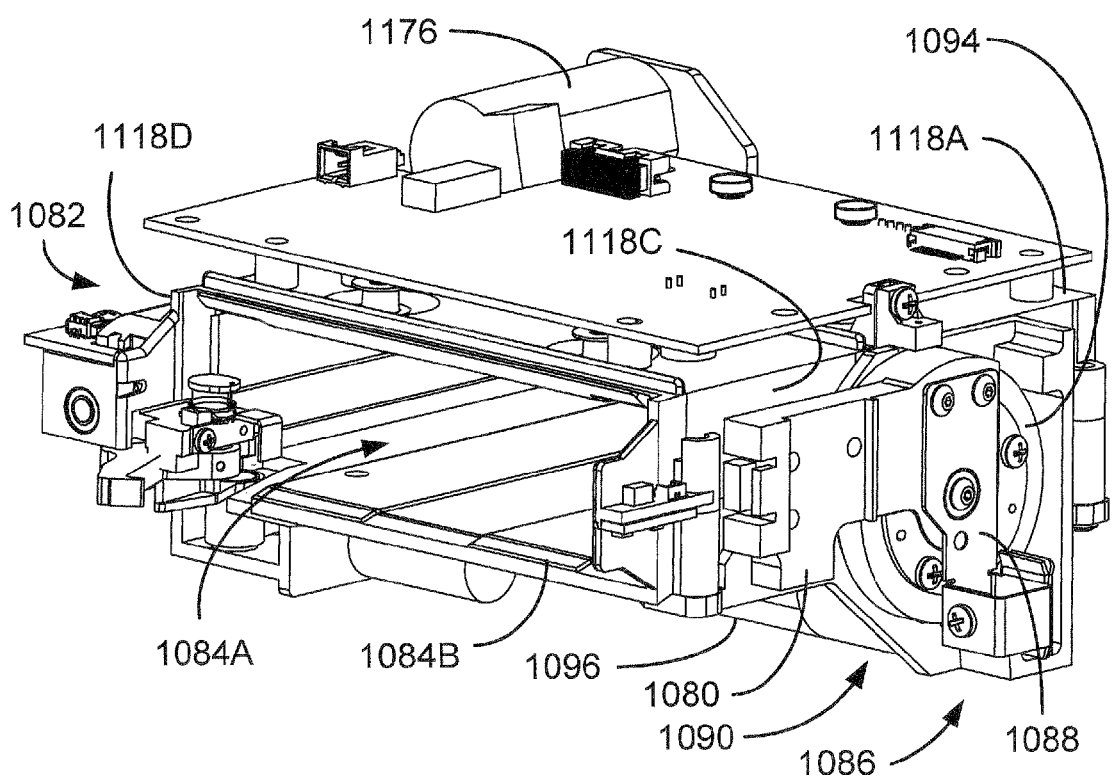
Figure 33G:
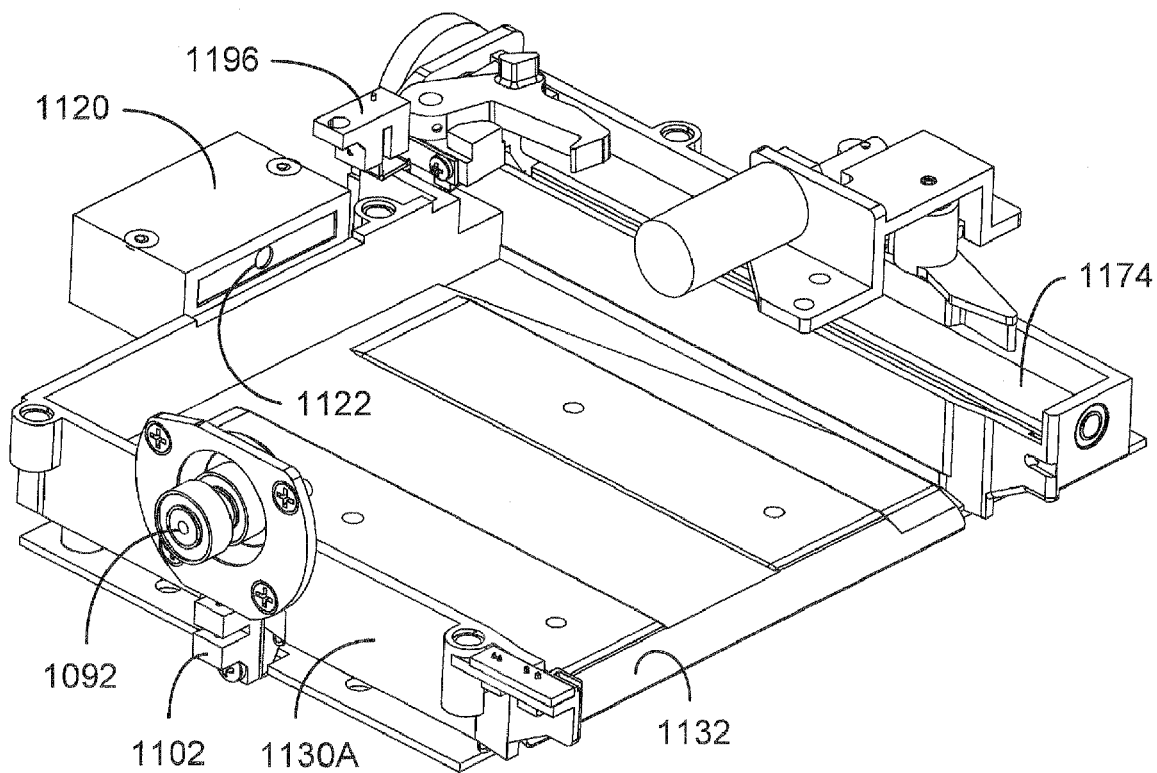
Figure 33H:
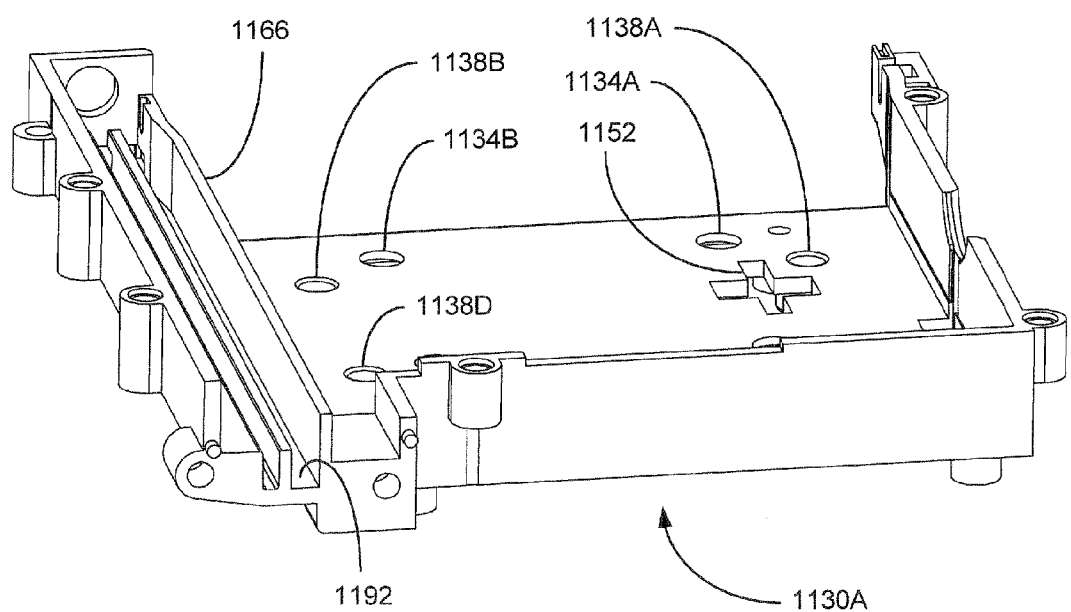
Figure 33I:
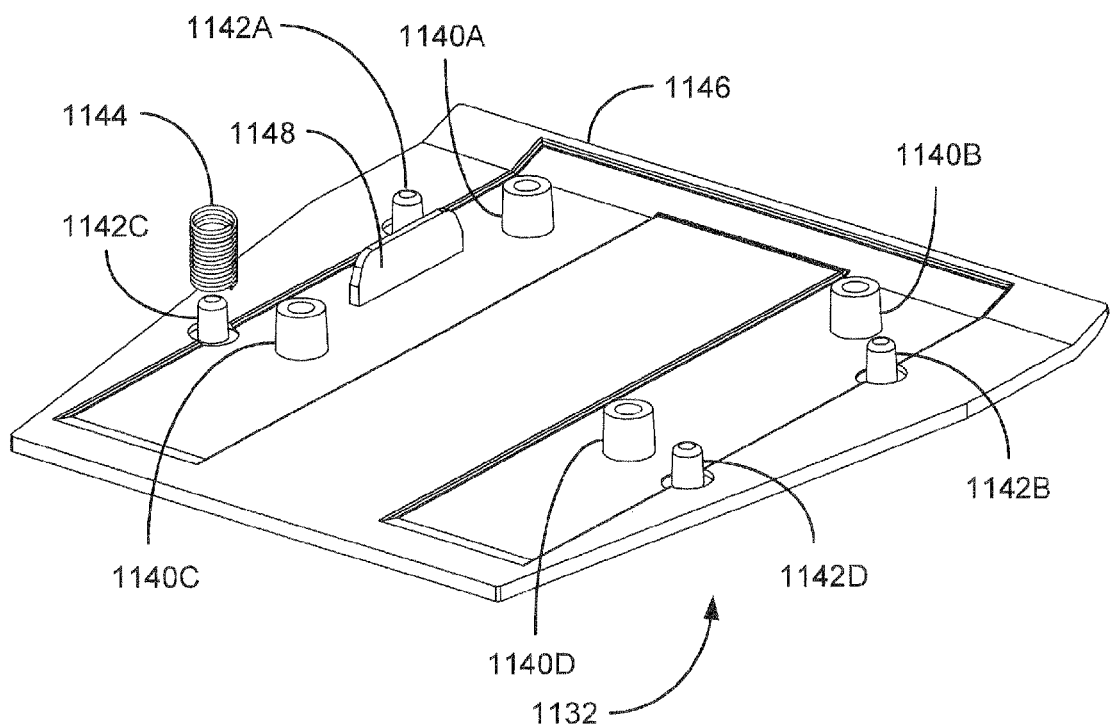
Figure 33J:
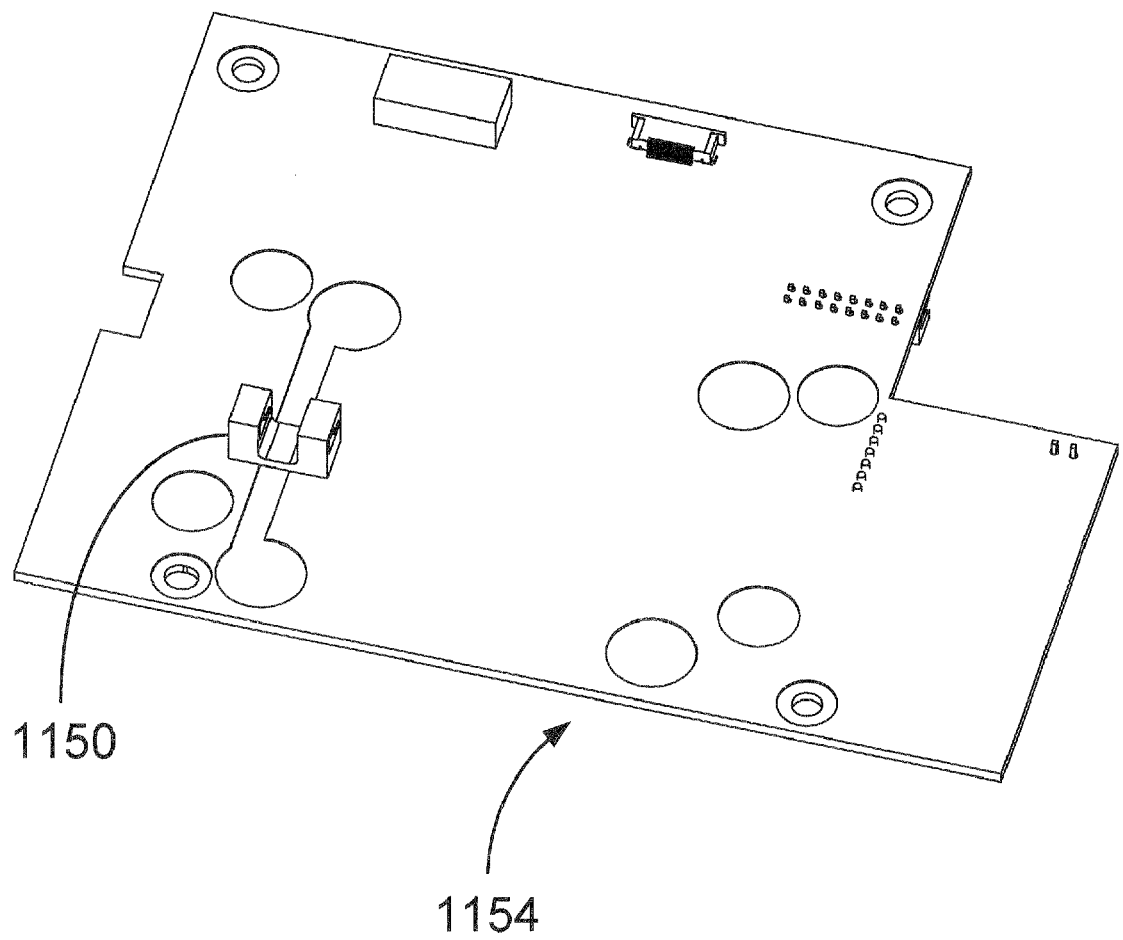
Figure 33K:
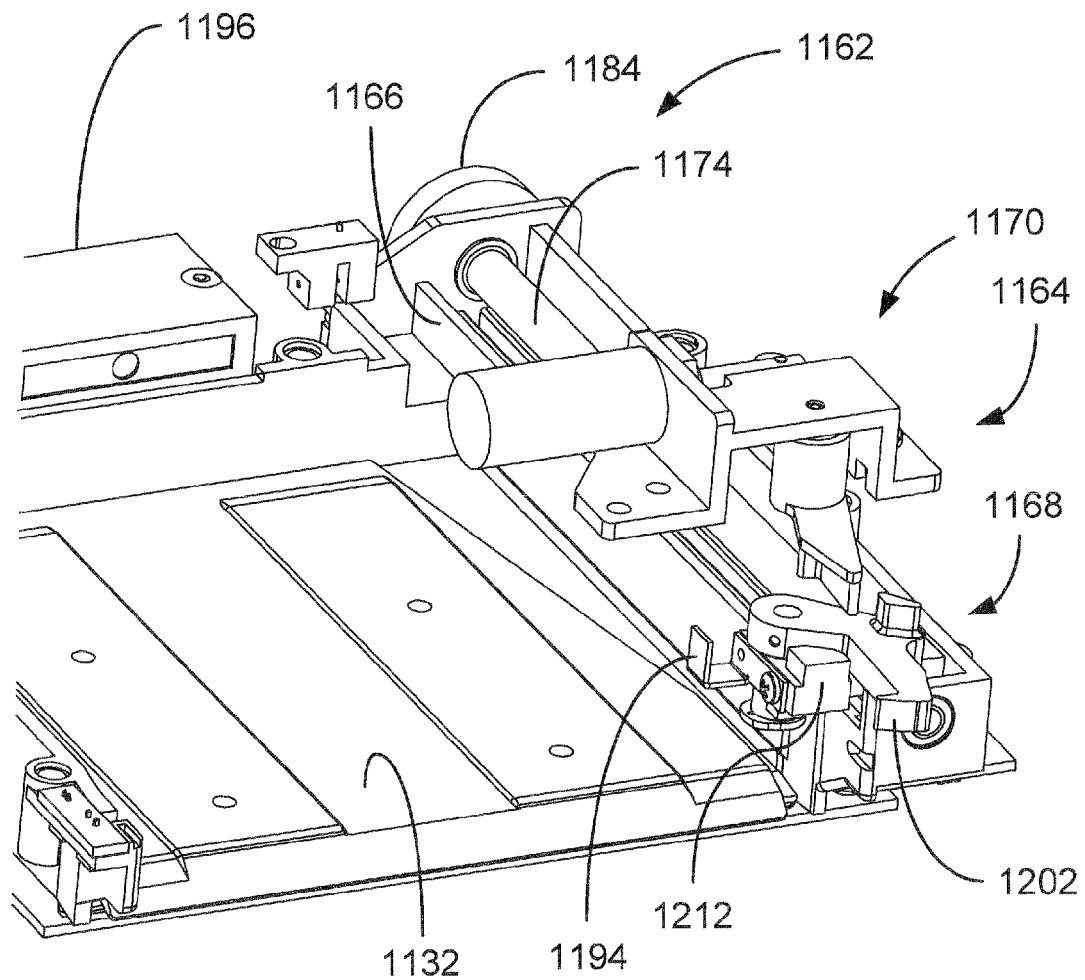
Figure 33L:
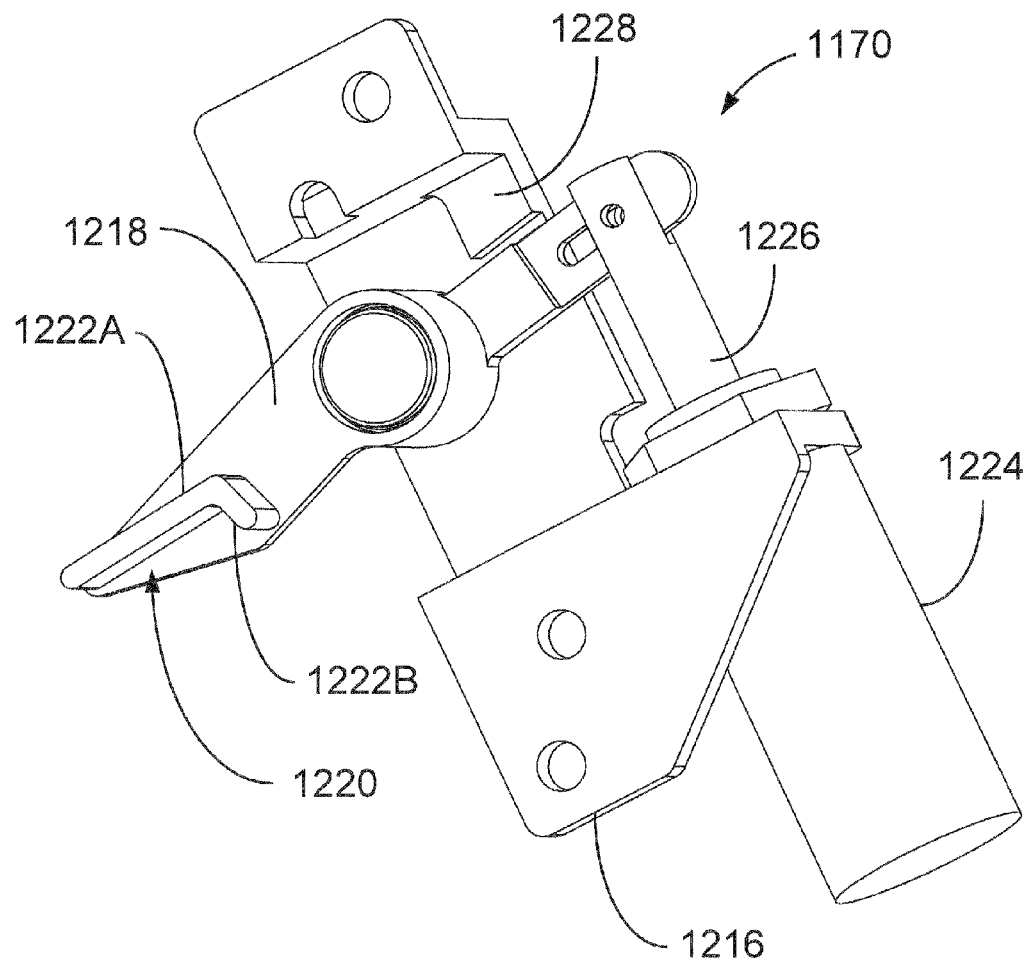
Figure 33M:
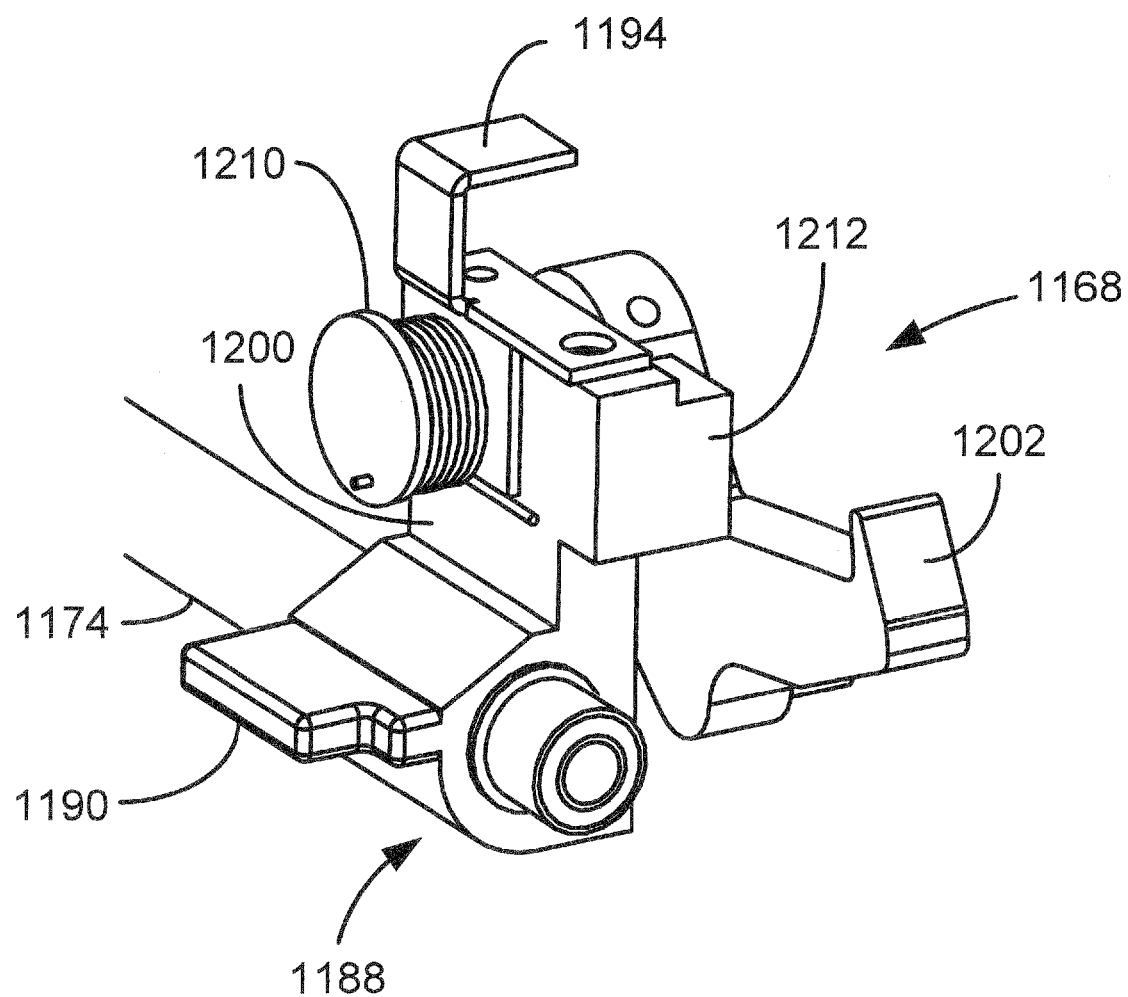
Figure 33N:
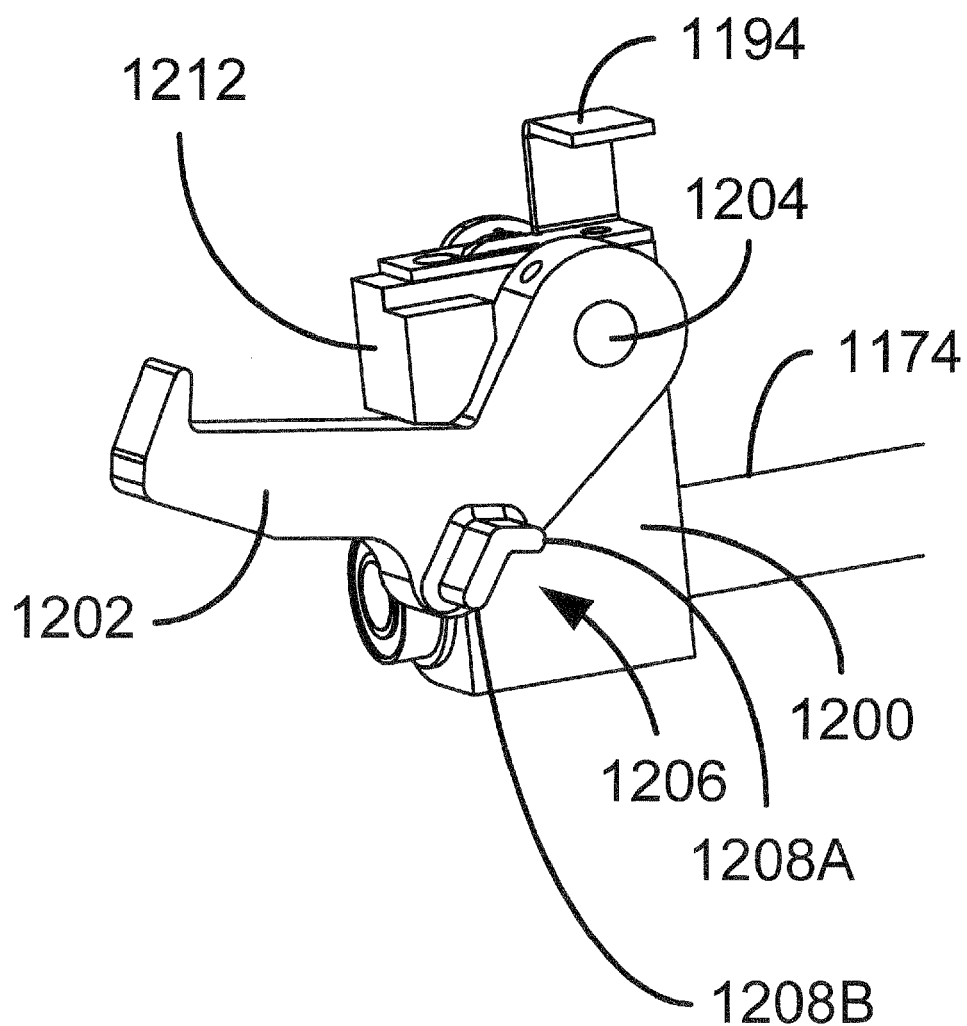

With reference to FIGS. 33C-33D, the cartridge transport unit 1050 comprises a carriage block 1080 that is attached to the rail block 1058 and engages the lead screw nut 1066. As will be appreciated by one skilled in the art, upon the application of a rotational motive force by the DC motor 1068, the lead screw nut 1066 is displaced along the lead 1062 and, as a consequence, the cartridge transport unit 1050 is horizontally displaced along the linear rail 1056. Horizontal displacement of the cartridge transport unit 1050 along the linear rail 1056 facilitates: (a) positioning of the cartridge transport unit 1050 over a particular slot of a magazine 270 supported by the magazine picker 880 so that a data cartridge 224 can be inserted into the slot of the magazine 270 or a data cartridge 224 can be extracted from the slot of the magazine 270; and (b) moving the cartridge transport unit 1050 towards and away from a drive 180 during the transfer of a data cartridge 224 between a magazine 270 and the drive 180. The location of the cartridge transport unit 1050 is determined using an encoder associated with the DC motor 1068 or other position sensor known in the art.

With reference to FIGS. 33C-33F, the cartridge transport unit 1050 further comprises: (a) a housing 1082 that defines an interior space 1084A for receiving a data cartridge 224 and an opening 1084B through which a cartridge 224 is received into the interior space 1084A and through which a cartridge 224 is expelled from the interior space 1084A (sensor is located adjacent to the opening 1084B for use in determining whether a data cartridge 224 has been grasped and for determining whether a cartridge 224 is in a magazine 270); and (b) a rotary assembly 1086 for selectively rotating the housing 1082. The rotary assembly 1086 comprises: (a) a bracket 1088 that is attached to the carriage block 1080; (b) a gear 1090 with a center bearing 1092 for attaching the bracket 1088 to the gear 1090 so as to allow relative rotational movement between the bracket 1088 and the gear 1090, and with an outer gear ring 1094 that is fixed to the housing 1082; (c) a DC motor 1096 for providing a rotational motive force that is used to rotate the housing 1082 about an axis defined by the center bearing 1092, the DC motor 1096 is attached the housing 1082 by a bracket 1098; (d) a pinion 1100 that is attached to the spindle of the DC motor 1096 and engages the outer gear ring 1094. As will be appreciated by one skilled in the art, a rotational motive force produced by the DC motor 1096 is transmitted to the outer gear ring 1094 by the pinion 1100. As a consequence, the housing 1082 rotates relative to the carriage block 1080 and about the axis 1096. A rotational sensor 1102 that is attached to the housing 1082 cooperates with a flag 224 that is associated with the bracket 1088 to providing information on the rotational position of the housing 1082.

Figure 34A:
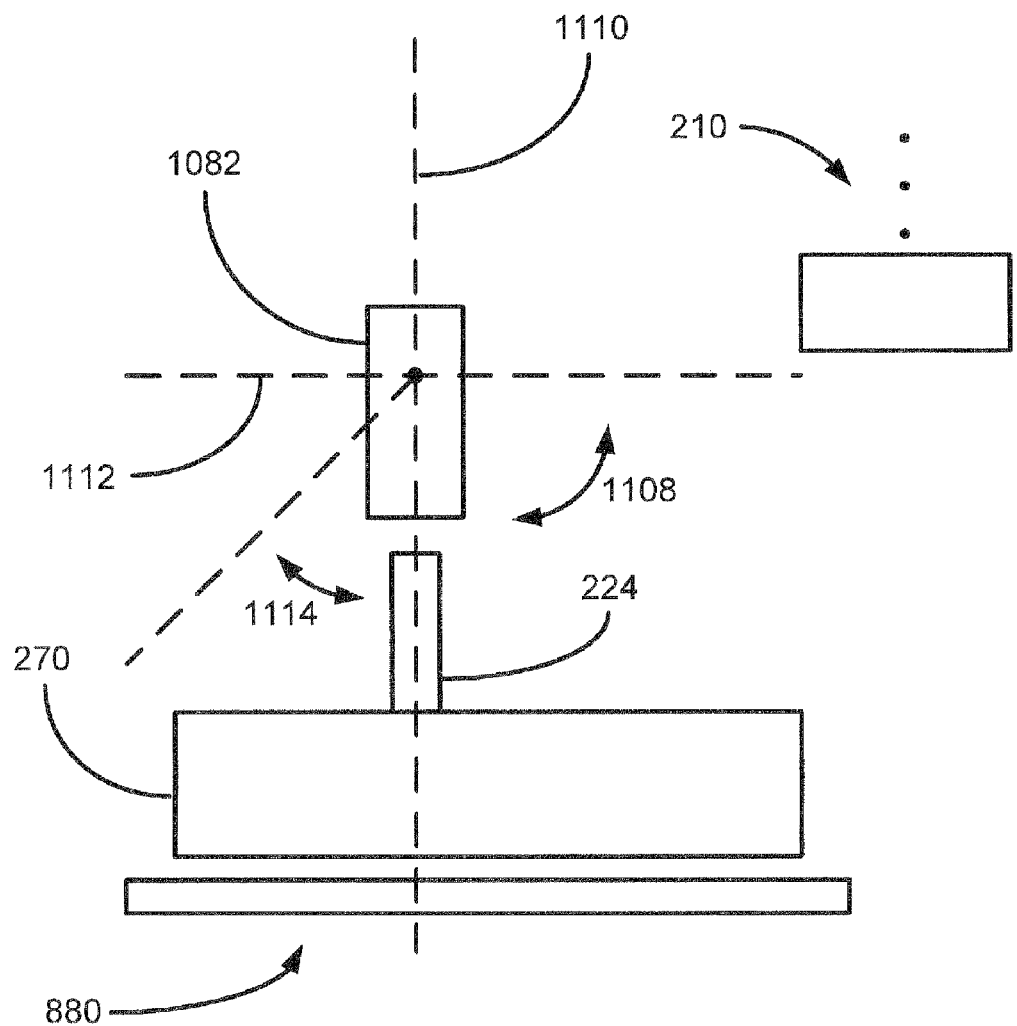
FIGS. 34A and 34B respectively illustrate the range of motion of the housing of the cartridge transport and the ability of a bar code reader to read a bar code label that identifies a magazine and a bar code label that identifies a cartridge.
Figure 34B:
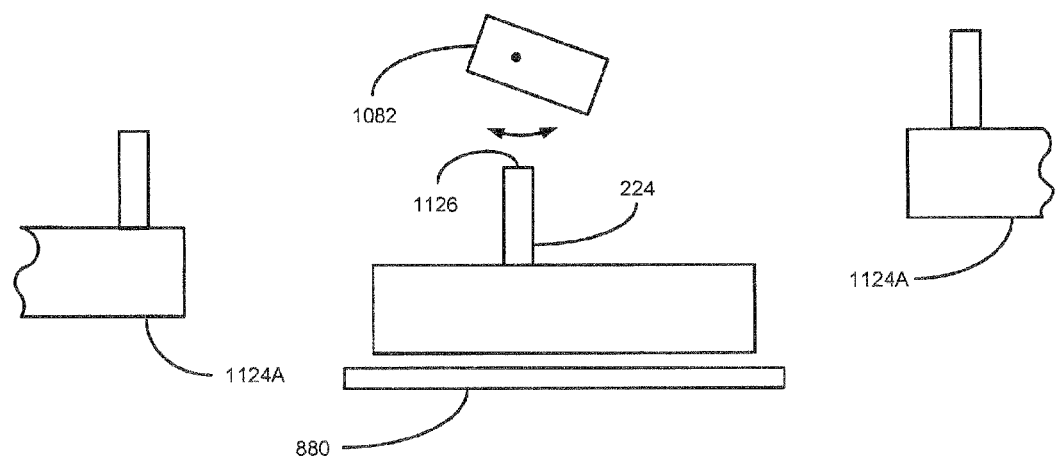

With reference to FIG. 34A, due to orientation of the drives 180 and the orientation of a cartridge 224 in a magazine 270 supported by the magazine picker 880, the rotary assembly 1086 must be able to rotate the housing 1082 through a range 1108 of a least ninety degrees located between a vertical plane 1110 and a horizontal plane 1112 to transfer a cartridge 224 between one of the drives 180 and a magazine 270 supported by the magazine picker 880. In the illustrated embodiment, the rotary assembly 1086 is able to rotate the housing 1082 through an additional range 1114 of about forty-five degrees. The ability to traverse a total range of approximately 135 degrees allows a bar-code reader 1120 associated with the housing 1082 to read bar codes associated with magazines 270 located on shelves 328A and shelves 328B, i.e., magazines 270 located on both sides of the magazine transport 212 and cartridge transport 214. The range of the rotary assembly 1086 can be further increased if, for example, an additional drive or drives 180 were located on the opposite side of the library 202 from the drives 180. The housing 1082 comprises a top side 1118A, bottom side 1118B, first side 1118C, second side 1118D, and back side 1118E. Associated with the back side 1118E is a bar code reader 1120 that is used to read a bar code label that is associated with and identifies a magazine 270 that is located on a shelf in the shelf system 208 and a bar label that is associated with a data cartridge magazine 270 located in a magazine 270. The barcode reader 1120 has an aperture 1122 with a field of view that extends through the interior space 1084A of the housing 1082 and out through the opening 1084B defined by the housing 1082. FIG. 34B illustrates the ability of the rotary assembly 1086 and the bar code reader 1120 to read a bar code that identifies a first magazine 1124A that is associated with the shelving 328A and a bar code that identifies a second magazine 1124B that is associated with the shelving 328B. With respect to the magazines 1124A, 1124B disclosed herein and the common orientation of all of the magazines 270 in the library 202, the bar code label associated with the magazine 1124A is situated in one of the recesses 290A, 290B and the bar code label associated with the magazine 1124B is situated in the other of the recesses 290A, 290B. As FIG. 34B also illustrates, the rotary assembly 1086 and the bar code reader 1120 are also capable of reading a bar code label that is attached to an end face 1126 of a cartridge 224. In some cases, the horizontal transport unit 1052 must also be used to appropriately position the bar code reader 1120 to read a bar code label associated with a magazine 270 or with a cartridge 224. In an alternative embodiment, the bar code reader can be located in a different location on the housing 1082. In yet other embodiments, separate bar code readers can also be employed; one to read a bar code that identifies a magazine 270 and one to read a bar code that identifies a cartridge 224. If two bar code readers are employed, the bar code reader for reading the bar code that identifies a magazine 270 can be located elsewhere than the cartridge transport unit 1050 (e.g., with the magazine picker 880). In other embodiments of the present invention, at least one sensor, such as an alternative reader or readers, can be used to identify alternative identification for cartridges 224 and/or magazines 270. For instance, if an RFID (Radio Frequency Identification) tag is used to identify a magazine 270 or cartridge 224, an appropriately situated sensor or sensors can be associated with the cartridge transport 214, magazine transport 212, or other appropriate element in the library 202.

With reference to FIGS. 33E and 33G-33I, the housing 1082 is capable of accommodating data cartridges of different dimensions. More specifically, the housing 1082 is capable of accommodating cartridges that have different heights, i.e., the perpendicular distance between the two, parallel surfaces of the cartridge with the greatest surface areas. In the illustrated embodiment, the housing 1082 is capable of accommodating an LTO, SAIT or DLT tape cartridge 224, 240 or 254. LTO and SAIT tape cartridges 224, 240 have substantially the same height. The DLT tape cartridge 254, however, has a height that is greater than the heights of the LTO and SAIT tape cartridges 224, 240. With the foregoing in mind, the housing 1082 comprises a top half 1130A and a bottom half 1130B that is attached to the top half 1130A to form the housing 1082. Adaptively attached to the top half 1130A is plate 1132. To elaborate, the top half 1130A comprises: (a) screw holes 1134A, 1134B, 1134C and 1134D each for receiving a screw, such as screw 1136; (b) spring towers 1138A, 1138B, 1138C and 1138D that each house a spring. The plate 1132 comprises: (a) retaining screw posts 1140A, 1140B, 1140C and 1140D that each receive and retain a screw that passes through the corresponding one of the screw holes 1134A-1134D; and (b) spring seats 1142A, 1142B, 1142C and 1142D, each for supporting one end of a spring, such as spring 1144. The other end of each spring is received in the spring towers 1138A-1138D. The plate 1132 also comprises a ramp 1146 that is disposed adjacent to the opening 1084B to facilitate the insertion of data cartridges 224 into the interior space 1084A. In operation, the plate 1132 and the interior surface of the bottom side 1118B are separated from one another when there is no cartridge 224 in the interior space 1084A by a distance that is only slightly greater than the height of an LTO or SAIT tape cartridge 224, 240. When an LTO or SAIT tape cartridge 224, 240 is located in the interior space 1084A, the plate 1132 and the interior surface of the bottom side 1118B remain separated by approximately the same distance as when there was no cartridge 224 in the interior space 1084A. In addition, the plate 1132 and interior surface of the bottom side 1118B operate to constrain the movement of the cartridge 224 in one dimension, i.e., the height dimension. When a DLT cartridge 254 is inserted into the interior space 1084A, the greater height of the cartridge 254 displaces the plate 1132 towards the top side 1118A of the housing and compresses the springs. Again, the plate 1132 and the interior surface of the bottom side 1118B constrain the movement of the cartridge 254 in one dimension, i.e., the height dimension. When the DLT cartridge 254 is removed from the interior space 1084A, the springs operate to return the plate 1118B to the position at which it is separated from the interior surface of the bottom side 1118B by a distance that is slightly greater than the height of an LTO or SAIT cartridge 224, 240.

The plate 1132 further comprises a flag 1148 that cooperates with a detector 1150 to indicates when a DLT tape cartridge 254 has been received in the interior space 1084A. In operation, when a DLT cartridge 254 is received in the interior space 1084A, the displacement of the plate 1132 causes the flag 1148 to pass through a slot 1152 in the top half 1130A and engage the detector 1150. The detector 1150 is located on a circuit board 1154 that is mounted to the top side 1118A of the housing and that includes control circuitry for the rotary assembly 1086 and the picker 880.

With reference to FIGS. 33K-33N, the cartridge transport unit 1050 comprises: (a) a grasper assembly 1160 that is used to grasp a cartridge 224; and (b) a linear drive assembly 1162 for moving a portion of the grasper assembly 1160 to move a cartridge 224 into and out of the interior space 1084A of the housing 1082. The grasper assembly 1160 comprises: (a) the plate 1132 and the interior surface of the bottom side 1118B of the housing 1082, which cooperate with one another to constrain a data cartridge 224 in a first dimension, i.e., the height dimension 226A, 226B; (b) a picker assembly 1164 and the interior surface of the back side 1118E of the housing 1082, which cooperate with one another to constrain a cartridge 224 in a second dimension, i.e., the depth dimension 230A, 230B between the ends of the cartridge 224; and (c) the interior surface of the first side 1118C of the housing 1082 in combination with an interior wall 1166 of the housing 1082 and the picker assembly 1164 to constrain a cartridge 224 in a third dimension, i.e., the width dimension 228A, 228B.

The picker assembly 1164 comprises: (a) a finger/thumb assembly 1168 that is used in grasping a cartridge 224; and (b) a finger actuation assembly 1170 that is used to place a finger 1202 associated with the finger/thumb assembly 1168 in a desired orientation for extracting a data cartridge 224 from a magazine 270, inserting a data cartridge 224 into a magazine 270, extracting a data cartridge 224 from a drive 180, and inserting a data cartridge 224 into a drive 180.

The linear drive assembly 1162 operates to linearly move the finger/thumb assembly 1168 to pull a cartridge 224 into the interior space 1084A of the housing 1082 and to expel a cartridge 224 from the interior space 1084A of the housing 1082. The linear drive assembly 1162 comprises: (a) a lead screw 1174 that is supported by the housing 1082; (b) a DC motor 1176 for providing a rotational motive force for moving the finger/thumb assembly 1168, the motor 1176 is attached to a bracket 1178; (c) a pinion 1180 that is attached to the spindle of the DC motor 1176; (d) an idler gear 1182 that interfaces with the pinion 1180; (e) a lead screw gear 1184 that interfaces with the idler gear 1182 and is attached to one end of the lead screw 1174. The finger/thumb assembly 1168 comprises a nut portion 1188 that resides on the lead screw 1174 and a guide tongue 1190 that is attached to the nut portion 1188 and resides in a groove 1192, a side of which is formed by the interior wall 1166. When the motor 1176 produces a rotational motive force, the finger/thumb assembly 1168 is displaced along the lead screw 1174. Typically, the displacement is associated with moving a cartridge 224 into the interior space 1084A or expelling a cartridge 224 from the interior space 1084A. Associated with the finger/thumb assembly 1168 is a flag 1194 that cooperates with a detector 1196 to indicate when the finger/thumb assembly 1168 has been fully retracted into the interior space 1084A of the housing 1082. In addition, the detector 1196 is used in combination with an encoder associated with the motor 1176 to provide positional information on the finger/thumb assembly 1168.

The finger/thumb assembly 1168 further comprises: (a) mounting block 1200; (b) a finger 1202 that is pivotally attached to the mounting block 1200 via a finger pivot shaft 1204; (c) finger cam 1206 that is attached to the finger 1202 and includes a first and second finger cam legs 1208A, 1208B; (d) a finger return spring assembly 1210 that is attached to the pivot shaft 1204 and operates to bias the finger 1202 towards a data cartridge 224; and a thumb 1212 that limits the movement of the finger 1202 towards a cartridge 224 and also assists in pushing a cartridge 224 out of the interior space 1084A. It should be appreciated that in embodiments of a magazine-based data cartridge library 202 that operate only on cartridges, such as a SAIT tape cartridge 240, with two gripper notches, such as notches 250A and 250B, a cartridge may be grasped between a pair of movable elements.

The finger actuation assembly 1170 comprises: (a) a bracket 1216 that is mounted to the housing 1082; (b) a picker 1218 that is pivotally attached to the bracket 1216; (c) a picker cam 1220 that engages the finger cam surface 1206 to place the finger 1202 in desired orientations for particular insertion and extraction operations, with the picker cam 1220 comprising first and second picker cam legs 1222A, 1222B; (d) a solenoid 1224 that is used to rotate the picker 1218 and comprises a plunger 1226 that is attached to the picker 1218; and (e) a stop 1228 that limits the rotation of the picker 1218 in one direction.

Also associated with the cartridge transport 214 is a wall structure 1230 that serves to counteract the rotation of a cartridge 224 that occurs during extraction of the cartridge 224 from a magazine 270 or insertion the cartridge 224 into the magazine 270 due to the manner in which the picker assembly 880 engages the cartridge 224. It should also be appreciated that the cartridge transport 214 and the magazine transport 212 both comprise the elevator 750. As a consequence, elements of the cartridge transport 214 other than the elevator 750 and elements of the magazine transport 212 other than the elevator 750 are moved in unison by the elevator 750. This relationship makes possible bulk load and bulk unload operations. However, as will be appreciated by one skilled in the art, in other embodiments a cartridge transport and a magazine transport can each have an elevator that is capable of independent operation. Further, the operational ranges of the elevators can be substantially the same or different. Further, a cartridge transport with fewer actuators than those associated with the cartridge transport 214 is feasible. For example, a cartridge transport with elements that are functionally equivalent to all of the elements of the cartridge transport 214 described above, except for the elevator, could be mounted adjacent to a drive 180. In such an embodiment, a magazine transport would bring a magazine 270 into the operational range of the cartridge transport for the loading of cartridges 224 into the magazine 270 by the cartridge transport and the unloading of a cartridge 224 from the magazine 270 by the cartridge transport. In another possible embodiment, a cartridge transport with elements that are functionally equivalent to all of the elements of the cartridge transport 214 described above, except the elevator 750 and the horizontal transport 1052, could be mounted adjacent to a drive 180. In such an embodiment, the magazine transport would operate to bring magazines into the general operational range of the cartridge transport and the magazine picker would be used to position a specific slot of a magazine 270 for the loading and unloading of cartridges 224 by the cartridge transport. In any event, a cartridge transport is a device that is capable of moving a data cartridge 224 between a magazine 270 and a drive 180.

Figure 35A:
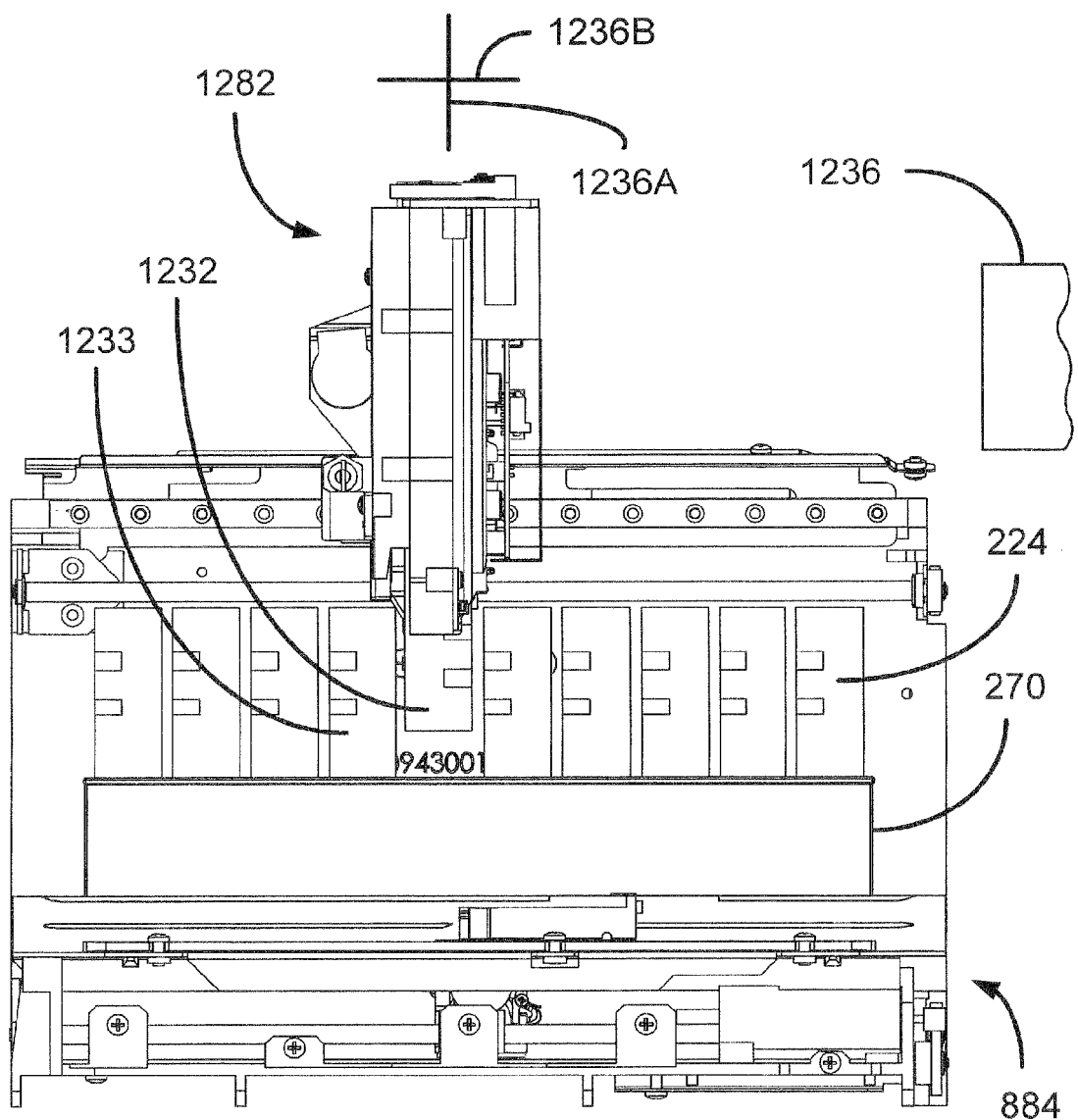
FIGS. 35A-35C illustrate steps associated with moving a data cartridge between a magazine and a drive.
Figure 35B:
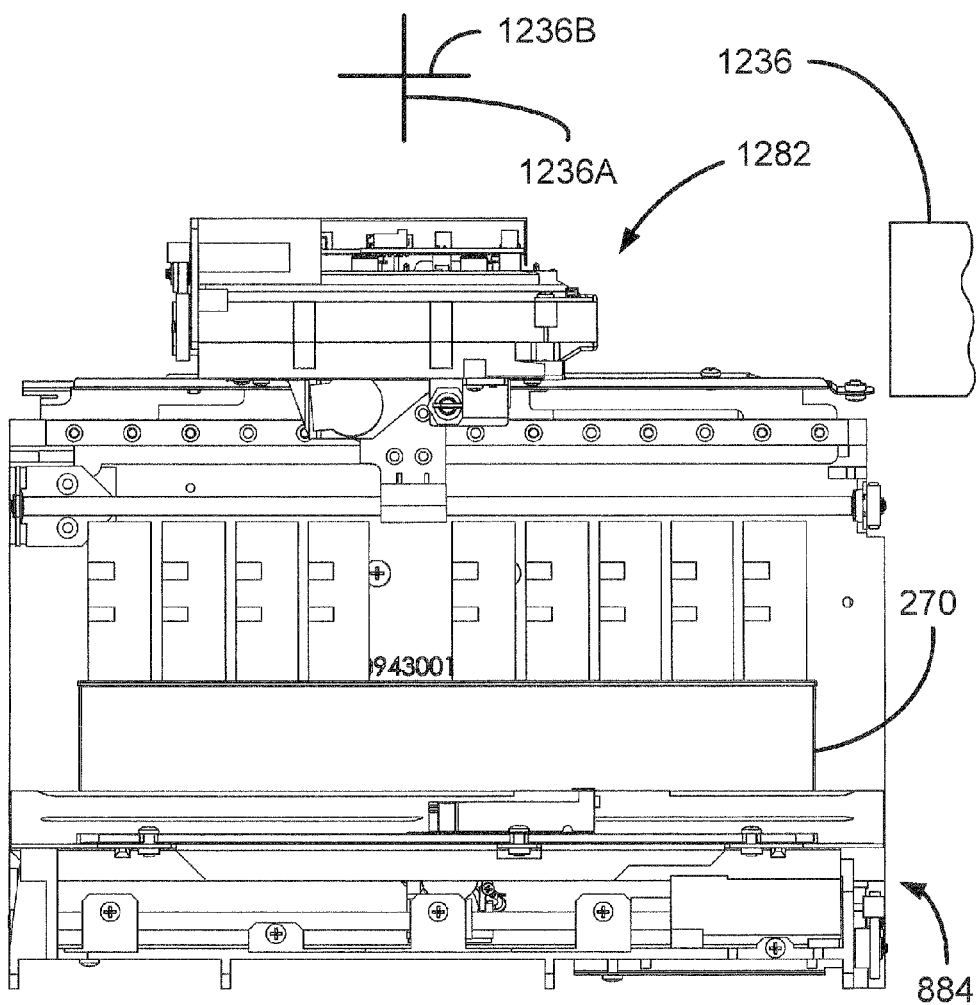
Figure 35C:
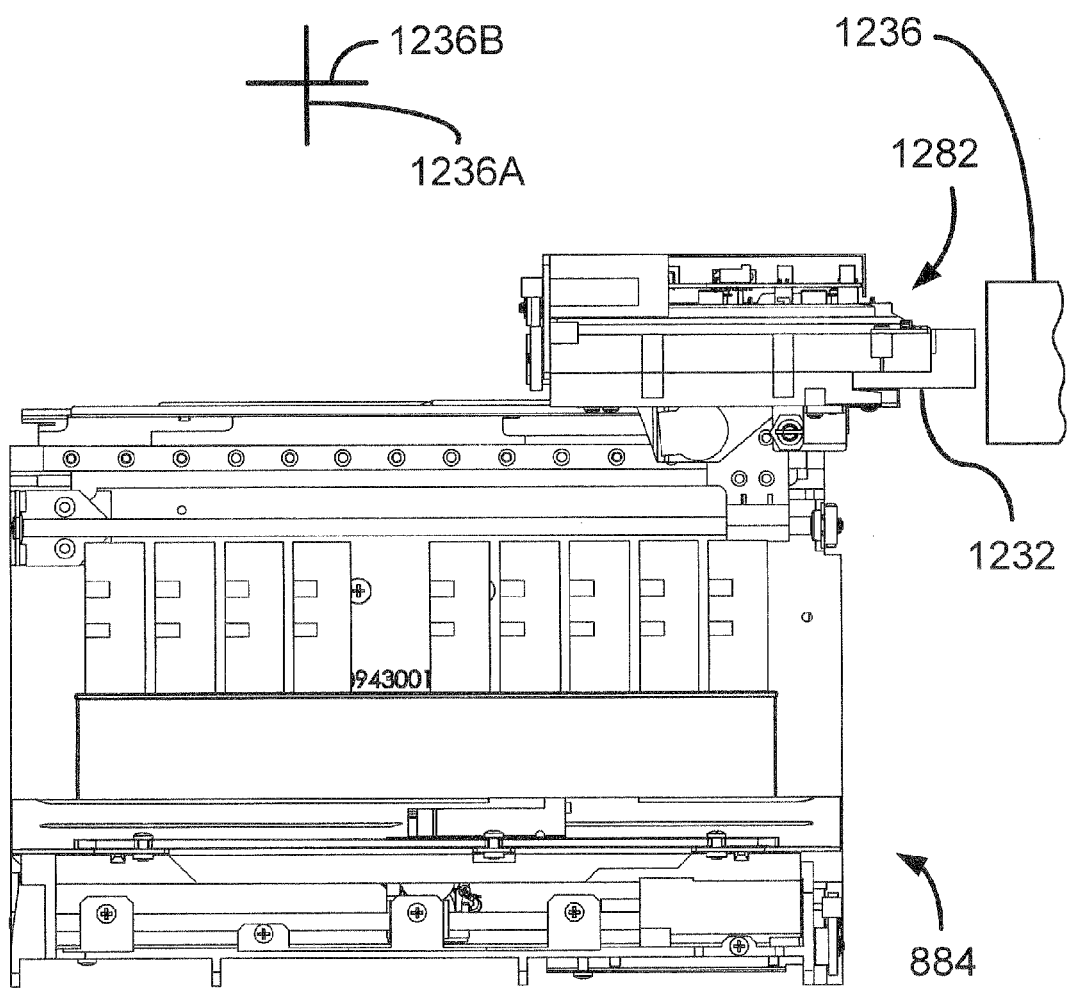

With reference to FIGS. 35A-35C, the operation of the cartridge transport 214 in moving a data cartridge 1232 from a magazine 270 to a drive 1236 is generally described. With reference to FIG. 35A, the magazine transport 212 has been used to move the magazine 270 from a storage location, such as a shelf of the shelf system 208 or the entry exit port 120, to the support structure 884. To elaborate, the magazine transport 212 has, if necessary, used the elevator 750 to position the magazine picker 880 and the support structure 884 adjacent to the whatever storage location was supporting the magazine 270. In this regard, one of the detectors 982, 984 was used to position the magazine picker 880 and the support structure 884. Further, the rotary assembly 1086 has likely been used to place the housing 1082 and the associated bar-code reader 1120 at an orientation that allows the bar-code reader 1120 to read a bar-code label associated with the magazine 270 to confirm that the appropriate magazine 270 is being accessed. Once the magazine picker 880 and support structure 884 were positioned adjacent to the storage location that was supporting the magazine 270, the magazine picker 880 and support structure 884 were used to move the magazine 270 from the storage location to the support structure 884. During the moving of the magazine 270 onto the support structure 884, the rotary assembly 1086 has been used to place housing 1082 and the associated bar-code reader 1120 at an orientation that allowed the bar code reader 1120 to read the bar-code labels associated with the cartridges 1232 and 224 in the magazine 270 to identify the desired cartridge, namely, cartridge 1232. In this regard, the rotary assembly 1086 is typically used to place the housing 1082 in the vertical orientation shown in FIG. 35A or at an angle that is between the vertical and horizontal planes 1236A, 1236B so that the bar-code reader 1120 can read the bar-codes associated with cartridges 1232 and 224 in the magazine 270.

With reference to FIG. 35A, after the magazine 270 has been positioned on the support structure 884 as shown in FIG. 35A or during the time when the magazine 270 is being positioned on the support structure 884, the horizontal transport unit 1052 and the rotary assembly 1086 are used, as needed, to position the opening 1084B of the housing 1082 to receive the data cartridge 1232. The linear drive assembly 1162 and the picker assembly 1164 are then used to draw the cartridge 1232 into the interior space 1084A of the housing 1082. The detector 1196 is used to determine when the cartridge 1232 has been fully retracted into the interior space 1084A of the housing 1082. At this point, it should be appreciated that: (a) the magazine 270 has oriented the cartridge 1232 (an LTO magazine 270 and cartridge 224) such that the face 226A of the cartridge 1232 with the greatest surface area lies in a vertical plane; and (b) that in extracting the cartridge 1232 from the magazine 270, the cartridge 1232 has been vertically displaced within the vertical plane.

At some point in retracting the cartridge 1232 into the housing 1082, the cartridge 1232 and elements of the cartridge transport 214 are situated so as not to interfere with any movement of the magazine 270. At this point, the magazine picker 880 can be used to transfer the magazine 270 from the support structure 884 to its original storage location or to another storage location, which may require the use of the elevator 750. Alternatively, the magazine 270 can be left on the support structure 884. Leaving the magazine 270 on the support structure 884 is desirable if, for example, a "bulk load" operation is to be performed.

In any event, after the picker assembly 1164 has engaged the cartridge 1232, the rotary assembly 1086 is used to rotate the housing 1082 and the grasped cartridge 1232 from the vertical orientation shown in FIG. 35A to the horizontal orientation shown in FIG. 35B. Typically, the rotary assembly 1086 rotates the housing 1082 after the cartridge 1232 has been completely retracted into the housing 1082. However, in certain circumstances, it is possible for the rotary assembly 1086 to rotate the housing 1082 during the period of time when the cartridge 1232 is being retracted into the housing 1082. For cartridges 224 located in the slots at or near the ends of the magazine 270, rotation of the housing 1082 to the horizontal orientation shown in FIG. 35B may also require that the horizontal transport unit 1052 horizontally and linearly translate the housing 1082 towards the center of the magazine 270 to prevent the housing 1082 from coming into contact with a shelf of the shelf system 208 or other element of the library 202. At this point, it should be appreciated that the cartridge 1232 has been rotated about a horizontal axis and about a horizontal axis that is parallel to the face of the cartridge 1232 with the greatest surface area, such as the face 226A.

With reference to FIG. 35C, the horizontal transport unit 1052 is used, as needed, to linearly and horizontally translate the housing 1082 and the cartridge 1232 in the direction required to insert the cartridge 1232 into the drive 1236. In addition, the elevator 750 and detector 984 (which operates in this instance to detect the flag 632 associated with the drive 1236) have been used, as needed, to position the housing 1082 so that when the housing 1082 is horizontally disposed as shown in FIGS. 35B and 35C, the opening of the housing 1082 is aligned with the receptacle, such as the receptacle 186 from FIG. 5A, of the drive 1236. The elevator 750 and detector 984 can be used to position the housing 1082 for insertion of the cartridge 1232 into the drive 1236 at any time after the magazine 270 has been loaded onto the support structure 1084. Once the opening 1084B of the housing 1082 has been aligned with the receptacle of the drive 1236, the cartridge 1232 is inserted into the drive 1236. In this regard, the linear drive assembly 1162 is used to expel the cartridge 1232 from the housing 1082 and into the drive 1236. The linear drive assembly 1162 typically begins expelling the cartridge 1232 after the opening 1084B has been disposed substantially adjacent to the receptacle of the drive 1236. However, the expulsion process can commence earlier. However, there may be risks associated with commencing the expulsion process earlier.

At this point, if the magazine 270 is still associated with the support structure 884, a bulk load operation can be performed, if desired. In a bulk load operation, the housing 1082 is repositioned using the horizontal transport unit 1052 and the rotary assembly 1056, as needed, so that a second cartridge 1233 in the magazine 270 can be grasped. The second cartridge 1233 is grasped and then oriented for insertion into a second drive (not shown) in the same manner as previously described with respect to the cartridge 1232. Further, the elevator 750 is used to position the housing 1082 for insertion of the second cartridge 1233 into the second drive. The disclosed bulk load operation can be used to transfer a desired number of cartridges 224 from a magazine 270 for use with a commensurate number of drives 180. [0267] It should also be noted at this point that the process for moving a data cartridge, such as cartridge 1232, from a magazine 270 to a drive, such as drive 1236, involved the use of the magazine picker 880 to move a magazine 270 onto the support structure 884 such that the magazine 270 was no longer associated with a storage location and completely supported by the support structure 884. If only one cartridge 1232 is to be moved from a magazine 270 to a drive 1236, an alternative process potentially avoids the need to fully extract the magazine 270 from its storage location. In this process, the magazine picker 880 terminates the extraction of a magazine 270 from a storage location after the desired cartridge 1232 has been exposed and is capable of being grasped. In one embodiment, the horizontal transport unit 1052 is used to position the housing 1082 as close to the storage location from which the magazine 270 is to be extracted as is feasible. Further, the rotary assembly 1086 places the housing 1082 in the vertical orientation shown in FIG. 35B. With the housing 1082 positioned by the horizontal transport unit 1052 and the rotary assembly 1086 in this manner, the desired cartridge 1232 can be grasped quickly once it is exposed. To elaborate, the signal provided by the bar-code reader 1120 once the desired cartridge 1232 is exposed and detected is used to terminate the operation of the magazine picker 880 such that the desired cartridge 1232 is positioned underneath the opening 1084B of the housing 1082. It should be appreciated that if the slot in the magazine 270 in which the desired cartridge 1232 is located is known beforehand, this information can be used to terminate the operation of the magazine picker 880 such that the desired cartridge 1232 is positioned underneath the opening 1084B of the housing 1082. In any event, extraction of the cartridge 1232 from the magazine 270 proceeds as previously described. However, if the magazine 270 has not been completely extracted from its storage location, a decision must be made as to whether to proceed with the extraction of the magazine 270 from its storage location or proceed to reinsert the magazine 270 into its storage location because the elevator 750 cannot be used to move the grasped cartridge 1232 to a drive 1236 until the magazine 270 is substantially removed from its storage location or substantially inserted into its storage location. In either case, once the magazine 270 has been substantially removed from its storage location or substantially returned to its storage location, the grasped cartridge 1232 is moved to a drive 1236 as previously described.

The operation of the cartridge transport 214 in moving the data cartridge 1232 from a drive 1236 to a magazine 270 is generally described with reference to FIGS. 35A-35C. With reference to FIG. 35C, the elevator 750 and the detector 984 have been used to grossly position the housing 1082 adjacent to the drive 1236, which holds the cartridge 1232. Further, the horizontal transport unit 1052 and the rotary assembly 1086 have been used, as needed, to orient the housing 1082 as shown in FIG. 35C. Consequently, through the operation of the elevator 750, horizontal transport 1052 and the rotary assembly 1086, as needed, the housing 1082 has been positioned to receive the cartridge 1232 from the drive 1236. Although FIG. 35C shows the magazine 270 on the support structure 884, the magazine 270 may or may not be associated with the support structure 884 when the housing 1082 is positioned to receive the cartridge 1232 from the drive 1236. If the magazine 270 is associated with the support structure 884, a "bulk unload" operation can be performed, if desired. In any event, the linear drive assembly 1162 and picker assembly 1164 operate to extract the cartridge 1232 from the drive 1236.

With reference to FIGS. 35B and 35C, once the cartridge 1232 is substantially clear of the drive 1236, the horizontal transport unit 1052 (as needed) and the rotary assembly 1086 are used to position the housing 1082 and the grasped cartridge 1232 for insertion into the magazine 270. Even though the housing 1082 and the grasped cartridge 1232 are being position for insertion of the cartridge 1232 into the magazine 270, it should be appreciated that the magazine 270 may or may not be associated with the support structure 1084 during this positioning of the housing 1082 and the grasped cartridge 1232. At this point, it should be appreciated that the cartridge 1232 has been rotated about a horizontal axis and about a horizontal axis that is parallel to the face, such as the face 226A, of the cartridge 1232 with the greatest surface area. After the cartridge 1232 is substantially clear of the drive 1236, the elevator 750 and one of the detectors 982, 984 is used to position the magazine picker 880 and the support structure 884 adjacent to the storage location of the magazine 270.

After the housing 1082 and the grasped cartridge 1232 have been positioned as shown in FIG. 35A, the cartridge 1232 is positioned for insertion into the magazine 270. Although FIG. 35A shows the magazine 270 as being on the support structure 884, the magazine 270 may not yet be associated with the support structure 884. In any event, before insertion of the cartridge 1232 into the magazine 1236 can be accomplished, the magazine 270 is positioned on the support structure 884 as shown in FIG. 35A. If the magazine 270 was not associated with the support structure 884 when the housing 1082 was positioned to receive the cartridge 1232 from the drive 1236, the magazine 270 is extracted from its storage location after the elevator 750 has appropriately positioned the support structure 884 adjacent to the storage location of the magazine 270. Once the housing 1082 and grasped cartridge 1232 and the magazine 270 are positioned as shown in FIG. 35A, the linear drive assembly 1162 and the picker assembly 1164 operate to expel the cartridge 1232 from the housing 1082 into the magazine 270. It should be noted at this point that in inserting the cartridge 1232 into the magazine 270: (a) the cartridge 1232 was oriented such that the face, such as the face 226A, of the cartridge 1232 with the greatest surface area lay in a vertical plane; and (b) that the cartridge 1232 was vertically displaced within the vertical plane.

It should be noted that if the magazine 270 was associated with the support structure 884 when the housing 1082 was positioned to receive the cartridge 1232 from the drive 1236, a "bulk unload" operation can be performed in which the cartridge 1232 is returned to the magazine 270 as described except that before the elevator 750 and magazine picker 880 are used to return the magazine 270 to its storage location, the elevator 750, horizontal transport unit 1052, rotary assembly 1086 and grasper assembly 1160 are used to move additional cartridges 224 from other drives 180 to the magazine 270.

It should also be noted that in the situation in which the magazine 270 is not associated with the support structure 884 when the housing 1082 is positioned to receive a cartridge 224 from a drive 180, a process in which a cartridge 224 can be returned to a magazine 270 in many cases without fully extracting the magazine 270 from its storage location can be implemented. To elaborate, the if the magazine 270 was not associated with the support structure 884 when the housing 1082 was positioned to receive the cartridge 1232, the magazine 270 must be extracted from its storage location after the cartridge 1232 has been extracted from the drive 1236 and the elevator 750 has positioned the support structure 884 adjacent to the storage location for the magazine 270. In this process, the magazine picker 880 terminates the extraction of a magazine 270 from a storage location after the desired cartridge 1232 has been exposed and is capable of being grasped. In one embodiment of the process, the magazine picker 880 terminates the extraction of a magazine 270 from its storage location after the slot in the magazine 270 that is to store the cartridge 1232 has been exposed. In one embodiment, the horizontal transport unit 1052 is used to position the housing 1082 as close to the storage location from which the magazine 270 is to be extracted as is feasible. Further, the rotary assembly 1086 places the housing 1082 in the vertical orientation shown in FIG. 35B. With the housing 1082 positioned by the horizontal transport unit 1052 and the rotary assembly 1086 in this manner, the cartridge 1232 can be inserted into the magazine 270 shortly after the slot in the magazine 270 that is to retain the cartridge 1232 is exposed. To elaborate, signals provided by the operation of the center position flag 920 in conjunction with the first sensor assembly 942 and an encoder associated with the motor 914 are used to determine when the slot in the magazine 270 in which the magazine 270 is to be placed is exposed and uses these signals to terminate the operation of the magazine picker 880 such that the desired cartridge 1232 is positioned underneath the opening 1084B of the housing 1082. At this point, the linear drive assembly 1162 and the picker assembly 1164 operate to insert the cartridge 1232 into the magazine 270. Once the cartridge 1232 is sufficiently inserted into the magazine 270, the magazine picker 880 operates to return the magazine 270 to its storage location.

It should also be appreciated that the magazine 270 from which a cartridge 224 is extracted does not have to be the magazine 270 to which the cartridge 224 is later returned.

If desired, the cartridge transport 214 can also be used to move the cartridge 1232 from one drive 180 to another drive 180. To move the cartridge 1232 from one drive 180 to another drive 180, the elevator 750, horizontal transport unit 1052, and rotary assembly 1086 are used to position the housing 1082 as shown in FIG. 35C to receive the data cartridge 1232 from the drive 1236. Once the housing 1082 has been positioned to receive the data cartridge 1232 from the drive 1236, the linear drive assembly 1162 and the picker assembly 1164 are used to extract the cartridge 1232 from the drive 1236. After the cartridge 1232 has been extracted from the drive 1236, the elevator 750 is used to position the housing 1082 and the grasped cartridge 1232 for insertion into another one of the drives 180.

Figure 36A:
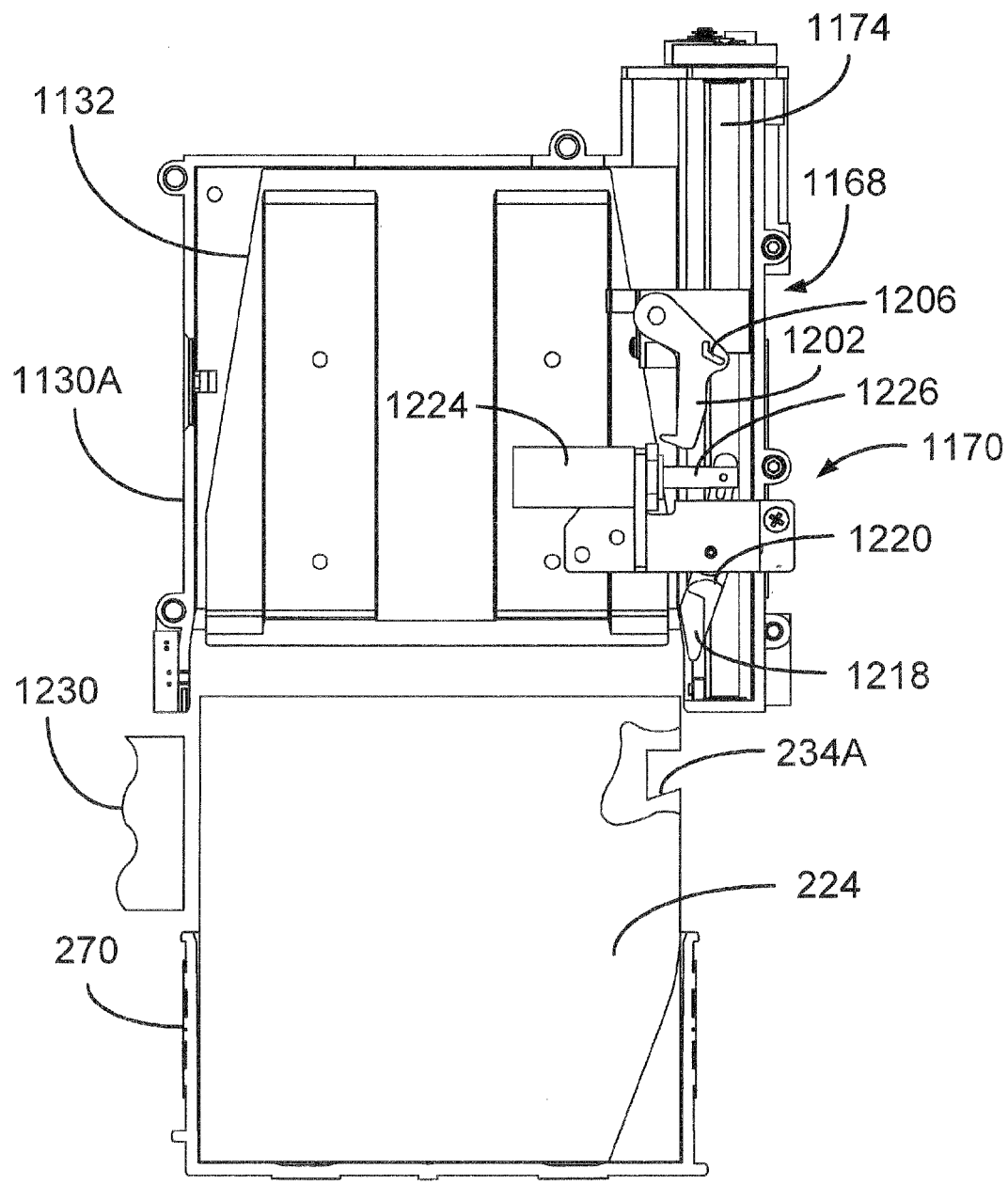
FIGS. 36A-36G are free body diagrams that illustrate an embodiment of a cartridge transport unit extracting/inserting a data cartridge from/into a magazine.

With reference to FIGS. 36A-36G, having generally described the use of the cartridge transport 214 in moving a data cartridge 224 between a magazine 270 and a drive 180, the operation of the picker assembly 1164 (which is comprised of the finger/thumb assembly 1168 and the finger actuation assembly 1170) and the linear drive assembly 1162 is described with respect to the: (a) picking or removing of a cartridge 224 from a magazine 270; and (b) loading of a previously grasped cartridge 224 into the magazine 270. FIGS. 36A-36F, when viewed in sequence, illustrate the operation of the picker assembly 1164 and the linear drive assembly 1162 in picking an LTO cartridge magazine 270 with a picker notch 234A from a magazine 270. With reference to FIG. 36A, (a) the elevator 750, horizontal transport unit 1052, and rotary assembly 1086 have, as needed, positioned the housing 1082 so that the opening 1084B is adjacent to the cartridge 1240; (b) the linear drive assembly 1162 has positioned the finger/thumb assembly 1168 within the housing 1082; and (c) the finger actuation assembly 1164 has positioned the picker 1218 so that the picker 1218 essentially has no effect upon the finger 1202 during the extraction operation. More specifically, the solenoid 1224 has fully extended the plunger 1226. As a consequence, the picker 1218 is positioned such that further rotation is prevented by the stop 1228.

Figure 36B:
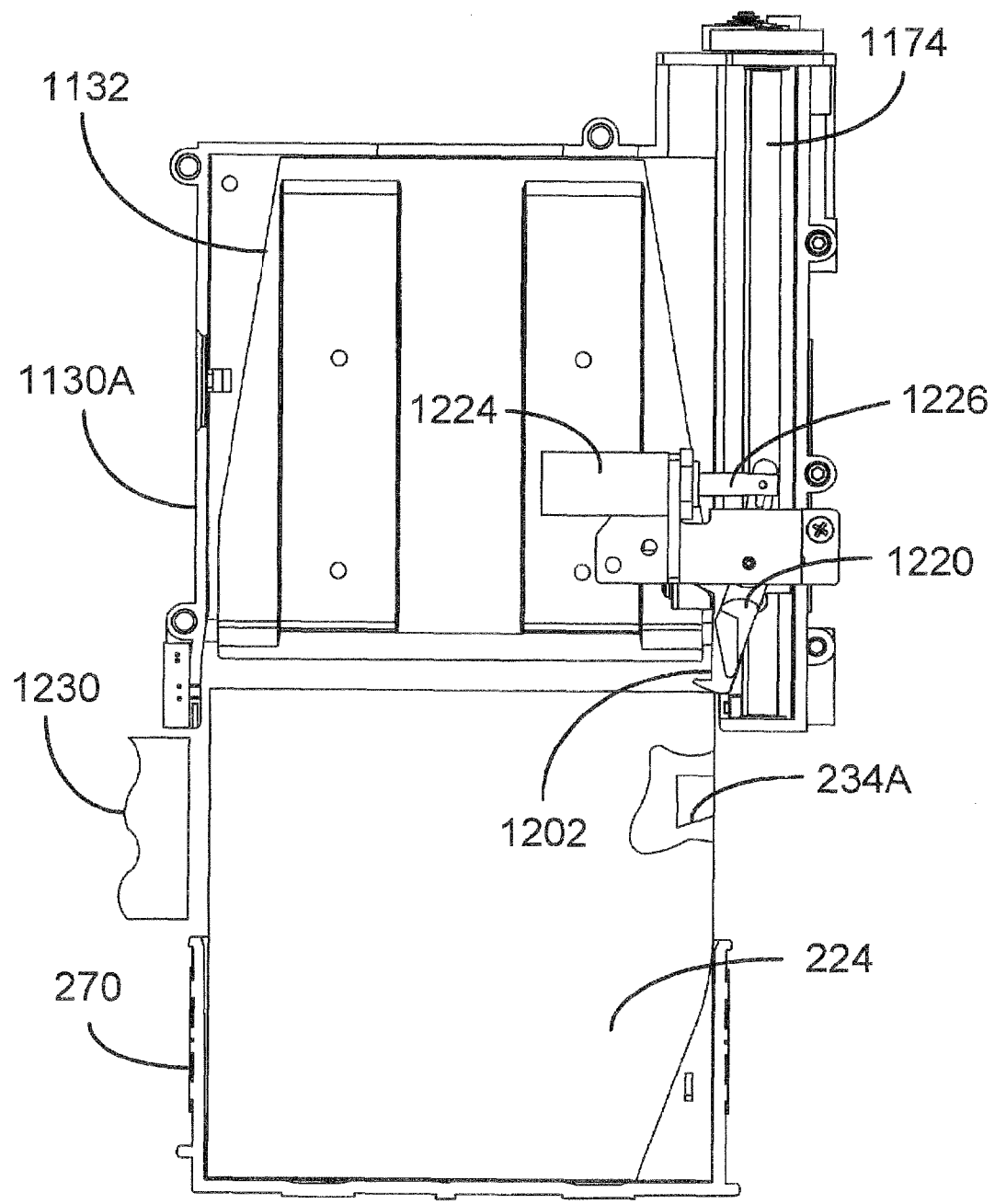
Figure 36C:
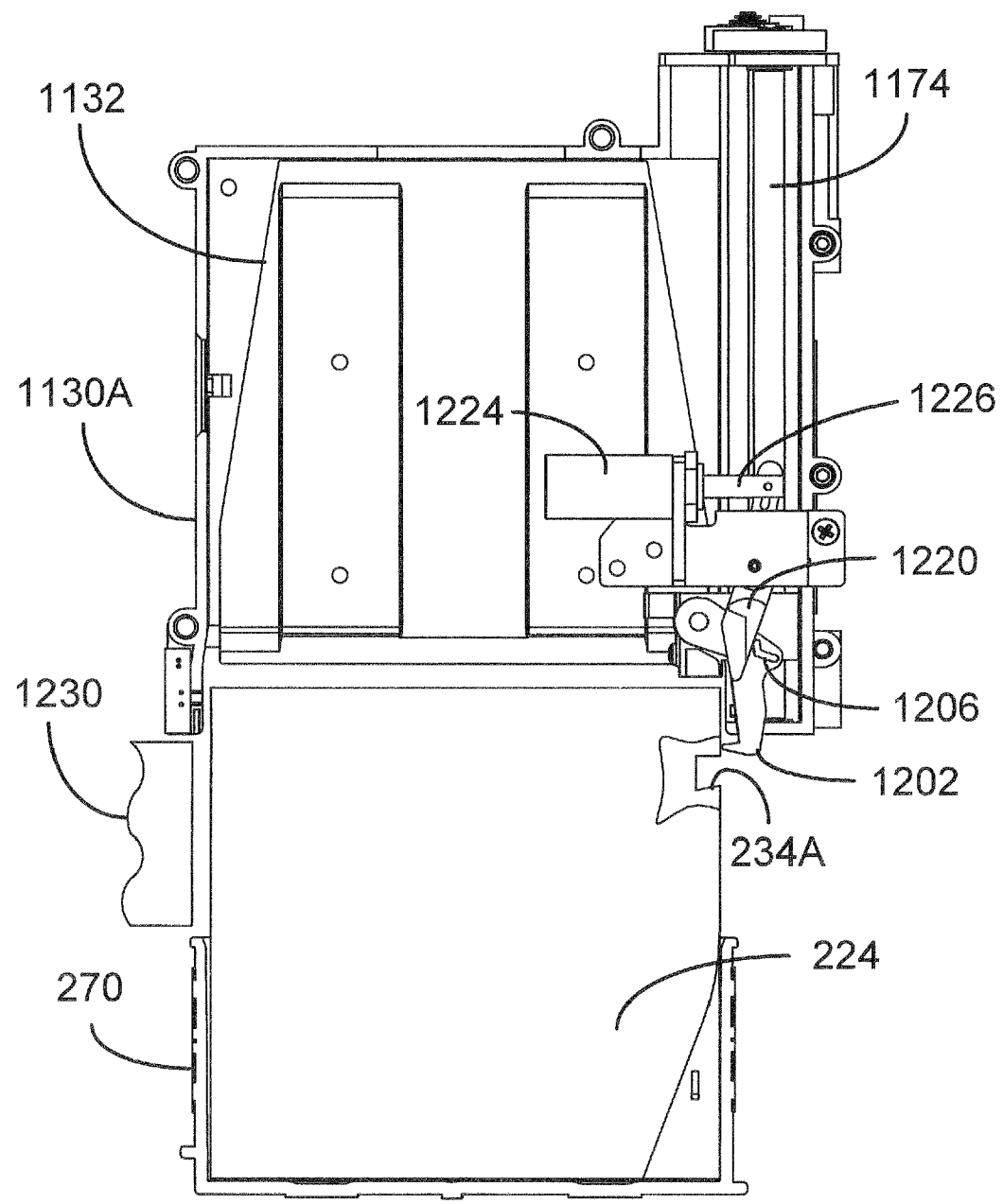
Figure 36D:
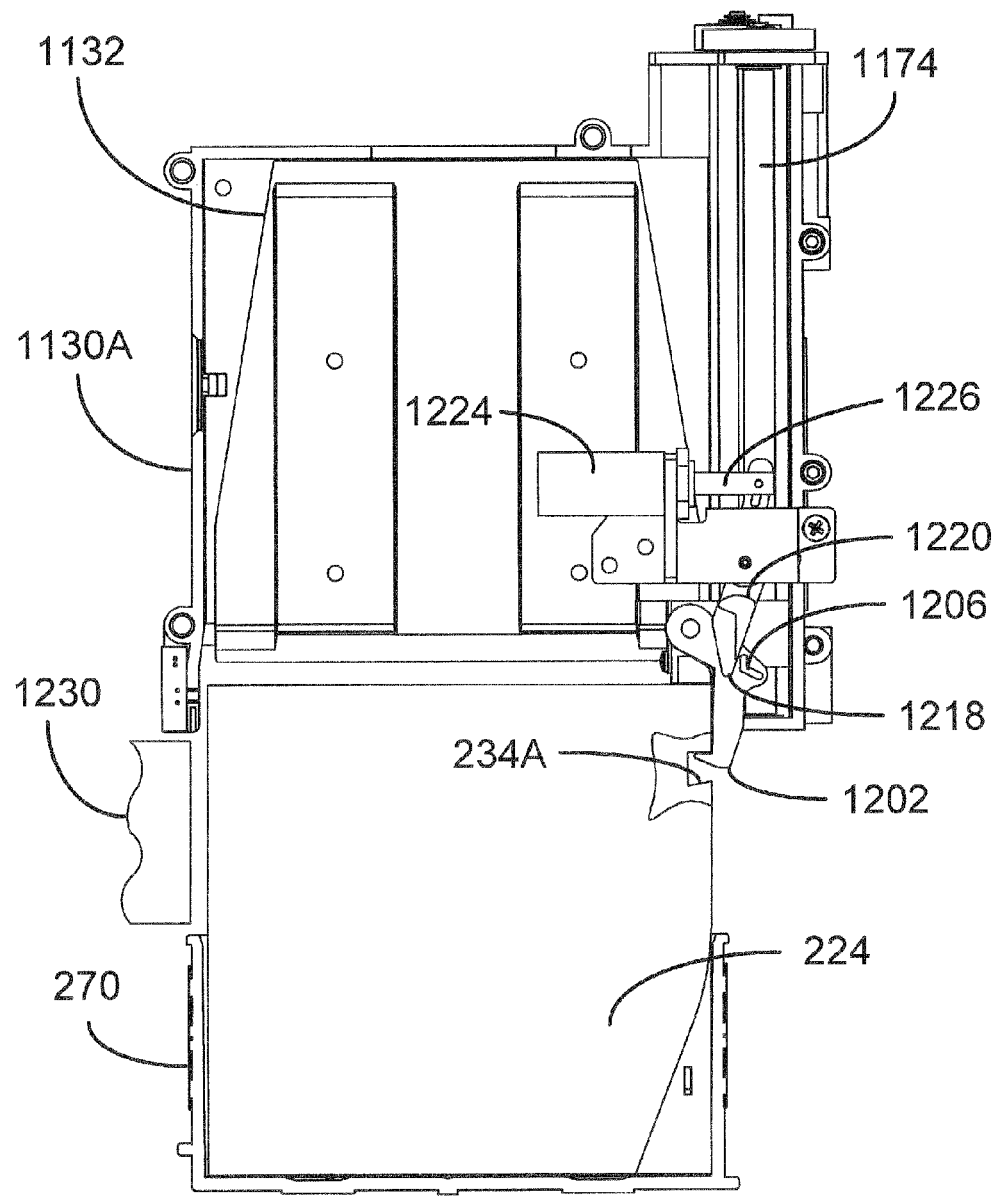
Figure 36E:
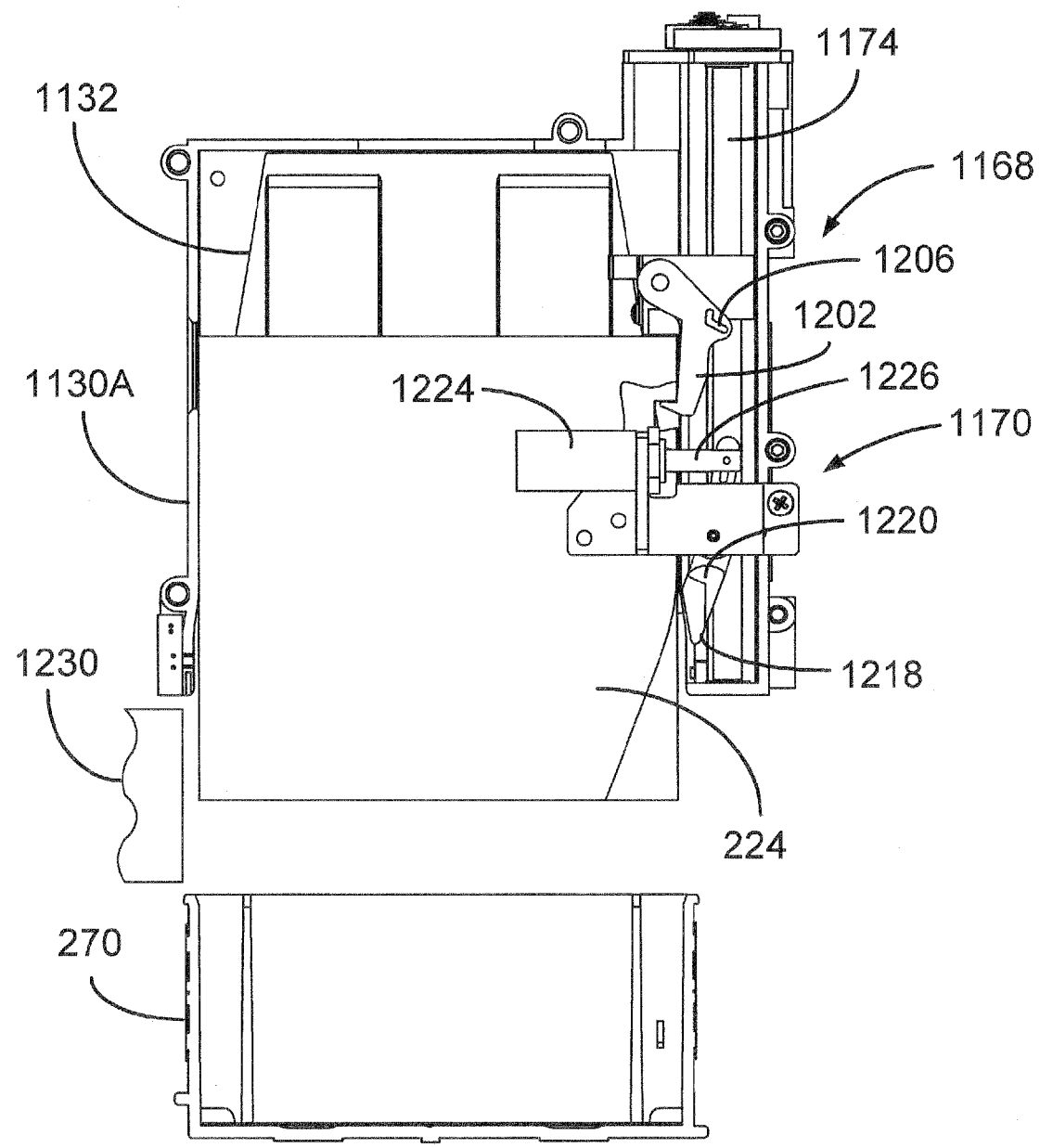

With reference to FIG. 36B, the DC motor 1176 of the linear drive assembly 1162 has been used to displace the finger/thumb assembly 1168 along the lead screw 1174 and towards the cartridge 1240. At this point, the finger 1202 has engaged the top end 230A of the cartridge 1240. With reference to FIG. 36C, as the linear drive assembly 1162 displaces the finger/thumb assembly 1168 further towards the cartridge 1240, the interaction of the finger 1202 with the surfaces of the cartridge 1240 causes the finger 1202 to rotate away from the cartridge 1240 such that energy is stored in the return spring 1210. With reference to FIGS. 36C and 36D, further displacement of the finger/thumb assembly 1168 towards the cartridge 1240 eventually results in the finger 1202 reaching the notch 234A. At this point, the energy stored in the return spring 1210 causes the finger 1202 to engage the notch 234A. With the notch 234A engaged, the cartridge 1240 can now be extracted from the magazine 270. With reference to FIG. 36E, after the notch 234A has been engaged, the linear drive assembly 1162 operates so as to displace the finger/thumb assembly 1168 and the cartridge 1240 away from the magazine 270. The wall 1230 serves to counteract rotation of the cartridge 1240 during the extraction. The linear drive assembly 1162 continues the displacement of the finger/thumb assembly 1168 and the cartridge 1240 away from the magazine 270 until the cartridge 1240 is fully within the housing 1082, as shown in FIG. 36F.

Figure 36F:
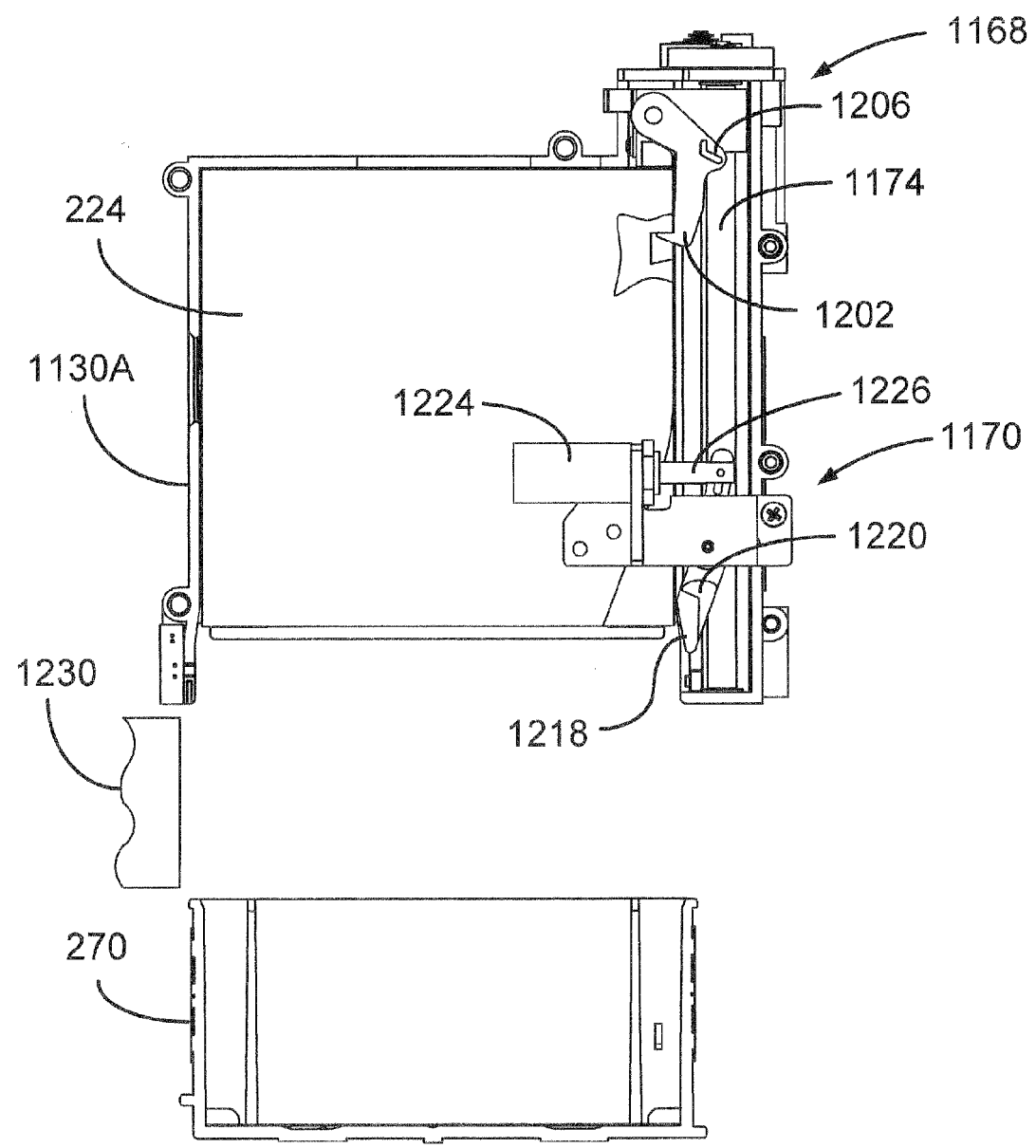

FIGS. 36F, 36E, 36D and 36G illustrate the operation of the picker assembly 1164 and the linear drive assembly 1162 in loading the LTO cartridge 270 into the magazine 270. With reference to FIG. 36F, (a) the elevator 750, horizontal transport unit 1052, and rotary assembly 1086 have, as needed, positioned the housing 1082 so that the opening 1084B is adjacent to the slot of the magazine 270 which is to hold the cartridge 1240; (b) the linear drive assembly 1162 and the finger/thumb assembly 1168 are operating to retain the cartridge 1240 within the housing 1082; and (c) the finger actuation assembly 1164 has positioned the picker 1218 so that the picker 1218 will not have an effect upon the finger 1202 during insertion of the cartridge 1240 into the magazine 270. More specifically, the solenoid 1224 has fully extended the plunger 1226. As a consequence, the picker 1218 is positioned such that further rotation is prevented by the stop 1228.

Figure 36G:
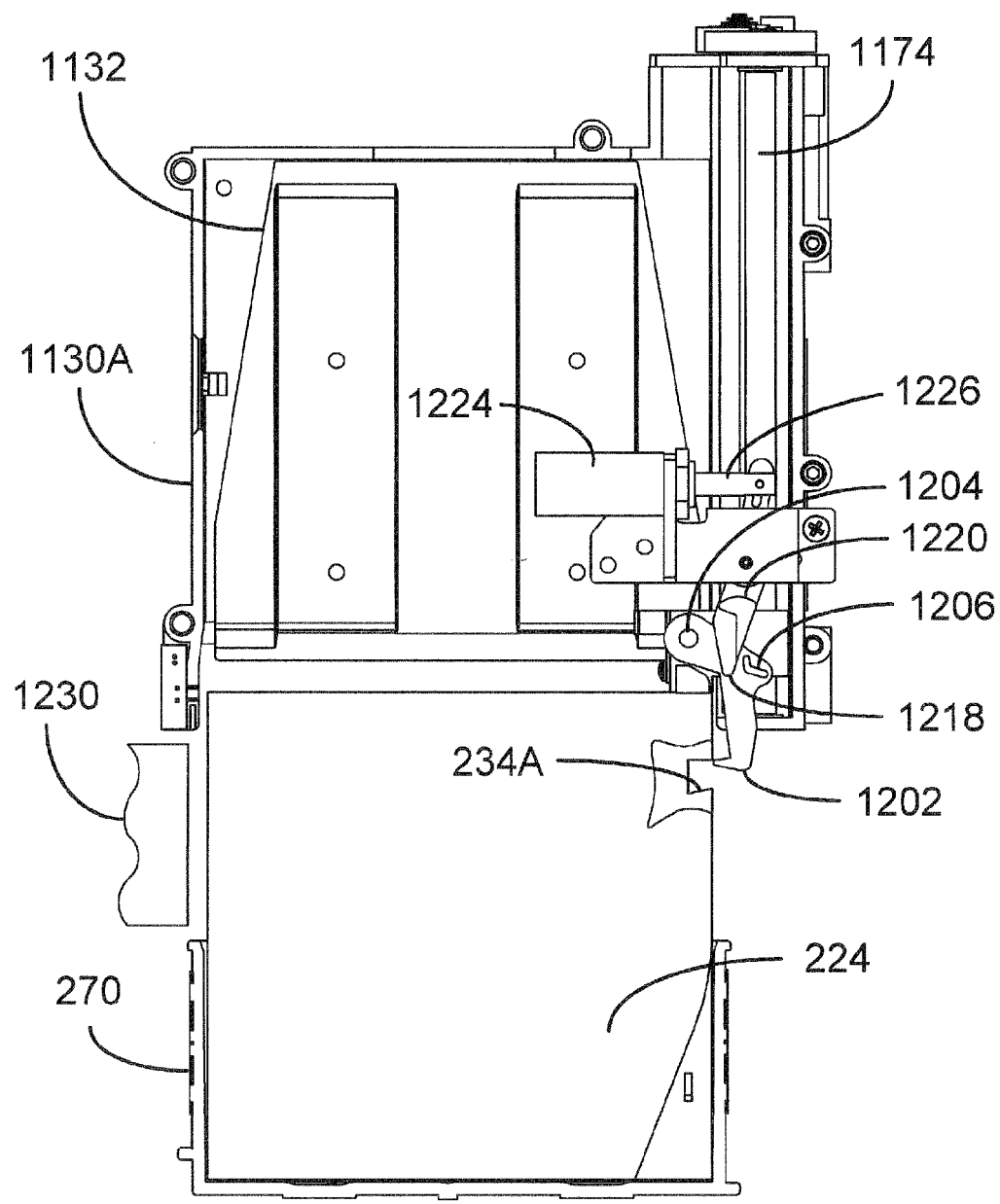

With reference to FIG. 36E, the linear drive assembly 1162 has been used to displace the finger/thumb assembly 1168 and the cartridge 1240 along the lead screw 1174 and towards the magazine 270. With reference to FIG. 36D, the linear drive assembly 1162 has continued to displace the finger/thumb assembly 1168 and the cartridge 1240 along the lead screw 1174 and towards the magazine 270 until the cartridge 1240 is fully loaded into the magazine 270. During the displacement of the cartridge 1240 towards the magazine 270, the wall 1230 has served to counteract rotation of the cartridge 1240. At this point, the picker cam surface 1220 of the picker 1218 is disposed between the finger cam 1206 of the finger 1202 and the pivot shaft 1204 of the finger 1202. To disengage the finger 1202 from the notch 234A of the cartridge 1240 and release the cartridge 1240, the solenoid 1224 is operated so as to retract the plunger 1226 and thereby rotate the picker 1218. Rotation of the picker 1218 pushes the finger 1202 away from the cartridge 1240 as shown in FIG. 36G. At this point, loading of the cartridge 1240 into the magazine 270 is complete.

Figure 37A:
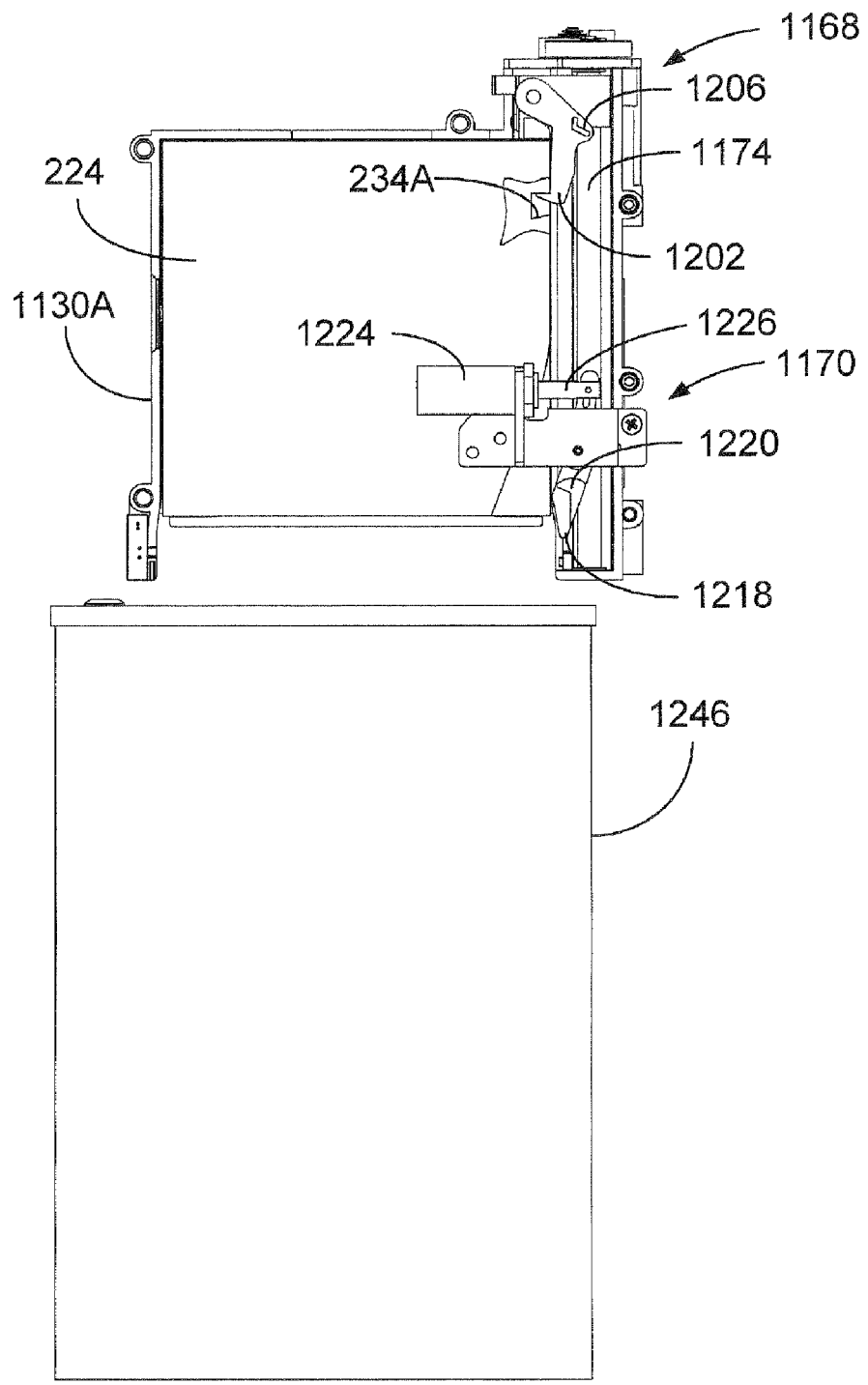
FIGS. 37A-37G are free body diagrams that illustrate an embodiment of a cartridge transport unit inserting/extracting a data cartridge into/from a drive.

FIGS. 37A-37D, when viewed in sequence, illustrate the operation of the picker assembly 1164 and the linear drive assembly 1162 in loading the LTO cartridge 1240 into a drive 1246. With reference to FIG. 37A, (a) the elevator 750, horizontal transport unit 1052, and rotary assembly 1086 have, as needed, positioned the housing 1082 so that the opening 1084B is adjacent to the receptacle, such as the recepticle 186 from FIG. 5A, of the drive 1246; (b) the linear drive assembly 1162 and the finger/thumb assembly 1168 are operating to retain the cartridge 1240 within the housing 1082; and (c) the finger actuation assembly 1164 has positioned the picker 1218 so that the picker 1218 will not have an effect upon the finger 1202 at this point in time. More specifically, the solenoid 1224 has fully extended the plunger 1226. As a consequence, the picker 1218 is positioned such that further rotation is prevented by the stop 1228.

Figure 37B:
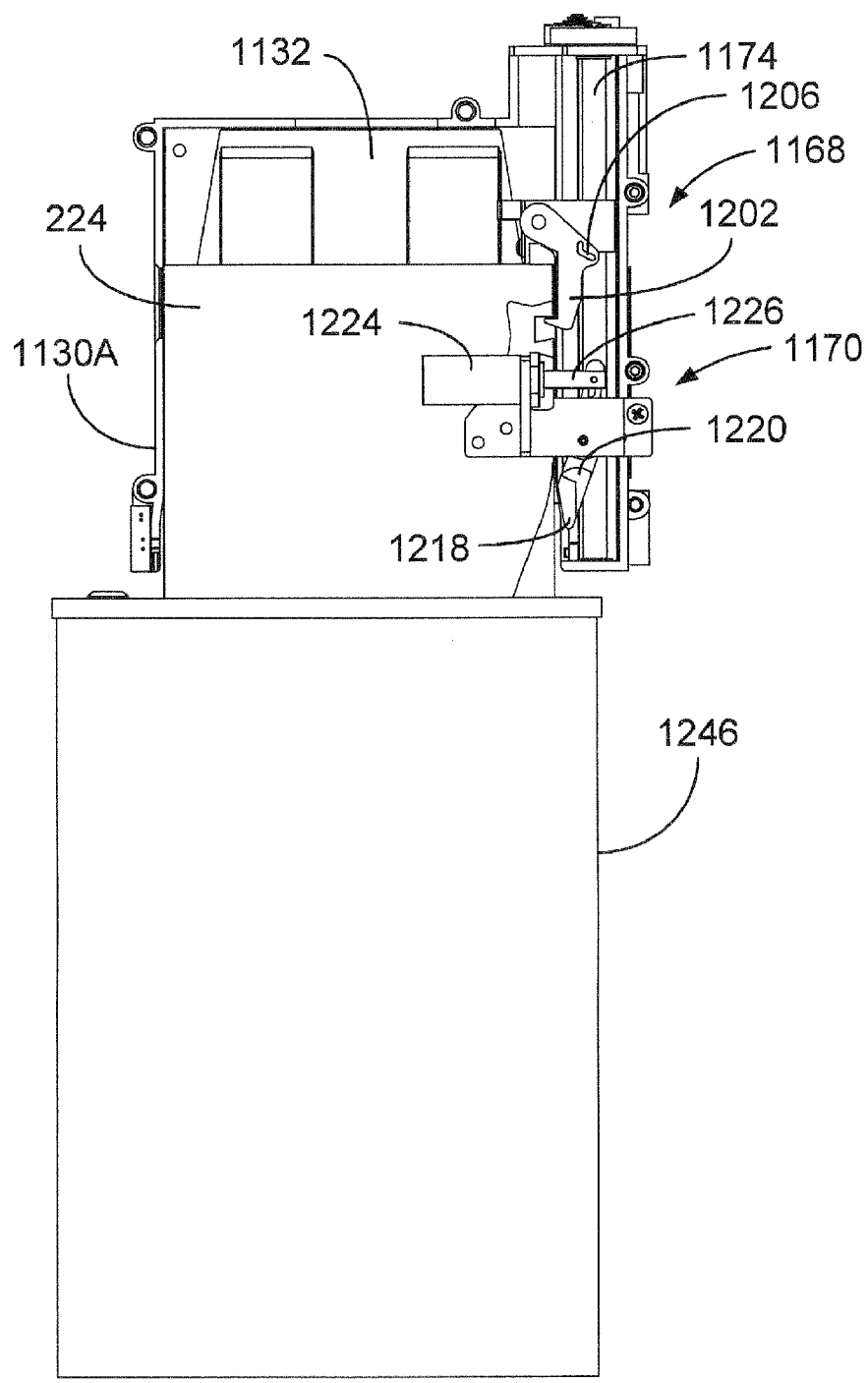
Figure 37C:
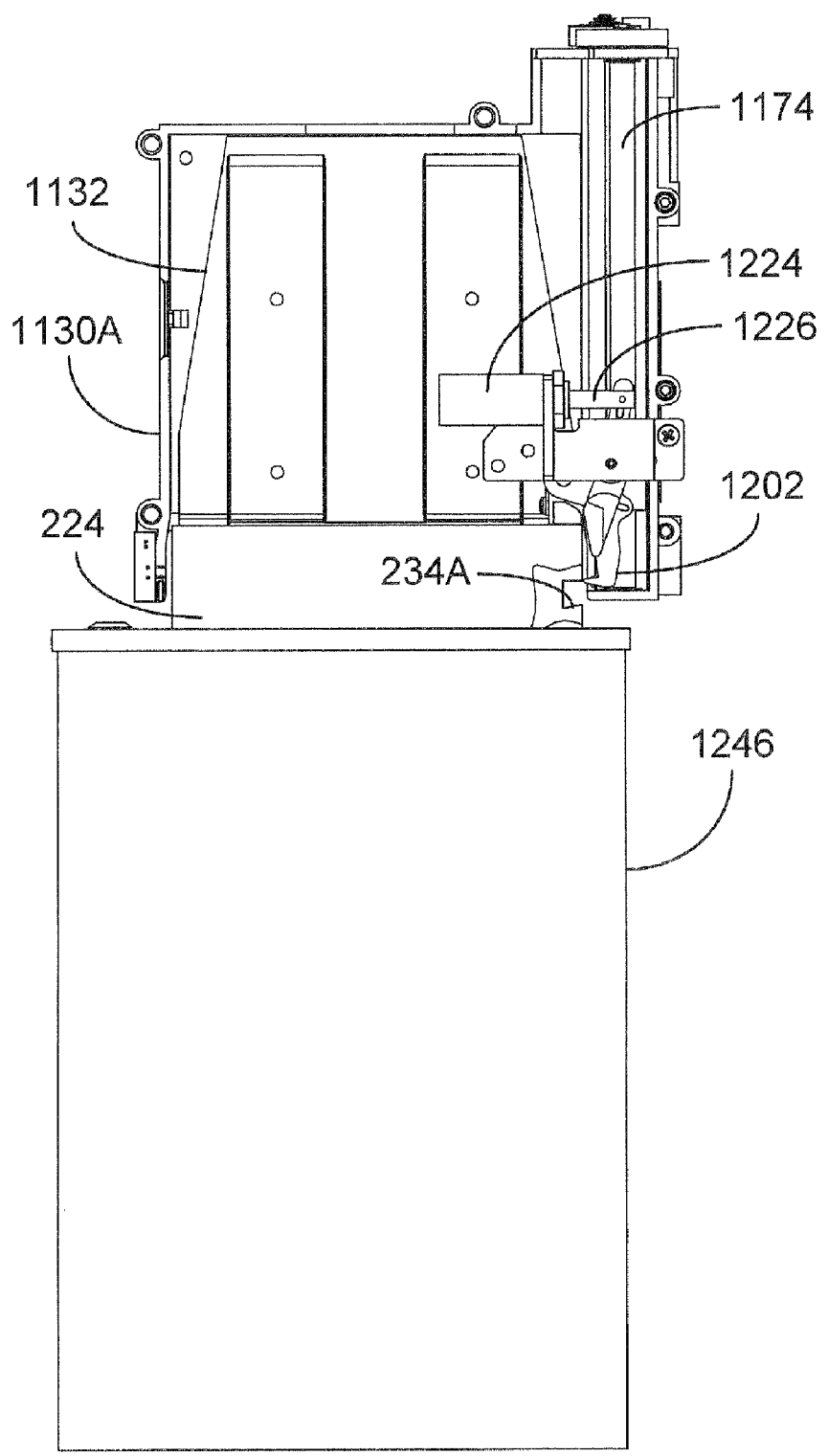
Figure 37D:
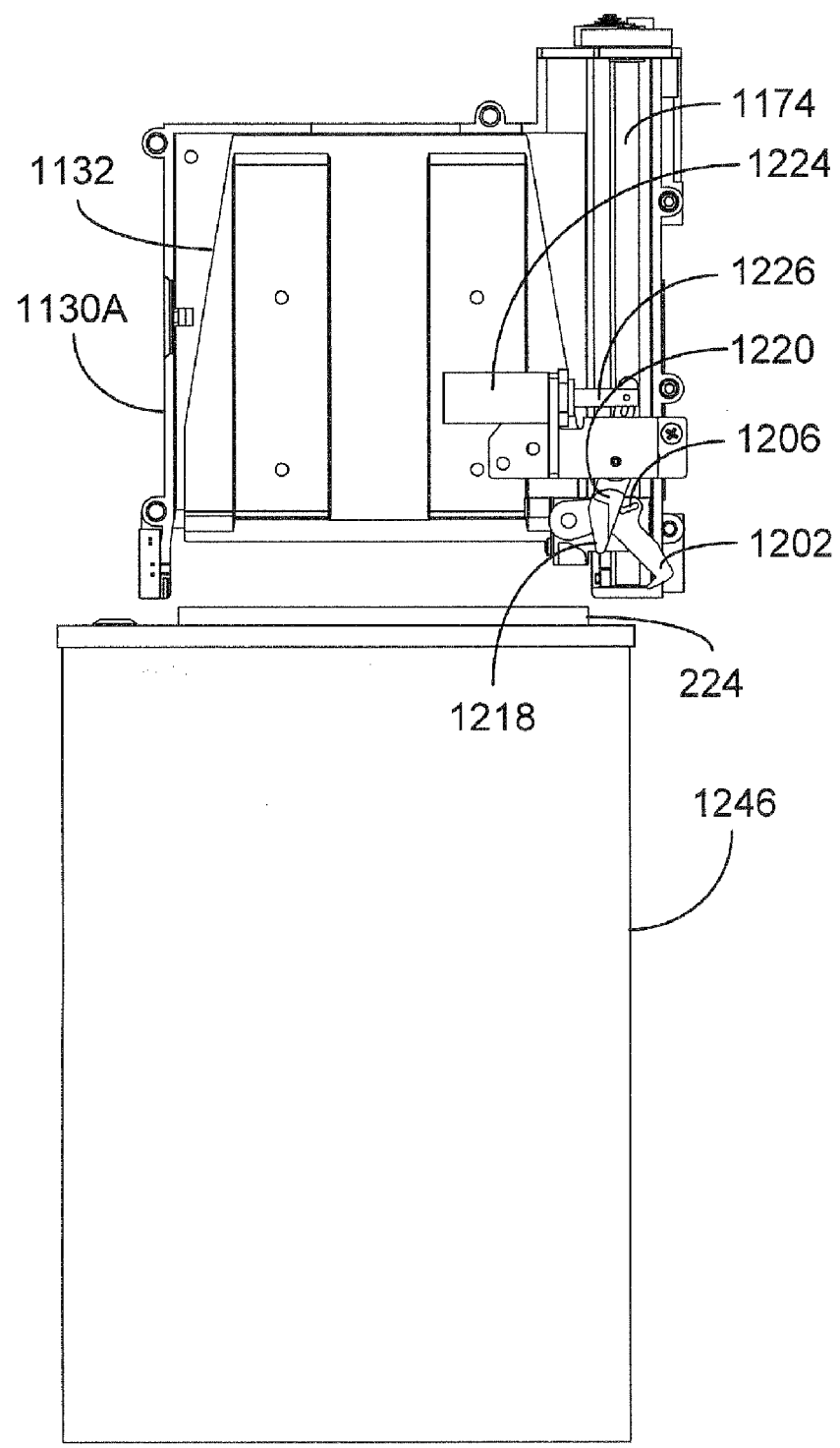

With reference to FIG. 37B, the linear drive assembly 1162 has been used to displace the finger/thumb assembly 1168 and the cartridge 1240 along the lead screw 1174 and towards the drive 1246. In addition, before the displacement of the finger/thumb assembly 1168 along the lead screw 1174 by the linear drive assembly 1162 reaches a point at which the finger cam 1206 of the finger 1202 could contact with the picker cam surface 1220, the finger actuation assembly 1164 has positioned the picker 1218 the picker 1218 so that the picker cam surface 1220 will cause the finger 1202 to rotate away from the cartridge 1240 and release the cartridge 1240 earlier than occurs during the loading of a cartridge 1240 into a magazine 270. More specifically, the solenoid 1224 has been operated so as to fully retract the plunger 1226 and thereby position the picker cam surface 1220 of the picker 1218 to interact with the finger cam 1206 of the finger 1202 to release the cartridge 1240 earlier than in the magazine loading operation. With reference to FIGS. 37C and 37D, further displacement of the picker/thumb assembly 1168 by the linear drive assembly 1162 eventually causes the picker cam surface 1220 to engage the finger cam 1206. After the picker cam surface 1220 has engaged the finger cam 1206, further displacement of the picker/thumb assembly 1168 towards the drive 1246 results in the picker cam surface 1220 applying a force to the finger 1202, via the finger cam 1206, that causes the finger 1202 to rotate about the pivot shaft 1204 and away from the cartridge 1240, thereby releasing the cartridge 1240 to the drive 1246. Comparison of FIG. 37C to FIG. 36G shows that the operation of the finger actuation assembly 1164 in the loading of the cartridge 1240 into the drive 1246 causes the finger 1202 to release the cartridge 1240 earlier than in the case of loading the cartridge 1240 into the magazine 270.

Figure 37E:
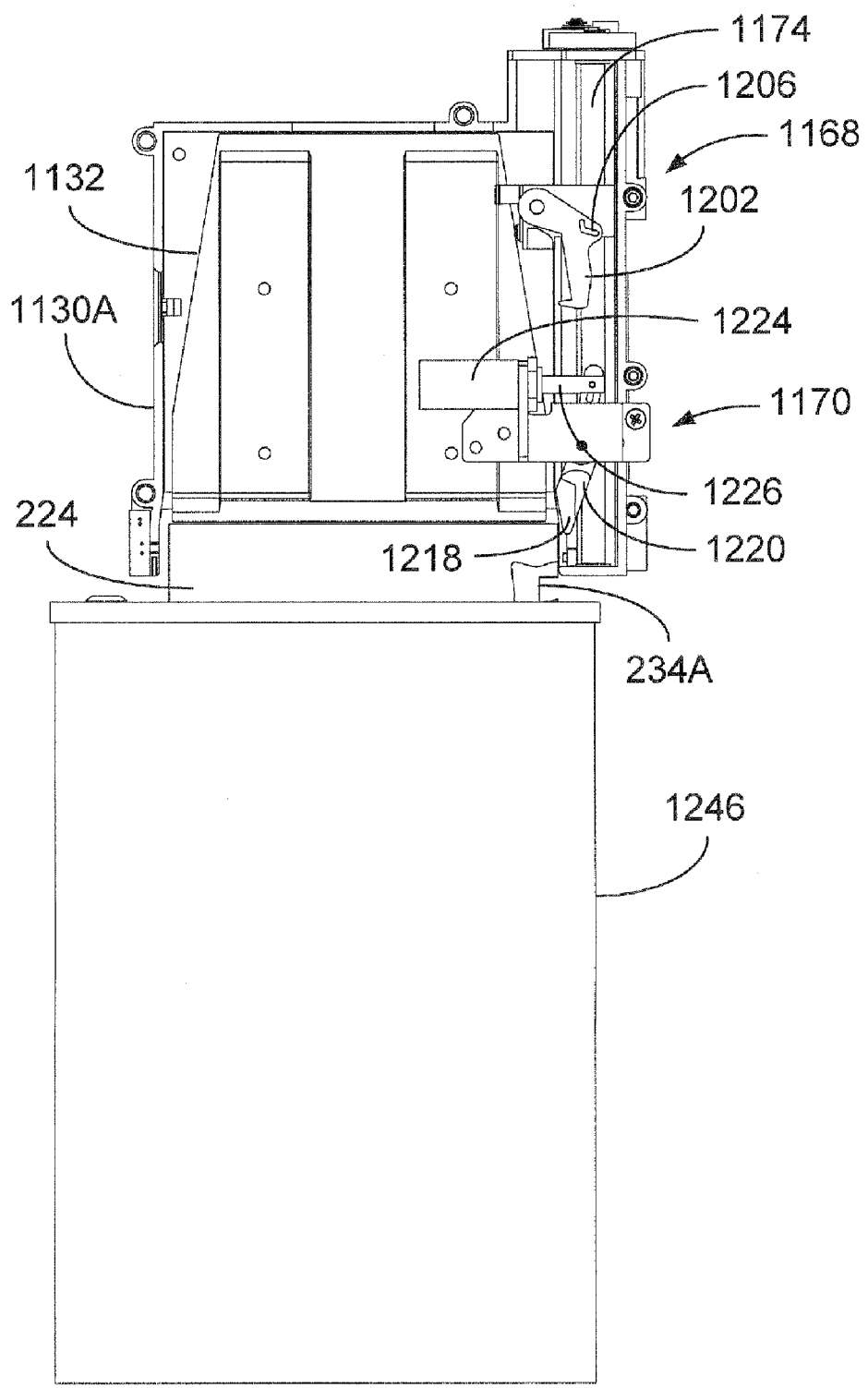

FIGS. 37E, 37F, 37G and 37A, when viewed in sequence, illustrate the operation of the picker assembly 1164 and the linear drive assembly 1162 in picking an LTO cartridge 1244 with a picker notch 234A from the drive 1246. With reference to FIG. 37E, (a) the elevator 750, horizontal transport unit 1052, and rotary assembly 1086 have, as needed, positioned the housing 1082 so that the opening 1084B is adjacent to the drive 1246; (b) the linear drive assembly 1162 has positioned the finger/thumb assembly 1168 within the housing 1082; and (c) the finger actuation assembly 1164 has positioned the picker 1218 so that the picker 1218 essentially has no effect upon the finger 1202 during the extraction operation. More specifically, the solenoid 1224 has fully extended the plunger 1226. As a consequence, the picker 1218 is positioned such that further rotation is prevented by the stop 1228.

Figure 37F:
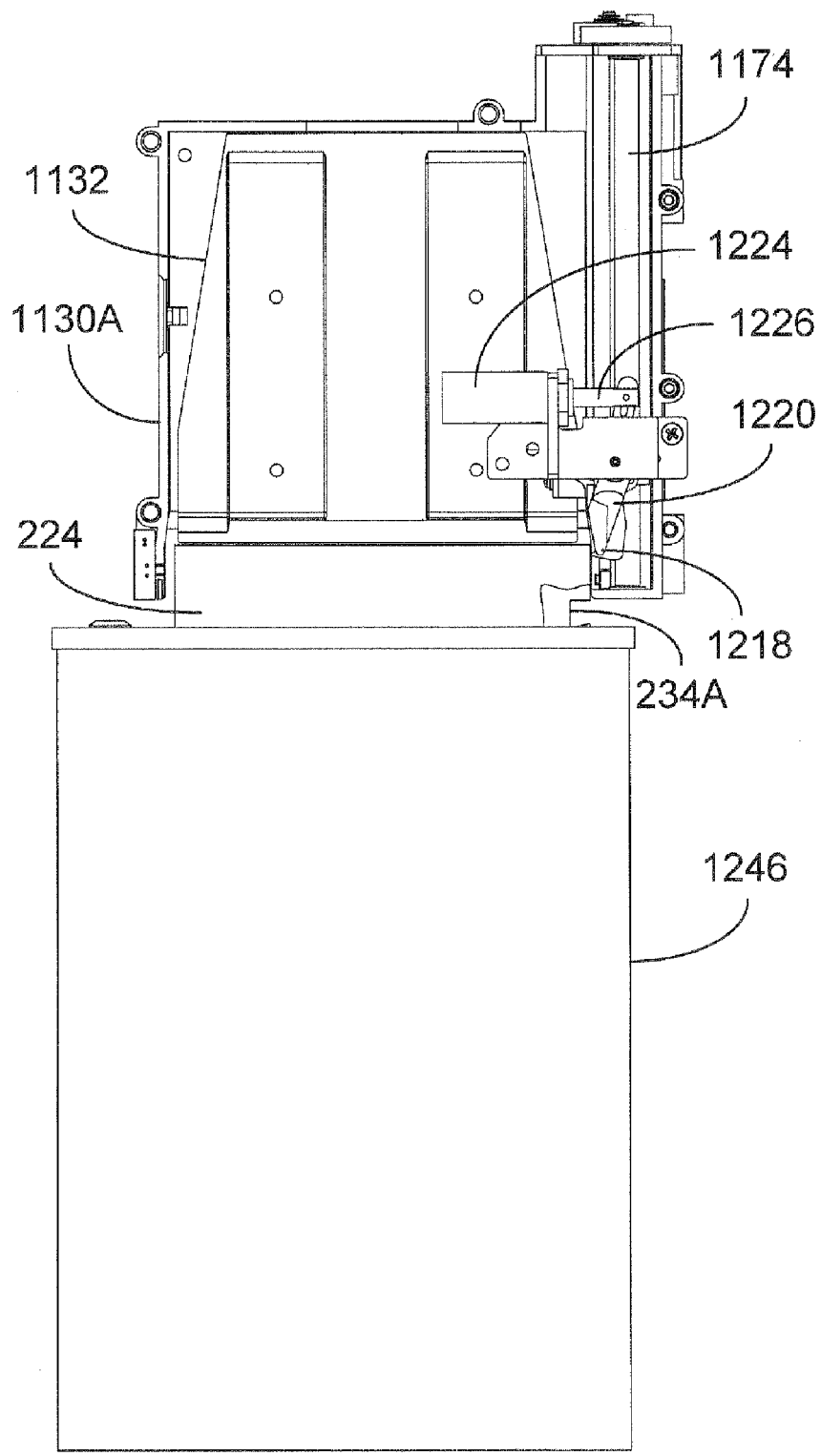
Figure 37G:
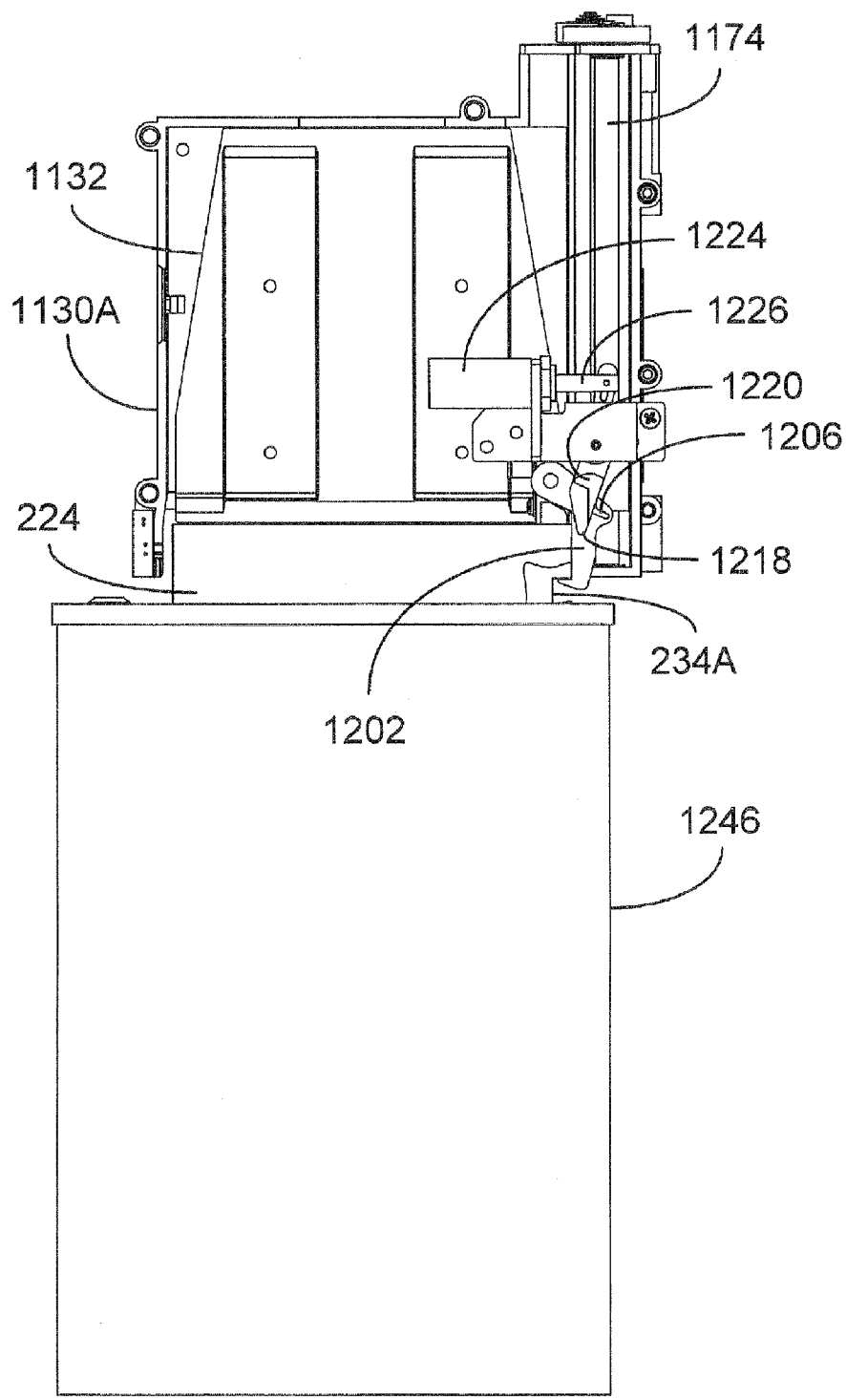

With reference to FIG. 37F, the DC motor 1176 of the linear drive assembly 1162 has been used to displace the finger/thumb assembly 1168 along the lead screw 1174 and towards the drive 1246. At this point, the finger 1202 has engaged the cartridge 1240 and the interaction of the finger 1202 with the surfaces of the cartridge 1240 has caused the finger 1202 to rotate away from the cartridge 1240 such that energy is stored in the return spring 1180. With reference to FIG. 37G, further displacement of the finger/thumb assembly 1168 towards the cartridge 1240 eventually results in the finger 1202 reaching the notch 234A. At this point, the energy stored in the return spring 1180 causes the finger 1202 to engage the notch 234A. With the notch 234A engaged, the cartridge 1240 can now be extracted from the drive 1246. With reference to FIG. 37A, after the notch 234A has been engaged, the linear drive assembly 1162 operates so as to displace the finger/thumb assembly 1168 and the cartridge 1240 away from the drive 1246. The linear drive assembly 1162 continues the displacement of the finger/thumb assembly 1168 and the cartridge 1240 away from the magazine 270 until the cartridge 1240 is fully within the housing 1082, as shown in FIG. 37A.

It should be appreciated that many of the elements of the library 202 employ linear or rotary actuators. Generally, for elements that employ a linear actuator, designs are feasible that employ a rotary actuator. Similarly, for elements that employ a rotary actuator, designs are feasible that employ a linear actuator. Further, the elements of the library 202 that employ linear or rotary actuators are capable of employing electrical actuators. Other embodiments of the present invention can employ actuators that utilize hydraulic or pneumatic actuators. In addition, many of the electrical motors utilized in the library 202 are DC motors. As one skilled in the art will appreciate, other types of electrical motors are feasible.

Figure 38:
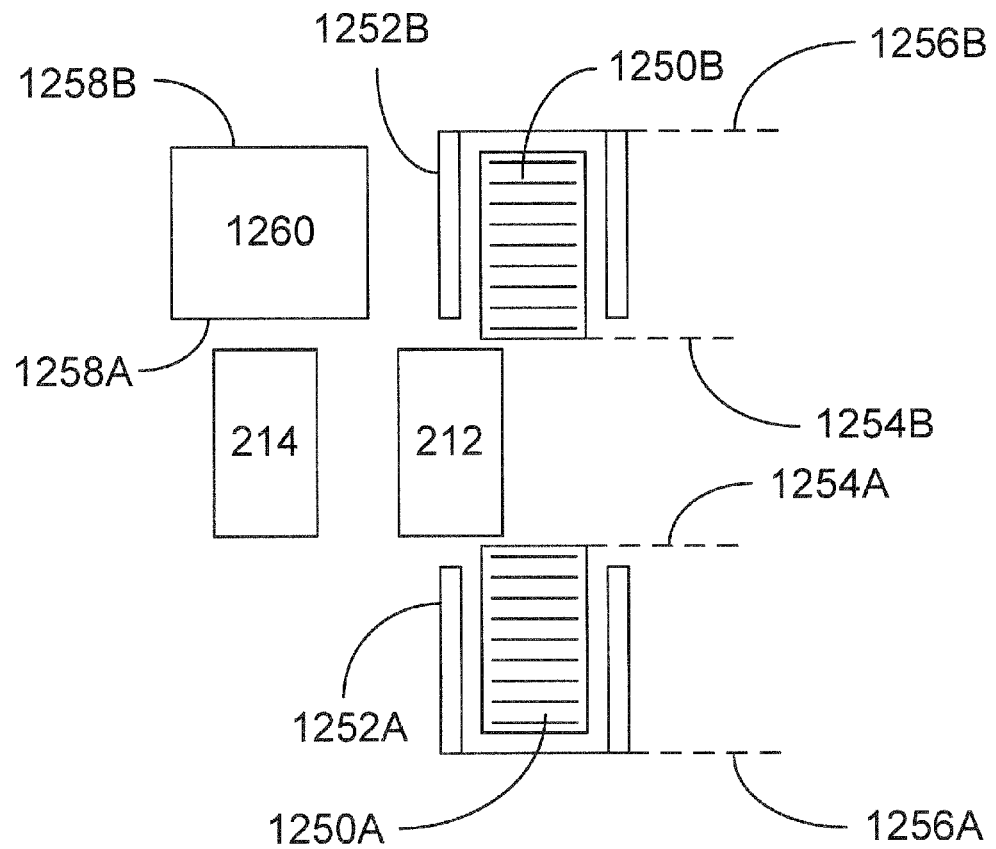
FIG. 38 illustrates the relationship between the space occupied by magazines resident in the library and the space utilized by the magazine transport and cartridge transport in the library.

With reference to FIG. 38, the relationship between the space occupied by shelved magazines 270 in the library 202 to the other elements of the library 202 is described. A first magazine 1250A associated with a first shelf 1252A of any one of the five columns of shelving 328A resides in a vertical plane that is bounded by a first face 1254A that corresponds with the front face of the first magazine 1250A and a second face 1256A that corresponds with the rear face of the first magazine 1250A and is substantially parallel to the first face 1254A (a first magazine space). The first shelf 1252A is accessible for loading and unloading the first magazine 1250A at substantially where the first face 1254A is defined. The first magazine 125A is loaded and unloaded to and from the first shelf 1252A via the magazine transport 212 and magazine picker 880. Similarly, a second magazine 1250B associated with a second shelf 1252B of any one of the two columns of shelving 328B resides in a vertical plane that is bounded by a first face 1254B and a second face 1256B that respectively correspond to the front and rear surfaces of the second magazine 1250B (a second magazine space). As disclosed in FIGS. 28A and 28B, the second shelf 1252B can reside in compartments 544A-544F within the user definable space 336. The second shelf 1252B is accessible for loading and unloading the second magazine 1250B at substantially where the first face 1254B is defined. The user definable space 336 can also comprise a drive 1260 wherein data cartridges can be loaded to and from the drive 1260 substantially where the first face 1254B is defined. The distance between the first and second planes 1254A, 1256A (or between the first and second planes 1254B, 1256B) defines the minimum distance that is needed between the first planes 1254A, 1254B (at least a portion of the space between these two planes 1254A, 1256A defining a magazine transport space) for the magazine transport 212 to move a magazine within the library 202 without re-orienting a magazine, such as the first magazine 1250A for example. Hence, the magazine transport space is bounded between the first face 1254A corresponding to the first shelf 1252A, which is the interface of the magazine transport space and the face where the first shelf 1252A can receive the first magazine 1250A, and the first face 1254B corresponding to the second shelf 1252B, which is the interface of the magazine transport space and the face where the user definable space 336 can receive the second magazine 1250B. The closer the distance between the first planes 1254A, 1254B to the minimum distance for the magazine transport 212, the more volume there is within the library 202 to accommodate more magazines 270 and/or more drives 180. In the illustrated embodiment, the distance between the planes 1254A, 1254B is less than twice the distance between the planes 1254A, 1256A and approaches 130% of the distance of the distance between the planes 1254A, 1256A. Further, the distance between the first and second planes 1254A, 1256A (or the distance between the first and second planes 1254B, 1256B) is roughly equal to the distance between the front and rear surfaces 1258A, 1258B of the drive 1260, of the two columns of drives 180. This allows the two columns of drives 180 and shelving 1252B to be positioned within the library 202 so as to efficiently utilize the available space within the library 202. It should also be appreciated that the magazine transport space overlaps with the magazine spaces or can be slightly greater than the width of a magazine 270, such as the first magazine 1250A defined by the first and second face 1254A, 1256A.

In a magazine-based library 100 with a circular/cylindrical type layout, the magazine transport 108 travels in a space that is located between two concentric "planes" or surfaces. Further, the magazines 270 are typically located in one or more spaces that are each located between two planes.

Figure 39:
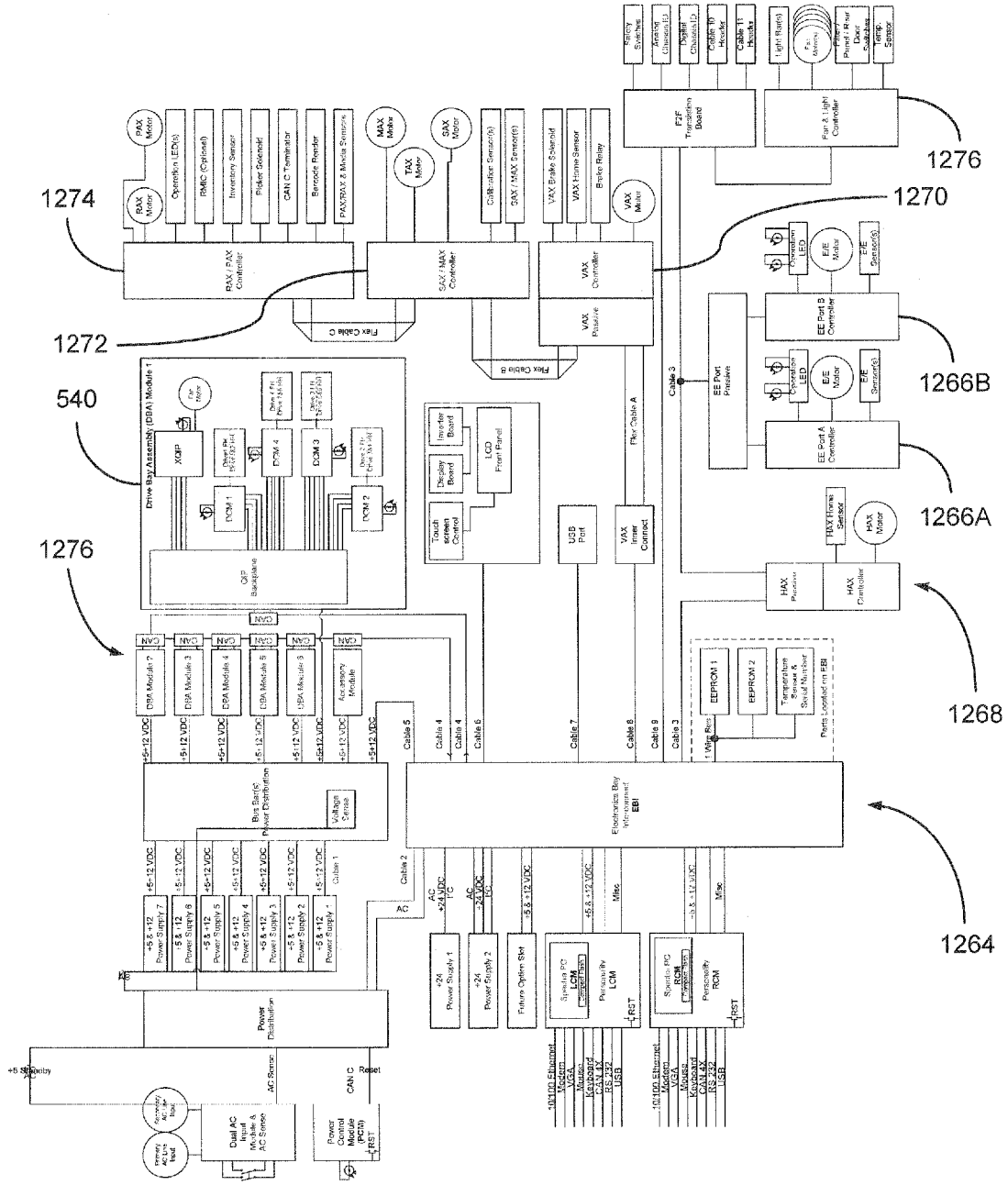
FIG. 39 illustrates the controller and the relationship of the controller to the electrical elements in the library and the power distribution system.

FIG. 39 illustrates the control system 218 for the library 202. Generally, the control system 218 is comprised of controller 1264 that is capable with communicating with other controllers in the library 202 that are associated with various electrical elements within the library 202. More specifically, the controller 1264 is capable of communicating with: (a) a first and second entry/exit port controllers 1266A, 1266B that respectively control electrical elements associated with the first and second entry/exit ports 368, 370; (b) a horizontal axis controller 1268 that controls electrical elements associated with the horizontal axis assembly 754 of the elevator 750; (c) a vertical axis controller 1270 that controls electrical elements associated with the vertical axis assembly 752 of the elevator 750; (d) a short axis/magazine controller 1272 that controls electrical elements associated with the horizontal transport unit 1052, magazine picker 880, and magazine transport device 900; (e) a rotation axis/picker axis controller 1274 that controls electrical elements associated with the rotary 1086, the linear drive assembly 1162, and the picker assembly 1164; and (f) an environmental controller 1276 that controls, among other things, the fans 220. In addition, the controller 1264 also communicates with elements associated with the operator interface 342. Further, the controller 1264 also communicates with the QIP 668 associated with an drive bay assembly 540 in the library via a Controller Area Network (CAN). Other control systems are also feasible.

The library 202 operates to read and/or write data on a recording medium that is located in a cartridge 224 that is stored in a magazine 270 that is, in turn, stored on a shelf of the shelf system 208 or in another storage location. Further, when the cartridge 224 is stored in the magazine 270, the cartridge 224 is oriented in the library 202 such that the face of the cartridge 224 with the greatest surface area, such as the surface 226A used herein for illustrative purposes, lies in a substantially vertical plane. Moreover, the cartridge 224 is oriented so that the surface vector of the face 226A of the cartridge 224 with the greatest surface area is substantially parallel to the direction in which the magazine picker 880 displaces the magazine 270. Further, when the cartridge picker 214 extracts/inserts the cartridge 224 from/into the magazine 270, the cartridge picker 214 displaces the cartridge 224 vertically within the noted vertical plane.

It should be appreciated that other embodiments of a magazine-based data cartridge library 202 are capable of operating on cartridges 224 that are oriented when in storage so that the face 226A of the cartridge 224 with the greatest surface area lies in a vertical plane, but the surface vector of the face 226A lies substantially perpendicular to the direction in which a magazine picker 880 displace the magazine 270 storing the cartridge 224 and/or a cartridge picker 214 extracts/inserts the cartridge 224 from/into the magazine 270 such that the magazine 270 is displaced horizontally within the vertical plane.

Figure 40A:
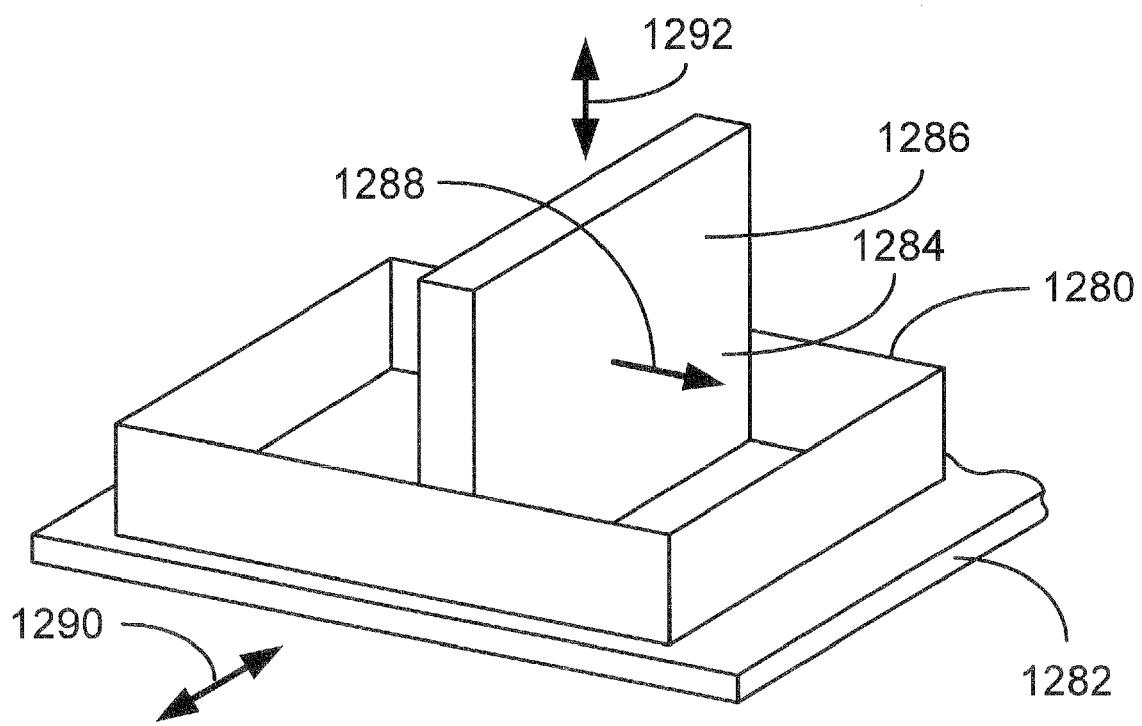
FIGS. 40A-40F illustrate alternative embodiments of magazines that operatively orients cartridges within a magazine-based data cartridge library such that the face of the cartridge with the greatest surface area lies in a vertical plane.

FIG. 40A illustrates an alternative embodiment of a magazine 1280 suitable for use in an alternative embodiment of a magazine-based data cartridge library relative to library 202. When the magazine 1280 is operationally disposed on a shelf 1282 of the library 202, the magazine 1280 holds a cartridge 1284 such that: (a) a face of the cartridge 1284 with the greatest surface area 1286 lies in a vertical plane; (b) the surface vector 1288 of the face 1286 is substantially perpendicular to a direction 1290 that the magazine 1280 is displaced by a magazine picker 880; and (c) the cartridge 1284 is displaced in a vertical direction 1292 by a cartridge picker 214 to insert/extract the cartridge 1284 into/from the magazine 1280.

Figure 40B:
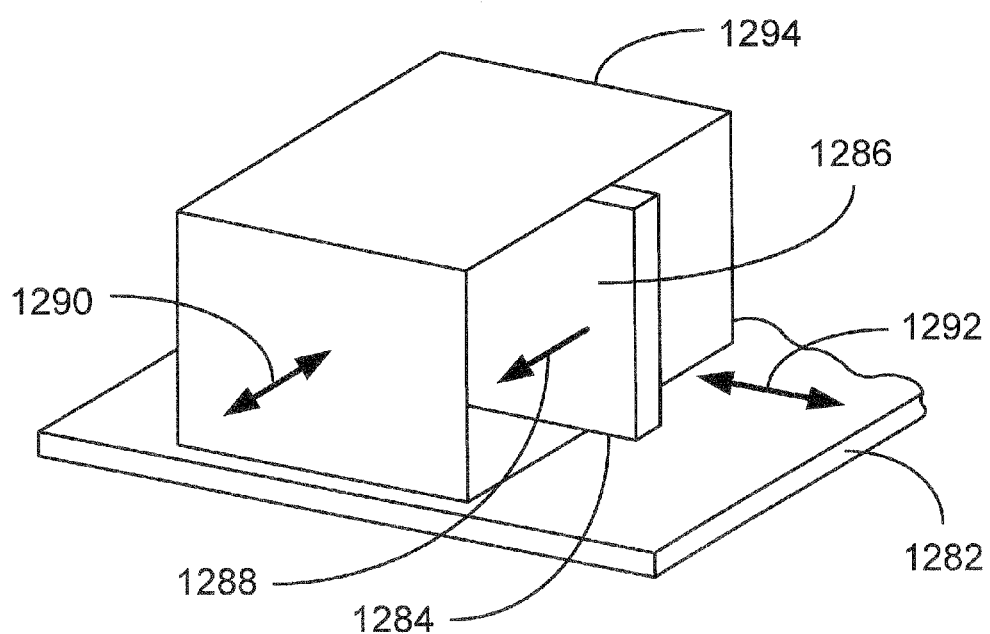

FIG. 40B illustrates an alternative embodiment of a magazine 1294 suitable for use in an alternative embodiment of a magazine-based data cartridge library relative to library 202. Each of the features in FIG. 40B that is substantially identical to a feature in FIG. 40A has been give the same reference number as the feature in FIG. 40A. When the magazine 1294 is operationally disposed on a shelf 1282 of the library 202, the magazine 1294 holds a cartridge 1284 such that: (a) a face 1286 of the cartridge 1284 with the greatest surface area lies in a vertical plane; (b) the surface vector 1288 of the face 1286 is substantially parallel to a direction 1290 that the magazine 1294 is displaced by a magazine picker 880; and (c) the cartridge is displaced in a direction 1292, a horizontal direction in the vertical plane in which the face 1286 of the cartridge 1284 with the greatest surface area lies, by a cartridge picker 214 to insert/extract the cartridge 1284 into/from the magazine 1294.

Figure 40C:
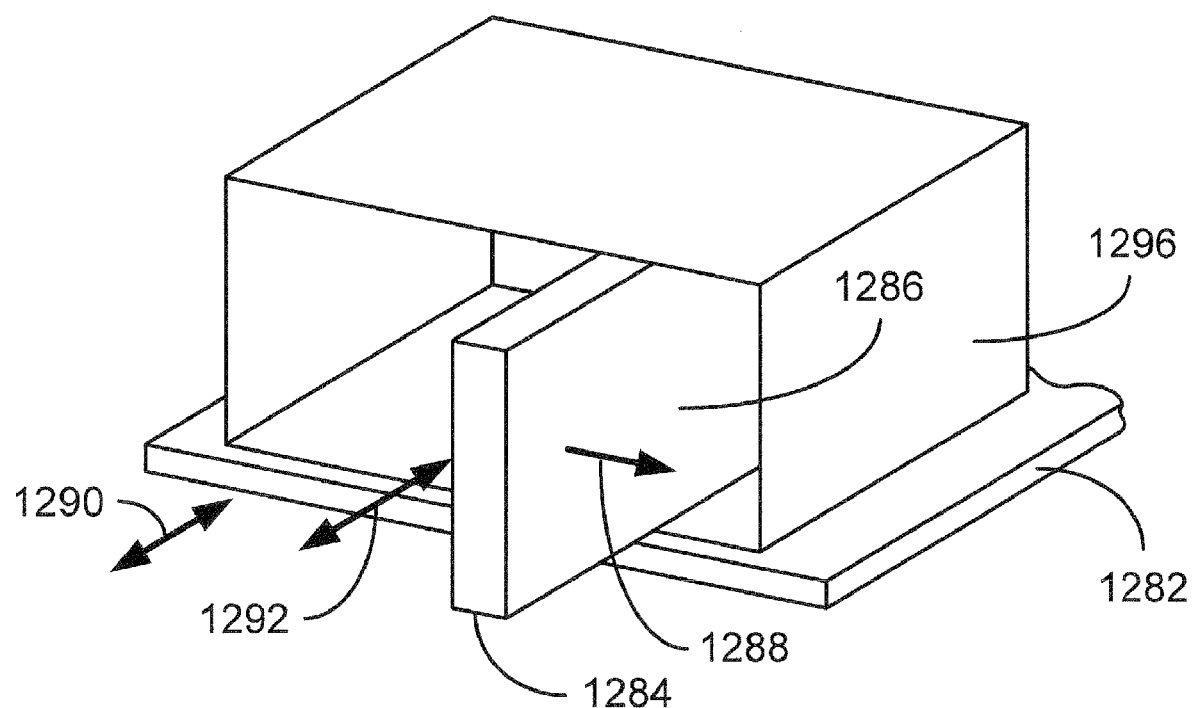

FIG. 40C illustrates an alternative embodiment of a magazine 1296 suitable for use in an alternative embodiment of a magazine-based data cartridge library relative to library 202. Each of the features in FIG. 40C that is substantially identical to a feature in FIG. 40A has been give the same reference number as the feature in FIG. 40A. When the magazine 1296 is operationally disposed on a shelf 1282 of the library 202, the magazine 1296 holds a cartridge 1284 such that: (a) a face 1286 of the cartridge 1284 with the greatest surface area lies in a vertical plane; (b) the surface vector 1288 of the face 1286 is substantially perpendicular to a direction 1290 that the magazine 1296 is displaced by a magazine picker 880; and (c) the cartridge 1284 is displaced in a horizontal direction 1292 in the vertical plane in which the face 1286 of the cartridge 1284 with the greatest surface area lies, by a cartridge picker 214 to insert/extract the cartridge 1284 into/from the magazine 1296.

Figure 40D:
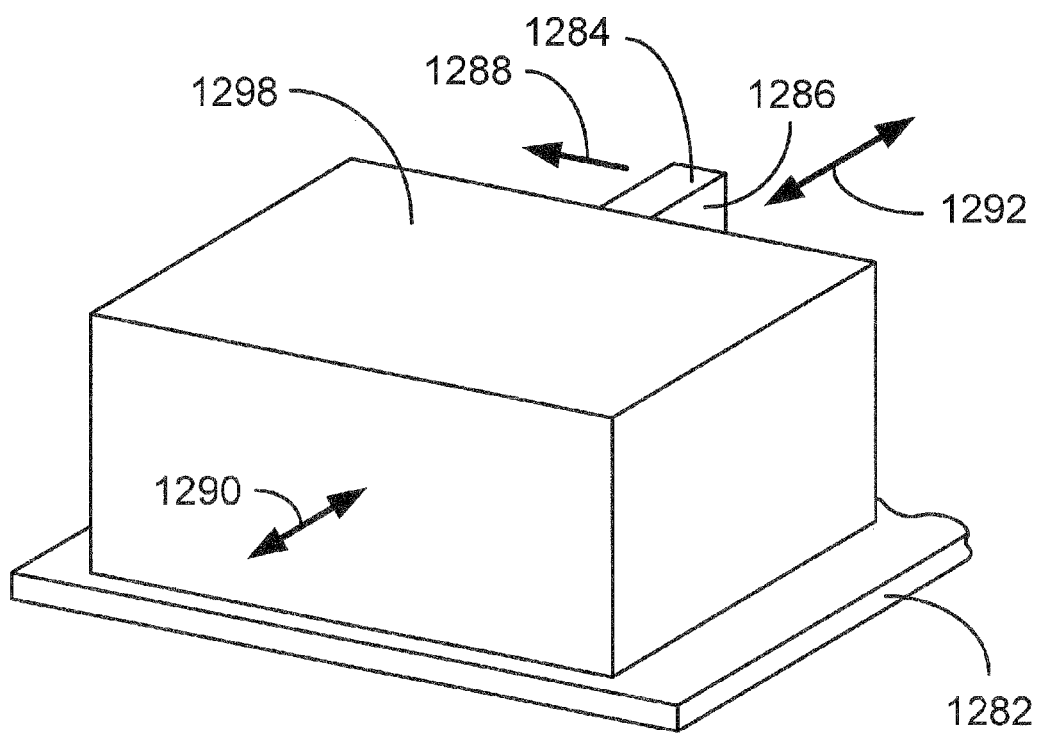

FIG. 40D illustrates an alternative embodiment of a magazine 1298 suitable for use in an alternative embodiment of a magazine-based data cartridge library relative to library 202. Each of the features in FIG. 40D that is substantially identical to a feature in FIG. 40A has been give the same reference number as the feature in FIG. 40A. When the magazine 1298 is operationally disposed on a shelf 1282 of the library 202, the magazine 1298 holds a cartridge 1284 such that: (a) a face 1286 of the cartridge 1284 with the greatest surface area lies in a vertical plane; (b) the surface vector 1288 of the face 1286 is substantially perpendicular to a direction 1290 that the magazine 1298 is displaced by a magazine picker 880; and (c) the cartridge 1284 is displaced in a direction 1292, a horizontal direction in the vertical plane in which the face 1286 of the cartridge 1284 with the greatest surface area lies, by a cartridge picker 214 to insert/extract the cartridge 1284 into/from the magazine 1298.

Figure 40E:
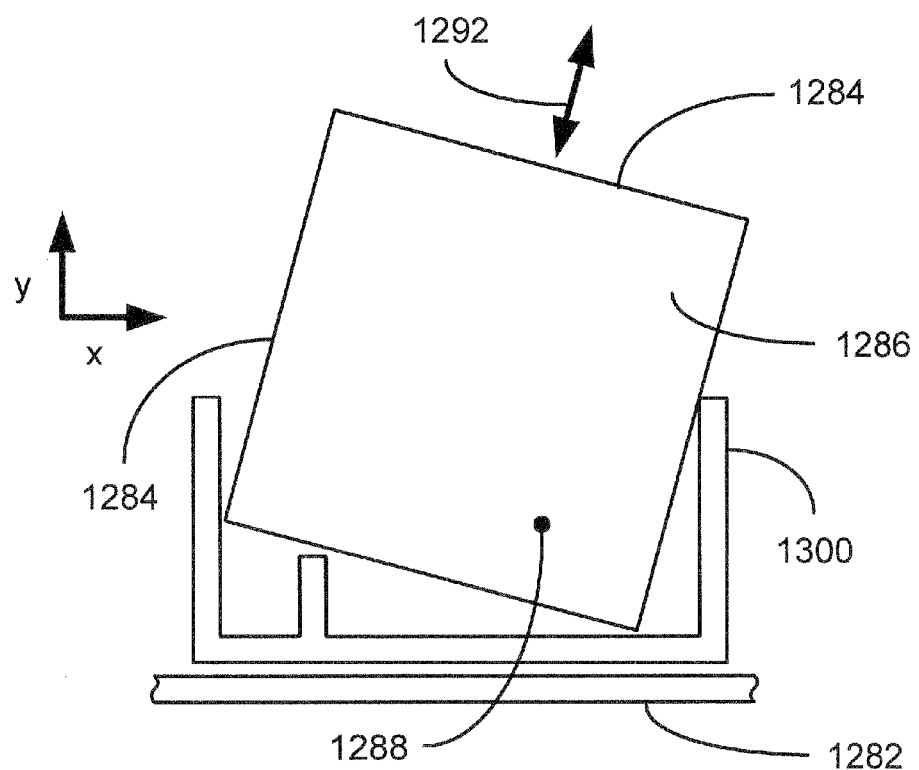

FIG. 40E illustrates a cross-section of alternative embodiment of a magazine 1300 suitable for use in an alternative embodiment of a magazine-based data cartridge library relative to library 202. Each of the features in FIG. 40E that is substantially identical to a feature in FIG. 40A has been give the same reference number as the feature in FIG. 40A. When the magazine 1300 is operationally disposed on a shelf 1282 of the library 200, the magazine 1300 holds a cartridge 1284 such that: (a) a face 1286 of the cartridge 1284 with the greatest surface area lies in a vertical plane; (b) the surface vector 1288 of the face 1286 is substantially perpendicular to or substantially parallel to a direction that the magazine 1300 is displaced by a magazine picker 880; and (c) the cartridge 1284 is displaced in a direction 1292 in the vertical plane in which the face 1286 of the cartridge 1284 with the greatest surface area lies that has both vertical and horizontal components, by a cartridge picker 214 to insert/extract the cartridge 1284 into/from the magazine 1300.

Figure 40F:
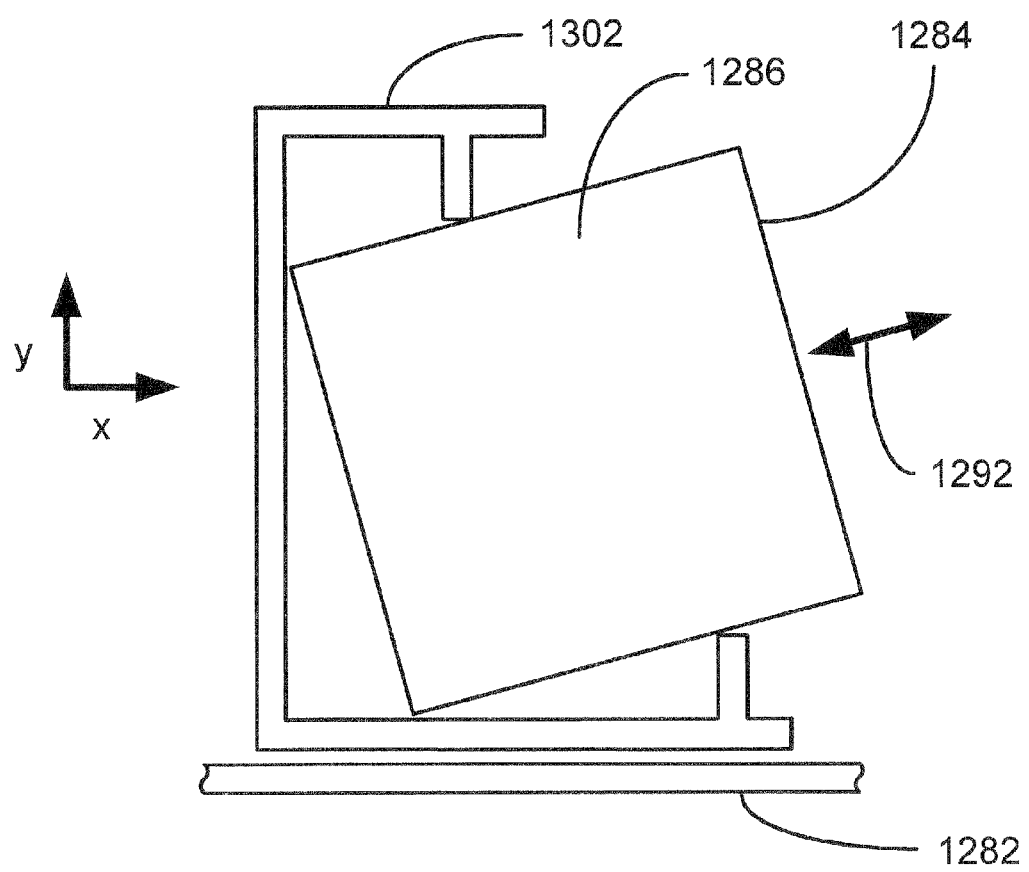

FIG. 40F illustrates a cross-section of alternative embodiment of a magazine 1302 suitable for use in an alternative embodiment of a magazine-based data cartridge library relative to library 202. Each of the features in FIG. 40F that is substantially identical to a feature in FIG. 40A has been give the same reference number as the feature in FIG. 40A. When the magazine 1302 is operationally disposed on a shelf 1282 of the library 202, the magazine 1302 holds a cartridge 1284 such that: (a) a face 1286 of the cartridge 1284 with the greatest surface area lies in a vertical plane; (b) the surface vector 1288 of the face 1286 is substantially perpendicular or substantially parallel to a direction that the magazine 1302 is displaced by a magazine picker 880; and (c) the cartridge 1284 is displaced in a direction 1292, a direction in the vertical plane in which the face 1286 of the cartridge 1284 with the greatest surface area lies that has both vertical and horizontal components, by a cartridge picker 214 to insert/extract the cartridge 1284 into/from the magazine 1302.

Figure 41A:
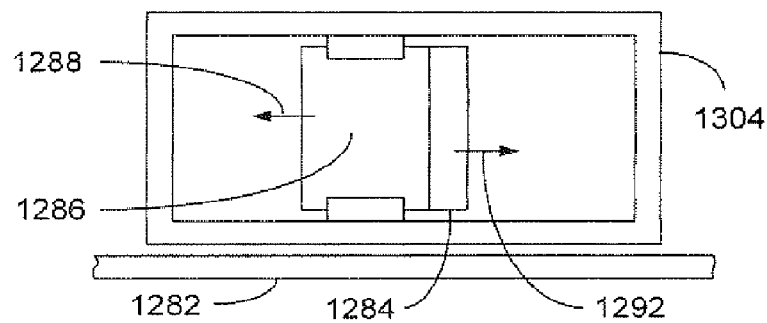
FIGS. 41A-41B illustrate an alternative embodiment of a magazine that operatively orients cartridges within a magazine-based data cartridge library such that the face of the cartridge with the greatest surface area lies in a vertical plane.
Figure 41B:
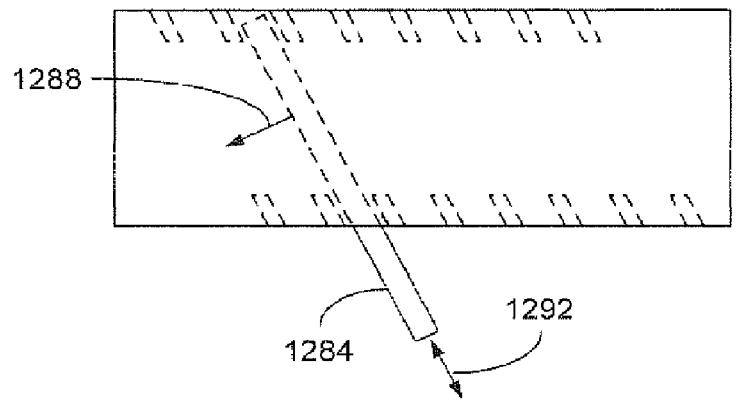

With reference to FIGS. 41A-41B, an alternative embodiment of a magazine 1306 is suitable for use with an alternative embodiment of a magazine-based data cartridge library relative to library 202. Each of the features in FIGS. 41A-41B that is substantially identical to a feature in FIG. 40A has been give the same reference number as the feature in FIG. 40A. When the magazine 1304 is operationally disposed on a shelf 1282 of the library 202, the magazine 1304 holds a cartridge 1284 such that: (a) a face 1286 of the cartridge 1284 with the greatest surface area lies in a vertical plane; (b) the surface vector 1288 of the face 1286 is neither perpendicular or parallel to a direction that the magazine 1304 is displaced by a magazine picker 880; and (c) the cartridge 1284 is displaced in a direction 1292, a horizontal direction in the vertical plane in which the face 1286 of the cartridge 1284 with the greatest surface area lies, by a cartridge picker 214 to insert/extract the cartridge 1284 into/from the magazine 1304.

Also feasible is a magazine that holds cartridge 1284 in a vertical plane and in an orientation that is a combination of the orientations that magazine 1300 or magazine 1302 and magazine 1304 hold a cartridge 1284.

As one skilled in the art will appreciate, the foregoing magazine designs are only exemplary of magazine designs that operatively hold magazines in a magazine-based data cartridge library 202 in an orientation such that the face, such as the face 1286, of the cartridge, such as cartridge 1284, with the greatest surface area lies in a vertical plane.

Figure 42:
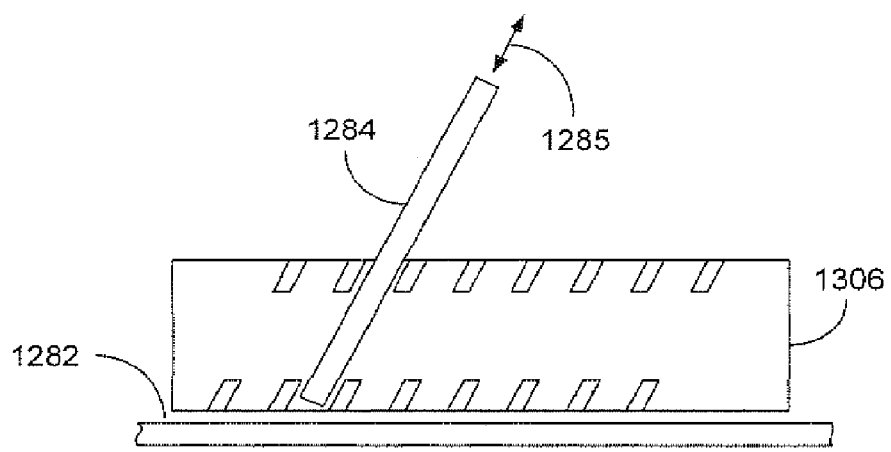
FIG. 42 illustrates an alternative embodiment of a magazine that is operative with the library.

It will also be appreciated by one skilled in the art that the library 202 is also operable with magazines that hold cartridges, for example cartridge 1284, such that the face, such as the face 1286, of a cartridge with the greatest surface area does not lie in a vertical plane. With reference to FIG. 42, the library 202 is operable with a magazine 1306, shown in cross-section, that when supported on a shelf 1282 in the library 202, the cartridge 1284 resides in a plane that is between a vertical plane and a horizontal plane, shown by the arrow 1285. Further, the cartridge transport 214 displaces the cartridge 1284 in this plane during insertion/extraction into/from the magazine 1306. As side loading/unloading embodiment of the magazine 1306 is also feasible but would not be operable with the library 202 without modification. These magazine 1306 designs are only exemplary of magazine 1306 designs suited for use magazine-based data cartridge library 202.

Figure 43A:
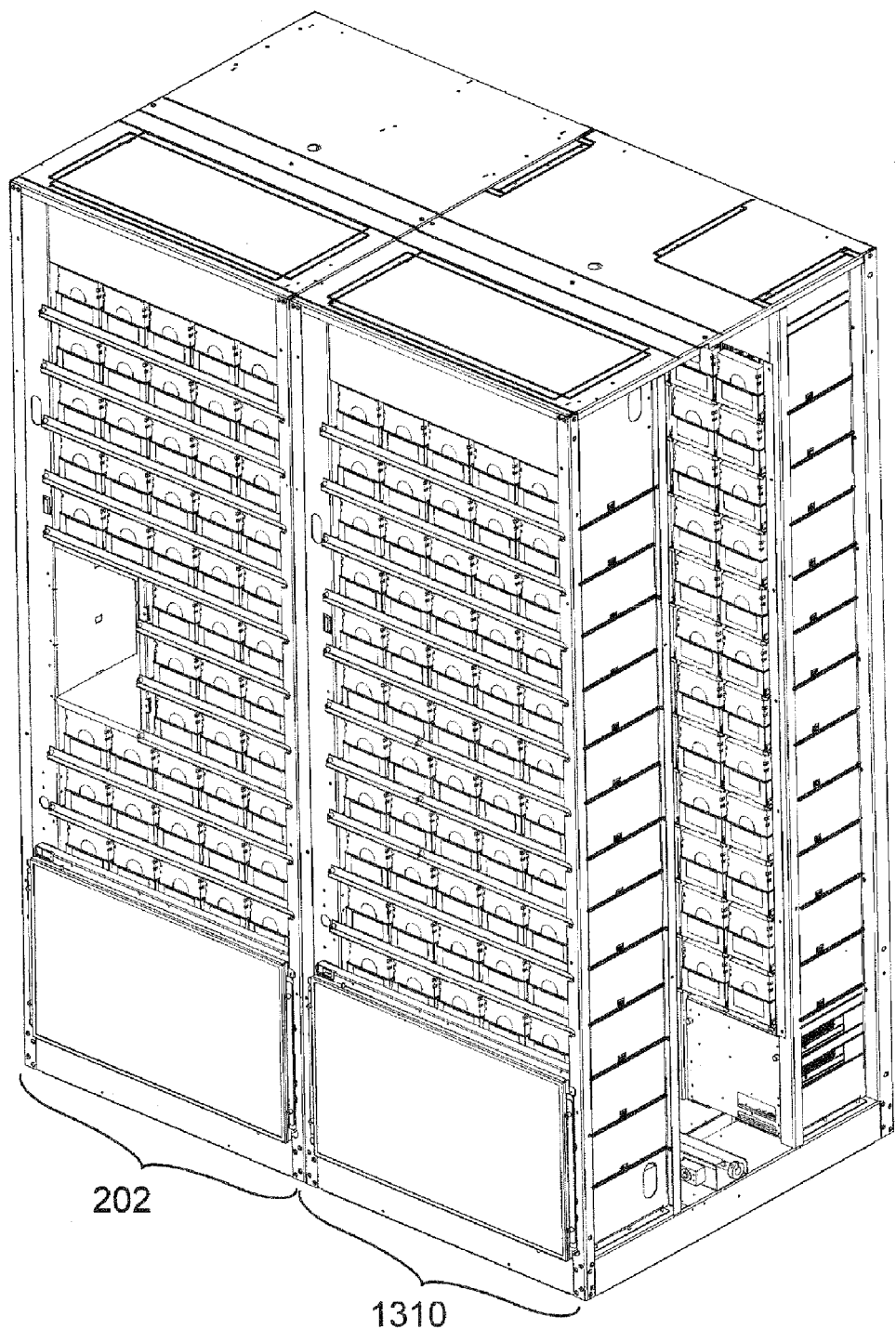
FIGS. 43A and 43B respectively illustrate an expanded library and a schematic representation of the process for producing the expanded library.
Figure 43B:
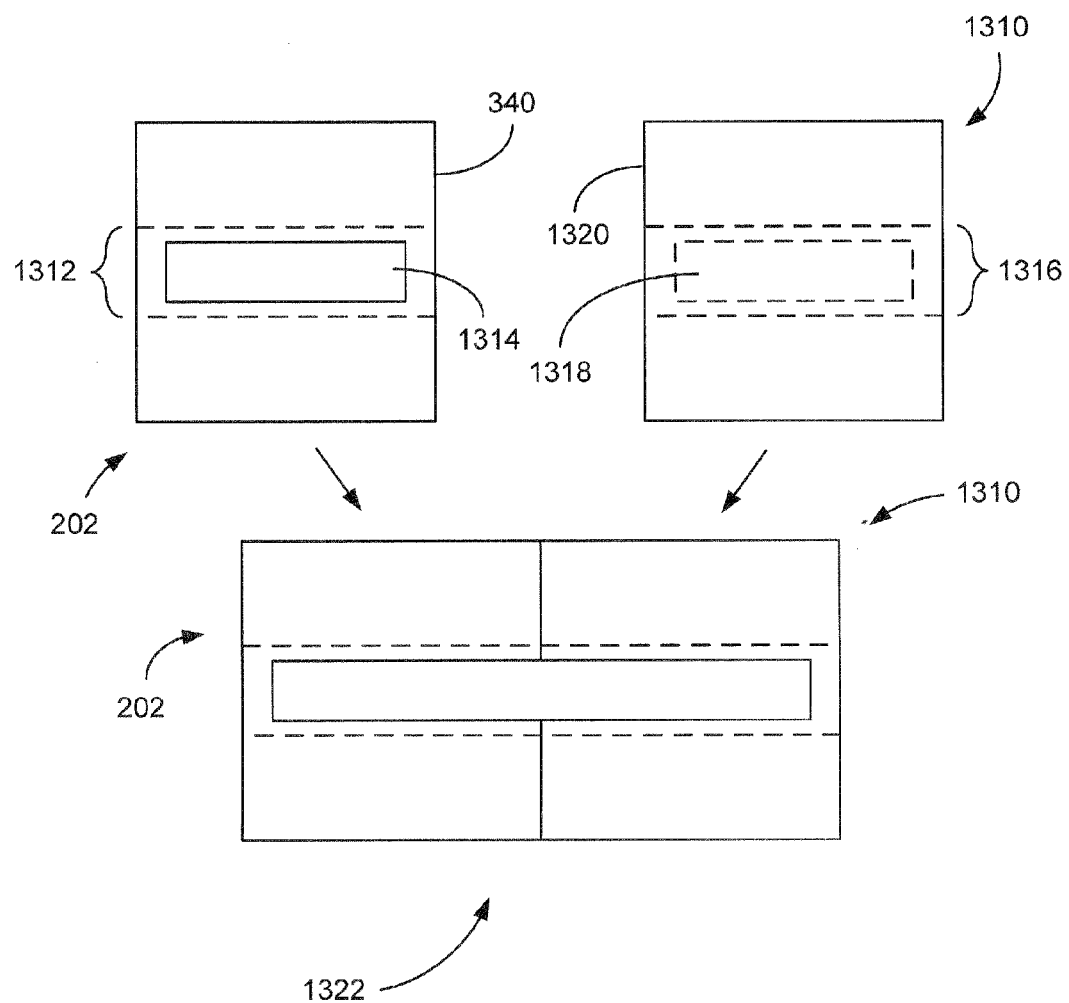

With reference to FIGS. 43A-43B, the expansion of the magazine-based data cartridge library 202 to include an add-on unit 1310 is discussed. Generally, the library 202 is capable of being expanded to include drive 180 and/or magazine 270 storage capability beyond that available in the library 202. The process of expanding the library 202 comprises obtaining the add-on unit 1310. The add-on unit 1310 can have any of a number of combinations of elements. For example, the add-on unit 1310 may be comprised entirely of shelving for storing magazines 270, entirely of drives 180 or drive bay assemblies 540 for accommodating drives 180, and various combinations of shelving and drives 180 or drive bay assemblies 540. The add-on unit 1310 can also comprise an entry/exit port, such as the entry/exit port 206 of the library 202. The add-on unit 1310 can also be another magazine-based data cartridge library that is capable of functioning independently of the library 202.

With reference to FIG. 43B, the process of making the expanded library 1322 is described from a schematic perspective. The library 202 has a magazine transporter space 1312 and a side 340 that is capable of being removed or modified so as to provide a path for transporting magazines 270 between the library 202 and the add-on unit 1310. Located within the magazine transporter space 1312 are horizontally extending components that are associated with the magazine transporter 212 and are cumulatively represented as horizontal components 1314. One horizontally extending component is the guide shaft 780. Other embodiments may employ a different type of rail or use a rack in a rack-and-pinion type of device for moving a magazine picker 880. The add-on unit 1310 has a magazine transporter space 1316 and may or may not have horizontally extending components. If the add-on unit 1310 has such components they are cumulatively represented by horizontal components 1318. Generally, the add-on unit 1310 also has a side 1320 that is either removable or capable of being altered to expose the magazine transport space 1312. Alternatively, the add-on unit 1310 may be built or designed so that the magazine space is exposed and no removal or alteration of a side is necessary.

The process of expanding the library 202 further comprises: (a) removing or modifying the side 340 of the library 202 to expose the magazine transporter space 1312 of the library 202; (b) removing or altering, if necessary, the side 1320 of the add-on unit 1300 to expose the magazine transporter space 1316; (c) aligning the magazine transporter space 1312 of the library 202 with the magazine transporter space 1316 of the add-on 1310; and (d) replacing the horizontal components 1314 of the elevator of the library 202 that limit the horizontal movement of the magazine transport 212 and any horizontal components 1318 associated with the add-on 1310 that limit the horizontal movement of a magazine 270 transported within the add-on 1310 with components that allow the magazine transport 212 to move within the magazine transporter space 1312 of the library 202, as well as the magazine transporter space 1316 of the add-on 1310. With respect to the replacing step, the guide shaft 780 is replaced with a single, continuous guide shaft that allows the magazine transport 212 to function in the magazine transporter space 1312 of the library 202 and the magazine transporter space 1306 of the add-on 1310, and thereby form an expanded library 1322.

Figure 44A:
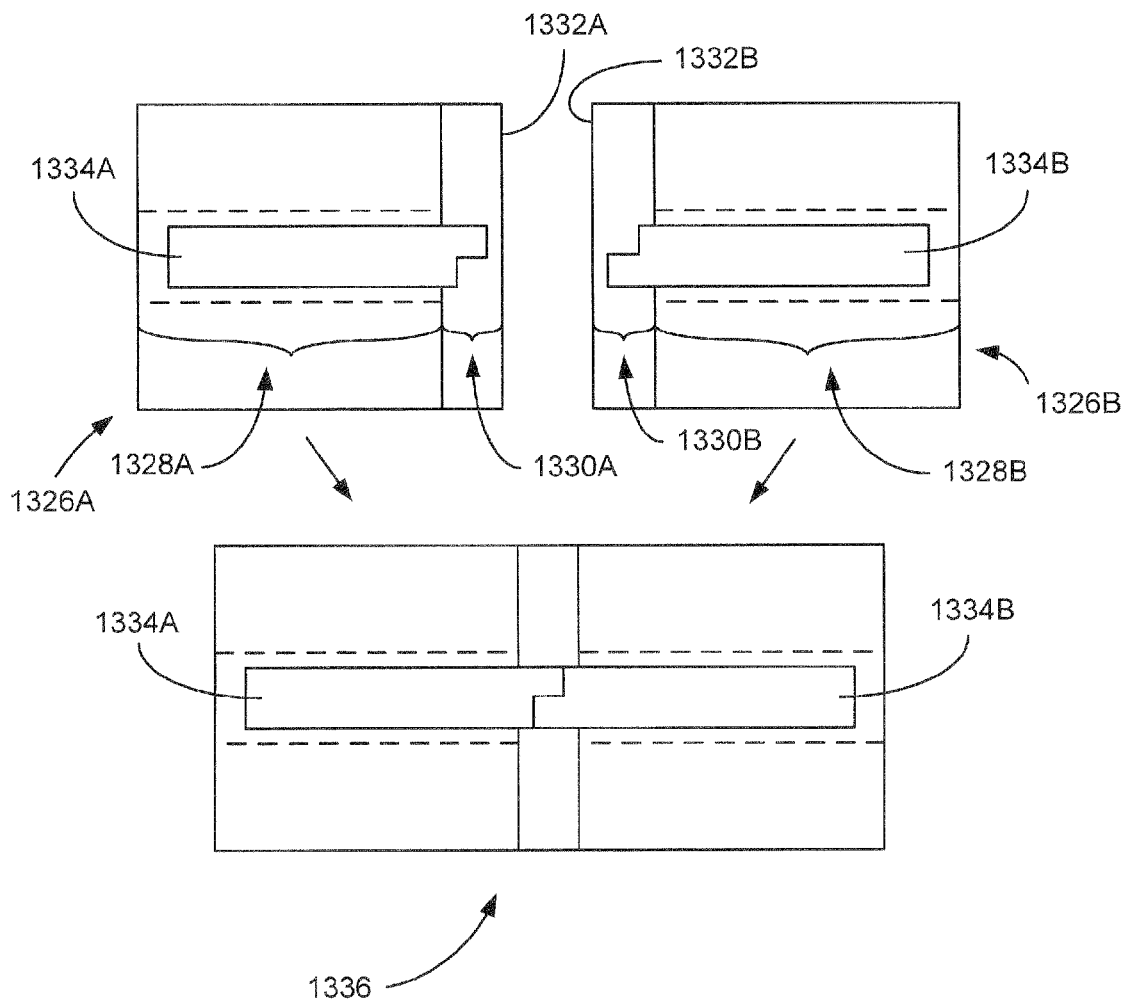
FIGS. 44A-44B schematically illustrate alternative methods of producing an expanded library.

With reference to FIG. 44A, an alternative approach to replacing a guide shaft, such as the guide shaft 780, or other member that is used to horizontally displace a magazine picker 880 is to effectively lengthen the rod or other member by adding one or more segments to the guide shaft 780 or member. As shown in FIG. 44A, a magazine-based library 1326A comprises a magazine transport space 1328A, a first magazine transport add-on space 1330A that is typically not used when the library 1326A is configured as a stand-alone device, a first side 1332A that is either removable or modifiable to provide a path for a magazine transport 212 to move between the first library 1326A and an add-on unit 1326B, and first horizontal magazine transport components 1334A that are adapted to mate with comparable components 1334B associated with the add-on unit 1326B. An add-on unit 1326B comprises a magazine transport space 1328B, a second magazine transport add-on space 1330B, a second side 1332B that is either removable or modifiable to provide a path for a magazine transport 212, and second horizontal magazine transport components 1334B that are adapted to mate with the first horizontal magazine components 1334A. In this embodiment, the first and second sides 1332A, 1332B are either removed or appropriately modified, the first and second magazine transport spaces 1328A, 1328B are aligned, and the first and second horizontal magazine transport components 1334A, 1334B are mated, thereby forming an expanded library 1336.

Figure 44B:
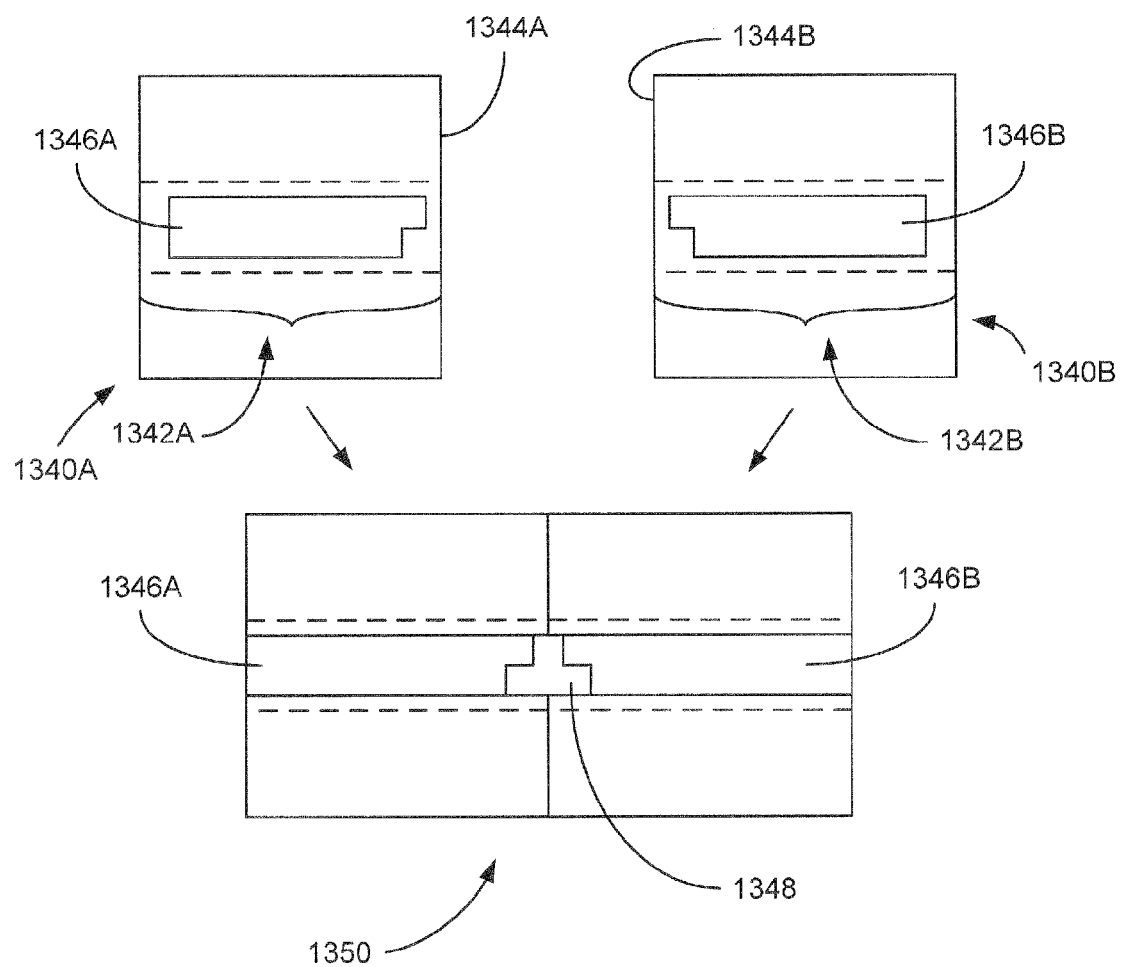

With reference to FIG. 44B, another approach to replacing a guide shaft, such as the guide shaft 780, or other member that is used to horizontally displace a magazine picker 880 is to effectively lengthen the rod or other member by adding one or more segments to the guide shaft 780 or member. As shown in FIG. 44B, a magazine-based library 1340A comprises a magazine transport space 1342A, a first side 1344A that is either removable or modifiable to provide a path for a magazine transport 212 to move between the library 1340A and an add-on unit 1340B, and first horizontal magazine transport components 1346A that are adapted to mate with bridge components that, in turn, are adapted to mate with comparable components associated with the add-on unit 1340B. An add-on unit 1340B comprises a magazine transport space 1342B, a second side 1344B that is either removable or modifiable to provide a path for a magazine transport 212, and second horizontal magazine transport components 1346B that are adapted to mate with the bridge components. In this embodiment, the first and second sides 1344A, 1344B are either removed or appropriately modified, the first and second magazine transport spaces 1342A, 1342B are aligned, and the first and second horizontal magazine transport components 1346A, 1346B are mated to one another by an intermediate bridge component 1348, thereby forming the expanded library 1350.

It will be appreciated by one skilled in the art that with respect to the various methods for expanding a magazine-based data cartridge library exemplified in FIGS. 43B, 44A and 44B further expansion of a magazine-based data cartridge library with additional add-on units is feasible.

Figure 45A:
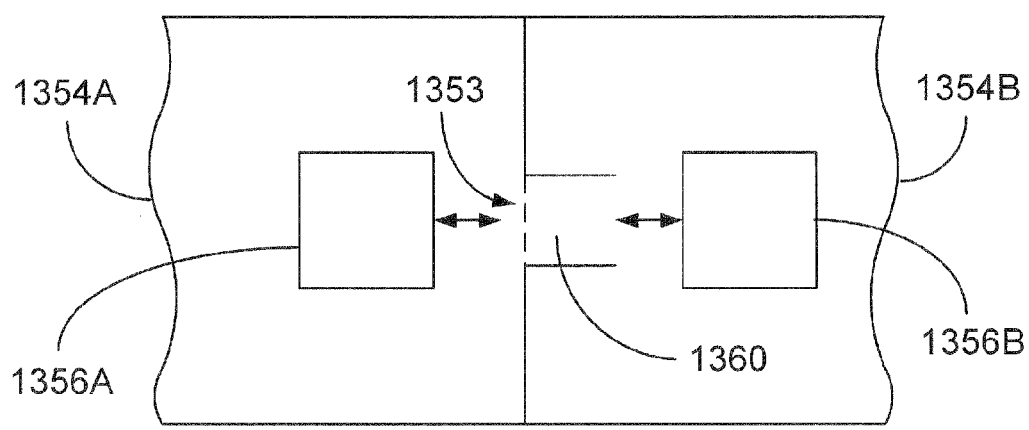
FIGS. 45A-45E illustrate various embodiments of magazine pass-through ports for passing magazines between magazine-based libraries.

FIGS. 45A-45E illustrate various embodiments of magazine pass-though ports that are each capable of passing a magazine 270 between a first magazine-based library 1354A with a first magazine transporter 1356A and a second magazine-based library 1354B with a second magazine transporter 1356B. With reference to FIG. 45A, a magazine pass-through port 1358 is provided that allows the first magazine transporter 1356A to move a magazine 270 to and from a magazine storage space 1360 that is associated with the second magazine-based library 1354B and accessible by the second magazine transport 1356B.

Figure 45B:
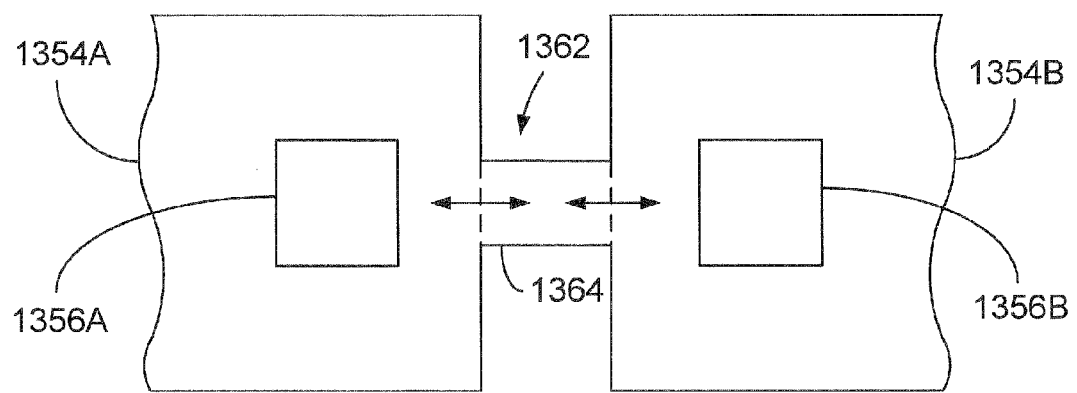

With reference to FIG. 45B, a magazine pass-through port 1362 is provided in which first and second magazine transporters 1356A, 1356B are each able to access a space 1364 that is located between the first and second libraries 1354A, 1354B and pass a magazine 270 from one 1354A to the other 1354B using the space 1364.

Figure 45C:
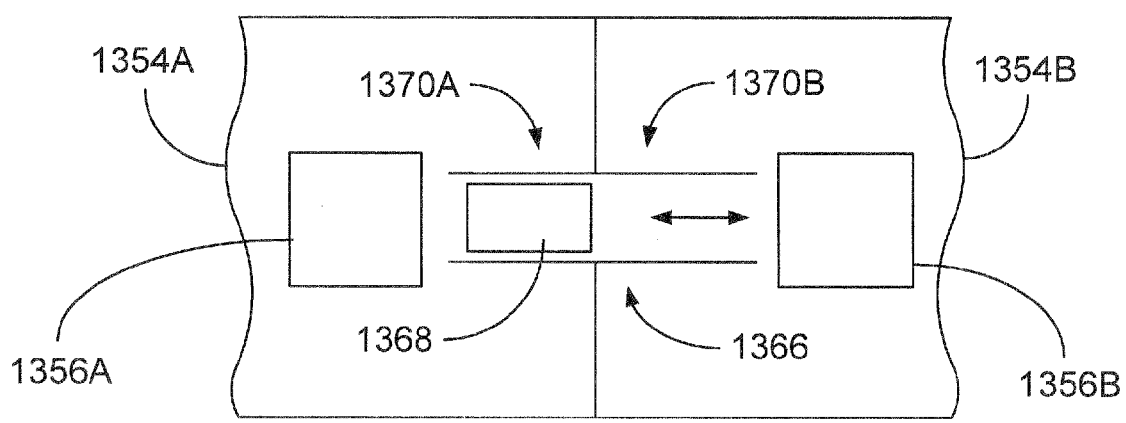

With reference to FIG. 45C, a magazine pass-through port 1366 is provided that utilizes an intermediate transport device 1368 to move a magazine 270 between a first space 1370A that is accessible to a first magazine transporter 1356A and a second space 1370B that is accessible to a second magazine transporter 1356B. Another embodiment uses a chute to pass a magazine 270 from a first space associated with one library, such as the first space 1370A associated with library 1354A, to a second space associated with another library, such as the second space 1370B associated with library 1354B.

Figure 45D:
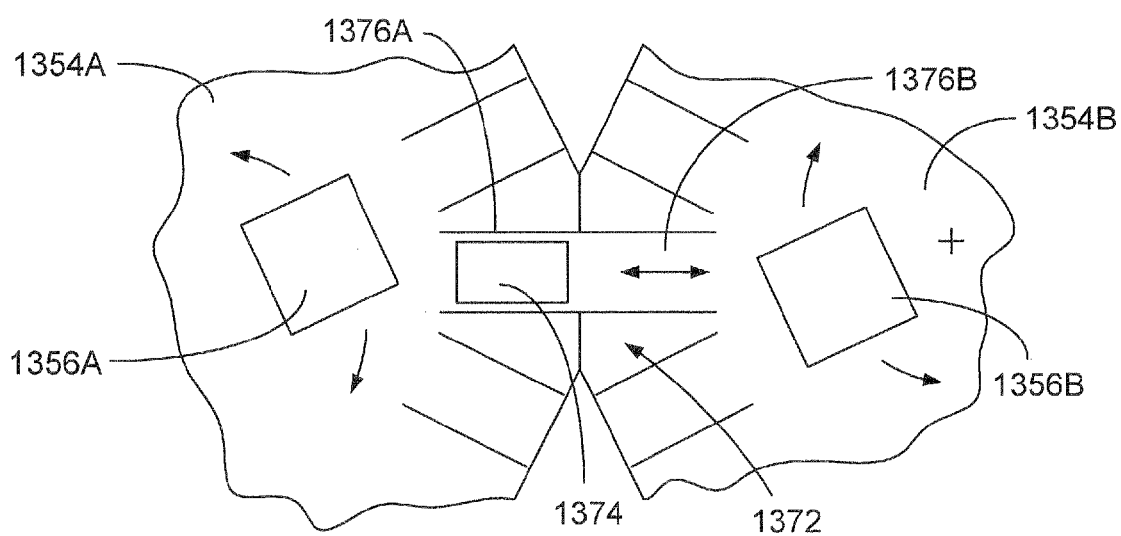

With reference to FIG. 45D, the first and second magazine-based libraries 1354A, 1354B are each magazine-based libraries with circular or cylindrical layouts. A magazine pass-through port 1372 is provided that utilizes an intermediate transport device 1374 to move a magazine 270 between a first space 1376A that is accessible to a first magazine transporter 1356A and a second space 1376B that is accessible to the second magazine transporter 1356B. Alternatively, a magazine chute that extends from the library 1354A to library 1354B can be used. In another embodiment, a second magazine chute from library 1354B to library 1354A is also feasible.

Figure 45E:
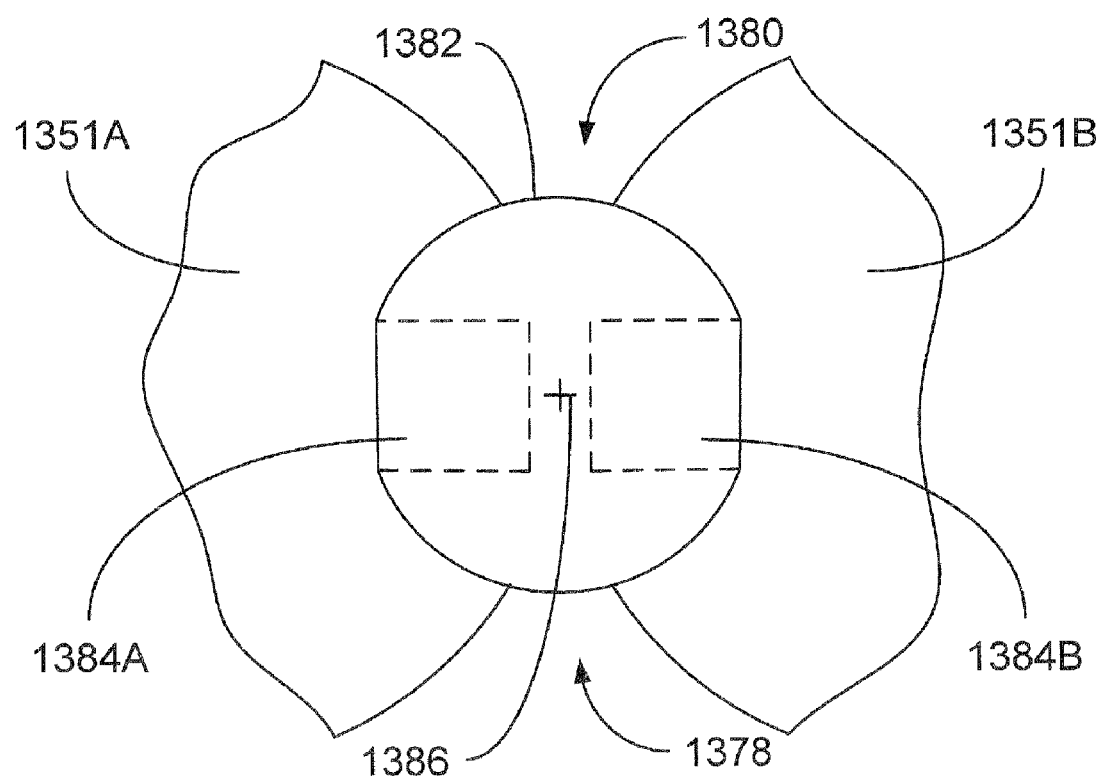

With reference to FIG. 45E, the first and second magazine-based libraries 1354A, 1354B are each magazine-based libraries with circular or cylindrical layouts. A magazine pass-through port 1378 is provided that utilizes an intermediate transport device in the form of a carousel device 1380 that is comprised of: (a) a carousel body 1382; and (b) a pair of magazine bays 1384A, 1384B that are capable of accommodating a magazine 270 and are each accessible to the first magazine transporter 1356A and the second magazine transporter 1356B depending upon the rotational position of the carousel 1380. In an alternative embodiment, a carousel with one or more than two bays is feasible. The carousel device 1380 also comprises an electric motor (not shown) that is used to rotate the carousel body 1382 about an axis 1386 as needed.

Figure 46A:
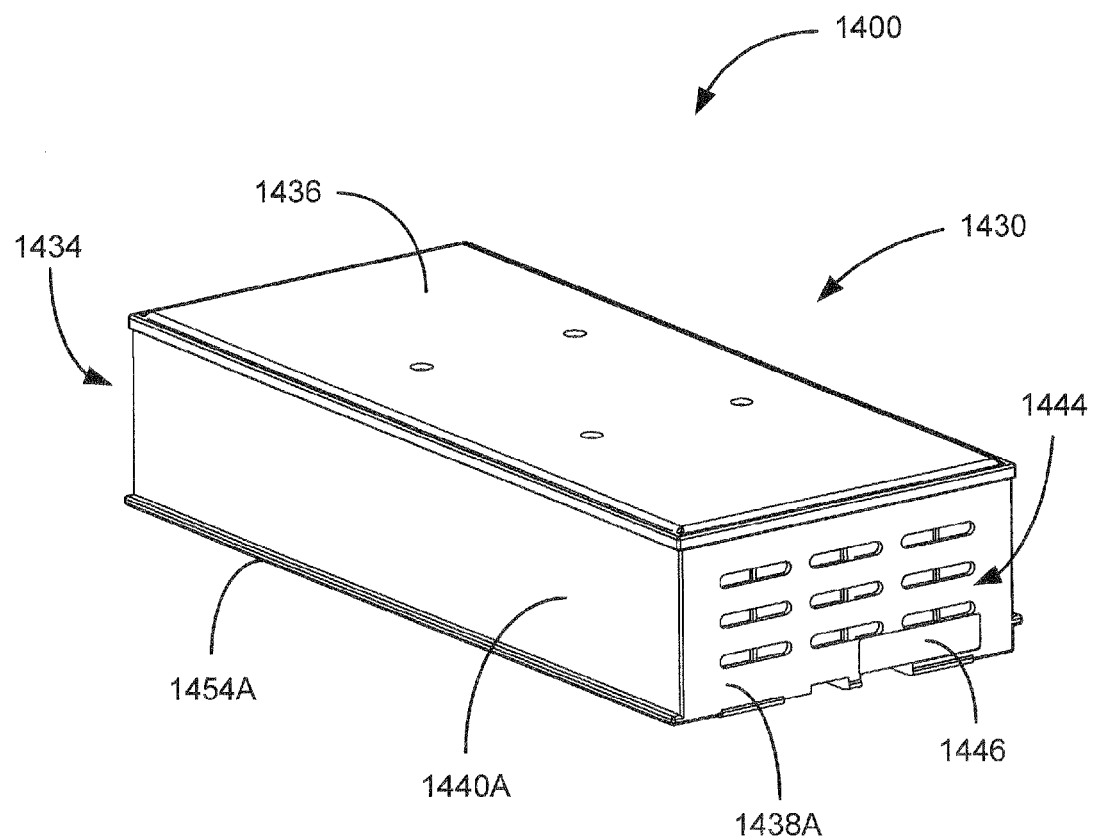
FIGS. 46A-46C are perspective views of an embodiment of a magazine data storage element.
Figure 46B:
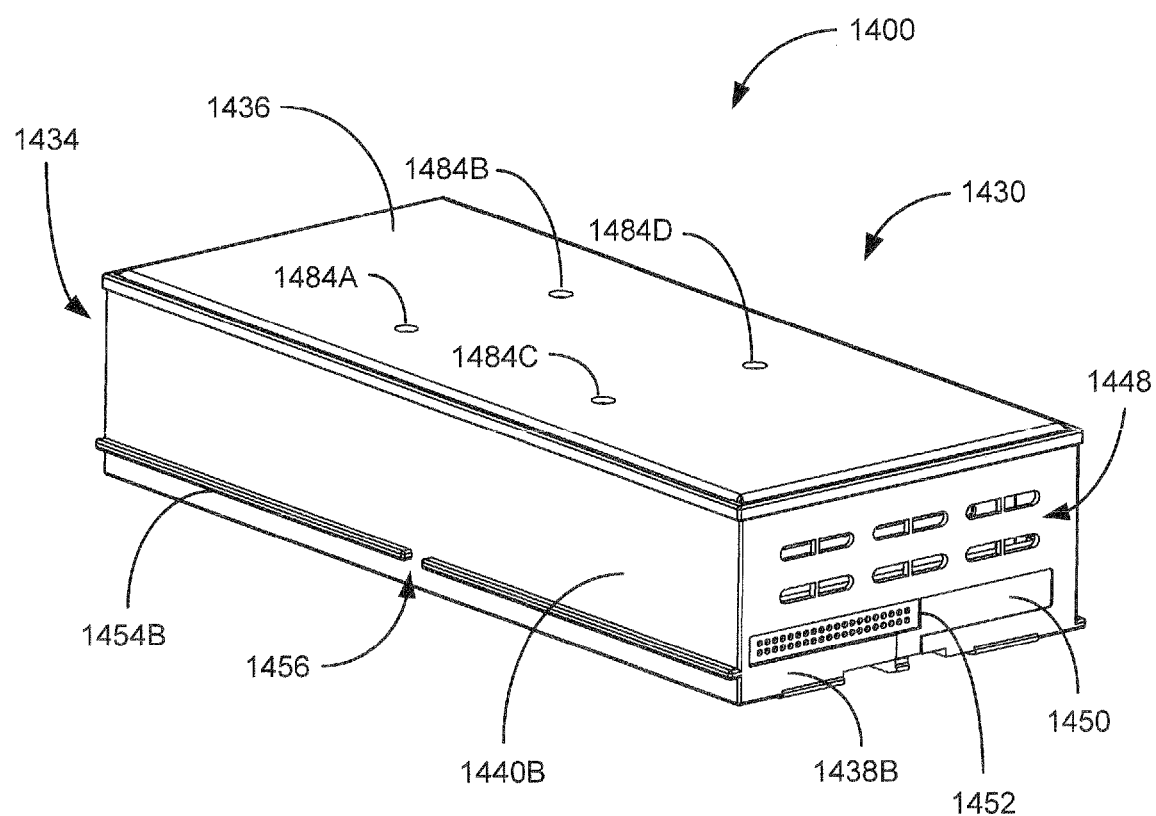
Figure 46C:
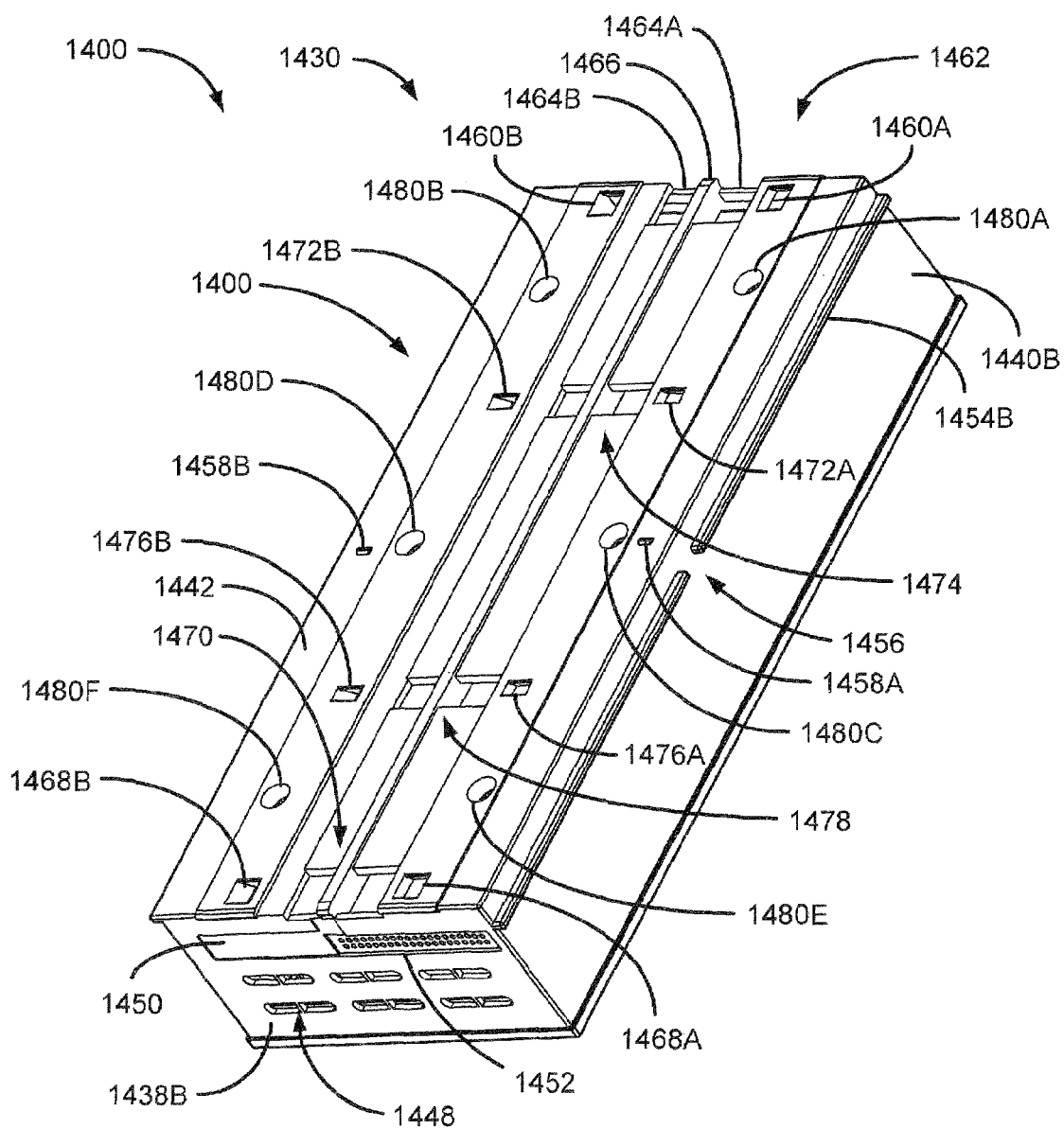

FIGS. 46A-46C are exterior, perspective views of an embodiment of a magazine data storage element 1400 that comprises a plurality of hard disk drives for storing data, a magazine for holding the drives, and an interconnect structure for providing power to the drives and transferring data to and/or from the drives via an interface associated with a magazine data storage element drive. Further, the magazine data storage element 1400 is capable of: (a) being inserted into or exported from the library 202 by the entry/exit port 206; (b) moved within the library by the magazine transport 212; and (c) being supported in any of the locations of the shelf system 208 that are capable of supporting the LTO/SAIT magazine 270 or the DLT magazine 320, including those locations associated with any of the magazine bay assembly 714 that might be incorporated into the library 202. The abilities are realized by the magazine data storage element 1400 having exterior characteristics that are substantially identical to the LTO/SAIT magazine 270 and the DLT magazine 320. Specifically, the magazine data storage element 1400 has length and width dimensions, orientation features, and magazine engagement features that are substantially identical to those of the LTO/SAIT magazine 270 and the DLT magazine 320. It should be appreciated that other embodiments of magazine data storage elements that have different dimensions, different or no orientation features, and different or no engagement features are feasible.

With continuing reference to FIGS. 46A-46C and FIG. 47, the magazine data storage element 1400 comprises: (a) a plurality of hard disk drives 1402, wherein a hard disk drive, herein exemplified by the serial ATA hard drive 1410, comprises of a disk recording medium (a magnetic, optical, magneto-optical or other medium), a motor for rotating the disk recording medium, a head for reading and/or writing data from and/or to the recording medium, an actuator for moving the head to a desired location over the recording medium to facilitate a data transfer operation; (b) a magazine 1400 for holding the plurality of hard disk drives 1402; and (c) an interconnect structure 1406 that is used to provide power to the drives 1402 and facilitate communications with another computer device via a magazine data storage element drive 1530 of FIG. 52A.

The plurality of hard disk drives 1402 is comprised of nine hard disk drives 1410. It should be appreciated that magazine data storage elements, such as the magazine 1400, with two or more hard disk drives 1410 are feasible. Further, each of the plurality of hard disk drives 1402 is a hard disk drive 1410 that employs a serial signal interface. Generally, serial signal interface hard disk drives 1410 (e.g., serial ATA, serial SCSI and FibreChannel hard disk drives) have signal and power plug interfaces that have a lower pin count than other interfaces, such as parallel SCSI. For example, the total number of pins for the signal and power plug interfaces of a serial ATA hard disk drive is twenty-two pins. In contrast, the total number of pins for the signal and power plug interfaces of a parallel SCSI drive is seventy-two, sixty-eight signal pins and four power related pins. It should be appreciated that a magazine data storage element 1400 that uses hard disk drives with parallel signal interfaces is feasible. However, the greater pin count associated with these drives may limit the applicability of magazine data storage elements 1400 that employs these types of drives. In the magazine data storage element 1400, each of the hard disk drives 1410 is a serial ATA, 2½" hard disk drive 1410 that comprises a magnetic disk recording medium.

Figure 48A:
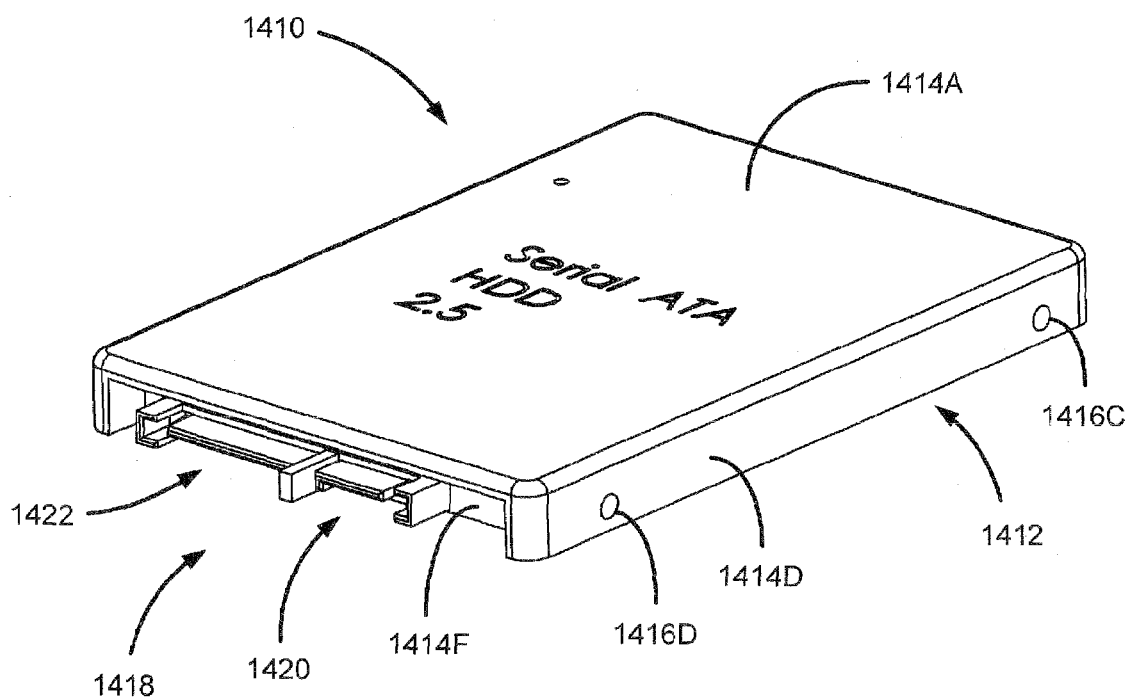
FIGS. 48A-48B are perspective views of a serial ATA 2½" drive that is used in the magazine data storage element shown in FIGS. 46A-46C.
Figure 48B:
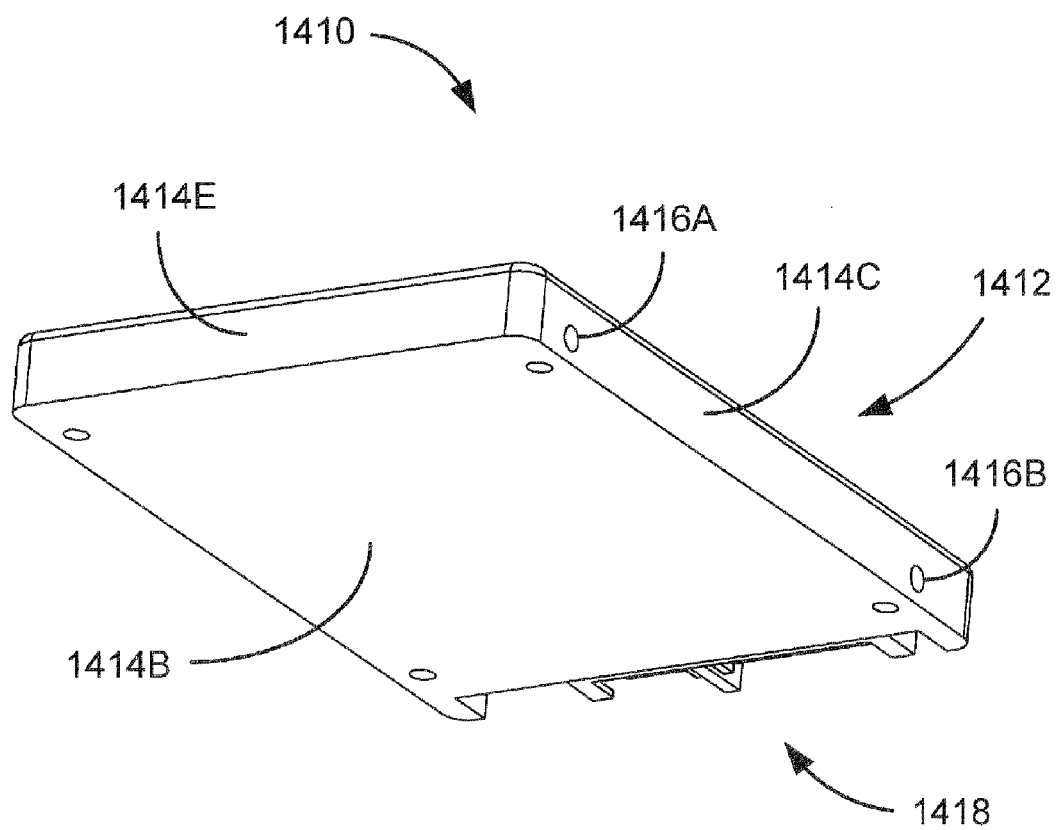

With reference to FIGS. 48A-48B, a serial ATA 2½" hard disk drive 1410 is generally described. The drive 1410 comprises a housing 1412 that encloses a 2½" diameter magnetic disk recording medium (not shown), an electric motor (not shown) for rotating the disk recording medium, a head structure (not shown) for reading data from and writing data to the disk, an actuator (not shown) for moving the head structure to a desired location adjacent to the disk to read data from or write data to a particular location on the disk. The housing 1412 comprises a top face 1414A, bottom face 1414B, first side face 1414C, second side face 1414D, front face 1414E, and back face 1414F. Respectively associated with the first side face 1414C and second side face 1414D are threaded mounting holes 1416A, 1416B and threaded mounting holes 1416C, 1416D that facilitate the mounting of the drive 1410 to a mounting bracket or structure, such as cage 1432C. Associated with the back face 1414F is a male plug interface 1418 that is comprises a signal plug interface 1420 and a power plug interface 1422. The signal plug interface 1420 is comprised of seven leads, two transmit signal leads, two receive signal leads, and three ground leads. The power plug interface 1422 is comprised of fifteen leads, nine of which are dedicated to 3.3 V, 5 V and 12 V power signals.

With reference to FIGS. 46A-46C and FIG. 47, the magazine 1400 is comprised of a housing 1430 and cages 1432A-1432C that each hold three of the plurality of disk drives 1402 within the space defined by the housing 1430. The housing 1430 is comprised of a tray 1434 and a tray lid 1436 that cooperates with the tray 1434 to enclose the plurality of disk drives 1402. It should be appreciated that enclosing the plurality of disk drives 1402 potentially serves a number of purposes. For example, enclosure provides an environment that can be controlled (e.g., dust and temperature), facilitates stacking and storage of the magazine data storage elements 1400 when not in use, protects the drives 1402 from exterior forces etc. In certain applications, there may be little or no benefit to be gained by enclosing the drives 1402. In such an application, a housing can be employed that exposes other components of a magazine data storage element, such as element 1400.

The tray 1434 is comprised of first and second end sides 1438A, 1438B, first and second lateral sides 1440A, 1440B, and a bottom side 1442. Associated with the first end side 1438A are: (a) a first set of holes 1444 that cooperate with another set of holes 1448 to allow air to be drawn across the disk drives 1402 during operation to cool the drives 1402; and (b) a first indentation 1446 for accommodating a bar code label or other label that identifies the magazine data storage element 1400. Associated with the second end side 1438B are: (a) a second set of holes 1448 that cooperate with the first set of holes 1444 to allow air to be drawn across the plurality of disk drives 1402 during operation to cool the drives 1402; and (b) a second indentation 1450 for accommodating a bar code label or other label that identifies the magazine data storage element 1400. It should be appreciated that other structures for supporting a label, such as a sleeve, are feasible. Further, one or more RFID (Radio Frequency Identification) tags, rather than labels, can be associated with the magazine data storage element 1400 to identify the element 1400. Also associated with the second end side 1438B is a magazine-drive connector hole 1452 that provides access to a connector that is used to establish signal and power connections with a drive, such as the SATA drive 1410.

Respectively associated with the first lateral side 1440A and second lateral side 1440B are rail 1454A and rail 1454B that function in substantially the same manner as the rails 292A and 292B, associated with the LTO/SAIT magazine 270 and the DLT magazine 320. Also associated with the second lateral side 1440B is an insertion/ejection notch 1456 that facilitates the insertion and ejection of the magazine data storage element 1400 relative to a magazine data storage element drive 1530.

Figure 49:
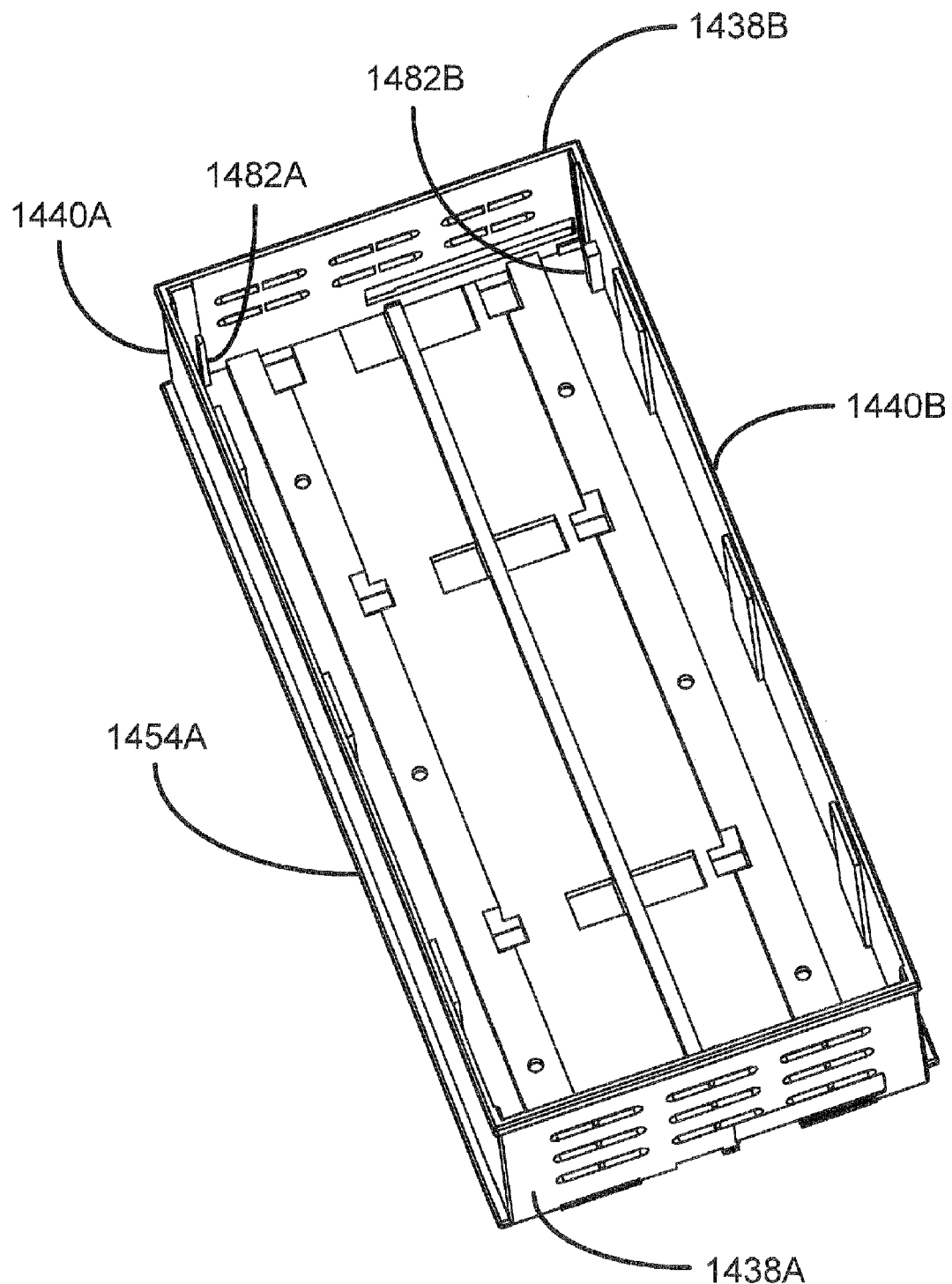
FIG. 49 illustrates the interior of the tray of the magazine data storage element shown in FIGS. 46A-46C.

Associated with the bottom side 1442 are: (a) detents 1458A, 1458B; (b) a first pair of engagement holes 1460A, 1460B; (c) first engagement flag 1462 structure that is comprised of a first pair of holes 1464A, 1464B that are separated from one another by a bar 1466; (d) a second pair of engagement holes 1468A, 1468B; (e) a second engagement flag structure 1470; (f) a third pair of engagement holes 1472A, 1472B; (g) a third engagement flag structure 1474; (h) a fourth pair of engagement holes 176A, 1476B; and (i) a fourth engagement flag structure 1478. The foregoing structures associated with the bottom side 1442 serve the same purpose as the corresponding structures associated with the LTO/SAIT magazine 270 and the DLT magazine 320. Consequently, these structures will not be described further. Also associated with the bottom side 1442 are holes 1480A-1480F for receiving screws that are used in mounting the cages 1432A-1432C on the interior of the bottom side 1442 of the housing 1430. With reference to FIG. 49, connector block mounts 1482A, 1482B are used to hold the interconnect structure 1406 in place to position the magazine-drive connector 1514 of FIG. 51A adjacent to the magazine-drive connector hole 1452. Associated with the tray lid 1436 are holes 1484A-1484D that receive screws that are used to fix the tray lid 1436 in place.

Figure 50:
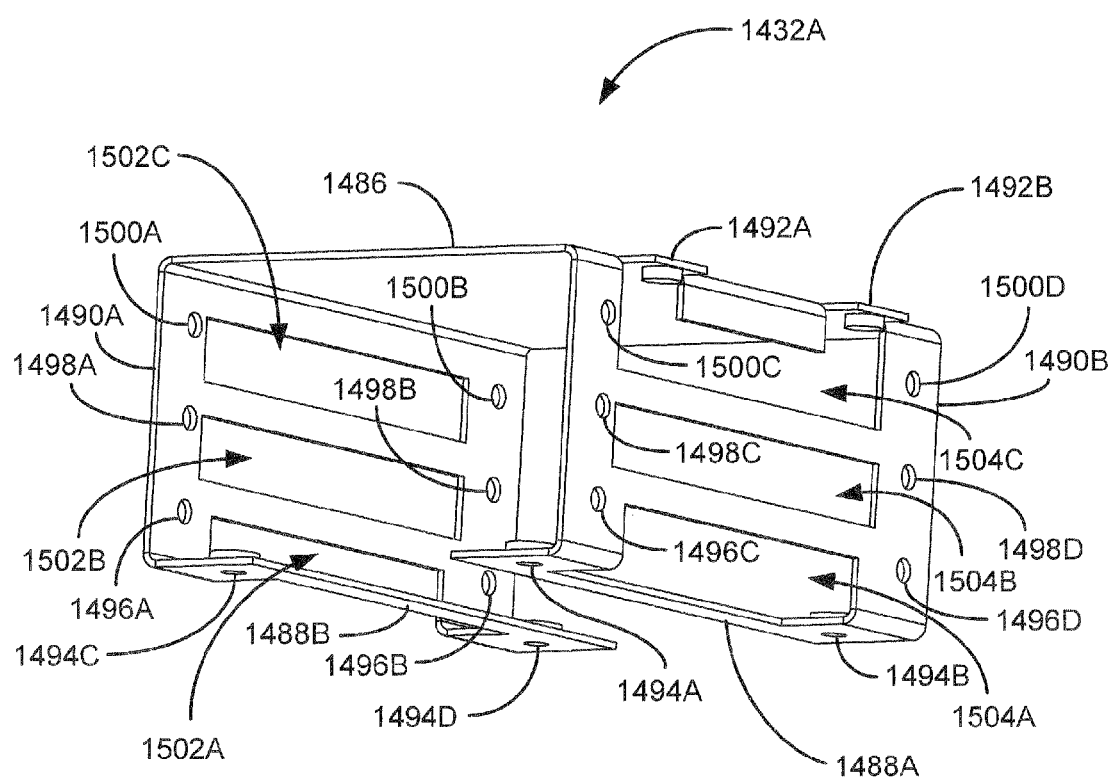
FIG. 50 is a perspective view of a cage that is used to hold three serial ATA drives in the magazine data storage element shown in FIGS. 46A-46C.

With reference to FIG. 50, the cage 1432A is described with the understanding that cages 1432B and 1432C are substantially identical to the cage 1432A. Cage 1432A is comprised of a top surface 1486, a pair of mounting brackets 1488A, 1488B, and a pair of side surfaces 1490A, 1490B. Associated with the top surface 1486 are a first and second threaded tabs 1492A, 1492B that, in the case of cages 1432B and 1432C, receive screws that pass through the holes 1484A-1484D of the tray lid 1436 to fix the tray lid 1436 to the cages 1432B and 1432C. Since the cage 1432A is ultimately attached to the tray 1434, attaching the tray lid 1436 to the cages 1436B, 1436C ultimately attaches the tray lid 1436 to the tray 1434. Associated with the mounting brackets 1488A, 1488B are threaded holes 1494A-1494D that receive screws that fix the cage 1432A to the interconnect structure 1406, which is in turn connected to the bottom side 1442 of the tray 1434. Associated with the first side surface 1490A are a first pair of holes 1496A, 1496B, second pair of holes 1498A, 1498B, and third pair of holes 1500A, 1500B. Similarly, a first pair of holes 1496C, 1496D, second pair of holes 1498C, 1498D, and third pair of holes 1500C, 1500D are associated with the second side surface 1490B. The groups of holes 1496A-1496D, 1498A-1498D and 1500A-1500D are each used to receive screws that respectively engage the threaded mounting holes 1416A-1416D of one of the plurality of serial ATA disk drives 1410. It should be appreciated that the cage 1432A can be adapted to accommodate a magazine data storage element 1400 that employs a disk drive that has a different mounting interface from that of the serial ATA drive 1410 shown in FIGS. 48A-48B. The groups of holes 1496A496D, 1498A-1498D and 1500A-1500D are spaced from one another so that when the cage 1432A is fully populated with serial ATA drives 1410 there are spaces above and below each drive through which air can pass to cool the drives. To facilitate the flow of air through the spaces above and below each of the drives, cut-outs 1502A-1502C are associated with the first side surface 1490A and cut-outs 1504A-1504C are associated with the second side surface 1490B. It should be appreciated that different cage structures are feasible. Among these different cage structures are cage structures that: (a) hold a different number of drives; (b) hold a drive in a different orientation from that illustrated; or (c) are entirely or partially formed from the same piece of material as the housing 1430. Also feasible are magazines that employ a greater or lesser number of cage structures relative to the illustrated magazine 1400.

Figure 51A:
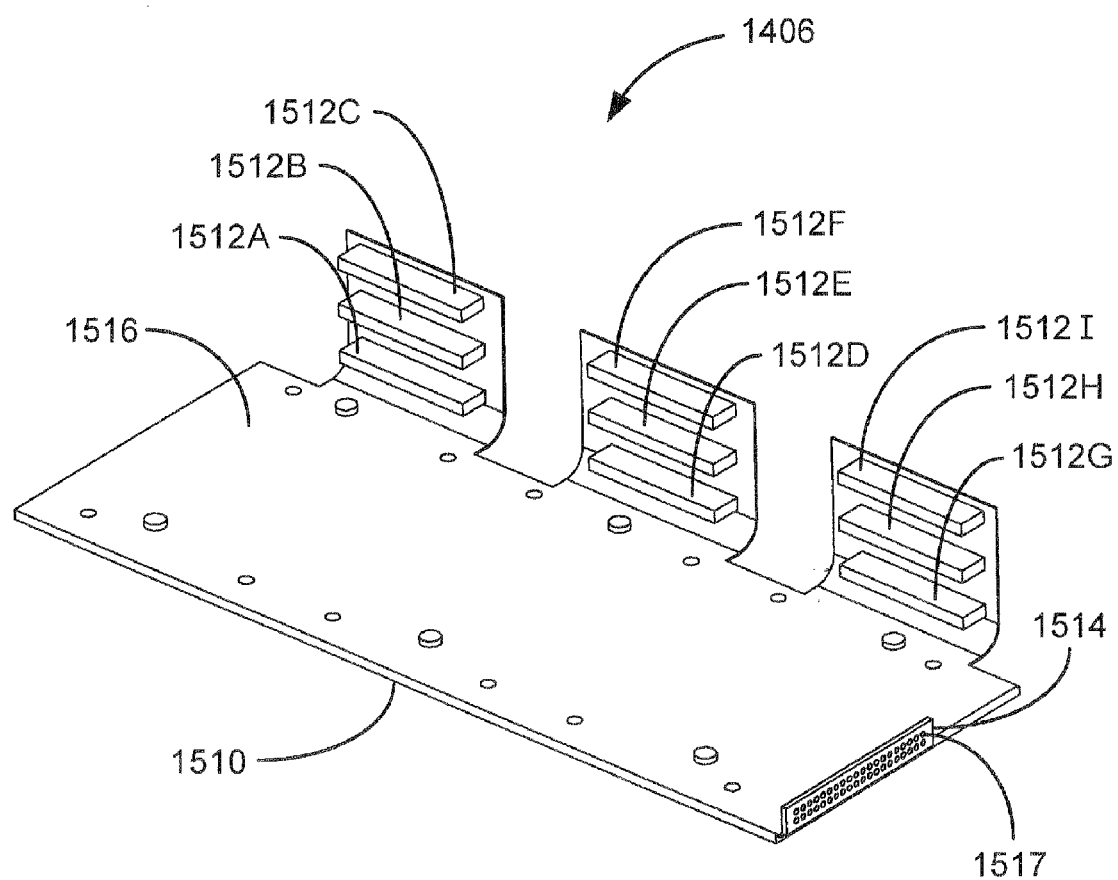
FIGS. 51A-51B are perspective views of the electrical connection structure of the magazine data storage element shown in FIGS. 46A-46C.
Figure 51B:
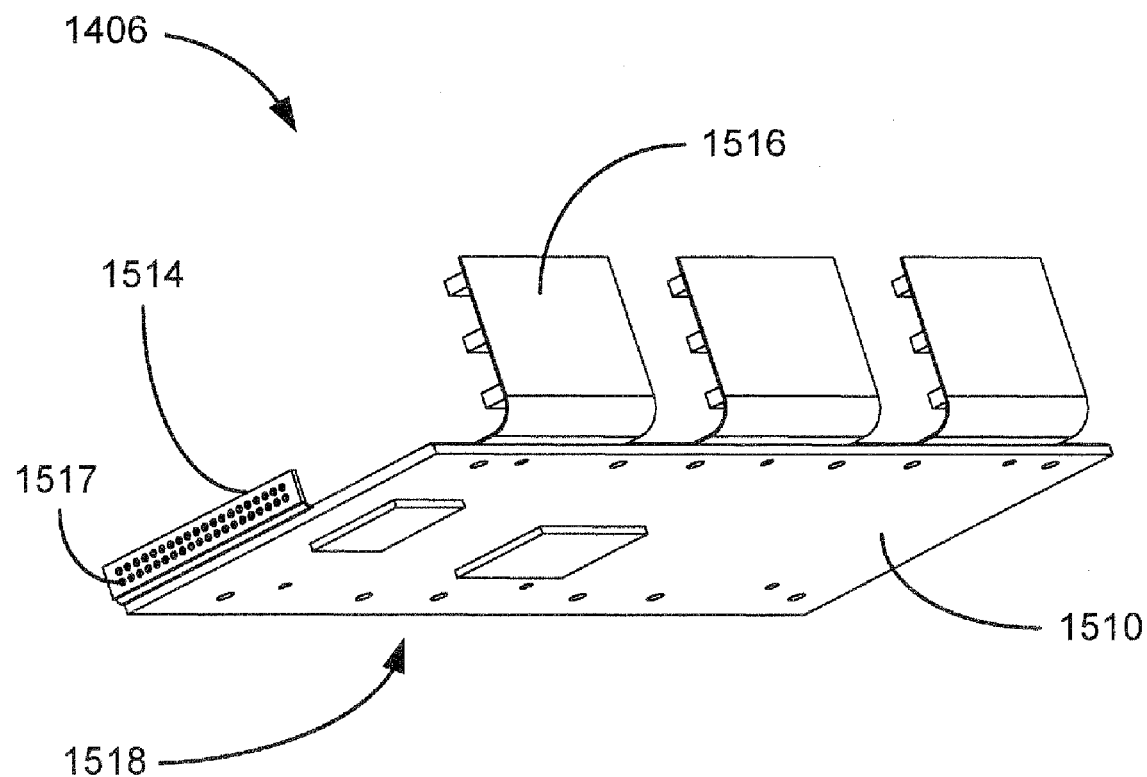
Figure 53A:
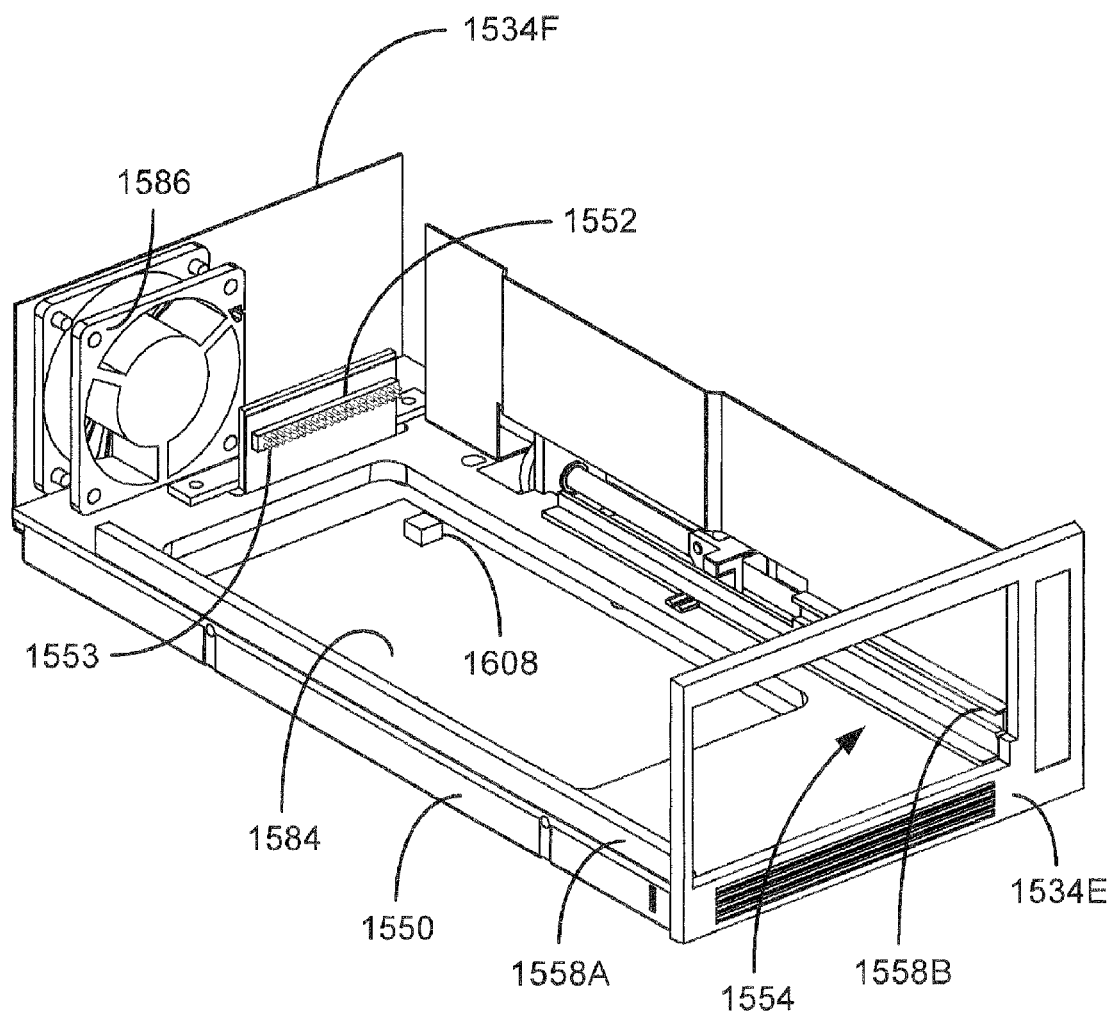
FIGS. 53A-53D are perspective views of interior features of the drive shown in FIGS. 52A-52B.
Figure 53B:
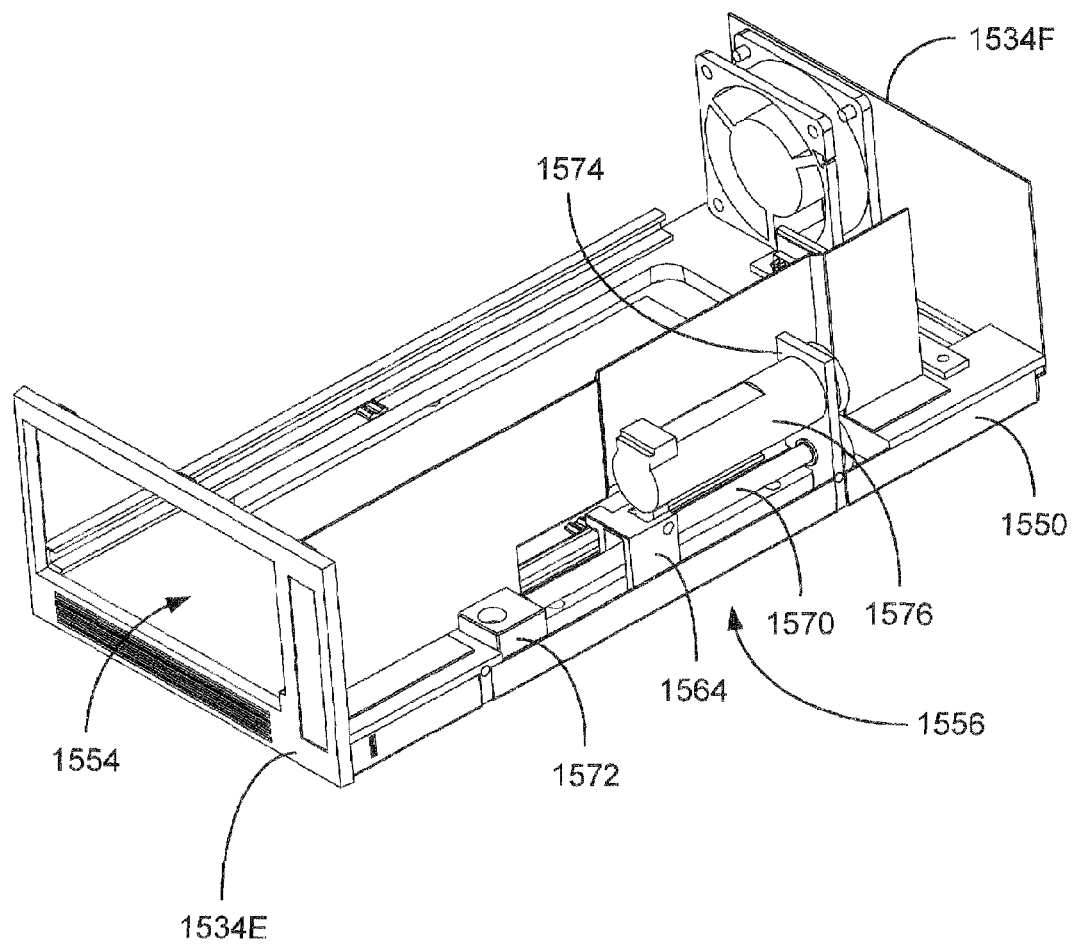
Figure 53C:
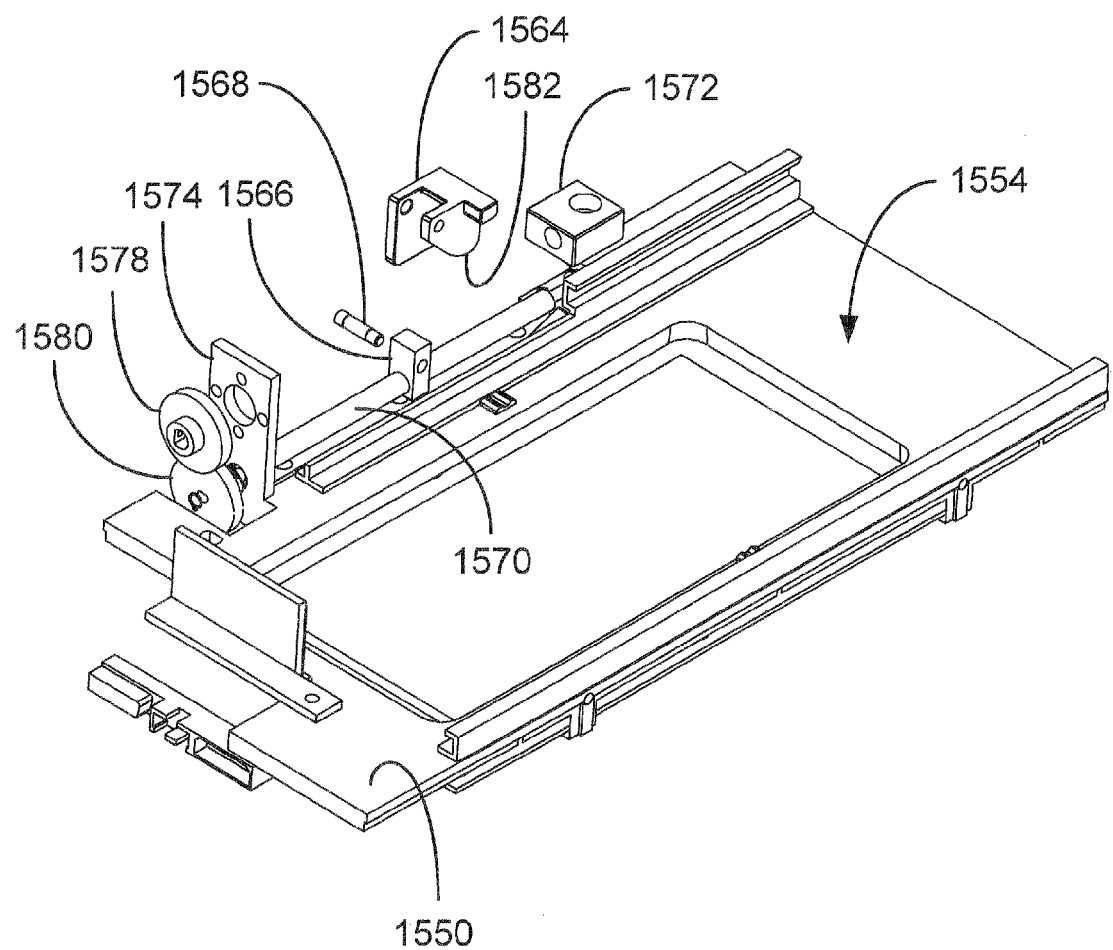
Figure 53D:
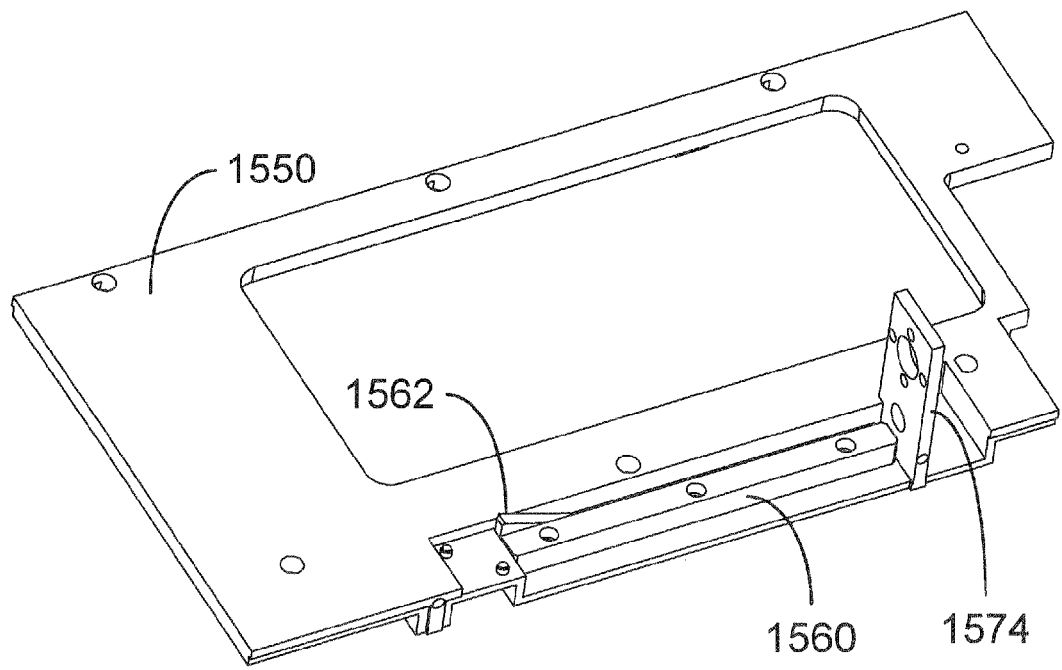
Figure 54A:
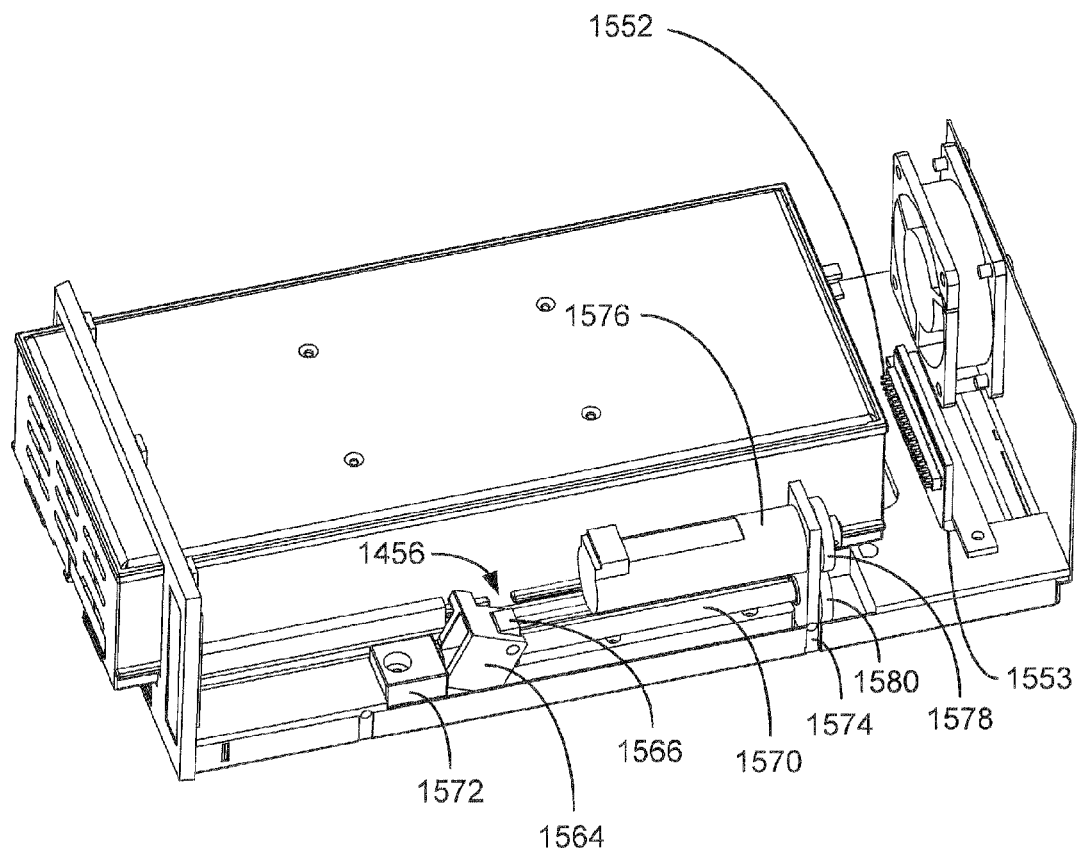
FIGS. 54A-54B illustrate the disengaged and engaged state of the drive shown in FIGS. 52A-52B.

With reference to FIGS. 51A-51B in conjunction with FIG. 54A, the interconnect structure 1406 is comprised of: (a) a board 1510; (b) hard disk drive connectors 1512A-15121, each of which is capable of engaging the plug interface 1418 of a serial ATA disk drive 1410; (c) a magazine-drive connector 1514 for engaging a drive-magazine connector 1552 of a magazine data storage element drive 1530; and (d) a flex circuit 1516 that is attached to the board 1510 and comprises electrical and/or optical conductor traces (not shown) that establish electrical and/or optical connections between the hard disk drive connectors 1512A-1512L and the magazine-drive connector 1514. The magazine-drive connector 1514 is comprised of a plurality of electrical/optical conductive pads 1517 that are each positioned to engage the end of a pin, such as a pin 1553, in a non male/female relationship, the pin 1553 being associated with a drive-magazine connector 1552 in a magazine data storage element drive 1530. Engaging the pin 1553 and pads 1517 cause the disk drive magazine 1400 to become operable, in the illustrative embodiment. By employing a plurality of pads 1517 instead of female connectors, pin breakage is reduced and the degree of alignment needed to establish connections between the pads 1517 and pins 1553 is reduced relative to, for example, a male/female connection arrangement. FIG. 46B illustratively shows the pads 1517 associated with the disk drive magazine 1400, which forms contact with the pins 1553, shown in FIG. 53A, in an arrangement that excludes a male and female relationship, to facilitate the conduction of power and communication across the pins 1553 and pads 1517, thus, taking advantage of the benefits of not having a male/female connection arrangement as discussed. The pads 1452, in the illustrative embodiment of FIG. 46B, are substantially flat round conductive pads that engage the free-end of spring loaded pins 1553. It should be appreciated that an interconnect structure that accommodates a hard disk drive with a different interface is feasible. Similarly, an interconnect structure with a magazine-drive connector that accommodates a magazine data storage element drive with a different type of connection interface is feasible. Further, the magazine-drive connector could comprise a plurality of pins that interface with a drive-magazine connector that is comprised of a plurality of pads.

Figure 51C:
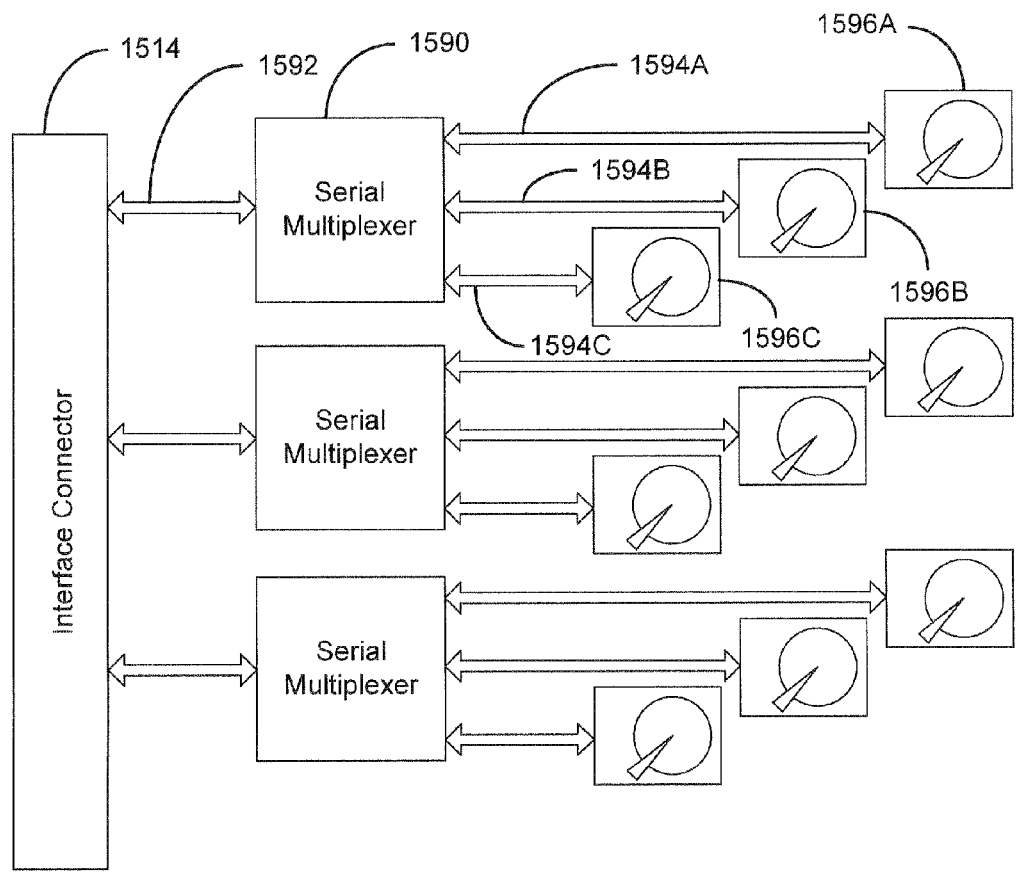
FIG. 51C is an embodiment of an electrical connection structure that comprises a serial multiplexer.

Also associated with the interconnect structure 1406 is electronic circuitry 1518 that interfaces with the traces on the flex circuit 1516 (electrical or optical) to perform channel multiplexing functions if the magazine-drive connector 1514 is unable to provide enough signal and power paths for all of the drives 1402. With reference to FIG. 51C, an embodiment of the electronic circuitry 1518 that is useful in performing channel multiplexing is described. The electronic circuitry 1518 comprises a serial multiplexer 1590 that: (a) receives power and data signals from the magazine-drive connector 1514 over a serial bus 1592; (b) multiplexes the power and data signals received from the magazine-drive connector 1514 over subsidiary buses 1594A-1594C, which are respectively connected to drives 1596A-1596C; (c) demultiplexes data signals received from drives 1596A-1596C over the subsidiary buses 1594A-1594C; and (d) provides the demultiplexed data signals to the magazine-drive connector 1514 via the serial bus 1592. The subsidiary buses 1594A-1594C are connected to the drives 1596A-1596C via connectors 1512A-1512C. If the serial bus 1592 is a serial ATA bus, the serial bus 1592 and the subsidiary serial buses 1594A-1594C are each implemented as at least twenty-two conductors on the flex circuit 1516.

Figure 51D:
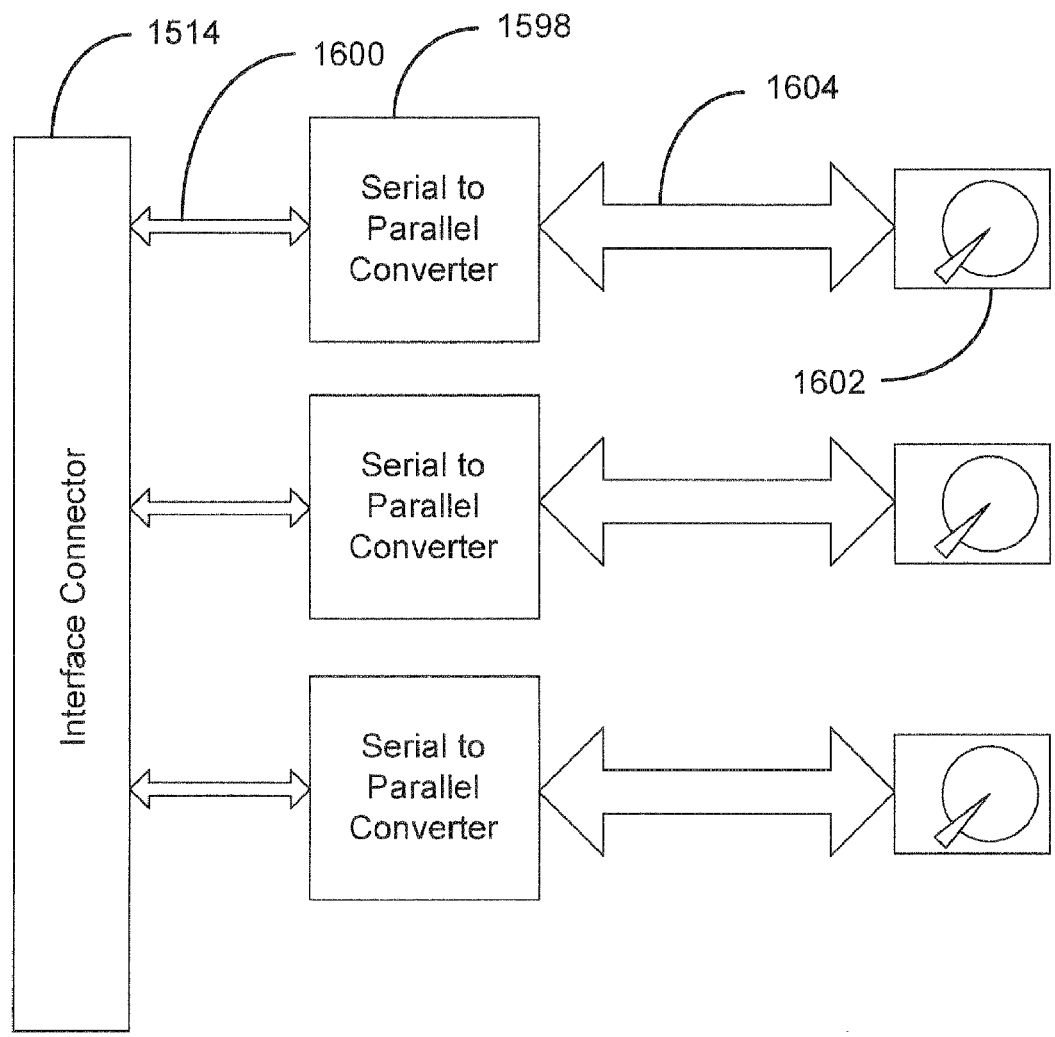
FIG. 51D is an embodiment of an electrical connection structure that comprises a serial/parallel converter.

With reference to FIG. 51D, if one or more of the hard disk drives 1402 in the element 1400 is a parallel interface drive and there is a desire or need to have a low number of pads, such as pads 1517, associated with the magazine-drive connector 1514, an embodiment of the electronic circuitry 1518 can comprise a serial/parallel converter 1598 to reduce the number of pads associated with the magazine-drive connector 1514. The serial/parallel converter 1598: (a) receives power and data signals from the magazine-drive connector 1514 over a serial bus 1600; (b) converts the serial power and data signals received from the magazine-drive connector 1514 to a parallel format and provides the parallel power and data signals to a parallel drive 1602 via a parallel bus 1604; (c) receives parallel data signals from the parallel drive 1604; and (d) converts the parallel data signals received from the parallel drive 1604 to a serial format and provides the serial signals to the magazine-drive connector 1514.

It should be appreciated that a magazine data storage element comprised of serial and parallel drives is feasible. Further, a magazine data storage element is feasible in which a multiple serial/parallel converters are established between a serial multiplexer and multiple, parallel hard disk drives.

In addition, the electronic circuitry 1518 comprises a solid state memory, such as a EEPROM, that allows statistical data to be kept on the magazine data storage element 1400, such as the number of mounts/dismounts to/from a drive 1410, etc. The solid state memory is also capable of being used to define the recording media of the plurality of disk drives 1402. For example, the hard disk drives 1402 could be configured as a write-once-read-many (WORM) media, as "just a bunch of disks" (JBOD), or as a redundant array of independent drives (RAID).

Figure 47:
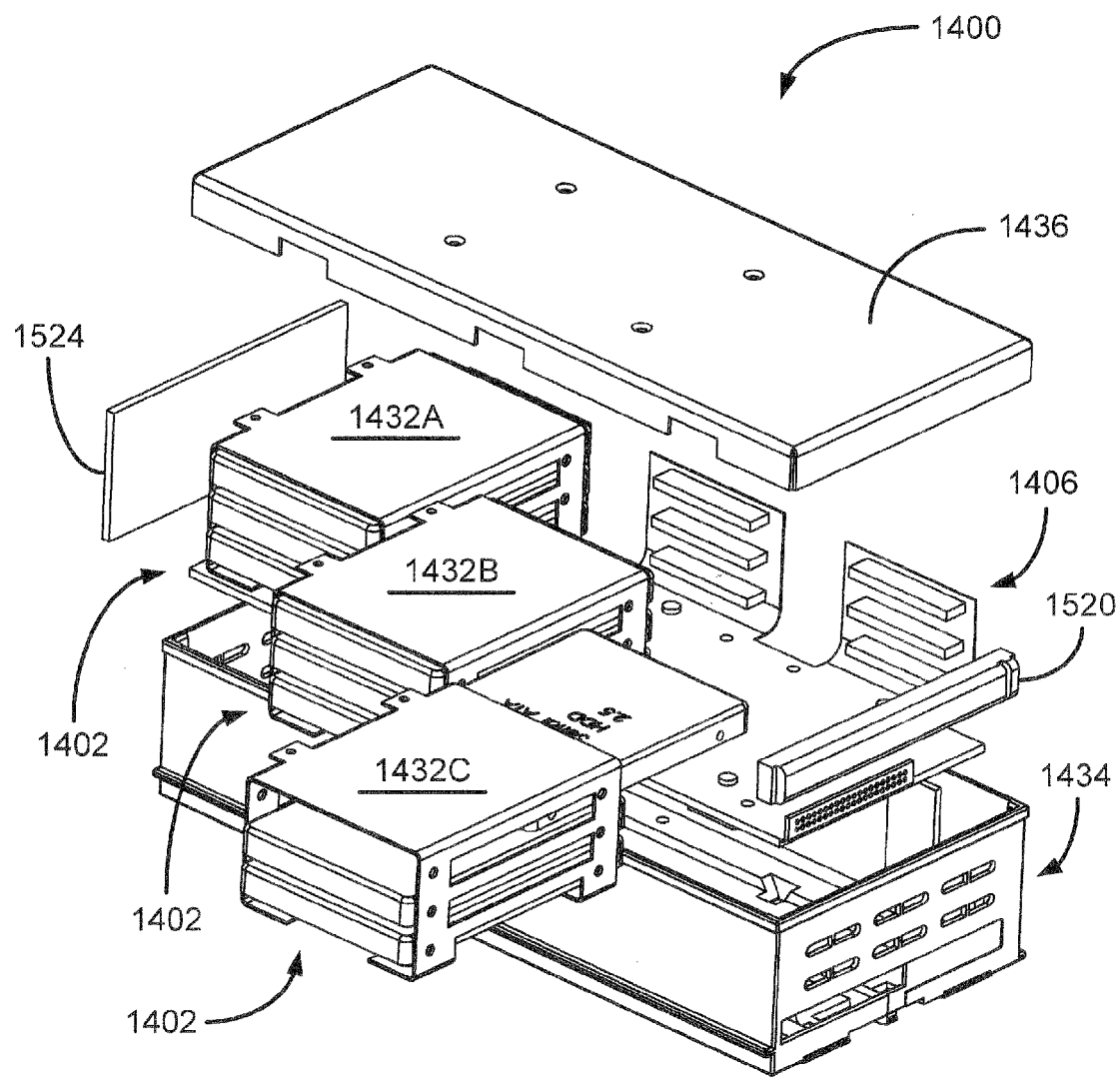
FIG. 47 is an exploded view of the magazine data storage element illustrated in FIGS. 46A-46C.

With reference to FIG. 47, the interconnect structure 1406 also comprises a magazine connector block 1520 that is positioned by the connector block mount 1482A, 1482B and cooperates with the cage 1432C to hold the magazine-drive connector 1514 in the magazine-drive connector hole 1452 of the tray 1434.

With continuing reference to FIG. 47, the magazine data storage element 1400 is further comprised of a filter 1524 that is positioned between the first end side 1438A of the tray 1434 and the cage 1432A so as to catch particulates that enter the housing 1430 via the first set of holes 1444 while allowing air to pass between the first set of holes 1444 and the second set of holes 1448 to cool the drives 1402 during operation.

Figure 52A:
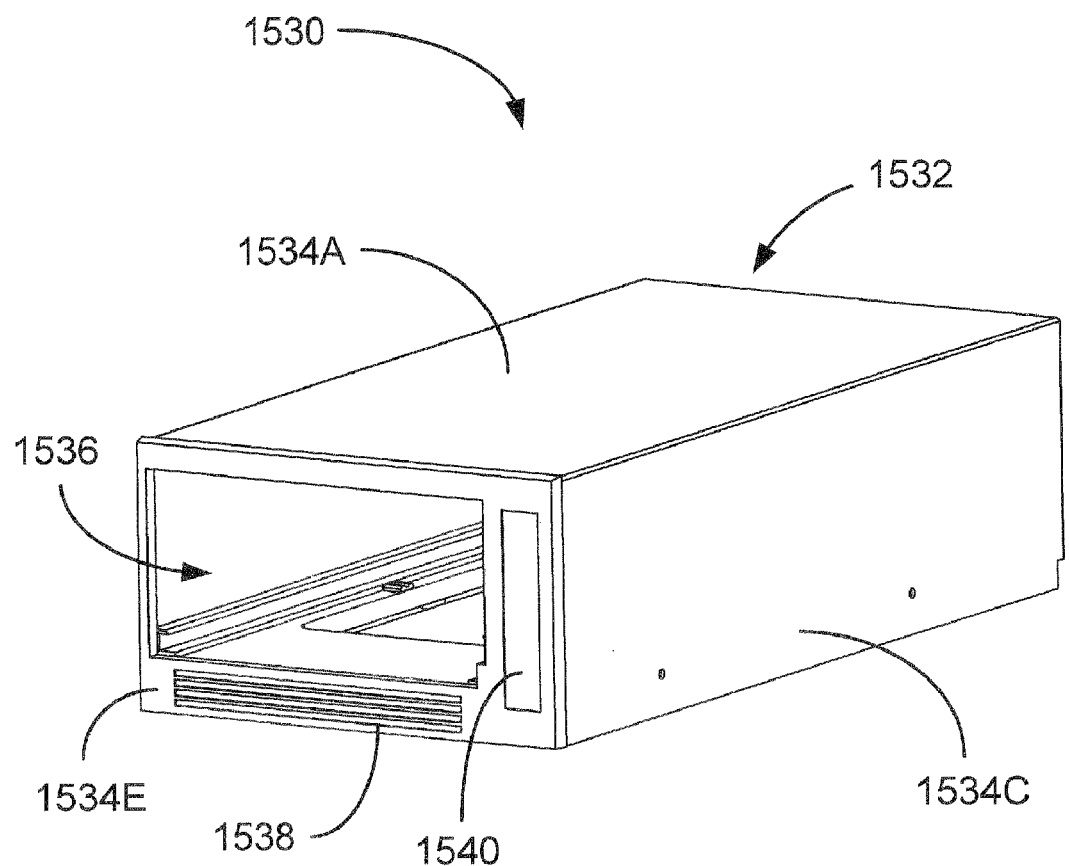
FIGS. 52A-52B are exterior perspective views of a drive for the embodiment of a magazine data storage element shown in FIGS. 46A-46C.
Figure 52B:
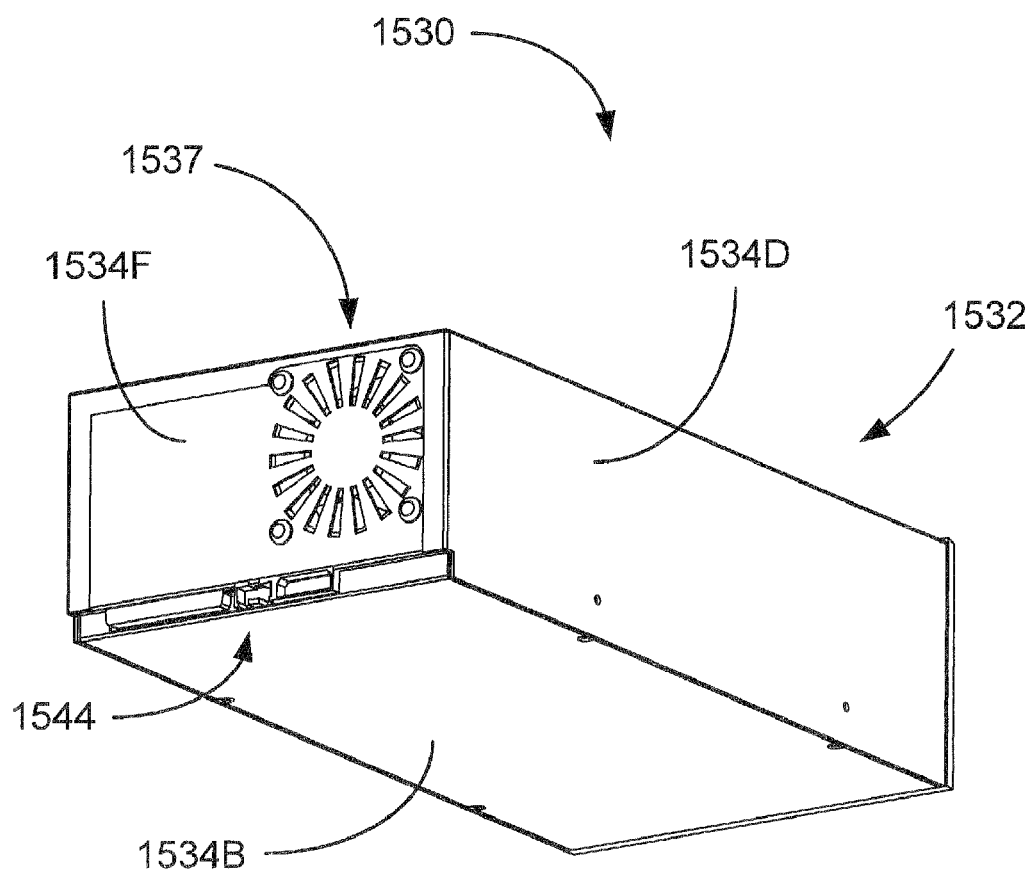

FIGS. 52A-52B are exterior perspective views of an embodiment of a magazine data storage element drive 1530 that is capable of transferring data to and from the magazine data storage element 1400. The drive 1530 is dimensionally substantially identical to a full height LTO, SAIT or DLT drive 180 that can be used in the library 202. Consequently, the drive 1530 is capable of being mounted in the drive bay assembly 540. Further, the plug interface in the sled portion of the drive bay 540 that interfaces with the plug of the drive 1530 is substantially identical to that shown in FIGS. 26A-26C. Further, the plug interface in the housing of a drive bay 540 that accommodates a sled with a drive 1530 is substantially identical to that shown in FIGS. 24A-24F. Other types and forms of plug interfaces are feasible.

The drive 1530 comprises a housing 1532 that is, in turn, comprised of a top wall 1534A, bottom wall 1534B, first and second side walls 1534C, 1434D, front wall 1434E, and back wall 1534F. Associated with the front wall 1534E is an opening 1536 for receiving a magazine data storage element 1400; a grill 1538 that allows air to be moved through the drive 1530 during operation to cool components of the drive 1530; and a status panel 1540 for providing an operator with drive 1530 status information. Associated with the back wall 1534F is a second grill 1537 that facilitates the flow of air through the drive 1530 during operation. A plug interface 1544 for receiving data related signals and power is also associated with the back wall 1434F. The plug interface 1544 is substantially identical to the plug interface on a comparable SAIT drive. Other plug interfaces are feasible.

With reference to FIGS. 53A-53D, the drive 1530 is further comprised of a chassis 1550 that generally provides a mounting surface for other elements that comprise the drive 1530. In this regard, the chassis 1550 provides a mounting surface to which the bottom wall 1534B, first and second side walls 1534C, 1534D, front wall 1534E, and back wall 1534F are directly mounted. The chassis 1550 also provides a mounting surface for: (a) a drive-magazine connector 1552 that interfaces with the magazine-drive connector 1514 of the magazine data storage element 1400; (b) a magazine guide structure 1554 that cooperates with the rails 1454A, 1454B of the magazine data storage element 1400 to align the magazine-drive connector 1514 of the magazine data storage element 1400 with the drive-magazine connector 1552; and (c) a magazine insertion/ejection system 1556 that is used to force the magazine-drive connector 1514 of the magazine data storage element 1400 into engagement with the drive-magazine connector 1552 during an insertion operation and out of engagement with the drive-magazine connector 1552, for example, during an ejection operation. Also attached to the chassis 1550 is a controller board 1584 that comprises electronic circuitry for controlling the operation of the drive 1530 relative to a magazine data storage element 1400. In this regard the controller board 1584 provides the ability to manage or configure the hard disk drives 1402 associated a magazine data storage element 1400. In one embodiment, the controller board 1584 is capable of configuring the hard disk drives 1402 as a redundant array of independent drives (RAID) or as just a bunch of drives (JBOD). A fan 1586 is attached to the back wall 1534F and is used, during operation, to pull air across the controller board 1584 and through a magazine data storage element, such as element 1400, to cool the board and the hard disk drives 1402 within the element 1400.

The drive-magazine connector 1552 is comprised of a plurality of spring-loaded pins 1553. The free end of each of the pins 1553 is positioned to engage a corresponding conductive pad 1517 associated with the magazine-drive connector 1514 when the magazine data storage element 1400 is properly inserted into the drive 1530. Most, if not all, of the pins 1553 are connected to the plug interface 1544 by conductors 1553. If the magazine-drive connector 1514 comprises optical pads/receivers, the drive-magazine connector 1552 employs an optical "pin" structure that is capable of engaging the optical receiver. It should be appreciated that the magazine-drive connector 1514 may comprise one or more optical pads/receivers and one or more electrically conductive pads. In which case, the drive-magazine connector 1552 and the conductors 1553 are adapted accordingly. Spring loaded pins 1553 are employed to reduce the occurrence of broken pins that could disable the drive 1530. Further, the use of spring loaded pins 1553 and pads 1517 to establish a connection between a magazine data storage element 1400 and the drive 1530 allows some alignment tolerance relative to a male/females connection structure, i.e., the magazine-drive connector 1514 of a magazine data storage element 1400 does not need to be as accurately aligned to engage the drive-magazine connector 1552 as would be the case if the magazine-drive connector 1514 employed a plurality of female sockets. It should be appreciated that a drive-magazine connector could comprise a plurality of pads 1517 that interface with a magazine-drive connector that is comprised of a plurality of pins 1553. Other types of connection interfaces are feasible. For instance, a male/female connection interface is feasible. However, as previously noted, such an interface is likely to have more pin breakages and tighter alignment tolerances.

The magazine guide structure 1554 is comprised of first and second guide rails 1558A, 1558B that cooperate with the rails 1454A, 1454B of the magazine data storage element 1400 to assure that the magazine data storage element 1400 is oriented so that the magazine-drive connector 1514 appropriately interfaces with the drive-magazine connector 1552.

The magazine insertion/ejection system 1556 is comprised of: (a) a cam plate 1560; (b) a cam ramp 1562; (c) a cam hook 1564; (d) a lead screw nut 1566; (e) a pin 1568 that pivotally attaches the cam hook 1564 to the lead screw nut 1566; (f) a lead screw 1570 that receives the lead screw nut 1566; (g) a lead screw mounting block 1572 that provides a bearing mount for one end of the lead screw 1570; (h) a lead screw and motor mounting block 1574 that provides a bearing mount for the other end of the lead screw 1570 and a mount for a DC motor 1576; (i) the DC motor 1576 for providing the rotational motive force that is used to move the lead screw nut 1566 back and forth along the lead screw 1570; (j) a pinion 1578 that is operatively attached to the drive shaft (not shown) of the DC motor 1576; and (k) a gear 1580 that is attached to the lead screw 1570 and cooperates with the pinion 1578 to transmit the rotational motive force produced by the DC motor 1576 to the lead screw 1570.

In operation, the magazine insertion/ejection system 1556 is either in a disengaged state or an engaged state. FIG. 54A illustrates the disengaged state of the system 1556. In the disengaged state, the cam hook 1564 is positioned so as not to be able to engage the notch 1456 associated with the housing 1430 of the magazine data storage element 1400. This positioning of the cam hook 1564 is achieved by using the DC motor 1576 to drive the lead screw nut 1566 and the cam hook 1564 towards the lead screw mounting block 1572. As the lead screw nut 1566 and cam hook 1564 approach the lead screw mounting block 1572, a surface 1582 of the cam hook 1564 engages the cam ramp 1562. As the lead screw nut 1566 is driven further towards the lead screw mounting block 1572, the cam ramp 1562 applies a force to the cam hook 1564 via the surface 1582 that causes the cam hook 1564 to rotate to a position at which the cam hook 1564 is not able to engage the notch 1456.

Figure 54B:
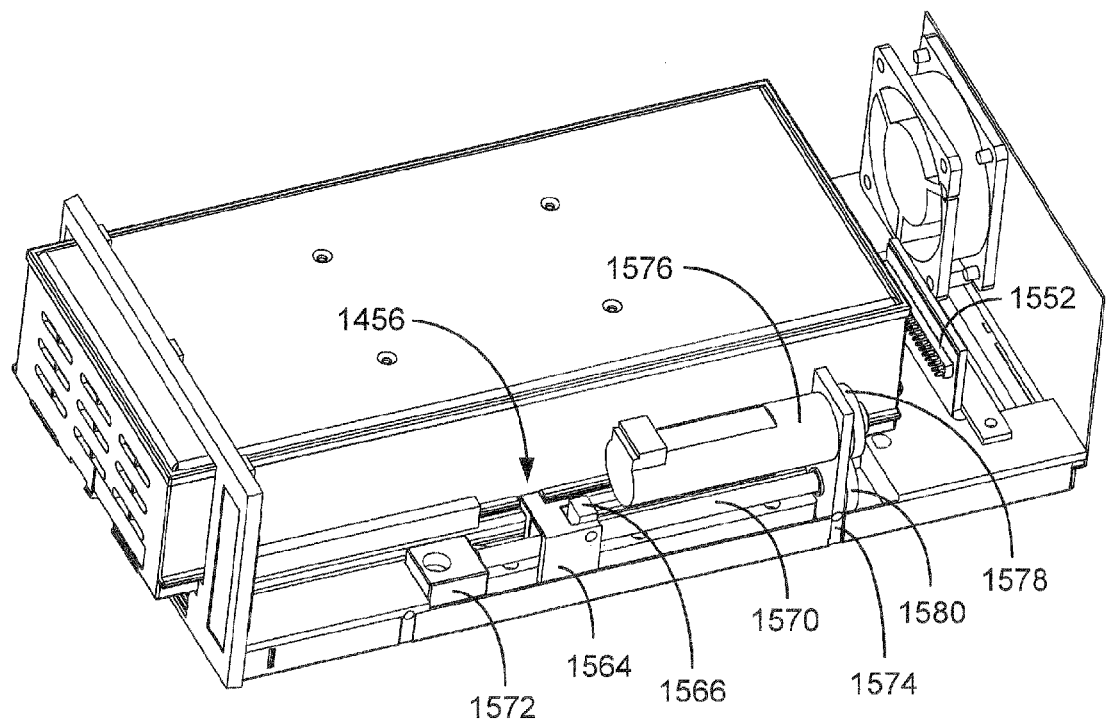
Figure 55A:
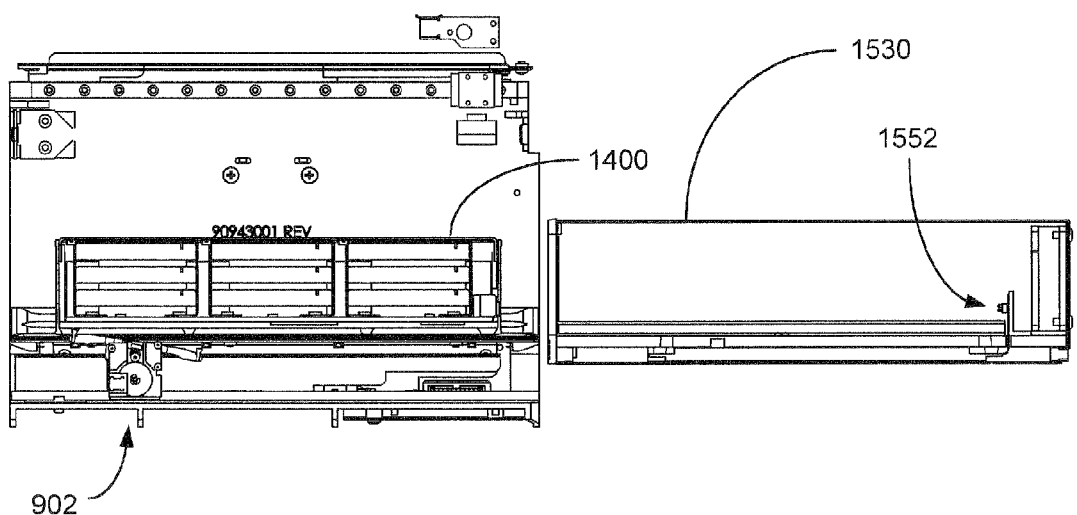
FIGS. 55A-55D illustrate the operation of the embodiment of a magazine picker shown in FIGS. 30A-30G in loading the embodiment of a magazine data storage element shown in FIGS. 46A-46C into the embodiment of a drive shown in FIGS. 52A-52B.
Figure 55B:
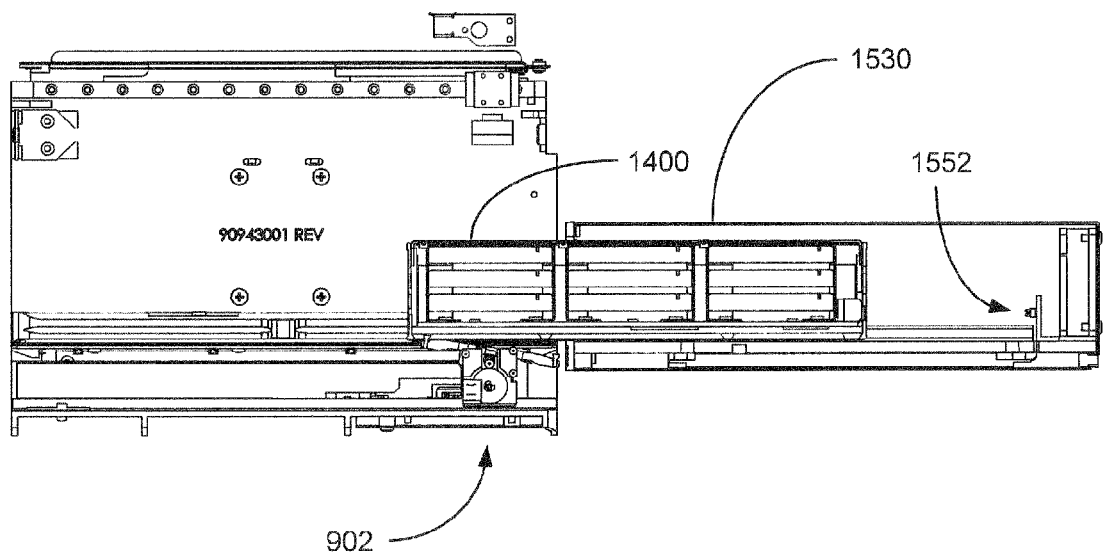
Figure 55C:
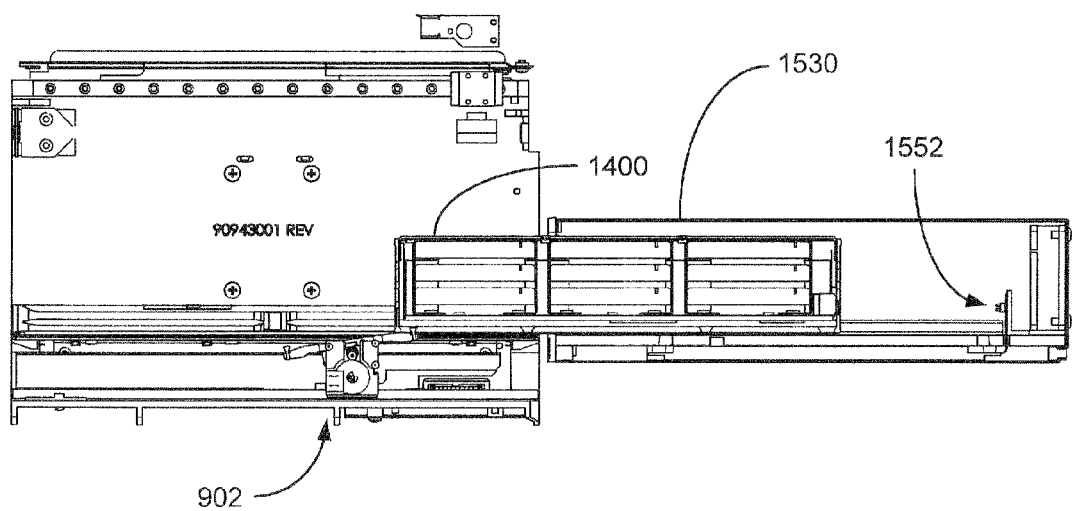
Figure 55D:
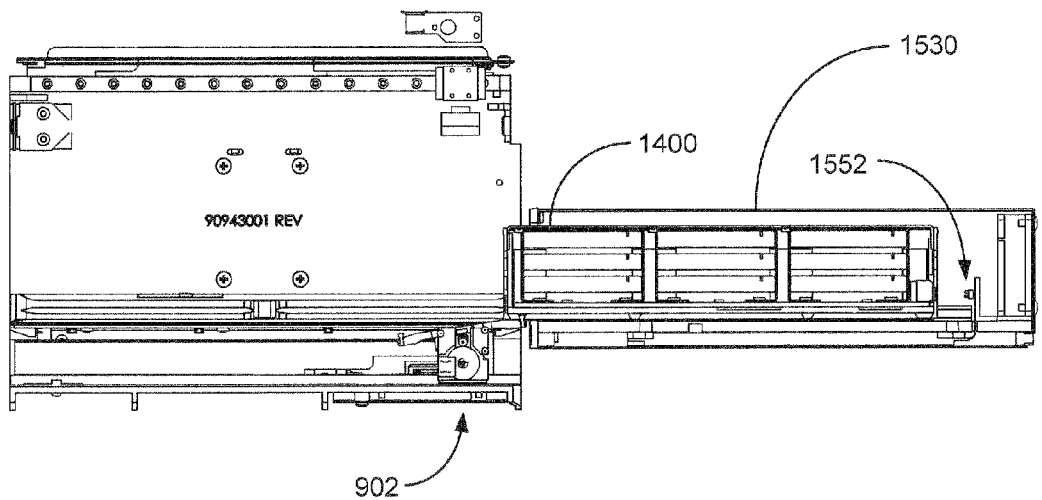

FIG. 54B illustrates the engaged state of the system 1556. In the engaged state, the cam hook 1564 is positioned to engage the notch 1456 associated with the housing 1430 of the magazine data storage element 1400. This positioning of the cam hook 1564 is achieved by using the DC motor 1576 to drive the lead screw nut 1566 and the cam hook 1564 to a position at which the surface 1582 of the cam hook 1564 is immediately adjacent to, but not engaging the cam ramp 1562. Once the cam hook 1564 has engaged the notch 1456, movement of the cam hook 1564 between the start of the cam ramp 1562 and the lead screw/motor mounting block 1574 is used to apply either a force that drives the element 1400 towards the drive-magazine connector 1552 or a force that drives the element 1400 away from the drive-magazine connector 1552.

The manner in which the magazine data storage element 1400 is moved within the library 202 is substantially identical to the manner in which a data cartridge magazine 466 is moved within the library 202. Specifically, the manner in which the magazine data storage element 1400 is moved into and out of the library 202 via the entry/exit port 206 is substantially identical to the manner in which the data cartridge magazine 466 is moved into and out of the library 202 via the entry/exit port 206 and described with respect to FIGS. 19A-19E. Likewise, the manner in which the magazine data storage element 1400 is moved away from a shelf, such as shelf 990, and towards a shelf 990 is substantially identical to the manner in which the magazine 988 is moved towards and away from a shelf 990 and described with respect to FIGS. 31A-31L. With reference to FIGS. 55A-55D, the manner in which the magazine data storage element 1400 is loaded into the drive 1530 is, in part, substantially identical the magazine 988 is moved towards a shelf, such as shelf 992, and described with respect to FIGS. 31H-31L. However, once the magazine data storage element 1400 is in the position illustrated in FIG. 55D, the drive 1530 employs the magazine insertion/ejection system 1556 to force the magazine data storage element 1400 towards the drive-magazine connector 1552 so that the magazine-drive connector 1514 engages the drive-magazine connector 1552. An optical detector 1608 is used to determine when the magazine data storage element 1400 is in the appropriate position for the insertion/ejection system 1556 to be employed. The insertion/ejection system 1556 is not activated, however, until the magazine picker 880 is disengaged from the magazine data storage element 1400. Once the magazine data storage element 1400 is disengaged from the magazine picker 880, the insertion/ejection system 1556 is transitioned from the disengaged state to the engaged state and used to force the element 1400 towards the drive-magazine connector 1552. The insertion/ejection system 1556 ceases forcing the element 1400 toward the drive-magazine connector 1552 once a connection has been established between the magazine-drive connector 1514 and the drive-magazine connection 1552. Confirmation that a connection has been established is determined using two of the pads, such as pads 1517, of the magazine-drive connector 1514 that are connected together. To elaborate, a connection is confirmed when a signal from the drive-magazine connector 1552 is applied to one of the two pads and returned to the magazine-drive connector 1514 from the other pad. Other structures for determining when to cease forcing the element 1400 towards the drive magazine connector 1552 are feasible. For instance, a second optical detector (not shown) can be employed or an encoder associated with the motor 1576.

Unloading of the magazine data storage element 1400 from the drive 1530 involves using the magazine insertion/ejection system 1556 to force the magazine data storage element away from the drive-magazine connector 1552 so that the magazine-drive connector 1514 disengages from the drive-magazine connector 1552. Unloading is completed by reversing the sequence of operations illustrated in FIGS. 55A-55D.

At this point, it should be appreciated a magazine-based library 202 comprised of one or more magazine data storage element drives, such as drive 1530, one or more other drives, such as a tape drive 180, that are each capable of operating on a data cartridge, such as an LTO cartridge 1244, a shelving system 208 that is capable of storing at least one magazine data storage element 1400 and at least one data cartridge magazine, such as magazine 320, a magazine transport 108, and a cartridge transport 110 is feasible. For example, a library comprised of one or more drives 1530, one more LTO, SAIT or DLT tape cartridge drives 180, the shelving system 208 that is capable of storing the magazine data storage element 1400 and one of the data cartridge magazines 270, 320, the magazine transport 212, and a cartridge transport 214 is feasible. Also feasible is a magazine-based library that operates solely on magazine data storage elements 1400. For example, a library comprised of one or more of the drives 1530, the shelving system 208 that is capable of storing one or more of the magazine data storage element 1400, and the magazine transport 214 is feasible. If the library 202 is used for such a magazine-based library, the elements of the library 202 associated with moving cartridges in the library can be eliminated. It should also be appreciated that the magazine data storage element 1400 is also capable of being transported between magazine-based libraries or sections of magazine-based libraries in the same manner that data cartridge magazines, such as magazine 320, can be transported between magazine-based data cartridge libraries or sections thereof. Also feasible is a non-library implementation in which a magazine data storage element drive is capable of being directly connected to a host computer. For example, the drive 1530 can be directly connected to a host computer, such as a PC (Personal Computer). In such an implementation, a magazine data storage element 1400 would be loaded/unloaded into/from a magazine data storage element drive, such as drive 1530, by hand.

What is claimed is:

1. A mobile data storage magazine for interacting with a docking station of a data storage library, the docking station including conductors for providing electrical power and communication, the magazine comprising:
   a magazine frame comprising an opening adapted to receive a plurality of operatively interconnected disk drives;
   a magazine cover that substantially encases the frame, the cover comprising ventilation holes adapted to cool the drives;
   a contact element associated with the magazine frame for conducting electrical power from the docking station to at least one of the plurality of disk drives when the contact element is engaged with the docking station electrical power conductor in a relationship that excludes a male and female relationship;
   a communication element associated with the magazine frame capable of conducting data between the docking station communication conductor and at least one of the plurality of disk drives when the communication element is engaged with the docking station communication conductor in a relationship that excludes a male and female relationship.

2. The mobile data storage magazine of claim 1 further comprising a magazine connector apparatus capable of accommodating a plurality of said contact elements, said contact elements associated with said connector apparatus accessible to said docking station via an accommodating opening in said cover.

3. The mobile data storage magazine of claim 1 wherein the interconnected disk drives are inaccessible by a user when the magazine is interacting with the docking station.

4. The mobile data storage magazine of claim 1 wherein the conductors each comprise either a flexible conductive element or a substantially flat conductive pad.

5. The mobile data storage magazine of claim 4 wherein the flexible conductive element is a spring loaded pin.

6. The mobile data storage magazine of claim 1 wherein the contact element is a substantially conductive pad adapted to engage a spring loaded pin.

7. The mobile data storage magazine of claim 1 wherein the communication element is adapted to receive communication through either electrical or optical transmission.

8. The mobile data storage magazine of claim 1 wherein the mobile data storage magazine is capable of coexisting with at least one data cartridge magazine comprised by a tape magazine library wherein the mobile data storage magazine is capable of being transferred within the tape magazine library by a robotic element from at least a shelf system to at least the docking station.

9. The mobile data storage magazine of claim 8 wherein the mobile data storage magazine is substantially the same size and shape as a tape cartridge magazine sized to fit substantially within the docking station and that is capable of holding at least two data cartridges.

10. The mobile data storage magazine of claim 1 wherein the mobile storage magazine is inoperable when not engaged with the docking station.

11. A method for engaging an air cooled mobile data storage magazine with a docking station of a data storage library, comprising the method steps of:
   engaging at least one docking station contact element comprised by the docking station with at least one magazine contact element in a non male/female relationship to establish electrical connection;
   providing electrical power to at least one of a plurality of disk drives capable of being disposed in the mobile data storage magazine;
   establishing communication with at least the docking station via a communication connection established between at least one communication element associated with the magazine and a compatible communication element associated with the docking station.

12. The method of claim 11, further comprising the method step of storing data on at least one of the plurality of disk drives.

13. The method of claim 12, wherein the communication connection is established through either electrical or optical transmission.

14. The method of claim 12, wherein the male/female contact element associated with the magazine is disposed on a magazine connector apparatus adapted to accommodate a plurality of said non/male female contact elements, said magazine connector apparatus is accessible via an accommodating hole in a magazine frame that substantially encases the magazine.

15. The method of claim 11, further comprising the method step of transferring the magazine from a storage location in a tape magazine library to the docking station in the tape library by a robotic element.

16. The method of claim 11 wherein the electrical power supplied to the disk drives is solely through the electrical connection.

17. A mobile data storage magazine, for interacting with a docking station, comprising:
   an air vented magazine frame defining a space wherein a plurality of operatively interconnected disk drives can be disposed;

a first contact element associated with the magazine frame capable of conducting electrical power to at least one of the plurality of disk drives when axially engaged with a second contact element associated with the docking station wherein the first and second contact elements are adapted to cooperate in a non male/female relationship;

a first communication element associated with the magazine frame capable of conducting data between at least one of the plurality of disk drives and the docking station when the first communication element is operatively linked to a second communication element associated with the docking station.

18. The mobile data storage magazine of claim 17 wherein the mobile data storage magazine is adapted to be received by an opening in the docking station.

19. The mobile data storage magazine of claim 18 wherein the docking station is capable of pulling the mobile data storage magazine into the docking station by a pulling means to engage the first and second contact elements.

20. The mobile data storage magazine of claim 17 wherein the disk drives depend on power provided by contact made between the first and the second contact elements.

* * * * *